(12) United States Patent
Rubin et al.

(10) Patent No.: US 9,219,541 B2
(45) Date of Patent: Dec. 22, 2015

(54) BASEBAND DATA TRANSMISSION AND RECEPTION IN AN LTE WIRELESS BASE STATION EMPLOYING PERIODICALLY SCANNING RF BEAM FORMING TECHNIQUES

(71) Applicant: All Purpose Networks LLC, Dover, NJ (US)

(72) Inventors: Harvey Rubin, New York, NY (US); James Keith Brewington, Paupack, PA (US); Anil S. Sawkar, Basking Ridge, NJ (US); David M. Poticny, Whippany, NJ (US)

(73) Assignee: ALL PURPOSE NETWORKS LLC, Dover, NJ (US)

( * ) Notice: Subject to any disclaimer, the term of this patent is extended or adjusted under 35 U.S.C. 154(b) by 17 days.

(21) Appl. No.: 13/945,273

(22) Filed: Jul. 18, 2013

(65) Prior Publication Data
US 2013/0336176 A1 Dec. 19, 2013

Related U.S. Application Data

(63) Continuation-in-part of application No. 13/916,338, filed on Jun. 12, 2013, which is a continuation-in-part of application No. 13/860,711, filed on Apr. 11, 2013, which is a continuation-in-part of application No.

(Continued)

(51) Int. Cl.
*H04B 7/00* (2006.01)
*H04B 7/26* (2006.01)
(Continued)

(52) U.S. Cl.
CPC .............. *H04B 7/26* (2013.01); *H04B 7/0617* (2013.01); *H04J 11/005* (2013.01); *H04W 16/28* (2013.01);

(Continued)

(58) Field of Classification Search
USPC .................................. 370/310–350
See application file for complete search history.

(56) References Cited

U.S. PATENT DOCUMENTS 8,521,141 B2   8/2013   Aguirre et al.
8,559,957 B2   10/2013   Hunzinger
(Continued)

FOREIGN PATENT DOCUMENTS

WO   2013188629 A2   12/2013
WO   2013188629 A3   4/2014

OTHER PUBLICATIONS

PCT/US2013/045581, "International Application Serial No. PCT/US2013/045581, International Preliminary Report on Patentability With Written Opinion mailed Dec. 24, 2014", All Purpose Networks LLC, 14 Pages.

(Continued)

*Primary Examiner* — Kwang B Yao
*Assistant Examiner* — Juvena Loo
(74) *Attorney, Agent, or Firm* — GTC Law Group LLP & Affiliates

(57) ABSTRACT

The present disclosure is related to a large-scale broadband wireless network capable of providing a very high wireless data capacity, wherein one aspect of the system utilizes a periodic beam forming system. When a wireless base station cell operates a periodic beam forming system, it is necessary to locate each user served by the cell within a sub-area covered by one of the m times N RF beams generated by the system. Methods for locating users within RF beam sub-areas are disclosed herein, where a user may be scheduled for transmission or reception only when an RF beam is focused on the sub-area that covers the user location. The present disclosure pertains to the systems and methods that may be used to process transmissions of and receptions by the baseband system of an LTE wireless base station that employs a periodic beam forming RF and antenna system.

28 Claims, 53 Drawing Sheets

Related U.S. Application Data

13/755,808, filed on Jan. 31, 2013, which is a continuation-in-part of application No. 13/667,424, filed on Nov. 2, 2012, now Pat. No. 8,565,689.

(60) Provisional application No. 61/659,174, filed on Jun. 13, 2012.

(51) Int. Cl.
*H04B 7/06* (2006.01)
*H04W 16/28* (2009.01)
*H04J 11/00* (2006.01)
H04W 64/00 (2009.01)
H04W 36/06 (2009.01)
H04W 36/08 (2009.01)
H04L 5/00 (2006.01)
H04L 27/34 (2006.01)

(52) U.S. Cl.
CPC .......... *H04L 5/0007* (2013.01); *H04L 5/0053* (2013.01); *H04L 27/34* (2013.01); *H04W 36/06* (2013.01); *H04W 36/08* (2013.01); *H04W 64/00* (2013.01)

(56) References Cited

U.S. PATENT DOCUMENTS

| | | |
|---|---|---|
| 8,565,689 B1 | 10/2013 | Rubin et al. |
| 8,867,380 B2 | 10/2014 | Gorokhov et al. |
| 2002/0137538 A1 | 9/2002 | Chen et al. |
| 2002/0160778 A1* | 10/2002 | Hiramatsu et al. ............ 455/436 |
| 2004/0131040 A1 | 7/2004 | Gruhl et al. |
| 2004/0190702 A1 | 9/2004 | Mayer et al. |
| 2005/0206564 A1 | 9/2005 | Mao et al. |
| 2006/0083201 A1 | 4/2006 | He et al. |
| 2006/0104262 A1 | 5/2006 | Kant et al. |
| 2007/0097942 A1* | 5/2007 | Gorokhov et al. ............ 370/342 |
| 2007/0135168 A1 | 6/2007 | Liu |
| 2007/0281642 A1* | 12/2007 | Gorokhov ................. 455/185.1 |
| 2008/0018459 A1 | 1/2008 | Derrick et al. |
| 2008/0123673 A1 | 5/2008 | Lee |
| 2008/0233967 A1 | 9/2008 | Montojo et al. |
| 2008/0242251 A1 | 10/2008 | Kraemer et al. |
| 2008/0261602 A1 | 10/2008 | Livneh |
| 2009/0086867 A1 | 4/2009 | Banu et al. |
| 2009/0170514 A1 | 7/2009 | Yokoyama |
| 2009/0201881 A1 | 8/2009 | Chun et al. |
| 2009/0219849 A1 | 9/2009 | Alpert et al. |
| 2009/0233545 A1 | 9/2009 | Sutskover et al. |
| 2009/0279430 A1 | 11/2009 | Huber et al. |
| 2009/0325491 A1 | 12/2009 | Bell et al. |
| 2010/0033374 A1 | 2/2010 | Van Rensburg et al. |
| 2010/0054196 A1 | 3/2010 | Hui |
| 2010/0056059 A1 | 3/2010 | Lakshmanan et al. |
| 2010/0075705 A1 | 3/2010 | Van Rensburg et al. |
| 2010/0080153 A1 | 4/2010 | Kahn et al. |
| 2010/0127931 A1 | 5/2010 | Rensburg et al. |
| 2010/0165931 A1 | 7/2010 | Nimbalker et al. |
| 2010/0173639 A1 | 7/2010 | Li et al. |
| 2010/0184444 A1* | 7/2010 | Suo et al. ...................... 455/450 |
| 2010/0191576 A1 | 7/2010 | Raleigh |
| 2010/0210218 A1 | 8/2010 | Iwamura et al. |
| 2010/0238845 A1 | 9/2010 | Love et al. |
| 2010/0246544 A1 | 9/2010 | Brisebois et al. |
| 2010/0268836 A1 | 10/2010 | Jabri et al. |
| 2010/0272062 A1 | 10/2010 | Velev et al. |
| 2011/0058505 A1 | 3/2011 | Pan et al. |
| 2011/0069666 A1 | 3/2011 | Kahn et al. |
| 2011/0105146 A1 | 5/2011 | Chandrasekaran |
| 2011/0182256 A1 | 7/2011 | Fodor et al. |
| 2011/0194530 A1 | 8/2011 | Tinnakornsrisuphap et al. |
| 2011/0292915 A1 | 12/2011 | Prakash et al. |
| 2011/0300852 A1 | 12/2011 | Krishnaswamy et al. |
| 2011/0319025 A1 | 12/2011 | Siomina et al. |
| 2012/0063402 A1 | 3/2012 | Arvidsson et al. |
| 2012/0092442 A1 | 4/2012 | Tapia et al. |
| 2012/0092990 A1 | 4/2012 | Tapia et al. |
| 2012/0140633 A1 | 6/2012 | Stanwood et al. |
| 2012/0142280 A1 | 6/2012 | Banu et al. |
| 2012/0149388 A1 | 6/2012 | West et al. |
| 2012/0165015 A1 | 6/2012 | Gupta et al. |
| 2012/0176977 A1 | 7/2012 | Gao et al. |
| 2012/0182987 A1 | 7/2012 | Gallant |
| 2012/0198032 A1 | 8/2012 | Fitzgerald et al. |
| 2012/0252474 A1 | 10/2012 | Tiirola et al. |
| 2012/0258754 A1 | 10/2012 | Banu et al. |
| 2012/0287986 A1 | 11/2012 | Paniconi et al. |
| 2012/0294400 A1 | 11/2012 | Banu et al. |
| 2012/0307697 A1 | 12/2012 | Mukhopadhyay |
| 2013/0017855 A1 | 1/2013 | Hui et al. |
| 2013/0028200 A1* | 1/2013 | Nory et al. .................... 370/329 |
| 2013/0031575 A1 | 1/2013 | Gallant et al. |
| 2013/0121135 A1 | 5/2013 | Berg et al. |
| 2013/0131840 A1 | 5/2013 | Govindaraj et al. |
| 2013/0142183 A1 | 6/2013 | Lee et al. |
| 2013/0143541 A1 | 6/2013 | Henderson et al. |
| 2013/0151623 A1 | 6/2013 | Weiser et al. |
| 2013/0152153 A1 | 6/2013 | Weiser et al. |
| 2013/0163424 A1 | 6/2013 | Goerke et al. |
| 2013/0208683 A1 | 8/2013 | Yuen et al. |
| 2013/0243075 A1 | 9/2013 | Dalela et al. |
| 2013/0336174 A1 | 12/2013 | Rubin et al. |
| 2013/0336179 A1 | 12/2013 | Rubin et al. |
| 2013/0337822 A1 | 12/2013 | Rubin et al. |
| 2013/0339455 A1 | 12/2013 | Bajaj et al. |
| 2014/0003394 A1 | 1/2014 | Rubin et al. |
| 2014/0010129 A1 | 1/2014 | Rubin et al. |
| 2014/0025781 A1 | 1/2014 | Ye et al. |
| 2014/0056224 A1 | 2/2014 | Rubin et al. |
| 2014/0105062 A1 | 4/2014 | McDysan et al. |
| 2014/0105216 A1 | 4/2014 | McDysan |
| 2014/0153402 A1 | 6/2014 | Rubin |
| 2014/0185516 A1 | 7/2014 | Rubin et al. |
| 2014/0219152 A1 | 8/2014 | Antó et al. |
| 2014/0233524 A1 | 8/2014 | Jang et al. |
| 2014/0334360 A1 | 11/2014 | Rubin et al. |
| 2014/0334449 A1 | 11/2014 | Rubin et al. |
| 2014/0335839 A1 | 11/2014 | Rubin et al. |
| 2014/0335881 A1 | 11/2014 | Rubin et al. |
| 2014/0341039 A1 | 11/2014 | Rubin et al. |
| 2014/0373124 A1 | 12/2014 | Rubin et al. |
| 2014/0376378 A1 | 12/2014 | Rubin et al. |
| 2015/0079945 A1 | 3/2015 | Rubin et al. |

OTHER PUBLICATIONS

PCT/US2013/045581, "International Application Serial No. PCT/US2013/045581, International Search Report and Written Opinion mailed Feb. 19, 2014", All Purpose Netowrks LLC, 23 Pages.

\* cited by examiner

| | 0 | 1 | 2 | 3 | 4 | 5 | 6 | 7 | 8 | 9 |
|---|---|---|---|---|---|---|---|---|---|---|
| TDD Config 0 | D | S | U | U | U | D | S | U | U | U |
| TDD Config 1 | D | S | U | U | D | D | S | U | U | D |
| TDD Config 2 | D | S | U | D | D | D | S | U | D | D |
| TDD Config 3 | D | S | U | U | U | D | D | D | D | D |
| TDD Config 4 | D | S | U | U | D | D | D | D | D | D |
| TDD Config 5 | D | S | U | D | D | D | D | D | D | D |
| TDD Config 6 | D | S | U | U | U | D | S | U | U | D | sub-frame →

Fig. 10

BASEBAND DATA TRANSMISSION AND RECEPTION IN AN LTE WIRELESS BASE STATION EMPLOYING PERIODICALLY SCANNING RF BEAM FORMING TECHNIQUES

CROSS-REFERENCE TO RELATED APPLICATIONS

This application is a continuation-in-part of U.S. patent application Ser. No. 13/916,338 filed Jun. 12, 2013, which is a continuation-in-part of U.S. patent application Ser. No. 13/860,711 filed Apr. 11, 2013, which is a continuation-in-part of U.S. patent application Ser. No. 13/755,808 filed Jan. 31, 2013, which is a continuation-in-part application of U.S. patent application Ser. No. 13/667,424, filed Nov. 2, 2012, which claims the benefit of U.S. provisional patent application 61/659,174, filed Jun. 13, 2012. All of these applications are incorporated herein by reference in their entirety.

BACKGROUND

This disclosure relates to broadband networks, and more specifically to methods and systems for increasing bandwidth in a large area broadband network.

DESCRIPTION OF RELATED ART

Wireless networks are deployed ubiquitously across the globe, with each new standardized air interface supplying ever-higher data rates to users. However, the popularity of data applications, and especially of video applications, is becoming so great that even the high data rates and increased capacity offered by 3G and 4G networks do not meet the current and expected demands for bandwidth. Several factors combine to make it difficult to meet these user demands. One is the air interface itself. New standards such as 3GPP (Third Generation Partnership Project) LTE (Long Term Evolution), offer the possibility of providing user data rates of up to 10 Mbps, 20 Mbps, or even higher. However, because of the way users are generally distributed across the coverage area of a transmitting Cell, an average Cell throughput of around 13 Mbps may be expected. This is not enough to supply video services to more than a handful of users. Hence, it is necessary to improve the utilization of the LTE air interface. Furthermore, inter-cell interference caused by the overlap of RF signals between transmitting Cells reduces the data rates and capacities that may be provided to users who are located in the boundaries between Cells. Any method of reducing, or eliminating, this inter-cell interference will improve the system capacity and throughput, and offer improved quality of service to these users. Another factor is the over-utilization of the back haul facility that connects an LTE Base Station (eNB) to the Enhanced Packet Core (EPC) network. Facilities that operate at one Gbps may not be deployed to reach all base stations, and hence, a moderate number of users of video applications may easily use so much back haul bandwidth that other services cannot be provided to the remaining users. Another factor is the way in which servers are deployed to bring services to wireless users. These servers are external to the wireless network, and may be located at great distances from the user access point in the wireless network. Long packet transit delays (latency) between the service program that runs on the server and the user access point in the wireless network may result in a poor user experience in using the service.

The US Government needs to take advantage of the plethora of new user devices being produced to run on new wireless networks like LTE. It is becoming less attractive for the Government to use proprietary systems for their wireless communications needs. The expense involved in acquiring new spectrum, and the coincidence of needs of US Government users and of general users, suggest that a standard LTE network be used concurrently by both types of users. In this shared system, during an emergency, it is necessary for the Government to be able to implement prioritized access for authorized government use of the network, or of a part of the network, necessarily excluding use for non-government purposes when capacity is exhausted. This behavior may not be available in today's wireless networks to the degree required by the government. Furthermore, government and commercial applications are more and more using sensors of all types to gather information. A wireless network that has the ability to acquire, process, store, and redistribute the sensor data efficiently and quickly is not available. Also, during military operations, or during emergencies, the ad hoc deployment of an LTE wireless network may be the best way to provide wireless service to emergency responders, to US armed forces, or to the general public. An ad hoc network may use airborne base stations that are deployed above the disaster area, or area of operation. In the case of an airborne ad hoc network deployment (or of other deployments involving mobile base stations), the network must be kept running as the airborne, or mobile, base stations need to be taken out of service because of low fuel or power, or because of loss of the airborne, or mobile, vehicle.

SUMMARY

Beam forming techniques have been used for many years in the areas of audio signal processing, sonar signal processing, and radio frequency signal processing to improve the operation of the system. In many cases, these systems locate a transmitting or receiving point, and then focus the system antennas to create a beam for that point. Among the teachings presented herein are those that disclose systems that operate in a different manner, and which take advantage of the fact that in LTE Wireless Systems, user devices are scheduled either to receive a transmission, or to generate a transmission. Such systems do not focus an antenna beam on a particular user, but rather, for frequency division duplexing (FDD) systems, generate in each of m 1 msec intervals a different pattern of N non-overlapping fixed position RF beams; for a time division duplexing (TDD) system, one of m different patterns of N fixed position RF beams is generated in each 1 msec non-S sub-frame of each LTE frame. Each RF beam covers a sub-area of the total Cell coverage area. The total collection of m times N RF beam patterns covers the area of the Cell. After m milliseconds in an FDD system, the RF beam patterns repeat; the beam patterns repeat after 10 msec in a TDD system. The RF beam patterns thus appear to rotate periodically over the Cell coverage area. Users are scheduled for transmission or reception only when a beam is focused on the beam sub-area that includes the user location. Such systems are referred to herein by terms such as "Agile Beam Forming system," "agile beam system," and "periodic beam forming system," and include a cellular LTE base transceiver station operating in the frequency division duplexing mode, or in the time division duplexing mode.

When an LTE wireless base station Cell operates a Periodic Beam Forming system, it is necessary to locate each user served by the Cell within a sub-area covered by one of the m times N RF beams generated by the system. Methods for locating users within RF beam sub-areas are disclosed herein. A user may be scheduled for transmission or reception only when an RF beam is focused on the sub-area that covers the user location. The present disclosure pertains to the systems and methods that may be used to process transmissions of and receptions by the baseband system of an LTE wireless base station that employs a Periodic Beam Forming RF and antenna system.

An LTE wireless base station system employing periodic beam forming is disclosed, wherein the digital baseband processing part of the system is connected to the RF and antenna part of the system via a digital interface, where the interface supports the transfer of information from the digital baseband system to the RF system for each of the N RF beams that are to be transmitted in each one-millisecond sub-frame of each LTE frame in an LTE FDD system, or in each D sub-frame in an LTE TDD system (these may be referred to as transmit beam data streams), and where the interface supports the transfer of information from the RF system to the digital baseband system for each of the N receive RF beams formed in each one-millisecond sub-frame of each LTE frame in an LTE FDD system, or in each U sub-frame in an LTE TDD system (these may be referred to as receive beam data streams). Furthermore, the digital interface may support an additional $((N+1)^{st})$ transmit data stream to send information to the RF system, carrying data that is to be transmitted via an RF signal that covers all portions of the Cell coverage area. This digital data stream may be referred to as the Cell-Wide transmit data steam. Also, the digital interface may support an additional $((N+1)^{st})$ receive data stream received from the RF system, which carries data that is received from an RF signal that covers all portions of the Cell coverage area. This digital data stream may be referred to as the Cell-Wide receive data stream. The digital data streams referred to herein may be carried over the interface in either a multiplexed fashion using one or more physical interfaces, in a non-multiplexed fashion using a separate physical interface for each data stream, and the like.

In embodiments, the system may be operated either using Transmission Mode 7 or Transmission Mode 2. The former implies to the User Equipment (UE) the use of a single antenna, logical antenna port 5, while the latter implies to the UE the use of Transmit Diversity, using two antennas. For Transmission Mode 7, the user data may be transmitted by the wireless base station only in the RF beam that covers the user location. For Transmission Mode 2, the user data may be transmitted both in the RF beam that covers the user location and in the Cell-Wide RF signal.

In embodiments, in every sub-frame, or Transmission Time Interval (TTI), in an FDD system, and in every D sub-frame in a TDD system, the LTE wireless base station MAC (Medium Access Control) layer software may select the information to be transmitted during that TTI. The information may be data that the MAC schedules for transmission to a set of UEs, and/or may be Paging messages, and/or may be data for one or more of the Common Channels (e.g., the PBCH, PDCCH, PHICH, PMCH). The MAC layer software may send this data, along with a mapping to the set of Resource Elements used by the data, to the PHY (Physical) layer software in the wireless base station, which may perform digital signal processing on the data, and may add Reference Signals to the data, to generate digital information to be sent to the RF subsystem to modulate a carrier frequency, and be transmitted via the wireless base station antenna system.

In embodiments, in every sub-frame in an FDD system, and in every U sub-frame in a TDD system, the LTE wireless base station MAC layer software may interface with the PHY layer software to inform it of the PRBs (Physical Resource Blocks) and sub-carriers, and the symbol times (i.e., the Resource Elements) to search for particular types of information received via the digital interface from the RF and antenna system. This information may be user data and associated demodulation Reference Signals transmitted from UEs, UE access attempts via the Random Access channel, requests and reports transmitted by the UEs on their control channels, and Sounding Reference Signals (SRS) transmitted by UEs and used by the wireless base station to measure the uplink channel quality. The RF and antenna system may process the received RF signals generated by the UEs into digital information that is sent to the wireless base station baseband system, where the digital stream is first processed by the wireless base station PHY layer software, and where the processed data is then presented to the MAC layer software.

In embodiments, in every 1 millisecond sub-frame (TTI) in an FDD system, (N+1) digital transmit data streams, and (N+1) digital receive data streams, may be processed by the MAC layer software and by the PHY layer software in the wireless base station. In a TDD system, (N+1) transmit data streams may be processed by the MAC layer software and by the PHY layer software in each of the D sub-frames of the TDD U/D configuration, and (N+1) receive data streams may be processed by the PHY layer software and by the MAC layer software in each of the U sub-frames of the TDD U/D configuration.

In embodiments, for each of the uplink and downlink directions, one digital data stream, the Cell-Wide data stream, may contain data for users whose location is not known, data for common channels, common or Cell-Specific Reference Signals, Paging messages in downlink transmissions, user data when Transmission Mode 2 (transmit diversity) is used, and the like. The UE data may also be sent using a transmit RF beam stream.

In embodiments, in addition to the Cell-Wide data streams, N other transmit beam data streams, and N other receive beam data streams, may be generated during each sub-frame (TTI) in an FDD system, or N other receive beam data streams may be generated in every U sub-frame, and N other transmit beam data streams may be generated in every D sub-frame, in a TDD system. Each of these data streams may correspond to an RF beam signal to be illuminated in the current sub-frame. The data in each transmit or receive beam data stream may include user plane data only for users who are known to be located in the area illuminated by the RF beam signal corresponding to the digital beam stream.

In embodiments, the specific embodiment where N=4 is included in these claims, where 4 transmit beam data streams, plus 4 receive beam data streams, plus the Cell-Wide transmit and receive data streams may be generated in each sub-frame of an LTE FDD system. In an LTE TDD system, 4 transmit beam data streams and a Cell-Wide transmit data stream may be generated in each D sub-frame, and 4 receive beam data streams and a Cell-Wide receive data stream may be generated in each U sub-frame of the TDD U/D configuration.

In embodiments, in a TDD system, the wireless base station PHY layer software and MAC layer software may process the S sub-frames, so that the DwPTS data may be sent in the Cell-Wide transmit data stream, and so that the UpPTS data may be received from the Cell-Wide receive data stream. Aside from the constraint that user plane data only for users in the currently illuminated RF beams be included in the N RF beam data streams generated for a given sub-frame, the MAC may use whatever algorithms are appropriate for scheduling the data for that subset of users.

In embodiments, in each TTI in an FDD system, or in each D sub-frame in a TDD system, the MAC layer software and the PHY layer software may generate (N+1) digital data streams, where one corresponds to the transmit RF signal to be generated in the current TTI, and which covers the entire Cell (e.g., Cell-Wide transmit RF signal), and where each of the remaining N digital data steams corresponds to an RF transmit beam to be generated in the TTI. The MAC layer software may provide the PHY layer software with information regarding which transmit data stream to use to transmit a specific set of transport blocks using a specific set of PRBs, be they for common channels, or for user data. The PHY layer software may process the transport blocks received from the MAC layer software, placing the results in a transmit beam data stream, or in the Cell-Wide transmit data stream, in the interface to the RF and antenna system, per the instructions received from the MAC layer software.

In embodiments, for each downlink common channel (e.g., PBCH, PDCCH, PHICH, PHICH) and for each common downlink Reference Signal (e.g., PSS, SSS, cell-specific RS, MBSFN RS, Positioning RS), the MAC layer software may provision the PHY layer software during initialization with a mapping of each of these items to the Resource Elements (PRBs, sub-carriers, symbol times) that are used by the wireless base station to carry their information and the common Reference Signals. The MAC layer software may provision the PHY layer software during any TTI in which this mapping and Resource Element information changes. Also, the MAC layer software may provision the PHY layer software, so the latter places the digital data for each of these items into the Cell-Wide transmit data stream that it sends to the RF and antenna system. Alternatively, the MAC layer software may not provision the PHY layer software with this mapping to the Cell-Wide transmit data stream, but instead, may indicate the mapping to the PHY layer software in each TTI in which common channel data and/or common Reference Signals are transmitted by the wireless base station.

In embodiments, in each TTI in an FDD system, and in each D sub-frame in a TDD system, the MAC layer software may send to the PHY layer software a transport block for each or any of the PBCH, PDCCH, PCFICH, and PMCH common channels being scheduled in the TTI, with a mapping of this data to the Cell-Wide transmit data stream, or the implicit mapping to the Cell-Wide transmit data stream may be indicated via a previous MAC-to-PHY provisioning interaction.

In embodiments, in each TTI in an FDD system, or in each D sub-frame in a TDD system, for each UE scheduled by the MAC to receive downlink data in the TTI, the MAC layer software may send to the PHY layer software a transport block with the UE data, plus an indicator to map the transport block to one or more transmit beam data streams, and/or to the Cell-Wide transmit data stream. The PHY layer may process each transport block, and place the result on the interface to the RF and antenna system, in the transmit data stream(s) corresponding to the mapping specified by the MAC layer. UE-specific Reference Signals for each UE may be mapped to the same transmit beam data stream as is the UE data, and sent by the PHY layer software to the RF and antenna system.

In embodiments, if the wireless base station receives a NAK from a UE for a transmission sent by the wireless base station, a retransmission may be scheduled in any sub-frame in which the current UE location is illuminated by an RF beam. The retransmitted data is thus treated in the same manner by the MAC layer software as is the original transmission, insofar as the Periodic RF Beam Forming is concerned.

In embodiments, in each TTI in an FDD system, or in each U sub-frame in a TDD system, the PHY layer software may independently process the Cell-Wide receive data stream, plus each of the N receive beam data streams received from the RF and antenna system, and may present to the MAC layer software (N+1) separate sets of received data corresponding to these receive signals obtained from the RF and antenna system.

In embodiments, in each TTI in an FDD system, or in each U sub-frame in a TDD system, the RF and antenna system may generate (N+1) digital data streams, where one corresponds to the received RF signal that covers the entire Cell (e.g., the Cell-Wide receive data stream), and where each of the remaining N digital data steams corresponds to an RF receive beam generated in the TTI. The MAC layer software may provide the PHY layer software with information regarding which receive data stream to process to receive a specific set of PRBs, be they for common channels, or for user data. The PHY layer software may present to the MAC layer software the results of its processing for each of the (N+1) receive signals, and for each result, may provide an indication of the receive beam data stream from which the result is obtained. By providing an indication of the receive beam data stream from which each result is obtained, the system allows the same PRB to be detected in multiple receive data streams.

In embodiments, for the PRACH uplink Random Access channel, and for each PUCCH assigned to each UE, and for each corresponding uplink PUCCH-DMRS Reference Signal, the MAC layer software may configure the PHY layer software during initialization, and whenever the UE or PRACH assignments change, with a mapping of each of these items to the Resource Elements (PRBs, sub-carriers, symbol times) that are used to carry their information. The PHY layer software may be provisioned by the MAC layer software, so the PHY layer processes the digital data for these Resource Elements from the Cell-Wide receive data stream that it receives from the RF and antenna system. The PHY layer software may report to the MAC layer software the results of its processing, indicating for each result the receive data stream from which the result is obtained (i.e., the Cell-Wide receive data stream, in this case). Alternatively, the MAC layer software may not provision the PHY layer software with this mapping to the Cell-Wide receive data stream, but instead, may indicate this mapping to the PHY layer software in each TTI in which common channel data and control channel data plus Reference Signals are received by the wireless base station.

In embodiments, in each sub-frame in an FDD system, and in each U sub-frame in a TDD system, the PHY layer software and the MAC layer software may extract from each of the N receive beam data streams the data transmitted by users who are known to be in the location covered by the RF beam corresponding to the receive beam data stream.

In embodiments, in each TTI for which data is scheduled to be transmitted by a UE, the MAC layer software may inform the PHY layer software of the set of PRBs assigned to the UE, and the receive data stream(s) that the PHY should use to process the UE data and the associated PUSCH-DMRS signals. The PHY layer software may send the data it detects to the MAC layer software, and may include an indication of the receive beam data stream from which each data item is detected.

In embodiments, in a TTI in which the UE re-transmits data, the MAC layer software may inform the PHY layer software of the set of PRBs assigned to the UE, plus the receive beam data stream(s) in which to detect the UE transmission.

In embodiments, once the UE location within an RF beam sub-area is determined in an FDD system, the wireless base station MAC layer software may schedule periodic SRS transmissions to begin in one of the two sub-frames of each LTE frame in which the RF beam sub-area covers the UE location. The periodicity of the SRS transmissions may be 4 sub-frames, e.g., 4 milliseconds, or any multiple of 4 milliseconds. Once the UE location is determined within an RF beam sub-area in a TDD system, the wireless base station MAC layer software may schedule periodic SRS transmissions to begin in one of the sub-frames in an LTE frame in which the RF beam sub-area covers the UE location. The periodicity of the SRS transmissions may be 10 sub-frames, e.g., 10 milliseconds, or any multiple of 10 milliseconds. In each sub-frame in which a UE SRS is transmitted, the MAC layer software may instruct the PHY layer software to detect the SRS signal level from the receive beam data stream associated with the RF receive beam signal that covers the UE location. The periodicity of the SRS reception is thus every 4 sub-frames, e.g., every 4 milliseconds, or a multiple of 4 milliseconds, in an FDD system; the periodicity of the SRS reception is every 10 sub-frames, e.g., every 10 milliseconds, or a multiple of 10 milliseconds, in a TDD system.

In embodiments, the wireless base station MAC layer software may reschedule the UE SRS transmissions whenever the UE location changes to a new RF beam sub-area. The SRS transmissions may be scheduled to be sent in the sub-frames in which an RF beam sub-area covers the current UE location.

In embodiments, if the UE location is known, Uplink Control Information (UCI) may be received by the wireless base station PHY layer software and by the MAC layer software from the receive beam signal carrying PUSCH data from the UE, if the UCI is present, or may be received from UE PUCCH data carried in the Cell-Wide receive data stream if the UCI is being sent on the PUCCH for a UE.

In embodiments, the wireless base station MAC layer software may maintain a list of UEs for each RF beam generated by the system (e.g., m times N lists, where N is the number of RF beams generated in each one-millisecond interval, and m is the number of different sets of N RF beams generated by the system). In embodiments, N may be 4, and m may be up to 4 in an FDD system, so up to 16 lists may be kept by the MAC layer software in an FDD system. In a TDD system, N may be 4, and m may be up to 1, 2, or 3, depending on the TDD U/D configuration, so there may be, respectively, up to 4, 8, or 12 lists kept by the MAC layer software. Each list may hold the set of UEs known to be located in the sub-area covered by the RF beam represented by the list.

In embodiments, in each upcoming sub-frame, the MAC layer software may know the set of RF beams that will be generated, and may use the list of UEs kept for each RF beam to determine the set of UEs that may be scheduled in the upcoming sub-frame. If data is available for a UE on one of these lists, the UE may be scheduled for downlink transmission in the upcoming sub-frame. In this way, the MAC layer software may guarantee that data is transmitted to a UE only when an RF beam is generated that covers the current UE location.

In embodiments, in an FDD system, if the UE location is known, and the UE sends a Scheduling Request to the wireless base station, and the next RF beam that covers the UE location is in sub-frame n, the wireless base station MAC layer software may send an uplink grant to the UE in sub-frame n−4, if possible, or in any sub-frame that occurs 4 sub-frames prior to a sub-frame in which the UE location is covered by an RF beam. In a TDD system, if the UE location is known, and the UE sends a Scheduling Request to the wireless base station, and the next RF beam that covers the UE location is in sub-frame n, the wireless base station MAC layer software may send an uplink grant to the UE in sub-frame (n−$K_{PUSCH}$), where $K_{PUSCH}$ is given in Table 5.1.1.1-1 of TS 36.213 a40, or in any sub-frame that occurs $K_{PUSCH}$ sub-frames prior to the sub-frame in which the UE location is covered by an RF beam.

These and other systems, methods, objects, features, and advantages of the present disclosure will be apparent to those skilled in the art from the following detailed description of the preferred embodiment and the drawings. All documents mentioned herein are hereby incorporated in their entirety by reference.

BRIEF DESCRIPTION OF THE FIGURES

The disclosure and the following detailed description of certain embodiments thereof may be understood by reference to the following figures:

FIG. 10 depicts an embodiment LTE TDD uplink/downlink configuration.

Figure 1:
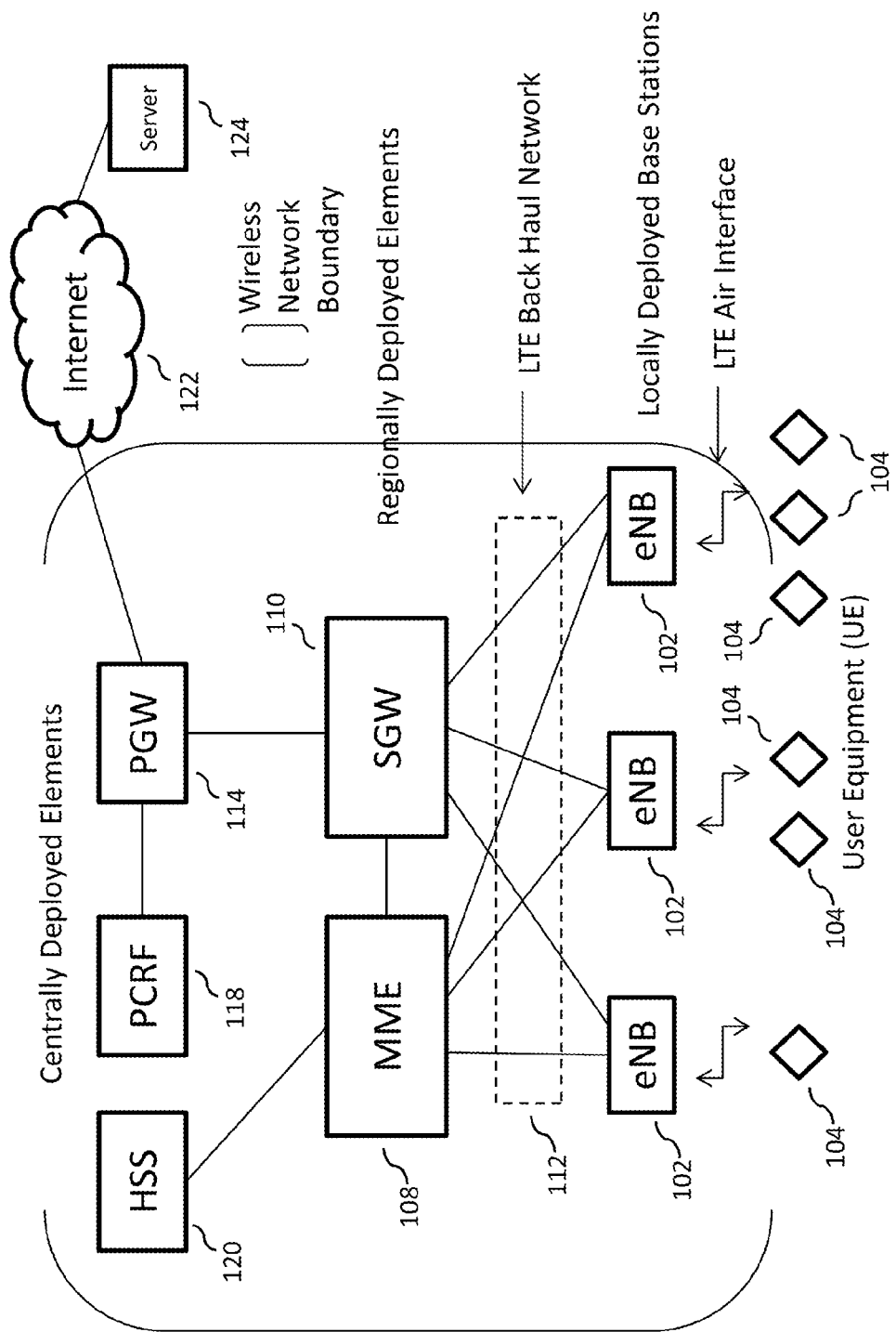
FIG. 1 depicts an embodiment typical deployment of LTE network elements.

While methods and systems have been described in connection with certain preferred embodiments, other embodiments would be understood by one of ordinary skill in the art and are encompassed herein.

DETAILED DESCRIPTION

The following is a written description of the present disclosure, and of the manner and process of making and using it, in such full, clear, concise, and exact terms as to enable any person skilled in the art to which it pertains, or with which it is most nearly connected, to make and use the same, and sets forth the best mode contemplated by the inventors of carrying out the disclosure.

The present disclosure is related to a broadband wireless network, more specifically, to a multi-purpose network, alternatively referred to in this disclosure as an "All Purpose Network" or "APN," that is capable of implementing a large scale (e.g., national) broadband wireless network to provide a very high wireless data capacity, and is capable of resolving all the issues described above. The APN may combine proven leading edge commercial wireless design and architecture methodologies with advanced RF technologies to substantially improve spectrum efficiency, spectrum usage, and data performance. A unique beam forming technique may be used to improve spectrum efficiency and spectrum usage, and part of the methods and systems disclosed herein as part of the APN network may involve orchestrating the periodicity of the RF beams in a manner appropriate to the LTE network. Also, an efficient algorithm for locating and tracking users within beams may be part of the present disclosure. Furthermore, it may be noted that the interference offered to users in one Cell by transmissions originating in an adjacent Cell typically reduce the quality of service offered to users who are located near the boundary between the two adjacent Cells. Part of the present disclosure describes how the use of an Agile Beam Forming System in each of the Cells in an APN network may substantially remove inter-Cell interference without resorting to special communications between the Cells, and without reducing the bandwidth available for use by users located in any part of the Cell coverage area. The issues above related to service delays, back haul utilization, and server and long haul network utilization may be resolved in the APN network via the deployment of servers as close as possible to the wireless users, namely, via deployments associated with the eNB (E-UTRAN Node B or Evolved Node B) network elements, such as through providing the servers with high speed connections to the eNB, locating the servers in proximity to the eNB, co-locating the servers with the eNB, and the like. Such deployments may require the integration of the servers into the LTE wireless network operation in the unique manner disclosed herein. When users are allowed to access servers associated with the eNB elements, their bearer packets no longer flow through the Serving Gateway (SGW) and public data network (PDN) Gateway (PGW) elements, so part of this disclosure shows how to preserve the collection of billing data in these cases. These servers, when integrated into the APN wireless network, may also form the foundation of a platform for gathering, processing, storing, and redistributing sensor data as disclosed in the present disclosure. Furthermore, the introduction into the APN network of Publish/Subscribe data communications, as disclosed in the present disclosure, makes it possible to implement the APN network as a Dual Use network, where only government users may be allowed access to portions of the network during a disaster or other emergency. The present disclosure may also relate to the use of the Publish/Subscribe communications infrastructure of the APN network to implement Hot-Standby services, which may play an important role in improving network operation and in improving the user experience. The present disclosure also addresses the issue of how to replace an airborne, or otherwise mobile, eNB base station, while the mobile base station is in operation.

Integrating an Optimization Server Function into the LTE Wireless Network

FIG. 1 shows an embodiment of deployment of the network elements that may provide the LTE wireless service to users and their user equipment (UE). The eNB 102 elements may be deployed in local areas where their RF radiation can reach the UEs 104. The Mobility Management Entity (MME) 108 and the Serving Gateway (SGW) 110 elements may be deployed in regional locations, and handle many (e.g., hundreds) eNB 102 elements. The MME 108 may connect to the eNB 102 elements via the LTE Back Haul network 112, and manage the access of the UEs 104 to the LTE network, and also handle mobility of UEs 104 as they Handover their wireless network connection from one eNB Cell (antenna) to another. The SGW 110 may connect to the eNB 102 elements via the LTE Back Haul network 112, and provide a semi-static connection point for routing packets between the UEs 104 and their targeted Server 124 computers. While the SGW 110 may be changed during a UE Handover procedure, in many cases, the SGW 110 may remain fixed during the Handover operation. The SGW 110 may maintain the bearers (utilizing General packet radio service Tunneling Protocol, also referred to as Generic Tunneling Protocol or GTP tunnels) for a UE 104, even when the UE 104 is Idle, and not actively connected to the network. The PDN Gateway (PGW) 114 may be generally deployed in a more centrally located data center, and interfaces with many (e.g., hundreds) SGW 110 elements. The PGW 114 may constitute the connection point between a UE 104 and a particular Packet Data Network 122 (e.g., the Internet), and may not change, even though the UE 104 goes through multiple Handover procedures as it moves around the LTE network. The Home Subscriber Server (HSS) 120 may provide a database of user subscription data. The Policy Charging and Rules Function (PCRF) 118 may control the allowed connection patterns of each UE 104. The LTE Wireless Network boundary thus may include the UE 104, the eNB 102, the MME 108 and SGW 110, and the PGW 114, HSS 120, and PCRF 118. The PGW 114 may interface to a particular packet data network 122, of which the Internet is one example.

Users typically invoke service programs on their UEs 104, and connect to computers (servers 124) that may need to be accessed, for example, via the Internet. Packets are routed from the UE 104 over the LTE air interface to the eNB 102, where they may be placed in a particular GTP tunnel (called a bearer 302), and sent to the SGW 110, and then to the PGW 114, and then via the Internet 122 (or other Packet Data Network) to the Server 124 which is their destination. Packets may then be sent from the Server 124 via the Internet 122 (or other Packet Data Network) to the PGW 114, and then via a particular GTP tunnel (bearer 302) to the SGW 110, eNB 102, and finally to the UE 104 over the LTE air interface.

It is important to note in FIG. 1 that the Server 124 computers that provide services to wireless users are typically far away from those users and their UE 104. Hence, packets may suffer the delays involved in traversing the Internet 122, the PGW 114 and SGW 110 network elements, the LTE back haul network 112, as well as the eNB 102 element and the LTE air interface. When congestion occurs at any of those points in the packet traversal path, the user experience suffers. Furthermore, the Server computers 124 that provide services to wireless users may be completely separate from the LTE Wireless Network, and cannot collect any data regarding the real-time state of the wireless network (e.g., the air interface utilization, the LTE back haul utilization at a given eNB 102, or congestion in the PGW 114 and SGW 110 elements). Today's Server computers 124 may thus be unable to alter their behavior in response to the real-time state of the LTE Wireless Network, and are therefore unable to use real-time network data to improve the user experience in using the LTE Wireless Network and in using the services offered by the Server computer.

The present disclosure describes an approach to resolve the issues pointed out above through a server computer 202, 204 (which may be a collection of server computers) that is integrated into the wireless network at one or more points, and is referred to herein alternately as an Optimization Server (Opt-Server), or a Priority and Optimization Processor (POP). The Optimization Server may be designed as a platform for running programs that provide services to UEs 104, and thus is equivalent in that respect to the server computers 124 that connect to the wireless UE today via the Internet, or via another packet data network.

The "integration" aspect may include management via a Network Management System that also manages the wireless network elements (e.g., the LTE wireless network elements shown in FIG. 1), and also may include having interfaces to the wireless network elements for the purpose of extracting real-time network data, and for the purpose of controlling the wireless network element in delivering services to the wireless user. The real-time network data may also be used to change the behavior of service programs that execute on the Optimization Server 202, 204, where the changed behavior improves the user experience. As an example, a service program that delivers streaming video to a user can use different video encoding rates based on real-time knowledge of the ability of the air interface to deliver a particular data rate to the UE 104. Also, the placement of the Optimization Server 202, 204 in the wireless network may reduce the packet transit delay that the user experiences. As will be shown below, the interface of the Optimization Server 202, 204 to the wireless network elements may be used to minimize the delay in exchanging packets between a server program and a UE 104.

Figure 2:
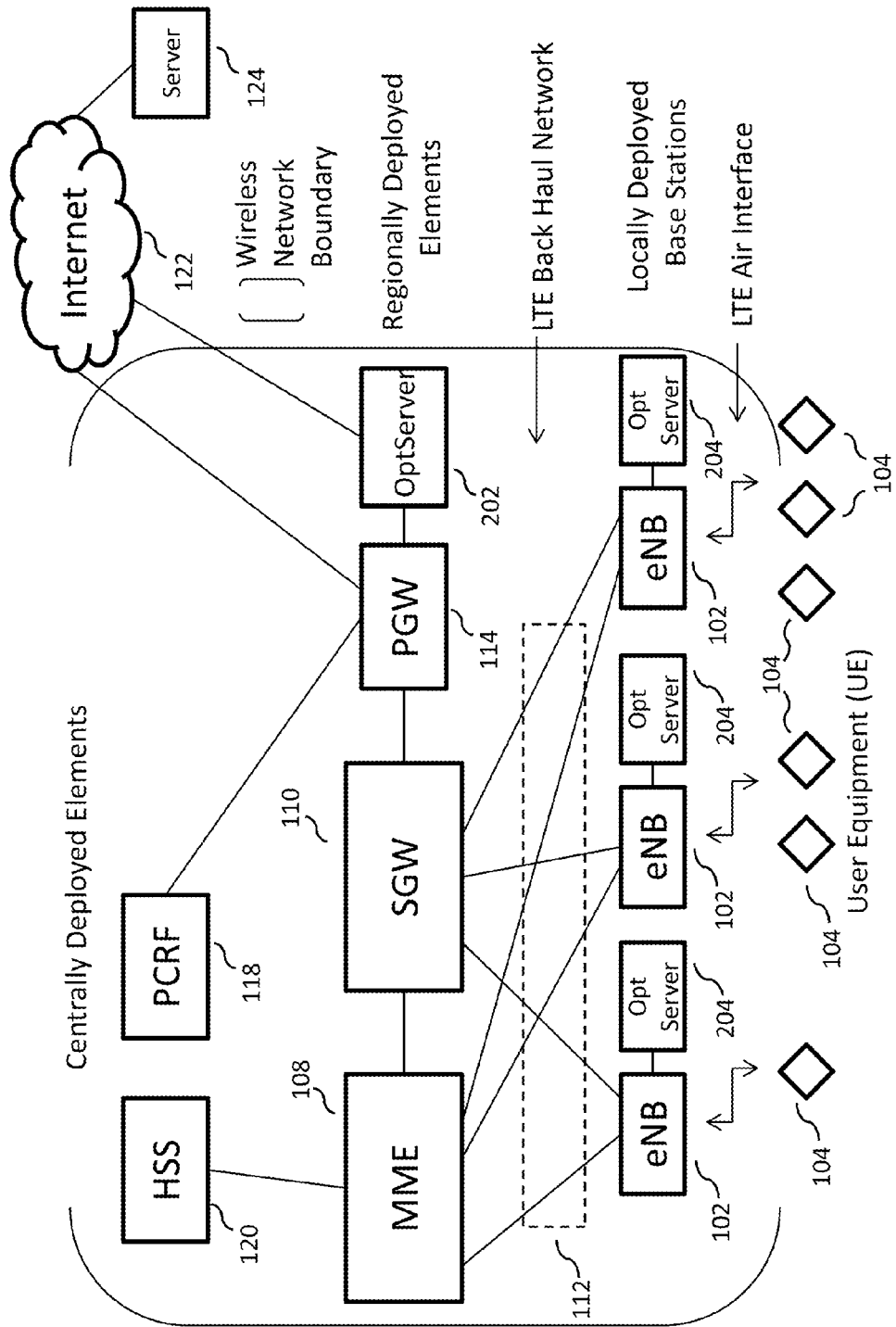
FIG. 2 depicts adding optimization servers to the LTE network.

An embodiment of the deployment points for the Optimization Server in the LTE wireless network is shown in FIG. 2. One deployment point is shown to associate the Optimization Server 202 together with the PGW 114 element, such as through providing the Optimization Server with high speed connections to the PGW, locating the Optimization Server in proximity to the PGW, co-locating the Optimization Server with the PGW, and the like. Doing so places the Optimization Server 202 at the edge of the LTE wireless network, and therefore avoids the packet transit delay that would otherwise be incurred in transiting a packet data network like the Internet. Services such as streaming video, or real-time video, can be better provided to many concurrent users in the region of the LTE wireless network with this approach. Furthermore, if the PGW 114 (and Optimization Server 202) is deployed regionally, as opposed to centrally within the country, packet delays may be further reduced. This deployment configuration is shown in FIG. 2. Note, too, that providing services via the Optimization Server 202 associated with the PGW 114 may still require packets to traverse the LTE back haul network 112 to reach the wireless UE 104. Second in importance to the air interface, the back haul network 112 is a critical resource whose utilization has to be conserved. This point is illustrated by having a large number of users who are accessed through the same eNB 102 element, and are all viewing a real-time video event. If all the streaming video packets transit the back haul network, enough bandwidth may not be available for use by other users who are accessed via that eNB 102.

The need to conserve the back haul 112 utilization may lead to the association of Optimization Servers 204 together with the eNB elements, such as through providing the Optimization Server with high speed connections to the eNB, locating the Optimization Server in proximity to the eNB, co-locating the Optimization Server with the eNB, and the like. If the service to the UE 104 (e.g., streaming a real-time video event) can be provided via the Optimization Server 204 that is associated with the eNB 102 that serves the UE 104, then the back haul network 112 usage may be minimized in delivering that service to the UE 104. Also, the delay experienced by packets exchanged between the Service Access Point (i.e., the Optimization Server 204) and the UE 104 may be minimized, because those packets only transit the eNB 102 and the LTE air interface.

As an example, consider the task of providing a video for a real-time event to 200 hundred users connected through the same eNB 102. Without the Optimization Server 204 associated with the eNB 102, the Service Access Point lies beyond the wireless network, and a single video packet stream for each UE 104 traverses the PGW 114, SGW 110, back haul network 112, eNB 102, and the LTE air interface. For 200 hundred UEs 104 concurrently viewing this service through the same eNB 102, it means that 200 times the basic video rate may be consumed on the back haul network 112. Now consider the situation when an Optimization Server 204 is associated with the serving eNB 102. Suppose further that the Optimization Server 204 and the UEs 104 implement the Publish/Subscribe communications paradigm described herein, so all 200 UEs subscribe to receive the same real-time video transmission. The video data stream is sent once from its generation point in the Internet through the LTE network, over the back haul 112 to the Optimization Server 204 associated with the serving eNB 102. The Publish/Subscribe software on the Optimization Server 204 then distributes the video packet stream to each of the 200 UEs 104 that have subscribed to the service via the Optimization Server 204.

Because of the way bearers 302 (i.e., GTP tunnels) are set up in the LTE network to carry packets to and from UEs, there may be no clear way to connect a UE to an Optimization Server that is associated with the eNB. Part of the present disclosure shows how this connectivity may be established. Furthermore, when services are provided by a server 124 attached to the Internet, or by an Optimization Server 202 associated with the PGW, the service may continue to be provided un-disrupted from the same service access point, even though the UE moves through the LTE wireless network, and is in Handover among the eNB 102 elements in the LTE network. However, when the Service Access Point is an Optimization Server 204 associated with an eNB 102, that access point may need to be changed when the UE 104 goes into Handover to another eNB 102. Part of the present disclosure shows how the Service Access Point may be switched rapidly between Optimization Servers 204 associated with the eNB 102 elements. If the Service Access Point switching is performed fast enough, the user experiences no disruption in the service being provided. Before switching the Service Access Point, it may be required that the UE 104 be connected to an Optimization Server 204 that is associated with an eNB 102 element.

Figure 3:
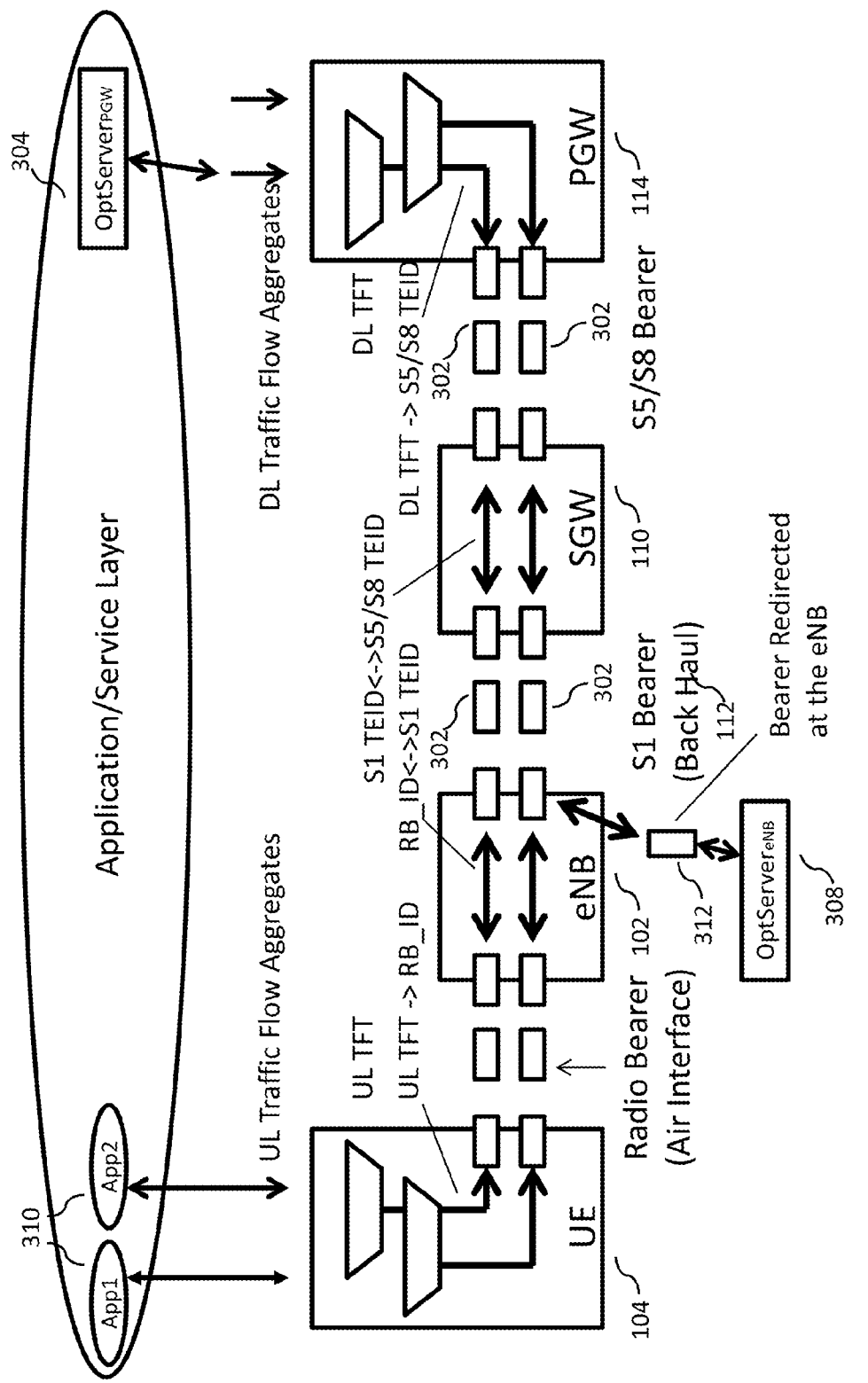
FIG. 3 depicts redirecting a UE bearer at the eNB.

FIG. 3 shows that in the LTE network, different bearers 302 may be established for each UE 104 to connect the UE 104 with a PGW 114 element. The PGW 114 element may provide the interface with the packet data network (e.g., the Internet 122) where the user service computers are typically located. In embodiments, each bearer 302 is a tunnel, using a simple GTP (Generic Tunneling Protocol) header to encapsulate the packets that are routed through the tunnel. Packet routing into a tunnel may be accomplished at the UE 104 and at the PGW 114 by associating the IP addresses and port numbers in the packet with the Internet Protocol (IP) addresses and port numbers in a "Traffic Flow Template" associated with a bearer 302. Each bearer 302 established for a UE 104 has a different Quality of Service (QoS) associated with it. Up to 15 bearers 302 can be established for a single UE 104. The first bearer 302 that is established to a given PGW 114 is called the Default Bearer 302. Any additional bearers 302 established to that PGW 114 are called Dedicated Bearers 302.

FIG. 3 shows an embodiment where one Dedicated Bearer 302 is "redirected" to point to an Optimization Server 204 that is associated with the eNB 102 that serves the UE 104. In this instance, the Optimization Server 204 associated with the eNB 102 is labeled OptServereNB 308, while the Optimization Server 202 associated with the PGW 114 is labeled OptServerPGW 304. An application 310 on the UE 104 may communicate with the OptServerPGW 304 by sending packets through a Default Bearer 302 that carries the packet to the PGW 114 associated with the OptServerPGW 304. Packets may be sent from the OptServerPGW 304 to the UE 104 by traversing the same Default Bearer 302. After the redirection of the Dedicated Bearer 312 is accomplished, an application 310 on the UE 104 may communicate with the OptServereNB 308 by sending packets through the redirected Dedicated Bearer 312. Packets may be sent from the OptServereNB 308 to the UE by traversing the same redirected Dedicated Bearer 312; no back haul may need to be utilized in the packet exchanges over the redirected bearer 312.

Redirecting a bearer 302 may not be a standard operation, so it may need to be accomplished via an OAM-style interface (Operations, Administration, and Maintenance interfaces) to the eNB 102. Also, note in FIG. 3 that after the Dedicated Bearer 312 is redirected at the eNB 102, the tunnel information that previously linked the bearer to the SGW 110 is still maintained in the eNB 102. This may be necessary to enable Handover to occur without change to the existing Handover procedure, and to enable the fast re-direction of the same Dedicated Bearer 312 at the target eNB during a Handover. The Dedicated Bearer 302 may not have to be re-established after a Handover, because it is may not be removed from the eNB 102 list of established bearers 302 when the bearer is redirected to an OptServereNB 308.

Figure 4:
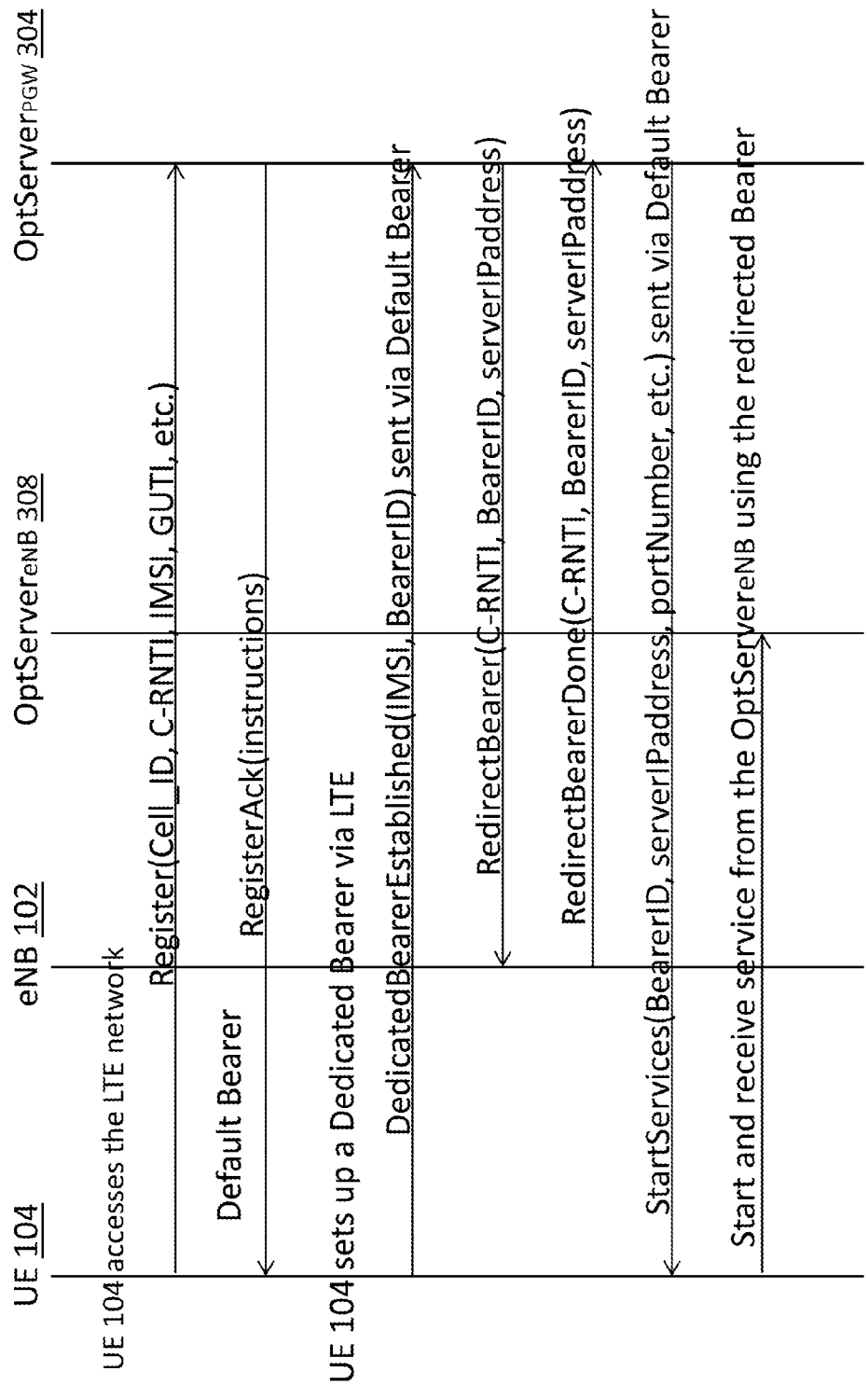
FIG. 4 depicts redirecting a dedicated bearer at an eNB.

In the architecture shown in FIG. 2 and FIG. 3, the OptServerPGW 304 may be used as a control point for redirecting bearers 312 at the eNB 102 elements for any UE 104. FIG. 4 shows a set of message interactions that may be used to accomplish the redirection. When the UE 104 accesses the LTE network, a Default Bearer 302 may be established to the PGW 114 associated with the OptServerPGW 304. The UE 104 may perform a Domain Name System (DNS) query to retrieve the IP address of the OptServerPGW 304. The UE 104 may use the Default Bearer 302 to connect to a Wireless Control Process 3902 on the OptServerPGW 304, and Registers itself with that program. The Registration information may contain the Cell_ID of the LTE Cell through which the UE is currently accessing the network, the Cell Radio Network Temporary Identifier (C-RNTI), which is the parameter used in the eNB 102 to identify the UE 104, the IMSI (International Mobile Subscriber Identity) used to identify the UE 104 in all LTE network elements except for the eNB 102, and the GUTI (Globally Unique Temporary Identifier) used to identify the MME 108 element currently serving the UE 102. Other parameters may be conveyed by the UE 104 to the Wireless Control Process 3902 via the Register message (e.g., the UE IP address) to facilitate the implementation of other services, as discussed herein.

When the UE 104 Registers with the program on the OptServerPGW 304, it may receive an acknowledgement response, which may contain a command to establish a Dedicated Bearer linked to the currently used Default Bearer. Alternatively, the LTE network provisioning at the PCRF (Policy Charging and Rules Function) may start the establishment of such a Dedicated Bearer for the UE 104. The UE 104 may use the standard LTE procedure to establish the Dedicated Bearer 302, and when this is completed, the UE 104 sends a response to the OptServerPGW 304 that contains the IMSI (to identify the UE 104 to the Wireless Control program 3902) and the BearerID of the just-established bearer 302. Because the Wireless Control Process 3902 may have the Cell_ID for the UE 104, it may determine the ID of the eNB 102 currently serving the UE 104. Using, for example, provisioned OAM IP addresses for the eNB 102 elements, the Wireless Control Process 3902 may send a message to the serving eNB 102 to command it to redirect the bearer 302. The C-RNTI may identify the UE 104 context to the eNB 104, and the BearerID may identify the UE bearer 302 that should be redirected. The server IP address tells the eNB 104 which OptServereNB 308 is the target of the redirection (so more than one Optimization Server 308 may be associated with the eNB 102). When the eNB 102 completes the redirection operation, it may reply to the Wireless Control Process 3902. The Wireless Control Process 3902 next may send a packet via the Default Bearer 302 to the UE 104 to inform it that it can start using the redirected Dedicated Bearer 312 to start services using the OptServereNB 308 as the Service Access Point. By directing packets through the redirected Dedicated Bearer 312, the UE 104 may start any of a plurality of services. Back Haul 112 utilization may be minimized for all of these services, and packet delays may likewise be minimized Transfer of Service Delivery Between eNB-Based Optimization Servers During Handover In FIG. 2, in an example suppose that a UE 104 is receiving service from an OptServereNB 308 associated with its serving eNB 102. If the UE 104 moves, so it is in Handover to another eNB 102, the Service Access Point has to be changed to the OptServereNB 308 that is associated with the new, target eNB 102 element. A service interruption is inevitable in this case, so it should be made as short as possible. To minimize the service interruption, the additional message interactions to effect the change in the Service Access Point needs to be embedded with the standard Handover processing used in the LTE network. Hence, a brief discussion of the standard Handover processing is provided here.

Standard Handover processing may be divided into three phases, such as Handover Preparation, Handover Execution, and Handover Completion. See FIG. 5. The current serving eNB 102 is referred to as the source eNB. The new eNB 102 is referred to as the target eNB. In the Handover Preparation phase, the source eNB 102 receives signal measurements from the UE 104, and determines that an antenna at another eNB 102 provides a stronger signal to the UE 104, and that a Handover should occur. The source eNB 102 transfers to the target eNB 102 its context information for the UE, including the ID and tunnel parameters for each bearer in effect for the UE. The tunnel information for the redirected bearer 312 may be included in the set of bearer information, but that information is for the tunnel endpoint at the SGW 110, not at the OptServereNB 308 associated with the source eNB 102. In this way, standard Handover processing may not be impacted by the inclusion of the OptServereNB 102 and the redirected bearers 312. Parameters involved in redirecting a bearer 312 are not transferred in the Handover processing. Meanwhile, the target eNB 102 may send to the source eNB 102 a C-RNTI value for the UE 104 to use at the target eNB 102. When the Handover Preparation phase is completed, the source eNB 102 sends a Handover Command message to the UE 104, and includes the new C-RNTI value. Any downlink data received by the source eNB 102 for the UE 104 may not be sent over the air to the UE 104, but is forwarded to the target eNB 102, where it is queued until the UE 104 connects at the target eNB 104. The SGW 110 may not yet be aware of the Handover, so it may continue to forward downlink data to the source eNB 102.

When the UE 104 receives the Handover Command, the Handover Execution phase may begin. The UE 104 synchronizes to the signals transmitted by the target eNB 102, and when this is done, the UE 104 accesses the target eNB 102 Cell using the new C-RNTI value, and sends the Handover Confirm message to the target eNB 102. The target eNB 102 starts to transmit the queued forwarded data to the UE 104 via the air interface. Because the tunnel information for the UE bearers 302 is available at the target eNB 102 from the Handover Preparation phase, the UE 102 may begin to send uplink packets through the target eNB 102. Uplink packets for the bearer 302 that needs to be redirected are not sent at this time, because the redirection has not yet occurred at the target eNB 102.

In the Handover Completion phase, the SGW 110 may be provided with the bearer 302 tunnel parameters being used at the target eNB 102, and it may now forward downlink data to the target eNB 102. The UE 104 context information may be deleted at the source eNB 102, and the Handover processing is done. See FIG. 5.

Figure 6:
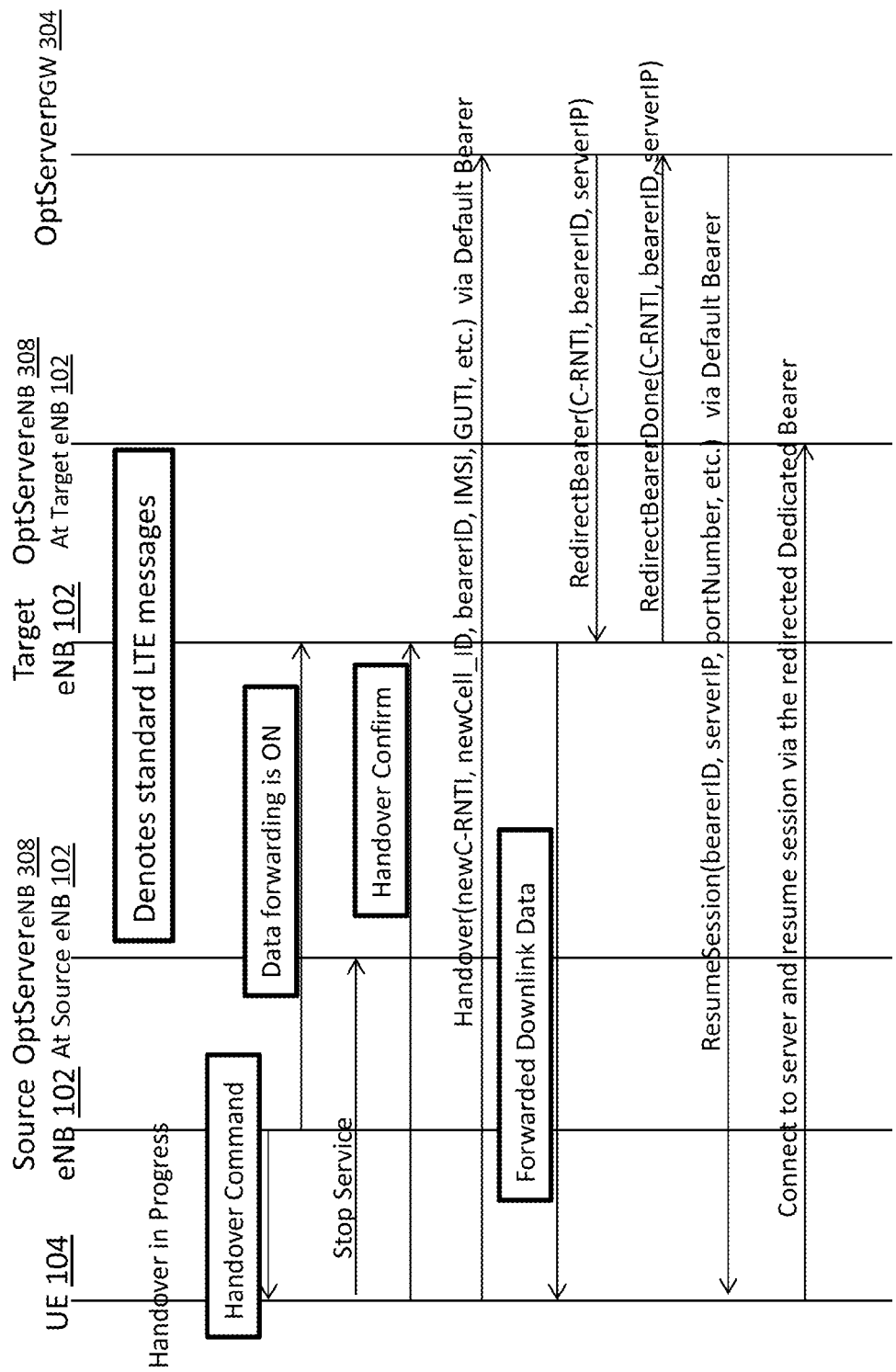
FIG. 6 depicts integrating a change of the optimization server during LTE handover processing.

FIG. 6 shows the interactions between the UE 104 and the Optimization Servers 202, 204 that integrates these servers into the LTE Handover procedure, and effectively transfers the point of service delivery from the Optimization Server 308 located at the source eNB 102 to the Optimization Server 308 located at the target eNB 102. The UE 104 client may play a role in ensuring that no data is lost in the transition of Optimization Server 308 elements, per FIG. 6. The OptServerPGW 304 plays a role in sending a command to the target eNB 102 to cause the bearer 312 that was previously redirected at the source eNB 102 to now be redirected at the target eNB 102. The use of a small plurality of messages (e.g., five) to effect the change in the Service Access Point means that the change may be accomplished quickly. In this instance, messages may include disconnect from the OptServereNB 308 at the source eNB 102, Handover( ), RedirectBearer( ), RedirectBearerDone( ), ResumeSession( ), and the like. See FIG. 6.

In FIG. 6, the UE 104 client may be informed by the LTE software executing on the UE 104 that the Handover Command message has been received. Before allowing the UE LTE software to proceed in synchronizing with the target Cell, the UE 104 client may send a packet over the redirected Dedicated Bearer 312 to disconnect from the OptServereNB 308 associated with the source eNB 102. When this is accomplished, the UE 104 client may allow the UE LTE software to proceed. Another notification may be provided to the UE 104 client when the UE 104 sends the Handover Confirm message to the target eNB 102. The client may then send a Handover( ) message to the Wireless Control Process 3902 executing on the OptServerPGW 304 to inform it of the new Cell_ID, the new C-RNTI, the IMSI, and the GUTI (which may have changed), and the bearer ID of the Dedicated Bearer 312 that needs to be redirected, plus other parameters (e.g., the UE 104 IP address) that may be required to provide additional services. The Wireless Control Process 3902 may derive the new eNB ID from the new Cell_ID, and obtain the eNB OAM IP address from provisioned, or other data. The target eNB 102 may be commanded to redirect the bearer 312 for the UE 104, and replies when this is done. At this point, the Wireless Control Process 3902 may send a ResumeSession( ) message to the UE 104 via the Default Bearer 302, and the UE 104 client is able to send a packet via the redirected Dedicated Bearer 312 to the OptServereNB 308 at the target eNB 102 to continue the session that was interrupted at the source eNB 102 location.

Replacing an Airborne eNB Using the LTE Handover Mechanism

Figure 7:
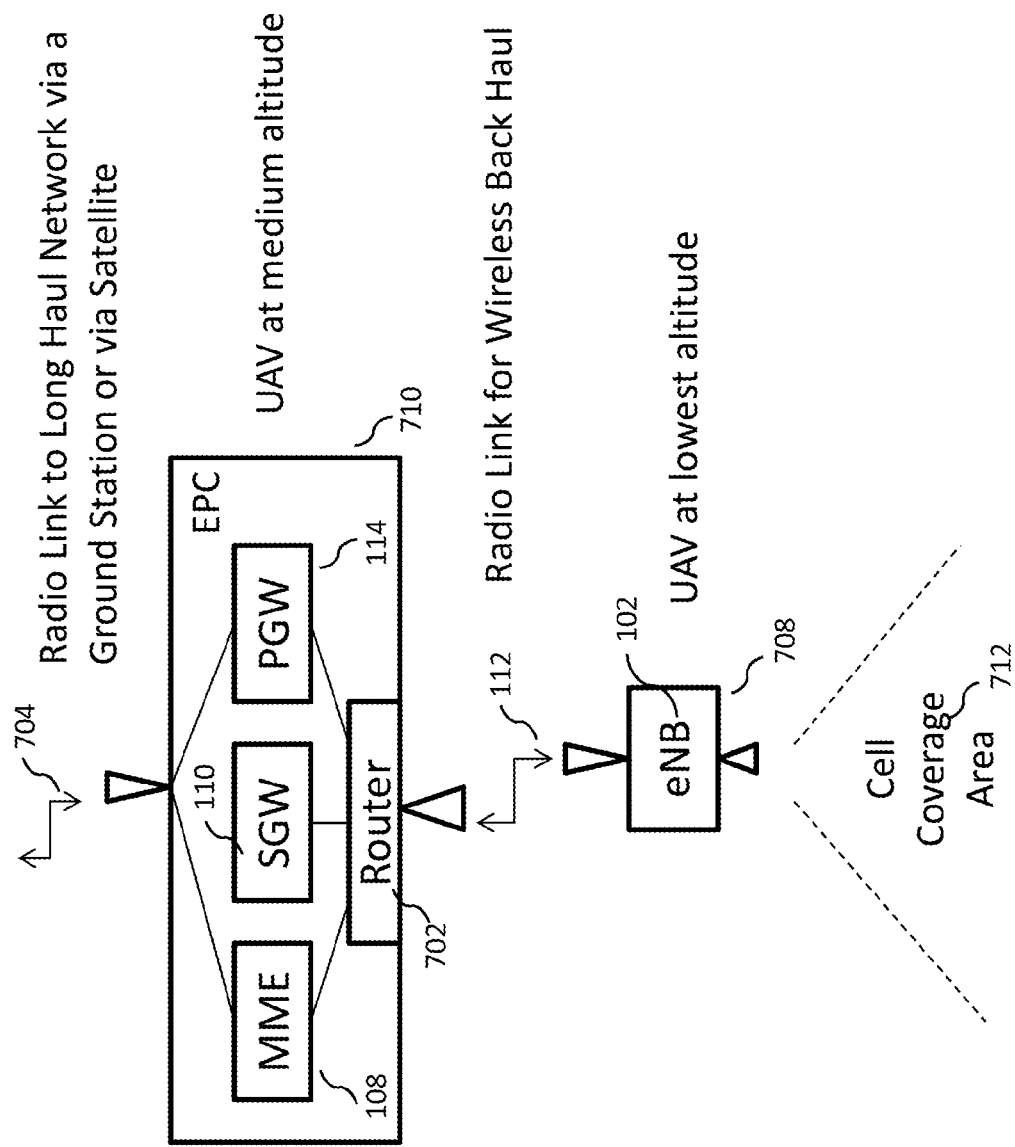
FIG. 7 depicts an embodiment of an airborne eNB deployment.

Referring again to FIG. 1, during emergencies, the wireless infrastructure may be destroyed, or may not be operating, and it becomes necessary to deploy a temporary network in an ad-hoc manner. One way to implement the deployment is to place the eNB 102 network element in an airborne vehicle, and have it hover over the area in which LTE wireless service is desired, as indicated by the Cell Coverage Area 712. The airborne vehicle may either be manned, or unmanned. In the latter case, the aircraft may be referred to as an Unmanned Aerial Vehicle (UAV 708). The Enhanced Packet Core (EPC) 710 network elements may include the MME 108, SGW 110, PGW 114, HSS 120, PCRF 118, and the like, plus a Router 702 to provide communications interconnectivity among the network elements. The MME 108, SGW 110, and PGW 114 network elements may be deployed in a second airborne vehicle 710 that may be situated remote from the area of operation of the eNB 102 elements. The MME 108 and the PGW 114 network elements may communicate over a the Long Haul Network connection 704 and the Long Haul Network 804 with the HSS 120 and the PCRF 118 network elements. The eNB-based vehicle 708 and the EPC-based vehicle 710 may communicate over a wireless back haul interface 112. All LTE network elements may communicate with the Element Management System (EMS) 802 using the Long Haul Network 804. This configuration is shown in FIG. 7. An alternative deployment of the EPC 710 elements is in ground-based nodes. In this case, the airborne eNB 102 vehicles 708 communicate via a wireless radio link 112 to a ground station that provides connectivity to the EPC 710 elements and to the EMS 802.

While other deployment configurations are possible, it may be best to deploy the eNB 102 elements by themselves, without adding other LTE network elements to the aerial vehicles 708 carrying the eNB 102. This deployment may be especially useful to be followed when Unmanned Aerial Vehicles (UAVs) are used. Weight and power limitations may be important in these deployments, and carrying only the eNB 102, and not any of the other LTE network elements, may ensure that the UAV 708 carrying the eNB 102 does so with minimal payload weight and power dissipation.

Replacing the eNB UAV in the Area of Operation

In any remote field deployment situation, but especially when the platforms that contain the LTE network elements are UAVs, there will come a time when a UAV needs to be replaced. The reason might be that the battery that powers the LTE equipment is running low, or that the UAV is running low on fuel, or it may be that the UAV that carries the LTE equipment needs to be removed from the scene and be serviced. In any case, it may be possible to replace the UAV platform while it is in operation in the field. The following algorithm shows how the eNB UAV 708 may be replaced while in service over an area of operation. The algorithm for accomplishing this replacement results in continuous service being provided to the UEs 104 in the area of operation of the eNB 102.

Figure 8:
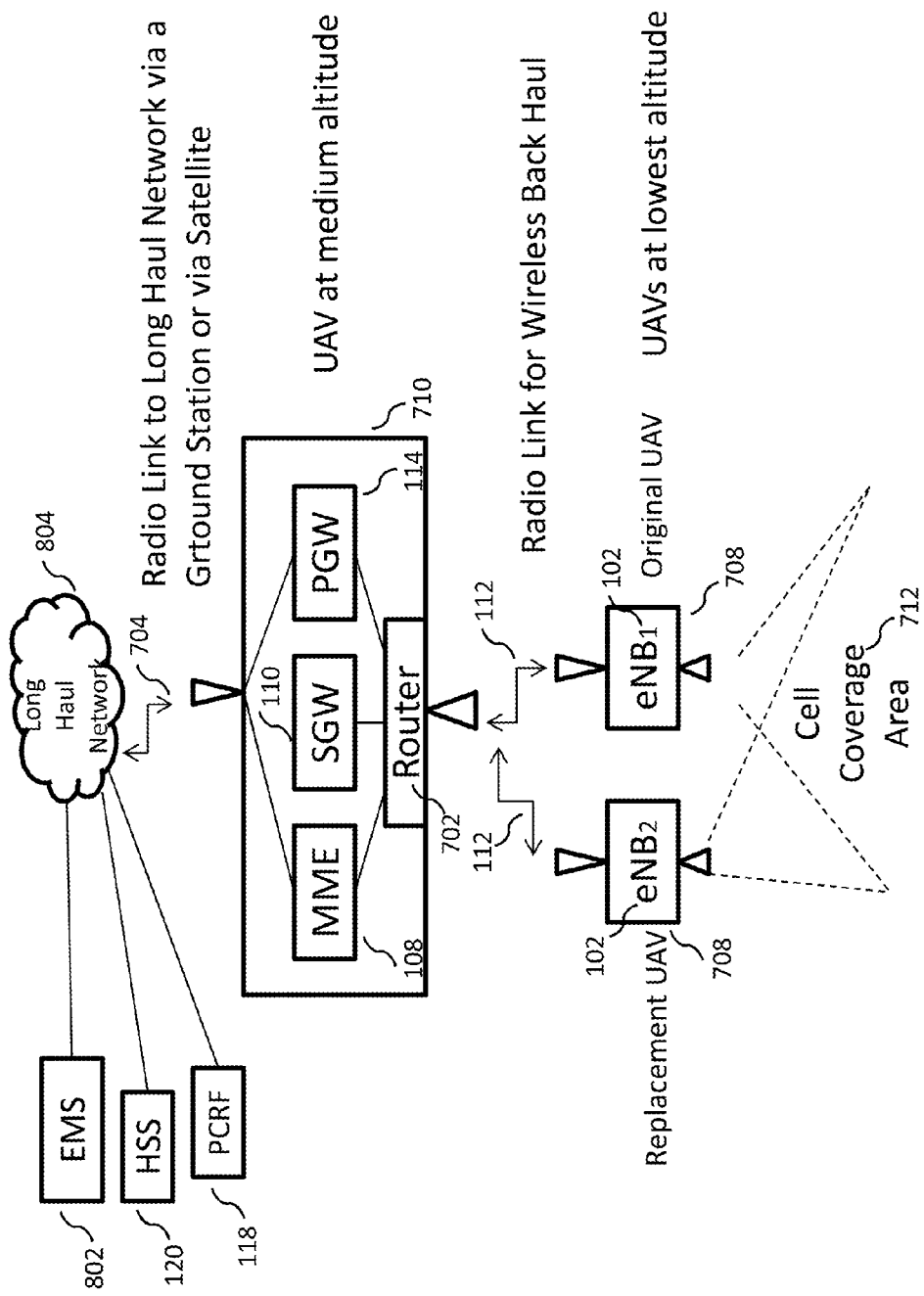
FIG. 8 depicts replacing an airborne eNB without loss of service to UEs.

FIG. 8 depicts the situation when the eNB 1 UAV 708 is being replaced by another eNB2 UAV 708 that has arrived in the area of operation. An embodiment of a replacement procedure is as follows.

1. The replacement UAV 708 hosting eNB2 102 arrives at the site of the UAV 708 hosting eNB1 102. eNB2 102 establishes radio communications with the backhaul antenna/radio of the UAV 710 that hosts the EPC 710 elements.
2. eNB2 102 establishes communications with the remote Element Management System (EMS 802) via a router 702 contained in the EPC UAV 710 equipment.
3. The EMS 802 provisions eNB2 102 with the same parameters that eNB1 102 has, except that its Cell ID is different.
4. The EMS 802 starts the replacement procedure at eNB1 102, and commands eNB1 102 to reduce its transmit power at a rate, Pr, and concurrently commands eNB2 102 to turn ON its transmitter, and increase its transmit power output at a rate Pr. The rate Pr should be chosen to emulate the power received at a UE 104 from two fixed antennas separated by the usual 2-Cell radii in deployed commercial LTE systems, when the motion of the UE 104 is away from eNB1 102 and towards eNB2 102, and the rate of emulated UE 104 motion is 3-30 km/hr.
5. At some point determined by the rate Pr and the RF propagation characteristics over the area of operation, all the user equipment (cell phones, digital elements, sensors, etc.) in the RF area 712 covered by eNB1 102 (and now also covered by eNB2 102) determine that the Cell at eNB2 102 has a strong enough signal compared with the Cell at eNB1 102 that a handover should be performed to the Cell at eNB2 102. All the UEs 104 in the RF coverage area 712 now perform a handover from eNB1 102 to eNB2 102.

6. When all the UEs 104 have migrated away from eNB1 102, eNB1 102 sends a "replacement completed" indication to the EMS 802, and eNB1 102 is now commanded to reduce its transmit power to 0. eNB1 102 is able to leave the area of operation. The eNB replacement has been completed without loss of service to the UEs in the area of operation.

Beam Periodicity Allowed in a Beam Forming LTE Wireless System Using Periodically Scanning Agile Beam Patterns In embodiments, the present disclosure may provide for an RF beam forming technique in an LTE wireless system. The particular beam forming technique may generate a number "N" of RF beams concurrently, such as in each one msec interval of an LTE frame 1002, where an LTE frame 1002 may be ten msec in duration. The N RF beams 902 may cover N sub-areas 902 of the total coverage area 712 of an LTE Cell, the coverage area 712 being determined by an LTE Cell using the same total transmit power used in the beam forming solution, but which may not use the beam forming technique. In the next interval, another N RF beams 902 may be generated to cover a different set of N sub-areas 902. This process may be repeated until the entire Cell coverage area has been scanned by the RF beam patterns 902. The RF beam patterns 902 repeat periodically in this scanning fashion.

The present disclosure may provide information related to the constraints on the scanning periodicity that may need to be obeyed by the RF beam patterns 902. For example, without limitation, for a Frequency Division Duplex (FDD) system, the periodicity of the RF beam patterns 902 may be required to be four msec. For a Time Division Duplex (TDD) system, the periodicity may generally be 10 msec (i.e., one LTE Frame 1002), but may be a shorter interval, depending on the TDD Uplink/Downlink (U/D) configuration 1002 being used in the LTE system. The data presented herein is the result of analysis through the methods and systems of the present disclosure. Certain specific constraints are given below.

The techniques of beam forming have been used for many years in the areas of audio signal processing, sonar signal processing, and radio signal processing. In many implementations, a technique is used whereby the signal source (for reception at the antenna array) location is determined, and then the antenna array is focused on that point. With the beam forming technology pertinent to this disclosure for LTE wireless systems, the beam forming operates in a different manner, and takes advantage of the fact that in LTE, the transmission of data to the UEs 104, and the reception of data from the UEs 104, is scheduled by the software in the LTE base station 102. This beam forming technology focuses a set of RF beams on specific, non-overlapping sub-areas of the Cell coverage area 712 for a fixed, short time interval, and then is moved to another set of non-overlapping sub-areas of the Cell coverage area 712 for the same fixed, short time interval. The beam pattern may be moved in this way until the entire Cell coverage area 712 has been scanned for a transmission from the antenna array, and for reception by the antenna array. Then, the beam pattern of coverage repeats in periodic fashion. See FIG. 9 for an example of a beam-scanning pattern consisting of four RF beams 902 generated in each of four consecutive one msec sub-frames of an LTE Frame, with the pattern repeating every four msec. In the first one msec interval, RF beams 902 numbered 1, 11, 9, and 14 may be generated, where these constitute a non-adjacent set of RF beams 902. In the second one msec interval, RF beams 902 numbered 3, 6, 7, and 13 may be generated. In the third one msec interval, RF beams 902 numbered 4, 8, 10, and 16 may be generated. In the fourth one msec interval, RF beams 902 numbered 2, 5, 12, and 15 may be generated. In the fifth one msec interval, the pattern repeats. Alternative sets of RF beam patterns 902 may be used, with the proviso that they be non-adjacent to ensure the best operation of the agile beam forming system.

The present disclosure may cover the constraints on the repetition rate of the beam patterns 902, and for TDD systems, also on the sets of sub-frames of frame 1002 in which the RF beam patterns 902 may need to be identical.

LTE is an OFDM (Orthogonal Frequency Division Multiplexing) system. The transmission intervals are organized into a set of sub-frames, and a set of 10 sub-frames comprises an LTE Frame 1002. Each sub-frame is one msec in duration, and each of these is further broken down into two slots, each of 0.5 msec duration. In an LTE FDD system, different frequency bands are used for uplink and downlink transmissions. Hence, UEs 104 can be scheduled to receive a downlink transmission, and/or can be scheduled for an uplink transmission, in any sub-frame. In an LTE TDD system, the same frequency band is used to carry uplink and downlink transmissions. To organize these transmissions, each sub-frame in the set of 10 sub-frames in each LTE Frame 1002 may be configured for either Uplink transmissions, or for Downlink transmissions. As shown in FIG. 10, there are 7 different TDD U/D Configurations 1002 specified for LTE operation. A particular LTE eNB 102 may be configured to use one of these Configurations 1002. The sub-frame labeled "S" in FIG. 10 is used to transmit an Uplink Pilot signal and a Downlink Pilot signal. The S-sub-frame is not used in determining the constraints imposed on the RF beam forming technique.

Hybrid Automatic Repeat Request (H-ARQ) Processing

Transmissions over the air interface are prone to errors due to interference and fading. Each transmission in the uplink direction and in the downlink direction has to be acknowledged by the other end. This is done by sending Hybrid Automatic Repeat Request (H-ARQ) acknowledgments or negative-acknowledgments on control channels. H-ARQ is a powerful technique for improving the performance of LTE systems over that of other wireless systems, and may need to be maintained when using the beam forming technology.

In the downlink direction, H-ARQ ACKs/NAKs are for uplink transmissions, and are sent on the Physical H-ARQ Indicator Channel (PHICH), which is part of the PDCCH (Physical Downlink Control Channel), i.e. the PHICH is transmitted in the first 1-3 symbols of each sub-frame. In the uplink direction, H-ARQ ACKs/NACKs (acknowledgement characters or negative acknowledgement characters) are sent on the Physical Uplink Control Channel (PUCCH), which is implicitly scheduled shortly after a downlink transmission.

When a downlink transmission is "NAKed," (i.e., receives a negative-acknowledge character) and needs to be retransmitted, the Media Access Control (MAC) layer in the eNB 102 element may need to schedule that retransmission. When the beam forming technique is employed, the MAC may be required to schedule the retransmission to occur in the sub-frame in which the RF beam 902 is formed that covers the current UE 104 location, and the data may be transmitted to the UE 104 via the covering RF beam 902. Because all user plane data may need to be sent to the UE 104 in the sub-frame in which is formed the RF beam 902 that covers the UE 104 location, the statement for the downlink transmissions may need to treat retransmitted data in the same way that initial transmissions of user plane data are treated with the beam forming technology. These statements apply equally to the FDD system and to the TDD system. Maintaining the efficiency of retransmissions in the downlink direction is not an issue when using the beam forming technique.

Figure 11:
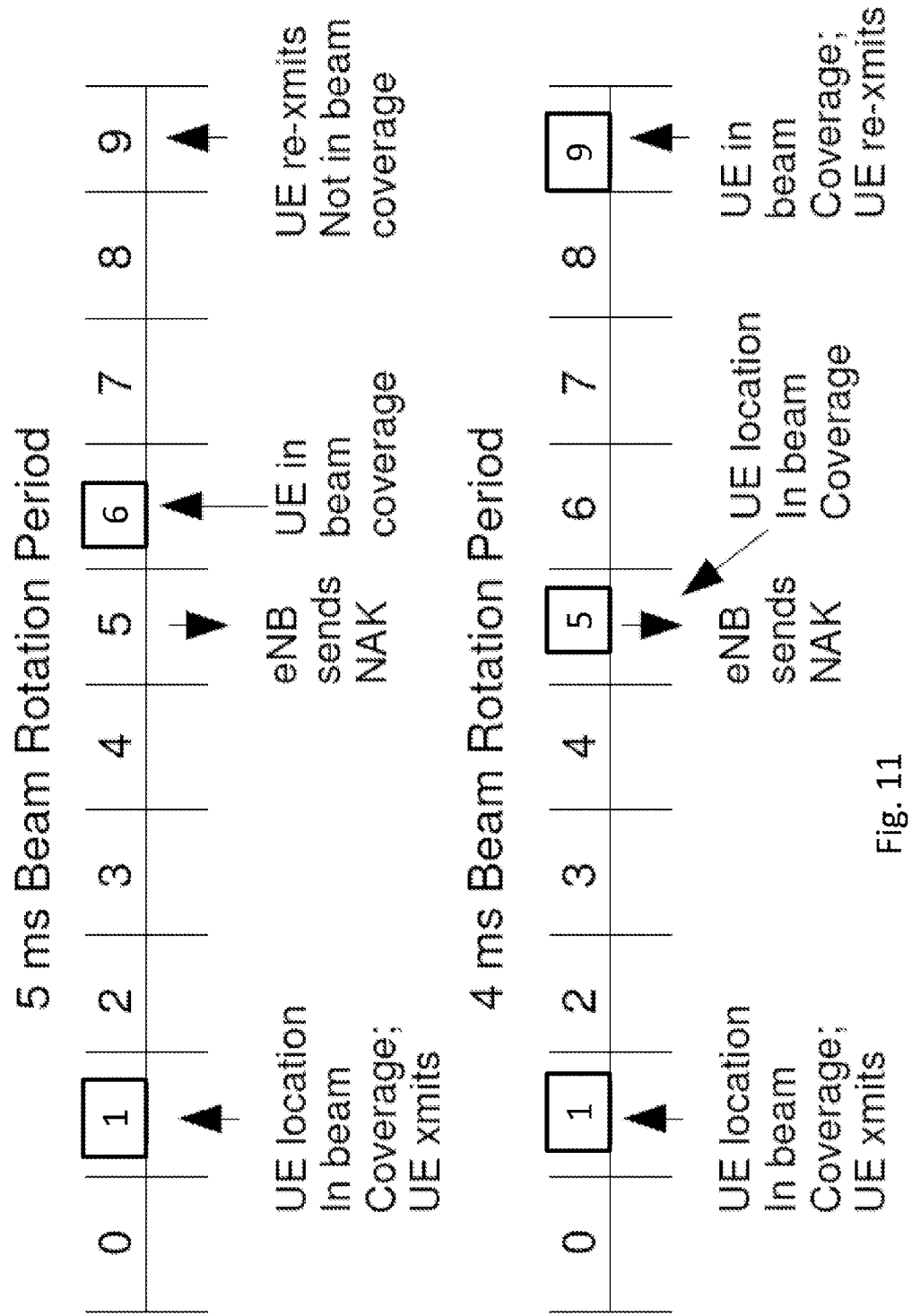
FIG. 11 depicts an example embodiment illustrating a 4 msec beam rotation in an FDD system to support H-ARQ operation.

Uplink retransmissions may not be explicitly scheduled, but may be implicitly scheduled. For instance, assume that the UE 104 makes an uplink transmission in a sub-frame in which the eNB 102 beam-forming receiver focuses on the UE 104 location. In an FDD system, if the UE 104 receives a NAK of any transmission via the downlink PHICH, the NAK may need to be sent four sub-frames after the sub-frame that contained the maligned UE 104 transmission. The UE 104 uses implicit scheduling to re-transmit the information four sub-frames after receiving the NAK. Hence, in an FDD system, if the period of the RF beam 902 coverage of the Cell sub-area 902 is different from four msec, it means that the UE 104 retransmission may occur in a sub-frame in which the UE 902 location is not illuminated by an RF beam 902. As mentioned, the UE 104 interprets an ACK or NAK received on the PHICH in sub-frame n as applying to the UE 104 transmission in sub-frame (n−4); See Section 8.3 of TS 36.213 va40. Meanwhile, the UE 104 implicitly reschedules its retransmission in sub-frame (n+4). See Section 8.0 of TS 36.213 va40. Hence, unless the RF beam 902 rotation through the Cell coverage area 712 is four msec (4 sub-frames) in an FDD system, uplink retransmissions fail (the eNB 102 is searching the receive beams for UE 104 user plane transmissions, and with a rotation different from four msec, the beam location 902 in the sub-frame where the retransmission takes place does not cover the UE 104 location). See FIG. 11 for an example using a beam 902 rotation period of five msec versus using a beam 902 rotation period of four msec in an LTE FDD system.

H-ARQ Processing for Uplink Retransmission in TDD Systems

The situation for a TDD system may be more complicated, because the relationship of the sub-frame in which the NAK is received to the referenced sub-frame of the original transmission is different for the different TDD U/D configurations 1002. So, too, is the relationship of the received NAK sub-frame to the sub-frame in which the UE 104 implicitly schedules the re-transmission. Table 8.3-1 of TS 36.213 a40 is reproduced below, and gives the relationships. If a NAK is received in sub-frame n, it implicitly refers to the transmission sent by the UE 104 in sub-frame (n−k), where the value k is shown below for the different TDD U/D configurations 1002.

TABLE 1

Sub-frame Relationship of NAK Received to Original Transmission in TDD Systems

| TDD UL/DL Config | Sub-Frame Number (n) in Which PHICH NAK is Received by the UE | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

The NAK transmissions from the eNB 102 may only come in specific downlink sub-frames, and not always four sub-frames removed, as in the FDD system.

Another way to view the information is to view the sub-frames in which the original UE 104 transmission is made, and then use the values to show when the NAK for that transmission may be sent by the eNB 102. This view is presented in the following Table 2, where the notation h} means that the NAK is received in sub-frame h of the following LTE frame. The TDD configurations show the Uplink/Downlink (or S) behavior of the system in each sub-frame, per FIG. 10 and Table 4.2-1 of TS 36.211 a40.

TABLE 2

Original UE Transmission Sub-frame and Sub-frame in Which NAK is Received in TDD Systems

| TDD U/D Config | Downlink to Uplink Switch Point Periodicity | Sub-Frame Number Notation: U/n} means that the PHICH NAK for the transmission in the indicated sub-frame comes in sub-frame n of the next frame. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U/6 | U/0} | U | D | S | U/1} | U/5} | U |
| 1 | 5 ms | D | S | U/6 | U/9 | D | D | S | U/1} | U/4} | D |
| 2 | 5 ms | D | S | U/8 | D | D | D | S | U/3} | D | D |
| 3 | 10 ms | D | S | U/8 | U/9 | U/0} | D | D | D | D | D |
| 4 | 10 ms | D | S | U/8 | U/9 | D | D | D | D | D | D |
| 5 | 10 ms | D | S | U/8 | D | D | D | D | D | D | D |
| 6 | 5 ms | D | S | U/6 | U/9 | U/0} | D | S | U/1} | U/5} | D |

Now that it is clear in which sub-frame a NAK may be sent for a UE 104 transmission, the next point to understand is the sub-frame in which the UE 104 may re-transmit its information. The offset from the sub-frame in which NAK is received may also depend on the TDD configuration 1002, and on the sub-frame in which the NAK is received. If the NAK is received in sub-frame n, the UE 104 schedules its retransmission in sub-frame (n+k), where k is given in the following table (from Table 8-2 of TS 36.213 a40 for normal HARQ operation).

TABLE 3

The Value k for UE Retransmission in Sub-frame (n + k) When NAK is Received in Sub-frame n

| TDD UL/DL | Sub-frame n | | | | | | | | | |
|---|---|---|---|---|---|---|---|---|---|---|
| Config | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Table 1, Table 2, and Table 3 provide a set of constraints on the where the RF beams 902 have to be in order to preserve the HARQ capability in TDD systems that use the beam forming technique. For example, if the RF beam 902 is focused on a location in sub-frame n when a UE 104 transmits information, then the same RF beam 902 pattern may need to be in effect in the sub-frame when the UE re-transmits its data. For example, Table 2 shows that for TDD configuration 0, if a UE 104 transmits information in sub-frame 3, a NAK for that transmission comes in sub-frame 0 of the following LTE frame. Table 3 specifies that a NAK received in sub-frame 0 causes the UE to reschedule its retransmission in sub-frame 4 (4 sub-frames after the NAK is received). This relationship means that the RF beam pattern 902 in sub-frame 3 (where the original transmission took place) and in sub-frame 4 (the sub-frame in which the retransmission occurs) may need to be the same. All of the constraints implied by these H-ARQ tables determine how many separate sets of RF beam patterns 902 can be had for a TDD system with a particular U/D configuration, and therefore, what the rate of repetition may need to be for the RF beam patterns 902. The result is not as straightforward as it is for the FDD system, in which there are 4 RF beam patterns that repeat every 4 sub-frames.

Before analyzing Table 1, Table 2, and Table 3 for all the HARQ constraints on the beam patterns, another aspect of the system may need to be analyzed for additional constraints imposed on the number of sets of beam patterns 902, and the sub-frames in which the RF beam patterns may need to be the same. Additional constraints may be imposed by the Channel Quality Indicator (CQI) measurements, because these measurements may be used to locate the UE 104 in the different RF beam locations 902. A description for Locating and Tracking UEs 104 in an RF Beam 902 of a Periodically Scanning RF Beam System, as described herein, explains the CQI measurements and how they are used in an LTE system employing this beam forming technology.

Channel Quality Indication (CQI)

To be able to optimize downlink transmissions by adapting the modulation and coding scheme (MCS), the mobile device 104 may have to send channel quality indications (CQI) on the PUCCH (Physical Uplink Control Channel) or the PUSCH (Physical Uplink Shared Channel). The CQI is a 4-bit result that indicates the measurement value. The measurement may be over the entire frequency range of the Cell bandwidth, or it can be over some subset of that frequency range. The entire frequency range may be divided into a set of Physical Resource Blocks, and collections of these are defined as a "sub-band" for the purpose of making CQI measurements over a frequency range that is less than the total RF bandwidth assigned to the Cell. In an LTE system, sub-band CQI measurements can be made on an aperiodic basis, where the report is sent via the PUSCH. Periodic wideband CQI measurements may be made using the PUCCH to send the report to the eNB 102.

When the eNB 102 desires that the UE 104 make a measurement of the Channel Quality and return a CQI measurement value, it may send command information, called Downlink Command Information (DCI), to the UE 104. In an FDD system, if DCI is sent in sub-frame n, the QCI measurement is reported by the UE in sub-frame (n+4). That, plus the HARQ constraint of (n+8) for uplink retransmissions, may dictate that the FDD system contain four sets of RF beam patterns 902 that repeat every 4 sub-frames. In a TDD system, the DCI commands may be constrained to be sent by the eNB 102 in the sub-frames shown in Table 2, i.e., the same sub-frames in which ACK/NAK are allowed to be sent. The UE 104 CQI measurement report is returned to the eNB 102 k sub-frames later, where k is shown in Table 3. Because the UE 104 location determination algorithm uses so-called aperiodic CQI reporting, where the report is returned via the PUSCH channel (i.e., within an RF beam 902), it means that the sub-frame in which the DCI command is sent and the corresponding sub-frame that contains the CQI measurement report may need to generate the same RF beam patterns 902.

Determining the Number of RF Beam Patterns in a TDD System

The information in Table 1, Table 2, and Table 3 may now be used to determine the number of RF beam patterns 902 that can be maintained in a TDD system with a particular U/D Configuration 1002, and the sub-frames that may need to use the same RF beam pattern 902. The constraints are based in the fact that HARQ may need to be preserved for UE 104 retransmissions; the sub-frame of an original transmission and the sub-frame of a retransmission may need to have the same RF beam coverage 902. Also, a DCI for a Channel Quality Information measurement in a given sub-frame and the CQI report in another sub-frame may need to have the same RF beam 902 coverage in those two sub-frames. The rationale for this statement is apparent from the algorithms presented herein for locating a UE 104 in an RF beam 902 when the UE 104 first accesses the Cell, and for tracking a UE 104 as it moves across the set of RF beam 902 locations that cover the Cell area 712. The information in Table 1, Table 2, and Table 3 is incorporated into the following table to make the analysis easier to visualize for each TDD U/D configuration 1002.

The notation used in Table 4 is described here. For each TDD U/D configuration 1002, the configuration is repeated from FIG. 10 for the convenience of the reader. The row above the configuration is used to indicate the sub-frame in which the UE 104 can send an Uplink transmission, X (i.e., in any U sub-frame), the sub-frame in which a corresponding NAK is received (N), and the sub-frame in which the corresponding retransmission occurs (R). If the relevant sub-frame occurs in the preceding LTE frame (2+LTE frames are shown in Table 4), it is indicated by N{j (for a NAK; the referenced transmission is sub-frame j in the previous LTE frame), or by R{j (for a retransmission; the original transmission occurred in sub-frame j of the previous LTE frame). In one case (TDD configuration 6), the retransmission is for an original transmission two LTE frames previous, so the notation R{{j is used.

The row beneath the configuration row is used to indicate when a DCI command can be sent by the eNB 102 to cause a CQI measurement. The notation dci-j is used to indicate that the DCI command is sent in sub-frame j (it is already indicated in sub-frame j, so this part is for convenience of viewing). The corresponding CQI measurement result is returned to the eNB 102 is the sub-frame marked by CQI-j, where, again, if the corresponding DCI command occurs in the previous LTE frame, the notation CQI-{j is used.

TABLE 4

HARQ and DCI/CQI Data for Determining the Number of RF Beam Sets in a TDD System

| TDD U/D Config | 0 | 1 | 2 | 3 | 4 | 5 | 6 | 7 | 8 | 9 | 0 | 1 | 2 |
|---|---|---|---|---|---|---|---|---|---|---|---|---|---|
| X, N, R | | | X2 | X3 | X4 | | N2 | X7 | X8 | X9 | N{3 | N{7 | R{2 |
| Conf 0 dci/cqi | D dci0 | S dci1 | U | U | U cqi0 | D dci5 | S dci6 | U cqi1 | U | U | D cqi5 | S dci0 | D dci1 | U cqi{6 |
| X, N, R | | | X2 | X3 | | | N2 | X7 | X8 | N3 | | N{7 | R{2 |
| Conf 1 dci/cqi | D | S dci1 | U | U | D dci4 | D | S dci6 | U cqi1 | U cqi4 | D dci9 | D | S dci1 | U cqi{6 |
| X, N, R | | | X2 | | | | | X7 | N2 | | | | R{2 |
| Conf 2 dci/cqi | D | S | U | D dci3 | D | D | S | U cqi3 | D dci8 | D | D | S | U cqi{8 |
| X, N, R | | | X2 | X3 | X4 | | | | N2 | N3 | N{4 | | R{2 |
| Conf 3 dci/cqi | D dci0 | S | U | U | U cqi0 | D | D | D | D dci8 | D dci9 | D dci0 | S | U cqi{8 |
| X, N, R | | | X2 | X3 | | | | | N2 | N3 | | | R{2 |
| Conf 4 dci/cqi | D | S | U | U | D | D | D | D | D dci8 | D dci9 | D | S | U cqi{8 |
| X, N, R | | | X2 | | | | | | N2 | | | | R{2 |
| Conf 5 dci/cqi | D | S | U | D | D | D | D | D | D dci8 | D | D | S | U cqi{8 |
| X, N, R | | | X2 | X3 | X4 | | N2 | X7 | X8 | N3 | N{4 | N{7 | |
| Conf 6 dci/cqi | D dci0 | S dci1 | U | U | U | D dci5 | S dci6 | U cqi0 | U cqi1 | D dci9 | D dci0 | S dci1 | U cqi{5 |

| TDD U/D Config | 3 | 4 | 5 | 6 | 7 | 8 | 9 | 0 | 1 | 2 | 3 |
|---|---|---|---|---|---|---|---|---|---|---|---|
| X, N, R | | R{3 | N{8 | | R{7 | R{8 | | | | | |
| Conf 0 dci/cqi | U | U cqi0 | D dci5 | S dci6 | U cqi1 | U | U | D cqi5 | S dci0 | U dci1 | U cqi{6 |
| X, N, R | | R{3 | N{8 | | R{7 | R{8 | | | | | |
| Conf 1 dci/cqi | U | D cqi{9 | D dci4 | S | U cqi1 | U cqi4 | D | D | S | U | U |
| X, N, R | | N{7 | | | R{7 | | | | | | |
| Conf 2 dci/cqi | D | D dci3 | D | S | U cqi3 | D | D | D | S | U | D |
| X, N, R | | R{3 | R{4 | | | | | | | | |
| Conf 3 dci/cqi | U | U cqi{9 | D cqi0 | D | D | D | D | D | S | U | U |
| X, N, R | | R{3 | | | | | | | | | |
| Conf 4 dci/cqi | U | D cqi{9 | D | D | D | D | D | D | S | U | U |

TABLE 4-continued

HARQ and DCI/CQI Data for Determining the Number of RF Beam Sets in a TDD System

| X, N, R | | | | | | | | | | | |
|---|---|---|---|---|---|---|---|---|---|---|---|
| Conf 5 dci/cqi | D | D | D | D | D | D | D | D | S | U | D |
| X, N, R | | R{2 | R{3 | N{8 | | R{4 | R{7 | | | R{{8 | |
| Conf 6 dci/cqi | U | U | D | S | U | U | D | D | S | U | U |
| | cqi{6 | cqi{9 | dci5 | dci6 | cqi0 | cqi1 | dci9 | dci0 | dci1 | cqi{5 | cqi{6 |

The data in Table 4 is analyzed as follows to determine the number of RF beam 902 sets that can be supported in a specific TDD U/D configuration 1002, and the sub-frames in which the same RF beam pattern 902 may need to be used.

The results in Table 5 constitute the main constraints in this disclosure for LTE TDD systems that employ an RF Beam Scanning antenna system. The constraints for a corresponding LTE FDD system are that the RF Beam pattern 902 repeat every 4 msec.

TABLE 5

The Number of RF Beam Sets, and the Sub-Frames Requiring the Same RF Beam Coverage in LTE TDD Systems

| TDD Configuration | Analysis | RF Beams may need to be identical in the listed sub-frame sets |
|---|---|---|
| 0 | The HARQ constraint shows that sub-frames 3, 4 may need to have the same RF beam 902 coverage, and that sub-frames 8, 9 may need to have the same RF beam 902 coverage. The DCI constraint shows that sub-frames 0, 4 may need to have the same RF beam 902 coverage, and that sub-frames 5, 9 may need to have the same RF beam 902 coverage. Sub-frame 2 and sub-frame 7 have no constraints related to the beam forming, because QCI reports generated in those sub-frames are related to DCI commands sent in an S sub-frame. The S sub-frame data may always be transmitted in the Cell-Wide signal, and does not present constraints on the number of RF beam sets. A requirement for the beam forming technique is that the S frames not be used to send DCI commands, or to receive CQI measurement reports for the purpose of determining the UE location, as described herein. This requirement limits the number of RF beam 902 sets that can be used to determine the UE location to 2. Sub-frames 2 and 7 may need to therefore be included in one of these RF beam 902 sets, for otherwise, UEs 104 in locations other than the ones illuminated in the two for which CQI measurements are returned cannot be located via the algorithms described herein on Locating UEs 104 within RF Beams 902. | (0, 3, 4, 7)(5, 9, 8, 2); hence, two sets of RF beams 902 can be used in Configuration 0. One set of RF beams 902 may be generated in sub-frames 0, 3, 4, and 7; a second set of RF beams 902 may be generated in sub-frames 2, 5, 8, and 9. No RF beams 902 are generated in sub-frames 1 and 6, which are the S sub-frames. An alternative set of sub-frames in which the same RF beams 902 may need to be used are: (0, 3, 4, 2) and (5, 9, 8, 7). Two other alternative sets of sub-frames are possible in which the same sets of RF beam patterns may be generated, namely, (0, 3, 4, 2, 7) and (5, 8, 9); (0, 3, 4) and (5, 8, 9, 2, 7). |
| 1 | The HARQ issue presents no constraints on the RF beam forming, because the retransmission occurs in the same sub-frame as the original transmission. The CQI constraint shows that sub-frames 9, 3 may need to have the same RF beam 902 coverage, and that sub-frames 4, 8 may need to have the same RF beam 902 coverage. Because the QCI reports may need to be able to identify UEs in any of the beam 902 locations, there cannot be more than two sets of RF beams. The remaining sub-frames may need to be included in either of the two sets of sub-frames in which CQI reports are returned. One example is shown in the cell to the right of this one in this table. | (3, 9, 0, 5)(4, 8, 2, 7) hence, two sets of RF beams 902 can be used in Configuration 1. One set of RF beams 902 may be generated in sub-frames 0, 3, 5, and 9; a second set of RF beams 902 may be generated in sub-frames 2, 4, 7, and 8. No RF beams 902 are generated in sub-frames 1 and 6, which are the S sub-frames. As noted, alternative dual sets of RF beam 902 may be generated by assigning sub-frames 0, 2, 5, and 7 to the two sets differently than shown above. There are 30 different ways of partitioning the four sub-frames 0, 2, 5, 7 into the two sets of RF beam patterns, one of which is shown above. |
| 2 | The HARQ issue presents no constraints on the RF beam forming sets, because retransmissions occur in the same sub-frame as the original transmission. However, the CQI constrains the use of only two RF beam patterns, because CQI is returned in just two sub-frames. These two may need to be used to locate the UEs in any of the RF beam 902 locations. The QCI relationships show that sub-frames 2, 8 may need to have the same RF beam 902 pattern, and that 3, 7 may need to have the same RF beam 902 pattern. The remaining sub-frames, 0, 4, 5, 9, may need to be included in one of these two sets of sub-frames. One example is shown in the next table cell. | (2, 8, 0, 4)(3, 7, 5, 9); hence, two sets of RF beams 902 may be used in Configuration 2. One set of RF beams 902 may be generated in sub-frames 0, 2, 4, and 8; a second set of RF beams 902 may be generated in sub-frames 3, 5, 7, and 9. No RF beams 902 are generated in sub-frames 1 and 6, which are the S sub-frames. As noted, alternative dual sets of RF beam 902 may be generated by assigning sub-frames 0, 4, 5, and 9 to |

TABLE 5-continued

The Number of RF Beam Sets, and the Sub-Frames Requiring the Same RF Beam Coverage in LTE TDD Systems

| TDD Configuration | Analysis | RF Beams may need to be identical in the listed sub-frame sets |
|---|---|---|
| | | the two sets differently than shown above. There are 30 different ways of partitioning the four sub-frames 0, 4, 5, 9 into the two sets of RF beam patterns, one of which is shown above. |
| 3 | The HARQ issue presents no constraints on the RF beam forming sets, because retransmissions occur in the same sub-frame as the original transmission. There are three sub-frames in which CQI reports are returned, and none are tied to an S sub-frame Hence, three sets of RF beams 902 can be used, with CQI reporting constraining 2, 8 to have the same RF beam 902 pattern, 3, 9 to have the same RF beam 902 pattern, and 4, 0 to have the same RF beam 902 pattern. The other sub-frames, 5, 6, 7, may need to be placed in one of these three sets of sub-frames, and therefore, other combinations of sets of sub-frames can be used, as long as (2, 8) are kept together, (3, 9) are kept together, and (4, 0) are kept together. | (0, 4, 6)(2, 8, 5)(3, 9, 7); hence, three sets of RF beams 902 can be used in Configuration 3. One set of RF beams 902 may be generated in sub-frames 0, 4, and 6; a second set of RF beams 902 may be generated in sub-frames 2, 5, and 8; a third set of RF beams 902 may be generated in sub-frames 3, 7, and 9. No RF beams 902 are generated in sub-frame 1, the S sub-frame. As noted, alternative triple sets of RF beam 902 may be generated by assigning sub-frames 5, 6, and 7 to the three sets differently than shown above. There are 39 different ways of partitioning the three sub-frames 5, 6, 7 into the three sets of RF beam patterns, one of which is shown above. |
| 4 | The HARQ for uplink re-transmissions does not constrain the way the RF beams are formed in the different sub-frames, because X2 is re-transmitted (when necessary) in sub-frame 2, and X3 is re-transmitted (when necessary) in sub-frame 3. With only two uplink sub-frames, at most two sets of RF beam patterns can be had, because the CQI values returned in the two uplink sub-frames may need to identify UEs for downlink transmission in all the other (D) sub-frames. The dci/CQI associations indicate that sub-frames 8, 2 may need to have the same RF beam 902 pattern, and that sub-frames 3, 9 may need to have the same RF beam 902 pattern. The other sub-frames, 0, 4, 5, 6, 7, may need to be collected with either pair to map the remaining sub-frames to the two RF beam 902 patterns. One example is shown in the table cell to the right. | (2, 8, 0, 4, 6)(3, 9, 5, 7); hence, two sets of RF beams 902 can be used in Configuration 4. One set of RF beams 902 may be generated in sub-frames 0, 2, 4, 6, and 8; a second set of RF beams 902 may be generated in sub-frames 3, 5, 7, and 9. No RF beams 902 are generated in sub-frame 1, the S sub-frame. As noted, alternative dual sets of RF beam 902 may be generated by assigning sub-frames 0, 4, 5, 6, and 7 to the two sets differently than shown above. There are 62 different ways of partitioning the five sub-frames 0, 4, 5, 6, 7 into the two sets of RF beam patterns, one of which is shown above. |
| 5 | Because there is only one uplink sub-frame in Configuration 5, the CQI measurement returned in that sub-frame (2) may need to capture the location of the UE regardless of where the UE is located in the Cell coverage area 712. I.e., there is just one set of RF beams 902 in this configuration, and the entire Cell coverage area 712 may need to be covered by this one set of beams. | (2, 8, 0, 3, 4, 5, 6, 7, 9); hence, one set of RF beams 902 can be used in Configuration 5. This single set of RF beams is repeated in sub-frames 0, 2, 3, 4, 5, 6, 7, 8, and 9. No RF beams 902 are generated in sub-frame 1, the S sub-frame. |
| 6 | HARQ for uplink retransmissions constrains the following pairs of sub-frames to use the same RF beam 902 pattern: (2, 3), (3, 4), (4, 7), (7, 8), (2, 8). The sub-frames when DCI is sent by the eNB 102, and the corresponding sub-frames when CQI is received by the eNB 102 constrains the following pairs of sub-frames to use the same RF beam 902 pattern: (9, 4), (0, 7), (5, 2). The sub-frame RF beam 902 pattern constraints overlap across all the sub-frames (except the S sub-frames, which are not used to send DCI to locate the UEs in this disclosure). | (0, 2, 3, 4, 5, 7, 8, 9); hence, one set of RF beams 902 can be used in Configuration 6. This single set of RF beams 902 is repeated in sub-frames 0, 2, 3, 4, 5, 7, 8, and 9. No RF beams 902 are generated in sub-frames 1 or 6, the S sub-frames. |

Locating and Tracking UEs in an RF Beam of a Periodically Scanning RF Beam System The present disclosure describes aspects for locating and tracking users in conjunction with an RF beam forming technique. The particular beam forming technique generates N RF beams 902 concurrently, such as in each 1 msec interval. The N RF beams 902 cover N sub-areas of the total coverage area 712 of an LTE Cell, the coverage area 712 being determined by an LTE Cell using the same total transmit power, but which does not use the beam forming technique. In the next 1 msec interval, another N RF beams 902 are generated to cover a different set of N sub-areas. This process may be repeated in an LTE Frequency Division Duplex (FDD) system for m times until, for example, after 4 msec (where m=4), the entire Cell coverage area 712 has been covered by the 4*N RF beams 902. For example, let N=4, so 16 RF beam 902 sub-areas cover the entire Cell area 712 in an FDD system. See FIG. 9.

Figure 9:
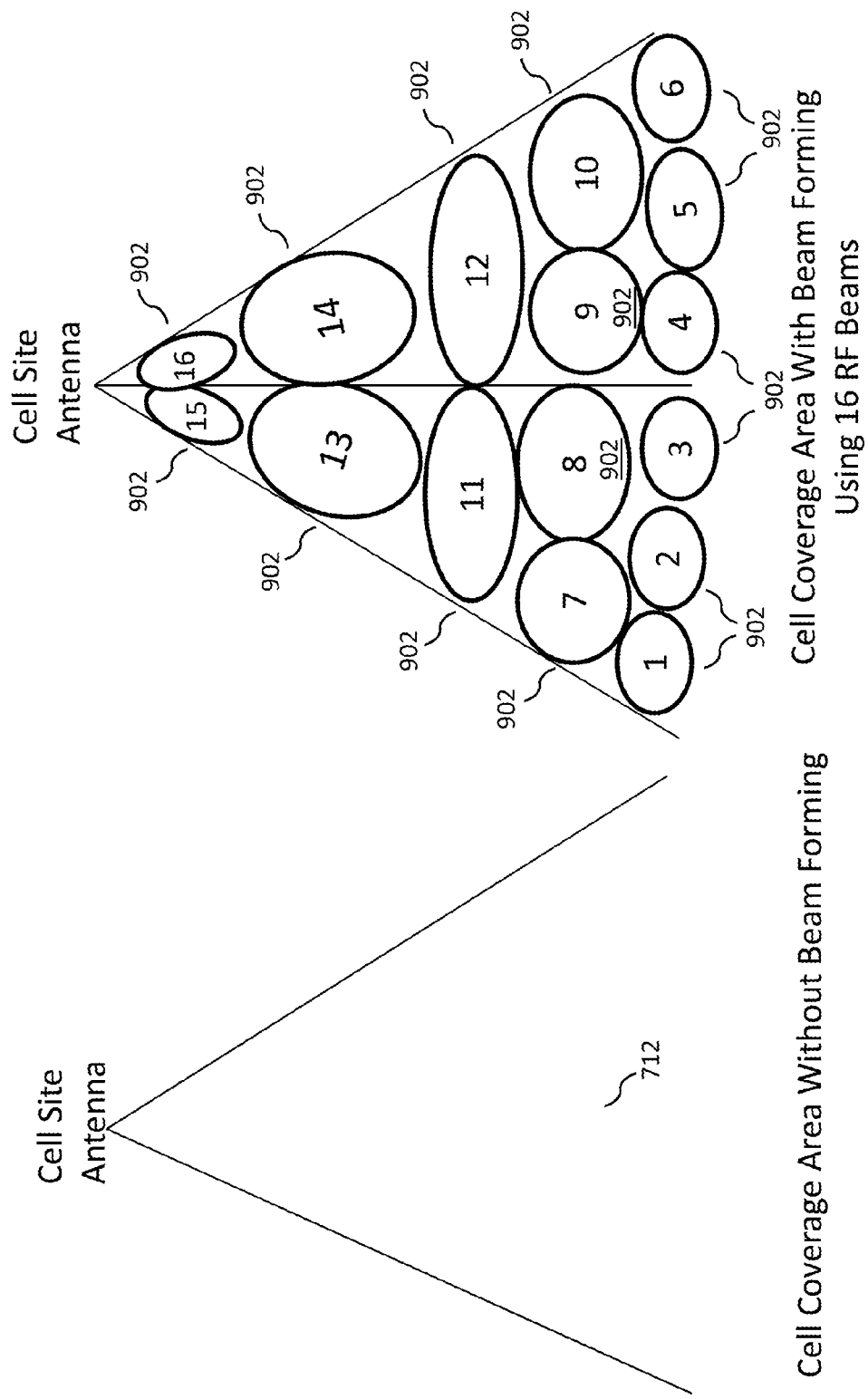
FIG. 9 depicts an example embodiment where cell coverage area is scanned with 16 RF beams every 4 msec.

The RF beam forming technique depicted in FIG. 9 does not focus an RF beam 902 on a particular user equipment (UE 104), as is done in other beam forming approaches. Rather, the RF beams 902 are generated continuously each 1 msec, with the same RF beam 902 sub-areas being covered every 4 msec in an FDD system. In FIG. 9, four sets of non-adjacent sub-areas are illuminated (for transmit) and are focused (for receive) over the course of four consecutive 1 msec time intervals.

In an LTE wireless system, downlink transmissions may be scheduled by software in the base station 102 called the Scheduler. The Scheduler may also grant permission for uplink transmissions. In this way, the bandwidth available via the LTE air interface is allocated to different users at different times in a manner determined by the Scheduler.

When the RF beam forming technique summarized in FIG. 9 is used, it is important for the Scheduler to know the current location of each UE, so that, in a particular 1 msec interval, it can give uplink transmission grants only to those UEs 104 in one of the four locations about to be focused by the RF subsystem beam forming in that 1 msec interval. Likewise, the Scheduler may need to schedule downlink transmissions only to those UEs 104 who are known to be located in one of the four RF beam 902 sub-areas about to be illuminated by the RF subsystem beam forming operation.

Hence, to enable the effective use of the RF beam forming technique, it may be essential that the Scheduler know which RF beam 902 covers the current UE location. There are two aspects to this problem that need to be resolved. One is to determine the RF beam 902 that covers the UE 104 location when the UE 104 first accesses the Cell (i.e., during an Initial Attach to the LTE system, or during a Handover into the Cell from a neighboring Cell, or during a time when the UE 104 comes out of the IDLE state, and re-establishes its connection to the current Cell). The second aspect of this problem is to track the UE 104 as the user moves across the sub-areas covered by the RF beams 902 generated by the RF subsystem of the Cell. This disclosure provides information that discloses techniques to handle these two aspects, for the purpose of proving priority in developing the techniques, and for providing the teachings required to locate and track UEs 104 for use with the RF beam forming technique.

In an example, in an LTE Time Division Duplex (TDD) system, the ten 1 msec sub-frames of each LTE Frame 1002 are divided into a set of sub-frames used for downlink transmissions and a set of sub-frames used for uplink transmissions. There are seven different configurations of the sub-frames into k-uplink sub-frames and m-downlink sub-frames. See FIG. 10. (The sub-frame labeled "S" is not used in the UE location algorithms presented herein.) When the RF beam forming technique is used in an LTE TDD system, UEs 104 need to be scheduled for uplink and downlink transmissions in a sub-frame (i.e., 1 msec interval) when an RF beam 902 covers the UE 104 location. Hence, the need to determine the UE 104 location within an RF beam 902, and the need to track the UE 104 location across the RF beams 902, are identical to those needs in an LTE FDD system. However, rather than design the RF beams 902 to have a pattern that repeats every 4 msec, as in an FDD system, the RF beam 902 pattern repeats every 10 msec in a TDD system for any of the Uplink/Downlink configurations chosen for the TDD system. See Table 6 for an example listing of the sub-frames in each TDD configuration 1002 where the RF beam 902 pattern may be the same. As described herein, for each TDD U/D Configuration, there may be several different acceptable modes of operation for assigning RF beam patterns to the U/D sub-frames. The number of sets of sub-frames therefore indicates the number of different sets of 4-beam patterns that can be sustained in the given TDD configuration 1002.

TABLE 6

Number of Sets of RF Beam Patterns Supported in Each TDD Configuration

| TDD U/D Configuration | Sets of Sub-frames that Have Identical Beam Patterns |
| --- | --- |
| 0 | (0, 3, 4, 7) and (5, 9, 8, 2): hence, this U/D configuration 1002 supports two sets of beam patterns of 4 beams each. No RF beams 902 are generated in sub-frames 1 or 6. |
| 1 | (3, 9, 0, 5) and (4, 8, 2, 7): hence, this U/D configuration 1002 supports two sets of beam patterns of 4 beams each. No RF beams 902 are generated in sub-frames 1 or 6. |
| 2 | (2, 8, 0, 4) and (3, 5, 7, 9): hence, this U/D configuration 1002 supports two sets of beam patterns of 4 beams each. No RF beams 902 are generated in sub-frames 1 or 6. |
| 3 | (0, 4, 6), (2, 5, 8), and (3, 7, 9): hence, this U/D configuration 1002 supports three sets of beam patterns of 4 beams each. No RF beams 902 are generated in sub-frame 1. |
| 4 | (0, 2, 4, 6, 8) and (3, 5, 7, 9): hence, this configuration 1002 supports two sets of beam patterns of 4 beams each. No RF beams 902 are generated in sub-frame 1. |
| 5 | (0, 2, 3, 4, 5, 6, 7, 8, 9): hence, this configuration 1002 supports one 4-beam pattern. No RF beams 902 are generated in sub-frame 1. |
| 6 | (0, 2, 3, 4, 5, 7, 8, 9): hence, this configuration 1002 supports one 4-beam pattern. No RF beams 902 are generated in sub-frames 1 or 6. |

Channel Quality Indicator

To be able to optimize downlink transmissions by adapting the modulation and coding scheme (MCS), the mobile device 104 may need to send channel quality indications (CQI) on the Physical Uplink Control Channel (PUCCH) or on the Physical Uplink Shared Channel (PUSCH). The CQI is a 4-bit result that indicates the measurement value. The measurement may either be over the entire frequency range of the Cell bandwidth, or over some subset of that frequency range. The entire frequency range is divided into a set of Physical Resource Blocks, and collections of these are defined as a "sub-band" for the purpose of making CQI measurements over a frequency range that is less than the total RF bandwidth assigned to the Cell. In an LTE system, sub-band CQI measurements can be made on an aperiodic basis, where the report is sent via the PUSCH. Periodic wideband CQI measurements can be made using the PUCCH to send the report to the eNB 102.

When the eNB 102 desires that the UE 104 make a measurement of the Channel Quality and return a CQI measurement value, it sends command information, called Downlink Command Information (DCI), to the UE 104. In an FDD system, if DCI is sent in sub-frame n, the QCI measurement is reported by the UE 104 in sub-frame (n+4). In a TDD system, the DCI commands are constrained to be sent by the eNB 102 in a subset of the sub-frames used for downlink transmissions. The UE 104 CQI measurement report is returned to the eNB 102 k sub-frames later, where k depends on the TDD Uplink/Downlink configuration 1002, and where (n+k) is a sub-frame configured for uplink transmission in the TDD system.

A CQI-Based Algorithm for Finding the UE Location after Random Access, Handover, or Service Request UE 104 Initial Location Determination in an FDD System The eNB 102 system may learn of the existence of a UE 104 in its Cell coverage area 712 via the Random Access (RA) procedure, via a Handover procedure, or via a Service Request procedure, in which the UE 104 becomes connected via the Cell. To allow the beam forming approach to be used for this UE 104, the current UE 104 location in one of the 16 RF beam 902 locations in the FDD system may need to be determined. The following algorithm uses CQI measurements to determine the UE 104 location within an RF beam 902. If the RF environment includes major multipath components, the CQI measurements may be used to determine an RF beam for downlink transmissions to the UE, while an SRS measurement (disclosed below) may be used to determine an RF beam for uplink transmissions by the UE.

In embodiments, right after the eNB 102 sends an RA grant to the UE 104, if there is no contention, the eNB 102 MAC (Medium Access Control) software may send commands in each of 4 successive sub-frames (i.e., sub-frames n, (n+1), (n+2), and (n+3)) to have the UE 104 provide an aperiodic report of a sub-band CQI value. (If there is contention, the commands are sent after contention is resolved, i.e., after the eNB 102 sends the Contention Resolution message on the PDSCH.) The eNB 102 MAC and the PHY (Physical Layer) software may arrange for the selected set of measurement sub-bands to be included in each of the transmit beam signals in each of the measurement sub-frames to ensure that every transmit beam has transmit energy from the sub-band focused on the illuminated beam area 902; if the UE 104 is in the illuminated beam area 902, it can make the desired CQI measurement of the configured sub-bands. These aperiodic measurements are returned via the UE 104 PUSCH. If the measurement is made in sub-frame n, the report is returned in sub-frame (n+4) in an FDD system.

The eNB 102 PHY and MAC software look for the UE PUSCH measurements in each of the four receive beam streams in each of the reporting sub-frame intervals, (n+4), (n+5), (n+6), and (n+7). The receive beams 902 cover areas that are non-adjacent (see FIG. 9). It means that the UE 104 measurement report should generally be received in only one sub-frame, and in only one received beam 902 signal for that sub-frame. It is possible, though, that the eNB 102 may receive measurement reports in more than one reporting sub-frame, in one receive-beam 902 data stream in each of those sub-frames. This situation occurs if the UE 104 is on the border between RF beam 902 location areas. In this case, the MAC may select the measurement with the best CQI value (or pick one of the measurements, if they are the same). The MAC may note the sub-frame and the received beam 902 signal that contains the UE 104 CQI measurement report to determine which of the 16 beam 902 locations contains the UE 104. This location is recorded as the current UE 104 location (i.e., the location that the eNB 102 may use when sending user plane transmissions to the UE 104, or when scheduling the UE 104 for uplink transmissions in a non-multipath RF environment).

UE Initial Location Determination in a TDD System

An approach similar to the one for FDD systems may be used to determine the UE 104 location within an RF beam 902 when the UE 104 first accesses a TDD system. Depending on the TDD U/D configuration 1002 (see FIG. 10), right after the eNB 102 sends an RA grant to the UE, if there is no contention, or after contention is resolved in the case of RA contention, the eNB 102 MAC software may send a command in the first upcoming sub-frame in each of the sets of sub-frames in which the different RF beam 902 patterns are generated for the particular TDD U/D configuration 1002, and in which a DCI command may be sent. See Table 4. The commands cause the UE 104 to make an aperiodic report of a sub-band CQI measurement. The eNB 102 MAC and the PHY may arrange for the selected set of measurement sub-bands to be included in each of the transmit beam 902 signals in the sub-frames in which the DCI commands are sent to the UE 104. This approach ensures that every transmit beam 902 has transmit energy from the sub-band focused on the illuminated beam areas 902; if the UE 104 is in an illuminated beam 902 area, it can make the desired CQI measurement of the configured sub-bands. (The S sub-frames may not be used to send these commands to make aperiodic channel quality measurements for the purpose of locating the UE 104 in an RF beam area 902.)

These aperiodic measurements are returned via the UE PUSCH. Depending on the TDD U/D configuration 1002, the sub-frame that can be used to send the DCI to make the aperiodic measurement is constrained. See FIG. 10. So, if the measurement is made in sub-frame n, the report is returned in sub-frame (n+k) in a TDD system that uses normal Hybrid-ARQ operation. The value that n can be, and the corresponding value of k, are specified in TS 36.213 a40. As an example, suppose the UE 104 accesses the Cell in sub-frame 2, and that the TDD U/D configuration 1002 being used is Configuration 0. Using the values in Table 6 and the Configuration 0 listed in FIG. 10, the eNB 102 MAC sends a DCI command in sub-frame 5, and receives the report in sub-frame 9. The eNB 102 MAC also sends a DCI command in sub-frame 0 of the next LTE frame, and receives the corresponding CQI measurement report in sub-frame 4 of that LTE frame.

The eNB 102 PHY and MAC look for the UE 104 PUSCH measurements in each of the four receive beam 902 streams in each of the reporting sub-frame intervals, which depend on the TDD U/D Configuration 1002. The receive beams 902 cover non-adjacent areas, where possible (in the case of Configuration 5 or 6, only one set of RF beams 902 is repeated in every U or D sub-frame, so some of the RF beam 902 areas may need to be adjacent to one another). It means that the UE 104 measurement report should generally be received in only one sub-frame, and in only one received beam 902 signal for that sub-frame. It is possible, though, that the eNB 102 may receive measurement reports in more than one reporting sub-frame, and/or in more than one receive-beam 902 data stream in each of those sub-frames. This situation occurs if the UE 104 is on the border between RF location areas 902. In this case, the MAC may select the measurement with the best CQI value (or pick one of the measurements if they are the same, and/or pick one of the receive RF beam 902 signals, if a report with the same best CQI value is received in more than one receive RF beam signal). The MAC may note the sub-frame and the received beam 902 signal that contains the UE 104 CQI measurement report to determine which of the RF beam 902 locations contains the UE 104. This location is recorded as the current UE 104 location (i.e., the location the eNB 102 may use when sending user plane transmissions to the UE 104, or when scheduling the UE 104 for uplink transmissions when the RF environment is not impacted by multipath transmissions).

A CQI-Based Algorithm for Tracking the UE Location
UE Location Tracking in an FDD System Once the UE 104 location is determined after it completes the Random Access procedure, or a Handover procedure, or the Service Request procedure, the UE 104 needs to be tracked, in case it moves to another RF beam 902 location within the same Cell coverage area 712. The following algorithm uses CQI reporting to track the UE 104 across the set of RF beam 902 locations that overlay the Cell coverage area 712 in an FDD system.

A value K (some number of hundreds of msec, e.g., K=20 for a 2000 msec interval) may be provisioned for periodic checking of the UE 104 location. The eNB 102 MAC may perform a CQI-based UE 104 location determination algorithm that is similar to the one specified above for the case of initial access to the FDD Cell. Hence, commands may be sent to the UE 104 to perform aperiodic CQI reporting in four consecutive sub-frames, n, (n+1), (n+2), and (n+3). UE 104 measurement reports are thus sent via the PUSCH in sub-frames (n+4), (n+5), (n+6), and (n+7). As in the case of the UE 104 location determination upon completion of the Random Access procedure, the eNB 102 MAC ensures that the sub-band Physical Resource Blocks (PRBs) selected for measurement are included in each of the transmit beam signals in each of the measurement sub-frames. The eNB 102 PHY and MAC look for the UE 104 PUSCH measurement reports in each of the four receive beam 902 streams in each of the reporting sub-frame intervals, (n+4), (n+5), (n+6), and (n+7). The receive beams 902 cover non-adjacent areas. It means that the UE 104 measurement report should generally be received in only one sub-frame, and in only one received beam 902 signal in that sub-frame. The MAC may note the sub-frame and the received beam signal to determine which of the 16 beam locations 902 contains the UE.

Because the RF beams in any sub-frame cover non-adjacent areas, the eNB 102 MAC should recover a measurement from only one receive beam 902 stream in any given reporting sub-frame. However, if the UE 104 is on the border between two or more RF beam 902 locations, the eNB 102 MAC may receive measurement reports in each of 2, 3, or in all 4 of the measurement reporting sub-frames. The MAC records the UE 104 location, or locations (up to four), in a temporary data set assigned to the UE 104. If the current UE 104 location is not among the ones determined via the just-received measurement reports, and if more than one UE-location has been determined, the MAC selects the UE 104 location associated with the best returned CQI value, and updates the current UE 104 location accordingly. If the current UE 104 location is among the ones just reported, or if it is the only one reported, the current UE 104 location is not updated at this point in time.

Whether the current UE 104 location has been updated at this point, or not, the aperiodic CQI reporting is repeated at H msec intervals (a provisioned number of 20 msec intervals, e.g., H=25 for making aperiodic measurements every 500 ms) until a single UE 104 location is determined, and which does not change for M (a provisioned value) consecutive H*20 msec intervals. If the K msec periodic UE 104 check interval occurs before the UE 104 location determined from the reports remains fixed in M consecutive reports, the K msec periodic location check is not performed for this UE 104, and the check for M consecutive fixed UE 104 location determinations is continued at the H*20 msec rate.

If the UE 104 location determination remains fixed in M consecutive aperiodic reporting instances, update the UE 104 location information if it has changed, cancel the H*20 msec running of the CQI-based location check procedure, and resume operation of the K msec UE 104 location check procedure for this UE. This repeating of the 4 consecutive sub-frames CQI measurement procedure handles the case where the UE 104 is on the boundary of different coverage areas illuminated by the RF beams 902, or oscillates between RF beam 902 locations. (Note: the sub-band CQI measurement interval is 1 sub-frame, namely, the sub-frame in which the UE 104 receives a command to make an aperiodic CQI measurement.)

UE Location Tracking in a TDD System

An approach similar to the one for FDD systems may be used to track the UE 104 location within an RF beam 902 as the UE 104 moves across the Cell coverage area 712 of a TDD system.

A value K (some number of hundreds of msec, e.g., K=20 for a 2000 msec interval) is provisioned for periodic checking of the UE 104 location. The eNB 102 MAC may perform a CQI-based UE 104 location determination algorithm that is similar to the one specified above for the case of initial access to the TDD Cell. Hence, commands are sent to the UE 104 to perform aperiodic CQI reporting in non-S sub-frames in which a DCI command can be sent, where a single sub-frame is selected from each of the sets of sub-frames in which a different set of RF beam patterns is generated, to initiate the aperiodic CQI measurement; S sub-frames are not used for this purpose. The number of DCI commands sent is thus equal to the number of RF beam 902 sets generated in the particular TDD U/D Configuration 1002 (see Table 6). UE 104 measurement reports are thus sent via the PUSCH in sub-frames appropriate for the particular TDD configuration 1002 in effect for the Cell. The receive RF beam areas 902 covered in the TDD system in a given sub-frame may, or may not be non-adjacent. It means that the UE 104 measurement report should generally be received in only one sub-frame, and in only one received beam 902 signal in that sub-frame. It is possible, though, that the eNB 102 may receive measurement reports in more than one reporting sub-frame, and/or in more than one receive-beam 902 data stream in each of those sub-frames. If the report is received in only one sub-frame, and in only one receive RF beam 902 signal, the MAC may note the sub-frame and the received beam 902 signal to determine which of the RF beam 902 locations contains the UE 104.

However, if the UE 104 is on the border between two or more RF beam 902 locations, the eNB 102 MAC may receive measurement reports in each of the measurement reporting sub-frames, and/or in more than one receive RF beam 902 signals in one or more of the reporting sub-frames. The MAC records the UE 104 location, or locations, in a temporary data set assigned to the UE 104. If the current UE 104 location is not among the ones determined via the just-received measurement reports, and if more than one UE-location has been determined, the MAC selects the UE 104 location associated with the best returned CQI value, and updates the current UE 104 location accordingly. If the current UE 104 location is among the ones just reported, or if it is the only one reported, the current UE 104 location is not updated at this point in time.

Whether the current UE 104 location has been updated at this point, or not, the aperiodic CQI reporting is repeated at H msec intervals (a provisioned number of 20 msec intervals, e.g., H=25 for making aperiodic measurements every 500 msec) until a single UE 104 location is determined, and which does not change for M (a provisioned value) consecutive H*20 msec intervals. If the K msec periodic UE 104 check interval occurs before the UE 104 location determined from the reports remains fixed in M consecutive reports, the K msec periodic location check is not performed for this UE 104, and the check for M consecutive fixed UE 104 location determinations is continued at the H*20 msec rate.

If the UE 104 location determination remains fixed in M consecutive aperiodic reporting instances, update the UE 104 location information if it has changed, cancel the H*20 msec running of the CQI-based location check procedure, and resume operation of the K msec UE 104 location check procedure for this UE 104. This repeating of the CQI measurement procedure handles the case where the UE 104 is on the boundary of different coverage areas illuminated by the RF beams 902, or oscillates between RF beam 902 locations. (Note: the sub-band CQI measurement interval is 1 sub-frame, namely, the sub-frame in which the UE 104 receives a command to make an aperiodic CQI measurement.)

The Sounding Reference Signal (SRS) in LTE Systems

The LTE standard defines an optional Sounding Reference Signal (SRS) in the uplink direction. It is transmitted by a UE 104 using a known sequence, and using a set of PRBs assigned by the eNB 102 MAC software. The SRS can be scheduled when the UE 104 is not transmitting user data, and is generally used to make estimates of the uplink channel conditions. The eNB 102 MAC can schedule periodic transmissions of the SRS with a period as low as 2 sub-frames. The eNB 102 MAC can also schedule a single aperiodic SRS transmission. The SRS is detected at the eNB 102 and processed by the PHY layer. The PHY layer reports to the MAC layer the received SRS signal-to-noise level per Resource Block assigned for the SRS. Reference the Femto Forum, Doc. No. FF_Tech003_v1.11 page 104, 2010.

An SRS-Based Algorithm for Finding the UE Location after Random Access, after Handover, or after Service Request UE Initial Location Determination in an FDD System The UE 104 location determination algorithm for an FDD system may operate the same way as when using the CQI reports, except that instead of having the eNB 102 MAC command the UE 104 to make CQI measurements in four successive sub-frames, it commands the UE 104 to send an SRS in each of four successive sub-frames. These are aperiodic SRS transmissions. Each SRS transmission is sent in a sub-frame offset defined for all UEs 104 by a Cell-specific parameter. The SRS transmissions received at the eNB 102 may be used in a manner similar to way the CQI measurements are used at the eNB 102 to determine the RF beam 902 that covers the UE 104 location.

UE Initial Location Determination in a TDD System

The UE 104 location determination algorithm for a TDD system may operate the same way as when using the CQI reports, except that instead of having the eNB 102 MAC send DCI commands for the UE 104 to make CQI measurements, the DCI commands are to send SRS transmissions. The commands are sent in the first upcoming sub-frame in each of the sets of sub-frames in which the different RF beam 902 patterns are generated for the particular TDD U/D configuration 1002, and in which a DCI command may be sent. See Table 4. The commands cause the UE 104 to send an aperiodic SRS transmission in the PRBs specified in the DCI command and in U sub-frames corresponding to the sub-frames in which the DCI command is received. Each SRS is returned in a sub-frame offset defined for all UEs 104 by a Cell-specific parameter. The SRS transmissions received at the eNB 102 may be used in a manner similar to way the CQI measurements are used at the eNB 102 to determine the RF beam 902 that covers the UE 104 location.

An SRS-Based Algorithm for Tracking the UE Location
UE Location Tracking in an FDD System The UE 104 location tracking algorithm for an FDD system may operate the same way as when using the CQI reports, except that instead of having the eNB 102 MAC command the UE 104 to make CQI measurements in four successive sub-frames, it commands the UE 104 to send an SRS in each of four successive sub-frames. The commands and reports are generated per the period values defined in the CQI-based tracking procedure outlined herein for an FDD system. These are aperiodic SRS reports. Each SRS report is returned in a sub-frame offset defined for all UEs 104 by a Cell-specific parameter. The SRS transmissions received at the eNB 102 may be used in a manner similar to way the CQI measurements are used at the eNB 102 to track the UE 104 as it moves from one RF beam 902 that covers the UE 104 location to another RF beam 902 that covers the UE 104 location.

UE Location Tracking in a TDD System

The UE 104 location tracking algorithm for a TDD system may operate the same way as when using the CQI reports, except that instead of having the eNB 102 MAC send DCI commands for the UE 104 to make CQI measurements, the DCI commands are to send SRS transmissions. The commands are sent in the first upcoming sub-frame in each of the sets of sub-frames in which the different RF beam 902 patterns are generated for the particular TDD U/D configuration 1002, and in which a DCI command may be sent. See Table 4. The commands cause the UE 104 to send an aperiodic SRS transmission in the PRBs specified in the DCI command and in U sub-frames corresponding to the sub-frames in which the DCI command is received. Each SRS is transmitted in a sub-frame offset defined for all UEs 104 by a Cell-specific parameter. The SRS transmissions received at the eNB 102 may be used in a manner similar to way the CQI measurements are used at the eNB 102 to track the UE 104 as it moves from one RF beam 902 that covers the UE 104 location to another RF beam 902 that covers the UE 104 location.

Efficient Delivery of Real-Time Event Services Over a Wireless Network

Figure 12:
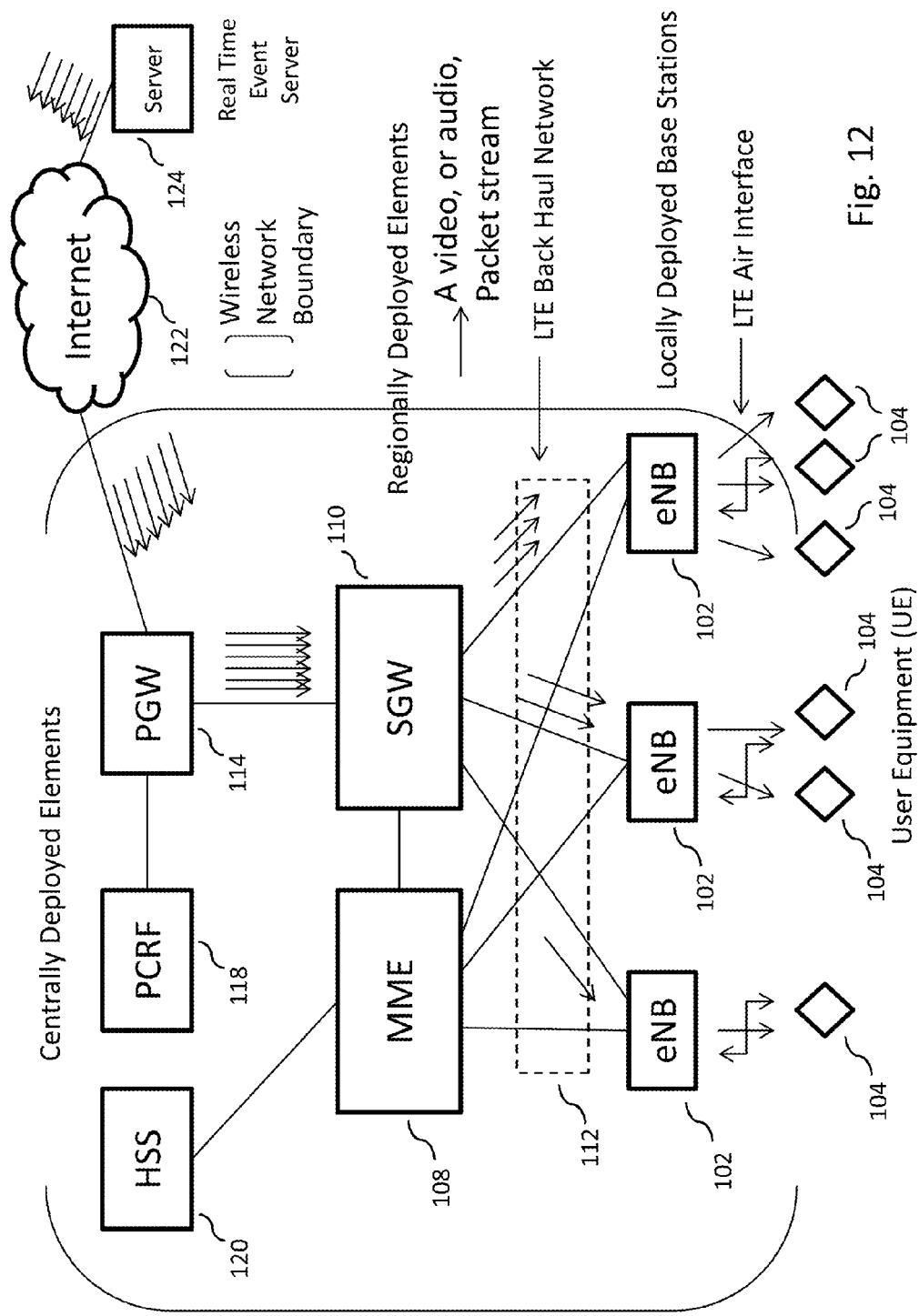
FIG. 12 depicts an example embodiment of a delivery of a real-time event service to six wireless users.

A Real-Time Event service 1502 is a service that delivers the same information content (e.g., video and audio) concurrently to multiple users. Examples include the delivery of the State of the Union Address. The event does not have to occur in real time; delivery of pre-recorded TV programs to users who see and hear the same content at the same time constitutes another example of this type of service. It may be difficult to offer real-time event services using the architecture shown in FIG. 1. In a typical deployment, there may be on the order of 600 eNB 102 elements that provide coverage for a particular geographic region. In the case of wireless users using today's architecture (i.e., FIG. 1), it may mean that each end-user 104 connects to a server 124 that delivers these data streams, and the data streams may be sent from the server 124 to each end-user independently of delivery to other end users. The situation is depicted in FIG. 12 for the case of 6 LTE wireless users 104 receiving the service. Note that the Real Time Event Server 124 may maintain a separate connection to each wireless user, so 6 connections, and 6 independent packet transmissions for video and 6 independent packet transmissions for audio may be required at the Real Time Event Server 124. Note, too, that the PGW 114 may handle the delivery of the 6 video streams and the 6 audio streams to the SGW 110 element, and that the SGW 110 element may deliver the 6 video streams and the 6 audio streams to the eNB 102 elements that serve the individual LTE users 104. Finally, each LTE eNB 102 element delivers the separate video and audio streams to the end users 104 who access the system via that eNB. Hence, one eNB 102 may handle the over-the-air delivery of packets for three users 104, another may do so for two users 104, a third eNB 102 may do so for one user 104 in the example shown in FIG. 12.

If the video data stream rate is 500 kbps (a typical rate), and the audio stream rate is 32 kbps (a typical rate), the example in FIG. 12 would have the Real Time event server 124 handling six independent connections, and sending about 3 Mbps to these end users. Likewise, the PGW 114 and SGW 110 may handle packet transfers of similar rates. These rates are well within the capabilities of today's servers and wireless network elements. However, 6 users of the service is just an example. A realistic situation may have 60,000 users 104 distributed across the 600 eNB 102 elements concurrently watching the Real Time Event (e.g., a TV show, a sporting event, a political event). With the architecture of FIG. 1, the Real Time event server 124 may have to support 60,000 user connections, and deliver an aggregate data rate of 60,000 times 500 kbps, or 30 Gbps. This rate far exceeds the capabilities of today's servers 124. Multiple servers 124 may need to be employed (e.g., 10 servers 124) to bring the transmission rate at each server to a manageable value. Likewise, with multiple servers 124 employed, the number of user connections at each server may be reduced to a more manageable value of perhaps, 6,000 per server. The economics of deploying about 10 Real Time Event servers 124 to deliver this service to 60,000 concurrent users may not be palatable to the service provider.

The situation at the PGW 114 cannot be remedied so easily. It is not economical to deploy many PGW 114 elements that serve large geographical regions, and in the case of serving 60,000 wireless users 104 for this Real Time Event service, the PGW 114 must handle the transit of 30 Gbps, a daunting task, which may be resolved only at great expense using the architecture of FIG. 1. The situation with the SGW 110 element may not be as bad as it is for the PGW 114 element, because in practice, there are several SGW 110 elements that serve subsets of the 600 eNB 102 elements in a region. At the eNB 102 elements, each eNB 102 element may have to deliver the service to each of around 100 users 104 connected through its Cells, and hence, each eNB 102 element has to handle delivery of 50 Mbps over the LTE air interface. While this value may be slightly beyond the capabilities of today's LTE eNB 102 elements, it may be well within the capability of the APN beam forming RF system presented in FIG. 9. However, each eNB 102 may then be required to support 50 Mbps utilization on its back haul 112 interface to receive the packets for its users from the SGW 110 element. This value may be problematic and costly to resolve at each eNB 102. If it is not resolved uniformly across the LTE wireless network, the user experience suffers, depending on which eNB 102 is used to access the LTE wireless network.

From the above, it may be seen that the difficulties involved in providing Real Time Event services (including commercial TV service delivery) to wireless users may involve the number of connections required at the Real Time Event Server 124, the data transmission rate required at the Real Time Event Server 124 and at the PGW 114 element, and secondarily, the real time data transmission rate required at the SGW 110, and the transmission capacity taken on the back haul 112 interface to each eNB 102 element.

An Architecture for Efficient and Economical Real Time Event Delivery

Figure 13:
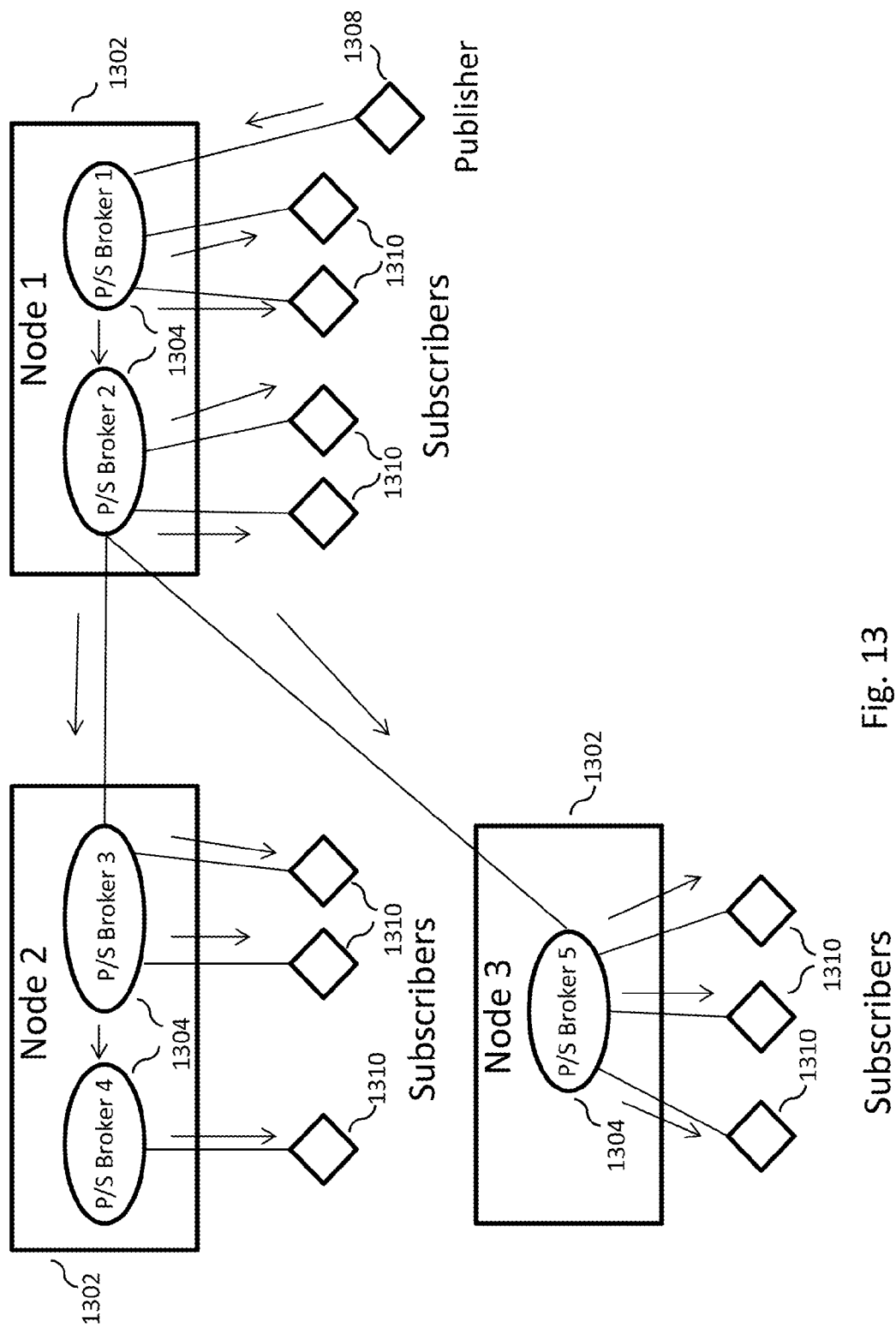
FIG. 13 illustrates an embodiment of the publish-subscriber broker architecture.

The issues related to the economical delivery of Real Time Event services in an LTE network may be resolved, if a distributed Publish/Subscribe (P/S) architecture concept is introduced into the APN wireless network to augment the capabilities of the Optimization Server 202 and 204. FIG. 13 shows an architecture that deploys the Publish/Subscribe Broker programs 1304 on a set of computing nodes 1302. One or more P/S Brokers 1304 may be deployed on each computing node 1302, depending on the number of entities expected to connect at each computing node 1302. Each communicating entity (i.e., a user device or a server) may connect to a single P/S Broker 1304 to receive the services of the P/S Broker architecture. End points may not connect directly to each other in this architecture. The packets that comprise a particular data stream may be identified by a tag called a Topic. A packet within a Topic stream may be referred to as an Event. In FIG. 13, one entity 1308 connected to a P/S Broker 1304 at Node 1 1302 may Publish a stream of packets, where the Publisher 1308 inserts the stream Topic into each packet. Meanwhile, 10 other users 1310 (i.e., end user devices, or programs running on other computers) may have previously Subscribed to this Topic. These users 1310 may be distributed across the three computing Nodes 1302 shown in FIG. 13, in each case connecting to the P/S Broker 1304 that runs on its attachment Node 1302.

The P/S Broker 1304 network is designed to distribute the Published packets to all the destinations that have Subscribed to the given Topic. P/S Broker 1 1304 knows to distribute the packet to P/S Broker 2 1304 within its own Node 1 1302, and also knows to distribute the packet to the two entities 1310 directly connected to it that have Subscribed to the Published Topic. P/S Broker 2 1304 knows to distribute the packet to P/S Broker 3 1304 on Node 2 1302 and to P/S Broker 5 1304 on Node 3 1302, and also knows to distribute the packet to the two entities 1310 directly connected to it that have Subscribed to the Published Topic. P/S Broker 5 1304 knows to distribute the packet to its three directly connected entities 1310 that have subscribed to the Published Topic. P/S Broker 3 1304 knows to distribute the packet to P/S Broker 4 1304 and to its two directly connected entities 1310 that have Subscribed to the Published Topic. Finally, P/S Broker 4 1304 knows to distribute the packet to the single directly connected entity 1310 that has Subscribed to the Published Topic. The Publisher sends one packet, and the P/S Broker network takes care of packet replication whenever it is needed. Each packet is replicated at each P/S Broker 1304 only to the extent that is necessary. Thus, the P/S Broker network distributes the task of replicating packets in an efficient manner.

A distributed set of Publish/Subscribe (P/S) Brokers 1304 may be set up to run on the set of Optimization Servers 202, 204 shown in FIG. 2, where the P/S Brokers 1304 may use the Publish/Subscribe communications paradigm to route packets efficiently between an entity 1308 that Publishes a packet stream and all entities 1310 that Subscribe to receive packets from that stream Topic. See an example deployment in FIG. 14.

Figure 14:
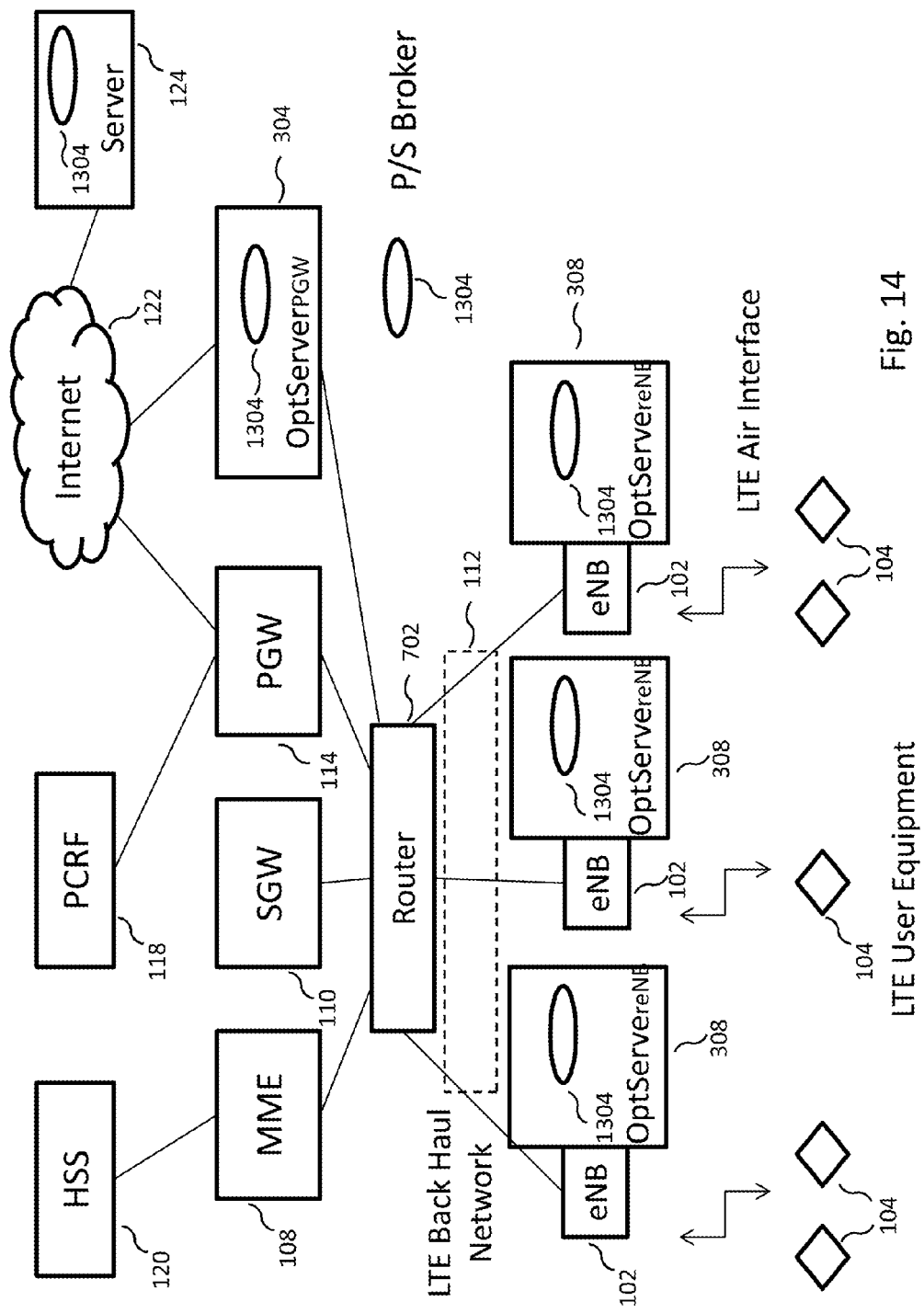
FIG. 14 depicts and example embodiment of a deployment of P/S brokers in the APN optimization server architecture.

As described previously herein, a technique is described that may be used to redirect a UE 104 dedicated bearer 312, so it has a local OptServereNB 308 as its end point, rather than the usual SGW 110 end point. If each UE 104 in FIG. 14 is connected via its redirected bearer to the OptServereNB 308 associated with its serving eNB 102, the UE 104 may connect to the P/S Broker 1304 program that runs on that computer. Note that in FIG. 14, a P/S Broker 1304 program may also run on the Server 124 that may be located in the Internet, remote from the LTE Wireless Network. All the P/S Brokers 1304 in FIG. 14 may be interconnected into a logical Publish/Subscribe Broker networking infrastructure.

If the Server 124 remotely connected via the Internet provides a Real Time Event service 1502, the P/S Broker 1304 network arrangement shown in FIG. 14 may be seen to eliminate the problems that occur in providing this service when the traditional architecture of FIG. 1 is used to deliver it. See FIG. 15 for the results that may be obtained when using the Publish/Subscribe Broker architecture in conjunction with the bearer redirection technique previously described herein.

The previously discussed issues relating the problems in providing a Real Time Event Service 1502 to wireless users 104 may now be seen to be resolved. The entity 1502 that generates the Real Time Event data stream connects to one P/S Broker, and no end user 104 device connects directly to it. The issue of maintaining 60,000 concurrent user connections may be seen to resolve into maintaining a single connection (which may also be used to deliver other services, besides the Real Time Event service). Furthermore, the Real Time Event service program 1502 generates one video packet per video time frame, and one audio packet per audio time frame, to send into the P/S Broker network, and it may be seen that it is no longer required that this program generate 60,000 video packets per video time frame, and 60,000 audio packets per audio time frame, to send to the 60,000 concurrent end users 104. It may be seen that packet replication is performed by the P/S Broker network, when necessary. It may be seen that one Real Time Event Server 124 can handle delivery of the service to 60,000 concurrent users 104, and that a multiplicity of Real Time Event servers 124 is no longer required. The economics of delivering this service may therefore be seen to be improved compared with using the current wireless network architecture.

Furthermore, it may be seen that the Internet and the long haul network now carries one packet per video time frame, and one packet per audio time frame, instead of 60,000 of each per time frame. Therefore, it may be seen that the long haul network bandwidth utilization has been reduced from 30 Gbps to 500 kpbs, a reduction by a factor of 60,000.

It may be seen that because of the presence of the OptServerPGW 304 and the OptServereNB 308 servers associated with the eNB 102 elements, the PGW 114 is no longer involved in routing the packets for this service. The capacity of the PGW 114 may be retained to deliver other services. The packets are routed by the P/S Broker 1304 on the OptServerPGW 304 to a P/S Broker 1304 on each of the OptServereNB 308 servers that have UEs 104 that Subscribe to the Real Time Event service data streams. To relate the situation in FIG. 15 to the one extrapolated (to 60,000 users) from FIG. 12, it is supposed that each of the 600 eNB 102 elements have 100 UEs 104 that Subscribe to the Real Time Event service. Hence, the P/S Broker 1304 on the OptServerPGW 304 replicates by 600 times a video packet per video time frame, and an audio packet per audio time frame, and forwards each of these packets to an OptServereNB 308 server. The transmission rate at the OptServerPGW 304 may thus be seen to be 600 times 500 kbps, or 300 Mbps, a value that may reasonably be handled by today's server computers. Furthermore, the transmission rate over the LTE back haul network to each OptServereNB 308 may be seen to be 500 kbps, rather than the 50 Mbps required using today's architecture, a reduction by a factor of 100.

It may also be observed that the need to distribute the Real Time Event service packets at a 300 Mbps rate by the OptServerPGW 304 may be reduced by having more than one server instance associated with the PGW 114. For example, if five OptServerPGW 304 instances are deployed, with each covering 120 of the 600 OptServereNB 308 servers, then the data rate required from each OptServerPGW 304 instance to deliver the Real Time Event service is reduced to 60 Mbps.

At each OptServereNB 308, the P/S Broker 1304 receives one video packet per video time frame, and one audio packet per audio time frame (i.e., about a 500 kbps rate) from the P/S Broker 1304 running on the OptServerPGW 304, and distributes the packets to its directly connected UE 104 entities. In this example, it is assumed that each eNB 102 supports 100 UEs involved with the Real Time Event service, so the transmit data rate at the OptServereNB 308 may be seen to be 100 times 500 kbps, or 50 Mbps. This value may likewise be seen to be viable using today's server computer technology.

The integration of the Publish/Subscribe Broker architecture, the bearer redirection capability, and the Optimization Servers into the LTE wireless network in this disclosure may be seen to enable the economical delivery of Real Time Event services, including commercial TV, to wireless users.
Implementing Active-Hot Standby Redundancy in Server Architectures Using the Publish/Subscribe Paradigm In an Active-Hot Standby Redundancy architecture, two identical service instances, 1602 and 1604, are installed in the network. The servers 124 that run each service instance may be located far from its mate server 124, or may be co-located with the mate server 124, but placed on different power supplies. The actual deployment situation may depend on the expected failure modes pertaining to the servers 124. The Standby service instance 1604 may maintain state information for every Session maintained at the Active service instance 1602 that it is poised to replace. When a failure occurs in the Active instance 1602, the Standby instance 1604 promotes itself to Active, and assumes all aspects of the service identity and role of the Active instance 1602 it is replacing. Service to user entities continues without interruption, although transactions that are ongoing just as the failure occurs may be lost.

KeepAlive messaging may be used between the Active and Standby instances, 1602 and 1604, so the Standby instance 1604 can determine when to promote itself to the Active state, and assume the functions and all aspects of the service identity of the failed instance it is replacing.

When point-to-point communications architectures are used, it may generally be difficult to transfer the state information from the Active to the Standby instance. Maintaining lock-step state information at both the Active Service instance 1602 and at the Standby Service instance 1604 may involve a great deal of overhead at the Active Service instance 1602 in providing state information to the Standby Service instance 1604. In typical implementations where, as in this case, the service instances may execute on different computing nodes, state changes may first be accumulated on the Active instance 1602, and then transferred to the Standby instance 1604. Hence, many CPU cycles may be used in the Active instance 1602 host to implement the Hot Standby architecture.

When the Publish/Subscribe paradigm is used with the distributed P/S Broker architecture described herein, it may be much easier to maintain a common state in the Active and Standby instances, 1602 and 1604. The Standby instance 1604 may be programmed to Subscribe to the exact same Topics as does the Active service instance 1602, including Topics with the unique instance ID tag used by the Active instance 1602. Hence, without any actions being taken on the part of the Active instance 1602, the Standby instance 1604 may receive exactly the same messages that the Active instance 1602 receives. The Standby instance 1604 may process these messages in exactly the same way that the Active instance 1602 does, except that while the Active instance 1602 Publishes responses and other service-specific messages, the Standby instance 1604 may not Publish any service-specific messages. The state information kept in the Standby instance 1604 thus may be kept in lock step with the state information kept in the Active instance 1602.

Each service instance may have an instanceID value that distinguishes one service instance from another. These values may be used in the KeepAlive exchanges used by the Standby instance 1604 to monitor the operational state of the Active instance(s) 1602. The KeepAlive interactions shown in FIG. 16 and discussed herein may be used in this Active-Hot Standby Redundancy architecture. Because the Standby service instance 1604 is already using the same instance ID that the Active service instance 1602 uses for service-specific interactions, there is no need for the Standby instance 1604 to assume the service identity of the failed Active instance 1602 when a Role change occurs. The Standby service instance 1604 promotes itself to Active, and turns ON a software switch that allows it to Publish the messages it formerly did not Publish while it was in the Standby state. All service sessions continue without interruption, with the previously Standby instance 1604 now providing the service.

The paragraphs above indicate how the Standby instance 1604 may monitor an Active service instance 1602, and assumes all aspects of the role of the Active instance 1602, when the Active instance 1602 fails (including Publishing service-specific messages). This Active-Hot Standby Redundancy architecture may also be shown to work when a single Standby instance 1604 is ready to replace any of N Active service instances 1602. In this case, the Standby instance 1604 Subscribes to the service Topics that each of the monitored Active instances 1602 Subscribe to. The session state information may be organized on the Standby instance 1604 in a way that allows identification of a service session with a specific Active service instance 1602. Also, the Standby instance 1604 may maintain a separate KeepAlive exchange with each Active service instance 1602 that it is monitoring. When a failure is detected in an Active service instance 1602, the Standby instance 1604 promotes itself to Active, deletes the session state information for all but the sessions associated with the service instance 1602 that it is replacing, un-Subscribes from all service-specific Topics, except for those of the service instance 1602 it is replacing, and turns ON the software switch that hitherto prevents it from Publishing service-specific messages. The service sessions previously handled by the service instance 1602 that has failed are now handled by the Standby (now Active) service instance 1604. The newly promoted Active service instance may also report to an Element Management System 802 (EMS), indicating the failure of a specific Service instance 1602, and the assumption of an Active service role by the reporting service instance 1604.

It may be seen how the Active-Hot Standby Service Redundancy architecture disclosed herein using the P/S Broker messaging system can be used to provide a Hot Standby Redundancy server for the Real Time Event Service 1502 described in this disclosure. A Hot-Standby redundant server 124 may be deployed in addition to the Real Time Event server 124 shown in FIG. 15. The Service program 1502 running on the Standby server 124 may exchange KeepAlive messages with the Active service instance 1502 shown in FIG. 15 to determine the operational state of the Active instance 1502. Meanwhile, the Standby service 1502 Subscribes via the P/S Broker network to the same Topics as does the Active instance 1502, and may therefore maintain the same state information that is kept on the Active service instance 1502.

Using Keep-Alive Messages to Monitor the State of an Active Instance

The service instances, 1602 and 1604, may implement a method to determine whether they assume the Active state, or the Standby state, when they initialize. Further, the Standby instance 1604 and the Active instance(s) 1602 may implement a KeepAlive communication exchange, so the Standby instance 1604 can determine when an Active instance 1602 has failed. The repetition rate of the KeepAlive messages may determine the rapidity with which the Standby instance 1604 can determine the failure of an Active instance 1602, and promote itself to the Active state. Usually, a configured number of contiguous non-replies to KeepAlive messages sent by the Standby instance 1604 may be used to declare the failure of an Active instance 1602. The processing of the KeepAlive messages may be given priority, so false declarations of service instance failures do not occur.

Figure 16:
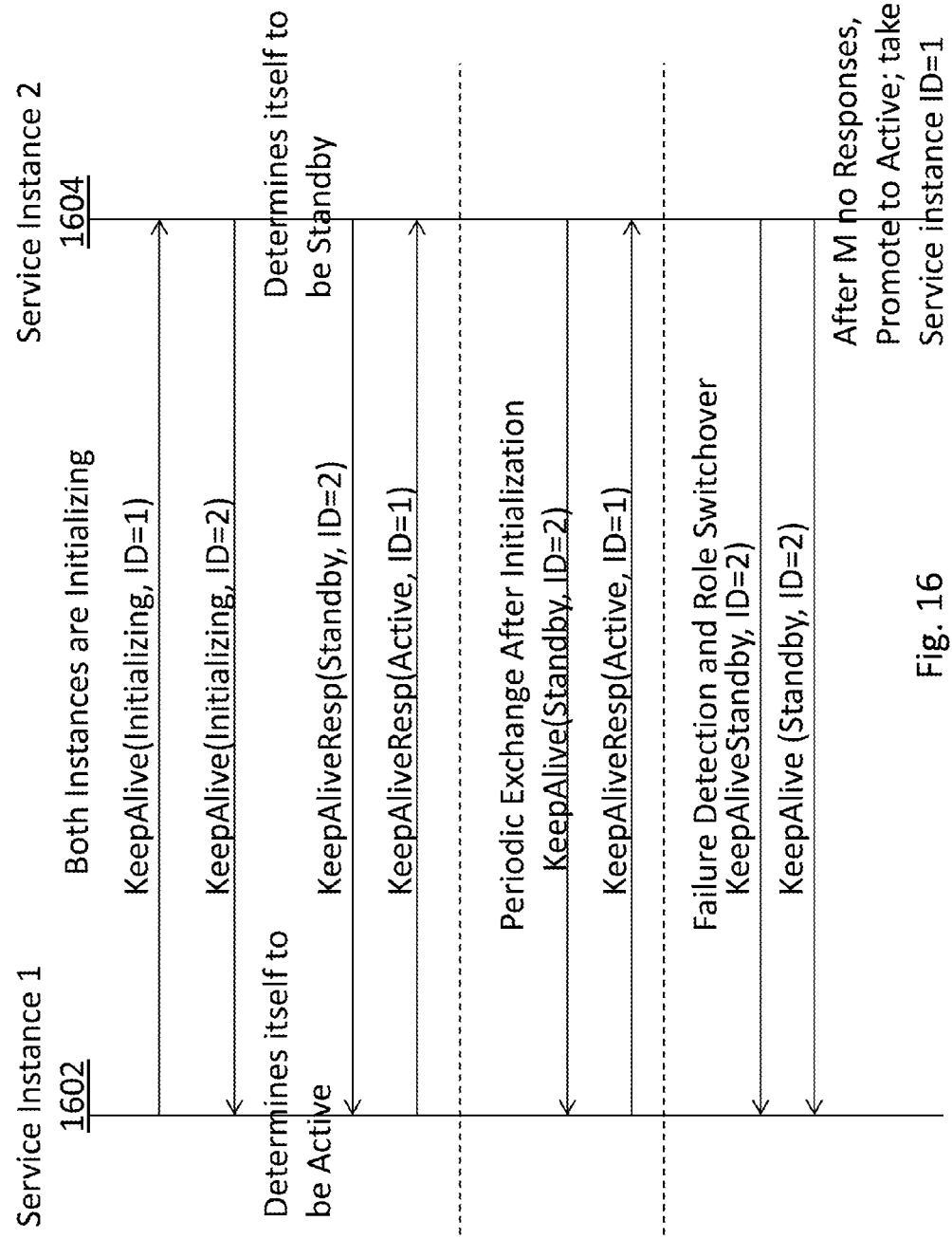
FIG. 16 depicts a keep-alive message interaction for service instance state monitoring.

FIG. 16 shows an example of KeepAlive messaging that may be used in this redundancy architecture. The interactions all occur using the connection of the Service programs to the P/S Broker instance 1304 that runs on their server 124, 304, 308, machine. However, the passing of messages through the P/S Broker 1304 architecture is omitted in FIG. 16 for the sake of simplicity. The Active service instance(s) 1602 and the Standby service instance 1604 may execute on different Server machines (124, 304, 308), because it is the failure of a Server (124, 304, 308) that is being overcome in the redundancy architecture. Furthermore, the Active service instances 1602 do not initiate the sending of KeepAlive messages, but always respond to a received KeepAlive message.

In the design of these service instances, 1602, 1604, each instance of <serviceType> may be configured with an <instanceID>. Also, several Topics (e.g., text strings) may be hard-coded for communicating the KeepAlive messages. All Active service instances 1602 of <serviceType> may Subscribe to the Topic ServiceControlkserviceType>/KeepAlive. In addition, when a service instance is Initializing, it must determine whether it is Active or Standby, so it Subscribes to the Topic ServiceControl/<serviceType>/KeepAlive/<instanceID>, where <instanceID> may be a value assigned to its own service instance. The initializing program may also Subscribe to the Topic ServiceControl/<serviceType>/KeepAlive. The latter Topic may be used to receive KeepAlive messages from another service instance that is either Initializing, or is in the Standby state. Although there can be N Active service instances 1602, there is only one Standby service instance 1604. Hence, when a service instance determines that it is the Standby instance 1604, it Subscribes to the Topic ServiceControl/<serviceType>/KeepAlive, and also Subscribes to ServiceControl/<serviceType>/KeepAlive/Standby. The former Subscription is used to receive KeepAlive messages from Active service instances 1602 that, for some reason, restart.

When a service instance Initializes, it may send a single KeepAlive message at a periodic configured rate to the Topic ServiceControl/<serviceType>/KeepAlive, and may indicate in the message payload that its state is "Initializing," and may also include its <instanceID>. The P/S Broker 1304 messaging system takes care of replicating this packet when there is more than one service instance 1602 being backed up in the redundancy architecture. Each service instance that receives this message responds by Publishing a KeepAliveResp message to the Topic ServiceControl/<serviceType>/KeepAlive/<instanceID>, where the <instanceID> is the value received in the KeepAlive message. Hence, the message may be routed by the P/S Broker 1304 system only to the Initializing service instance. The KeepAliveResp message contains the state of the sending instance, and the <instanceID> of the sending instance.

If, after a configured, or a provisioned, number of KeepAlive attempts, the initializing service instance receives no responses from any other service instance, the initializing service instance may set its State to Standby, and thereby leave no gaps in the state information it subsequently collects when other service instances initialize, assume the Active state, and begin to provide service to users. Upon transitioning to the Standby state, the service instance may un-Subscribe from the Topic "ServiceControlkserviceType>/KeepAlive/<instanceID>" and may add a Subscription to the Topic "ServiceControlkserviceType>/KeepAlive/Standby". The Subscription to the Topic "ServiceControl/<serviceType>/KeepAlive" may be retained. The Standby service instance 1604 may begin to Publish KeepAlive messages at the configured, or provisioned, periodic rate after a configured, or provisioned, time it may wait to allow other service instances to initialize. KeepAlive messages Published by the Standby service instance 1604 use the Topic "ServiceControlkserviceType>/KeepAlive", and include the Standby state and the <instanceID> of the Publisher of the message.

Responses to KeepAlive messages received from the Standby service instance are Published to the Topic "ServiceControl/<serviceType>/KeepAlive/Standby".

If a response is received from the Standby service instance 1604 in response to any KeepAlive message sent by the initializing service instance, the initializing instance may promote itself to the Active state, un-Subscribe from the Topic "ServiceInstance/<serviceType>/KeepAlive/<instanceID>", and retain its Subscription to "ServiceControlkserviceType>/KeepAlive".

If, after a configured, or provisioned, number of KeepAlive message transmissions, an initializing service instance receives responses from fewer than N Active service instances 1602, and none from a Standby service instance 1604, the initializing instance may change its state to Standby, may un-Subscribe from the Topic "ServiceControlkserviceType>/KeepAlive/<instanceID>", and may add a Subscription to the Topic "ServiceControl/<serviceType>/KeepAlive/Standby". The Subscription to the Topic "ServiceControl/<serviceType>/KeepAlive" may be retained. The Standby service instance 1604 may begin to Publish KeepAlive messages at a configured, or provisioned, periodic rate.

If the Initializing instance receives responses from all N Active service instances 1602, the Initializing instance may change its state to Standby, may un-Subscribe from the Topic "ServiceControlkserviceType>/KeepAlive/<instanceID>", and may add a Subscription to the Topic "ServiceControl/<serviceType>/KeepAlive/Standby". Alternatively, if the Initializing service instance receives a reply from the Standby instance 1604, the Initializing service instance promotes itself to Active, un-Subscribes from the Topic "ServiceInstance/<serviceType>/KeepAlive/<instanceID>", and retains its Subscription to "ServiceControlkserviceType>/KeepAlive".

After a configured, or provisioned, number of KeepAlive attempts, if the Initializing instance receives responses from other service instances, where the total number of replies is N or fewer, and some responses (including none) indicate service instances in the Active state, and other responses indicate service instances in the Initializing state, but no response indicates the Standby state, then the sending service instance may promote itself to the Active state if its <instanceID> is a smaller number than at least one of the <instanceID> values of all the other initializing instances, and may promote itself to the Standby state if its <instanceID> is larger than the values of all the other service instances reporting themselves to be in the Initializing state. Depending on the State assigned by the initializing service instance, the Subscriptions noted above are removed, added, or kept, depending on the State assigned by the initializing service instance.

If a Standby service instance 1604 receives a KeepAlive response from another service instance indicating that it, too, is in the Standby state, the instance that receives the response remains in the Standby state if its <instanceID> value is larger than the one indicated in the response message, but changes its state to Active if its <instanceID> is smaller than the one indicated in the response message. If a transition to the Active state is made, the changed service instance un-Subscribes from the Topic "ServiceControl/<serviceType>/KeepAlive/Standby", and retains its Subscription to the Topic "ServiceControlkserviceType>/KeepAlive".

Whenever a service instance receives a KeepAlive message from the Standby service instance 1604, it Publishes a response message to the Topic "ServiceControl/<serviceType>/KeepAlive/Standby", and indicates the unique identifier of the responding service instance, plus its current State. This response message is therefore routed by the P/S Broker 1304 networking architecture to the Standby service instance 1604.

It may be seen from the above that the logic to determine the Active/Standby status of a service instance is complex. FIG. 16 shows the KeepAlive interactions for one Active service instance 1602 and a Standby Service instance 1604. The P/S Broker 1304 subsystem is not shown to keep the figure as uncluttered as possible. Also, not all the cases described in the above paragraphs are illustrated in FIG. 16 for the sake of simplicity. Those skilled in the art may note that the descriptions herein constitute a complete algorithm for determining the Active or Standby state of an initializing service instance.

Note that FIG. 16 shows that when a Standby instance 1604 promotes itself to Active, it may retain its <instanceID> identity for KeepAlive message exchanges, but may use the <instanceID> of the service instance it is replacing for all Service-specific message. Doing so allows UEs 104 whose sessions have been interrupted at the failed service instance to restart those service sessions, or resume them, at the replacement service instance, using the same service instance ID value obtained at the start of the service session. An alarm message may also be generated by the formerly Standby service instance 1604 to report the failure of a specific, formerly Active, service instance 1602, and to report the state change of the Standby instance 1604 to the Active state. The alarm message is not shown in FIG. 16.

Architecture that Conserves Back Haul Utilization when Providing Services to Wireless Users Disclosed herein is a description of how to use an Optimization Server architecture that is integrated into an LTE Wireless network, plus a means of allowing a UE 104 to be connected to an Optimization Server 308 associated with its serving eNB 102 via a redirected bearer 312, plus a Publish/Subscribe Broker architecture to provide efficient delivery of Real Time Event services to wireless users. In the Real Time Event service, many users are receiving the same information (e.g., video, audio) at the same time. One of the efficiencies provided by the architecture is the great reduction in back haul 112 utilization compared with the utilization needed when today's architecture is used to provide the service.

Other types of services distribute the same information (e.g., video, audio) to many users, but do not do so at the same time. One example may be a Streaming Movie Delivery service. In this service, many users may elect to view the same movie, or video, but do so at different times. If the traditional architecture shown in FIG. 1 is used, each such end user 104 in the LTE wireless network receives a unique video data stream and a unique audio data stream that traverses the Internet 122, the long haul network 804, the elements of the Enhanced Packet Core (EPC) network (PGW 114 and SGW 110), the back haul network 112 connecting their serving eNB 102 to the EPC, and the LTE air interface.

A better approach may be to use the set of Optimization Servers 304 and 308 described in this disclosure, along with the Publish/Subscribe Broker architecture, as shown in FIG. 14. It may be noted that if the Service (e.g., Streaming Movie Delivery Service (SMD) 1702 is provided at the OptServer-eNB servers 308 shown in FIG. 14, and if the UE 104 dedicated bearer redirection 312 shown in FIG. 3 and FIG. 4 is invoked for each user desiring to receive the Streaming Movie Delivery service 1702, then the movie delivery to each such user does not use the LTE back haul network 112. The video and audio packet streams may be seen to traverse the path from the OptServereNB 308 associated with the user serving eNB 102 through that eNB 102, and over the LTE air interface to the User Equipment 104. This technique is applicable to any service that has the characteristic that the same information may need to be sent to a plurality of users 104, but not necessarily at the same instant in time. The Streaming Movie Delivery Service 1702 is just one example of a Service with this characteristic.

To provide the Streaming Movie Delivery service, a Streaming Movie Delivery (SMD) application 1702 may be deployed to run on each Optimization Server 304 and 308. See FIG. 17. This application 1702 may have access to movies that are stored locally in a permanent storage, but the number of movies stored may be more limited in the OptServereNB 308 elements than in the OptServerPGW 304 element. Movies that are not stored at any of the Optimization Servers 304 or 308 in the APN wireless network are obtained from a more remote store 1704 via the Internet, and saved at the OptServerPGW 304. Distribution of movies to the eNB 102 locations can be controlled by the Streaming Movie Delivery (SMD) 1702 service instance that runs on the OptServerPGW 304, and may be based on the number of users 104 who access a particular movie from a particular eNB 102 location.

Video streaming may consume not only a large over-the-air bandwidth, but generally may consume a large amount of bandwidth on the back haul connection 112 between the eNB 102 and the SGW 110. Thus, a relatively small number of users 104 engaged in a video streaming service at one eNB 102 may consume a large fraction of the over-the-air and back haul 112 capacities of the eNB 102. While the beam forming system discussed in this disclosure enhances the air interface capacity, so a larger number of high bandwidth users 104 may be served than in current eNB 102 implementations, a corresponding increase in the back haul 112 bandwidth may not be available. Hence, it is important to conserve back haul 112 bandwidth as much as possible, especially when delivering video services. When the back haul 112 is highly utilized, service delivery to all users 104 may be compromised, and the quality of service for all users 104 may deteriorate. The APN Optimization Server 308 deployment at the eNB 102 locations, plus the bearer redirection 312 at the eNB 102 elements, plus the Publish/Subscribe 1304 message delivery system deployed on the Optimization Servers 304 and 308, may conserve eNB 102 back haul 112 utilization, and therefore may keep quality of service high for all users 104. Also, the lowest delay possible is incurred in sending the audio and video data streams to the UE 104, because of the short path between the UE 102 and the point where the service is provided. This sub-section shows how the back haul 112 utilization is minimized when one, or many users access the Streaming Movie Delivery service 1702.

FIG. 4 shows the interactions between the UE 104 and software that runs on the OptServerPGW 304 when the user 104 invokes the Streaming Movie Delivery 1702 service on the UE 104. A dedicated bearer 302 may be established to support the service 1702 that is invoked by the user, and that bearer is re-directed 312 to an OptServereNB 308 node that is associated with the eNB 102 that serves the UE 104. The UE 104 may need to connect to a P/S Broker 1304 that runs on the OptServereNB 308 to receive its services via the P/S Brokering middleware.

The following is an example of the way the Streaming Movie Delivery service 1702 may be designed. Other designs may be possible. See FIG. 17 for the Service Deployment architecture. See FIG. 18 for the Service message interactions discussed next.

When the user selects the Streaming Movie Delivery icon on the UE 104 display, and enters the name of a movie to view, the UE 104 software may use the linkedBearerID, the DedBearerID, the ServerIP and ServerPort parameters obtained from the OptServerPGW 304 (see the StartServices message in FIG. 4) to connect to the P/S Broker 1304 at the OptServereNB 308. The UE 104 may have to locate a Service instance that can stream the selected movie to the UE 104, so the UE 104 Publishes a Service Discovery message to the Topic string "ServiceInquiry/StreamingMovieDelivery/<movie name>," and may include the UE 104 IMSI and the serving eNB ID in the message payload. The UE 104 also sends a Subscription to the Topic "ServiceDescription/StreamingMovieDelivery/<movie name>/<IMSI>." Including the UE IMSI in these messages may allow the response from any Streaming Movie Delivery service instance 1702 to be routed by the Broker network only to this requesting UE 104.

All Streaming Movie Delivery server programs 1702 may Subscribe to the Topic "ServiceInquiry/StreamingMovieDelivery/*," so all instances of this service may receive the UE 104 inquiry message. In the example shown in FIG. 18, the service instance 1702 running on the OptServereNB 308 at the serving eNB 102 location may receive the Service Inquiry message, as may the service instance 1702 running on the OptServerPGW 304. The UE 104 Service Inquiry message is replicated by the P/S Broker 1304 instance that is connected to the UE 104 at the OptServereNB 308. Assume that configuration of the OptServerPGW 304 P/S Broker 1304 inhibits further routing of this Service Inquiry, and hence, only the Streaming Movie Delivery instances 1702 at the serving eNB 102 and at the PGW 114 may respond, if they can provide the movie. Suppose they can (in this example, the service instance at the OptServerPGW 304 may store the set of all movies that can be provided at any OptServereNB 308, but the set of movies stored at a particular OptServereNB 308 may be a subset of these. The UE 104 may include the serving eNB 102 identifier in the Service Discovery message that it sends, so the Streaming Movie Delivery Service instance 1702 at the PGW 114 can determine when enough downloads are being requested from that location to warrant sending and storing the movie at that eNB 102 location, if it is not already stored there.).

Each responding Streaming Movie Delivery instance 1702 may Publish a service response message to the Topic "ServiceDescription/StreamingMovieDelivery/<movie name>/<IMSI>." This message may be routed only to the requesting UE 104. In this case, two response messages may be returned to the UE 104. The UE 104 software can determine from a parameter included in the message (e.g., associated eNB ID, or PGW), that the service instance 1702 at the OptServereNB 308 is closer to the UE 104, and selects that one to deliver the service. The Service Description message may contain the unique ID assigned to the service instance 1702.

Each SMD service instance 1702 Subscribes to a control message stream Topic for its service. In this case the Topic may be "ServiceControl/StreamingMovieDelivery/<unique ID>." Hence, when the UE 104 software Publishes a service request message to the topic "ServiceControl/StreamingMovieDelivery/<unique ID>," it may be routed to the service instance 1702 at the serving eNB 102 location. The movie name may be placed into this message payload, as well as a "StartMovie" indication, as well as any other parameters required to start the service (e.g., charging information, the Topic used by the UE 104 to receive the audio portion of the movie (includes the UE 104 IMSI to ensure routing back to the UE 104), the Topic used by the UE 104 to receive the video stream for the movie (includes the UE 104 IMSI to ensure routing back to the UE 104), the Topic used by the UE 104 to receive control information for the movie (includes the UE 104 IMSI to ensure routing back to the UE 104)).

The audio and video streams may be Published by the service instance 1702 running on the OptServereNB 308 that is associated with the serving eNB 102, and hence, no back haul 112 is used to send these streams to the UE 104. The UE 104 software receives the streams, and renders them to the user.

This scenario is followed by any number of UEs 104 being served by a particular eNB 102, and as long as the requested movies are available at the OptServereNB 308 that is associated with the eNB 102, no back haul 112 is used to carry any of the audio/video streams to these users 104. A large amount of back haul 112 utilization is conserved because of this architecture.

Figure 19:
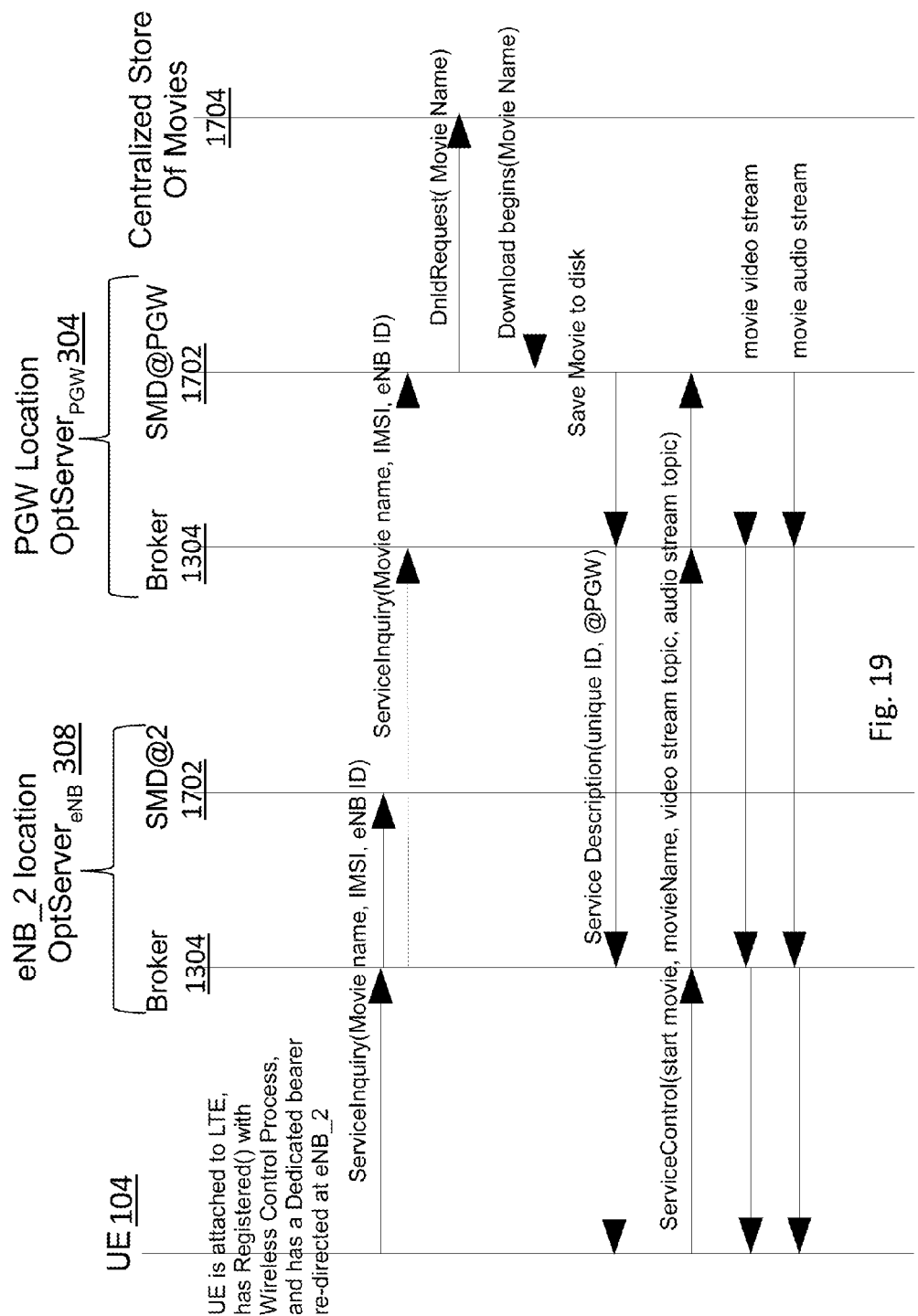
FIG. 19 depicts an example embodiment for streaming a movie delivery when download from a central store is required.

Providing Streaming Movie Delivery when the Movie is not Stored at the Serving eNB Location If the requested movie is not available at the Streaming Movie Delivery service instance 1702 at the serving eNB 102 location, the service instance 1702 may not reply to the ServiceInquiry Published by the UE 104. See FIG. 19. If the movie is available at the service instance 1702 at the PGW 114 location, it may respond to the UE 104 ServiceInquiry, and the movie is provided by that service instance 1702. Because the service dedicated bearer 312 for the UE 104 is re-directed at its serving eNB 102, the routing for the movies streams is from the Streaming Movie Delivery instance 1702 at the PGW 114 location through its P/S Broker 1304 connection to the P/S Broker 1304 on the OptServereNB 308 associated with the serving eNB 102, and then to the UE 104. See FIG. 17 and FIG. 19.

Meanwhile, because the UE 104 may include its current serving eNB 102 identity in the ServiceInquiry message, the SMD service instance 1702 at the PGW 114 may increment a count of the number of requests for this movie at that eNB 102 location. If the count exceeds a provisioned value, the service instance 1702 at the PGW 114 location may download the movie to the service instance 1702 at the eNB 102 location, where it may be stored. Future requests for this movie by a UE 104 attached through that eNB 102 are served by the Streaming Movie Delivery service instance 1702 associated with the eNB 102. The SMD service instance 1702 at the PGW 114 thus may keep a record of the SMD service instances 1702 and their eNB 102 locations, and the movies each is able to provide. This information may be used in the Handover scenario by the Wireless Control Process 3902 software at the OptServerPGW 304 to help it determine whether, or not, the service dedicated bearer 302 should be re-directed at the target eNB. Also, usage-based algorithms may be implemented to determine when a movie should be deleted from storage at a particular eNB 102 location.

In the case where the Streaming Movie Delivery service instance 1702 at the PGW 114 does not have local storage of the movie named in the UE 104 ServiceInquiry message, the SMD instance 1702 may interact over the Internet 122 with the Centralized Main Store 1704 for this movie service, and may begin to retrieve the movie. As the movie packets are received from the Centralized Main Store 1704, they are saved to disk. Once the SMD instance 1702 on the OptServerPGW 304 determines that it can obtain the movie from the Centralized Store 1704, it may send a ServiceDescription response to the UE 104 ServiceInquiry message. The movie is provided in this case by the SMD service instance 1702 that runs on the OptServerPGW 304. See FIG. 19 for the messaging involved in this scenario.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

APN LTE Network to Serve as a Dual Use Network

Dual Use means that the network may be used concurrently by the general public and by government agencies, with the following proviso. Whenever it may be deemed necessary (i.e., under control of the US government, without the need to get a court order), network access may be denied to all users/ entities whose priority is lower than the minimum allowed priority set by the government administrator, or is not one of the subset of allowed high priority access classes set by the government administrator. Furthermore, network access may be denied to all users/entities who are not members of specific government agencies allowed to access the network. The LTE Cell Barring for Government Use feature can be applied to any Cell, or to all Cells, or to a subset of Cells, in a 3GPP wireless network. Also, when Cell-Barring-For-Government-Use (CB-for-GU) is enabled, it may be possible for the network to cause a Detach of all users who are not members of the allowed government agencies, and/or whose priority is lower than the minimum allowed priority, or is not one of the subset of allowed high priority access classes set by the government administrator. It may also be possible to make exceptions for Emergency sessions that have already been established in the network, and it may be possible to allow Emergency access to the network, at the discretion of the US Government administrator. Lastly, it may be possible for the network to perform verification tests of the user identity before allowing a user to maintain access with the network, or with the part of the network that has CB-for-GU enabled. It may be apparent to those skilled in the art that the CB-for-GU capability described above goes well beyond the 3GPP Cell Barring capabilities prescribed for 3GPP networks. In the remainder of this disclosure for this feature, the focus is placed on how to design a Dual Use capability into a 3GPP LTE wireless network with the aforementioned characteristics. It may be understood that the same principles may be used in building a Dual Use capability into other types of 3GPP wireless networks, such as 3G Universal Mobile Telecommunications System (UMTS).

See the 3GPP documents TS 36.331 and TS 22.011; TS 23.203 (Policy Control Rules Function, etc.) and TS 23.228 (IP Multimedia Services, etc.) for standardized Cell Barring specifications. See also, TS 22.153, Requirements for Multimedia Priority Service. These standardized specifications do not allow the operation of a Dual Use network as described above. Furthermore, all the details for implementing even these standardized capabilities are not spelled out in these 3GPP documents. The standardized capabilities may be combined with additional, new features and capabilities to implement the type of Dual Use wireless network described above. The information contained in this disclosure describes in clear terms that may be understood by anyone skilled in the art the manner in which a Dual Use LTE wireless network may be implemented. The standardized capabilities are integrated with new, additional capabilities, to accomplish this end.

Using Network Roaming Concepts to Differentiate Government Agency Users from General Users The International Mobile Subscriber Identity, IMSI, is a unique identifier assigned to every piece of User Equipment (UE 104) that can access a 3GPP wireless network. The IMSI is a 64-bit value composed of up to 15 numbers. The first three digits are the Mobile Country Code (MCC). The next three digits (or two digits in European and other non-North American networks) are the Mobile Network Code (MNC) within the country. The remaining 9 (or 10) digits are the Mobile Subscription Identification Number (MSIN) within the network. The Home Network of a 3GPP wireless network is thus identified by a specific MCC, MNC value, which identifies a specific Public Land Mobile Network (PLMN). Users who sign up with the operator of a network are assigned an IMSI within that network, and are able to gain access to the Cells of that operator. Those Cells are within the Home Network of the IMSI.

Frequently, network operators enter into mutual agreements, whereby users in one operator network are allowed access in another operator network and vice versa. Such users are said to be Roaming when they access a Cell in an operator network that is different from their Home Network.

Network operators generally may provision their wireless network elements to define both the Home Network and the allowed set of Roaming Networks. A UE 104 with an IMSI that is not in the Home Network of a Cell being accessed, or is not in the list of Roaming Networks provisioned into the Home Network elements, is not allowed to access the Cell.

The Roaming concepts described above may be used to help implement part of the requirements of a Dual Use network. A UE 104 belonging to a member of a Government agency may be assigned an IMSI that is in the Home Network of the Dual Use network. Members of different government agencies may be distinguished by agency by using a subset of the MSIN values for assignment to members of a particular agency. Alternatively, members of different agencies may be assigned IMSIs with different MCC, MNC values, where each of these networks is defined to be an Equivalent network to the Home Network in the Dual Use network. In the Home Network, members of Equivalent Networks are treated in the same way as are members of the Home Network. As for the Home Network, the list of Equivalent Networks is provisioned into the network elements used to control access to the Home Network. The concept of Equivalent Networks is defined in the 3GPP standards.

Per the previous paragraph, members of Government agencies are assigned IMSI values that are either in the Home Network of the Dual Use network, or are assigned values in the set of Equivalent Networks in the Dual Use network. All other users may be assigned IMSI values in the network of their traditional network operator, and may access the Dual Use network as a Roamer. General users may prefer to access the Dual Use network because of lower cost of service, because of the ability to receive higher data rates than on Cells in their Home Network, because of lower congestion than on the Cells in their Home Network, or because of other reasons.

Ordinarily, general users may access the Cells in the Dual Use network as Roamers, and receive the same quality of service as is provided to members of Government agencies who access the Dual Use network as their Home, or Equivalent, Network. The Element Management System (EMS 802) that manages the network elements of the Dual Use network may be used to provision the network elements with the Home Network value, with the network values of each Equivalent Network, and with the network values of each allowed Roaming Network.

During an Emergency, or when the Government administrator deems it necessary, access to one Cell, to several Cells, or to all Cells, of the Dual Use network may need to be restricted for use only by Government users. One step to achieve this restriction may be to have the EMS provision each Mobility Management Entity (MME 108) that handles the restricted Cell, or Cells, to remove the list of allowed Roaming networks. In this case, the MME 108 may reject users who access the restricted Cell, or who access any of the restricted Cells, if they are members of any but the Home Network, or of an Equivalent network. In this case, attempted accesses may be rejected with a cause of "permanent PLMN restriction." Receiving this cause value makes the UE 104 enter the PLMN into its Forbidden PLMN list, and only a manual selection of a Cell in that PLMN can cause the UE 104 to attempt another access to it. Alternatively, if only a selected set of Cells is restricted, the reject cause value may be "temporary PLMN restriction." In this case, the UE 104 enters the Tracking Area (TA) of the restricted Cell into its list of restricted TAs, and may not attempt to access another Cell in this TA. It may also be the case that a subset of Roaming Networks is provisioned to be restricted, with the remaining Roaming Networks allowed. This type of provisioning may be at the discretion of the Government Network Administrator.

Figure 20:
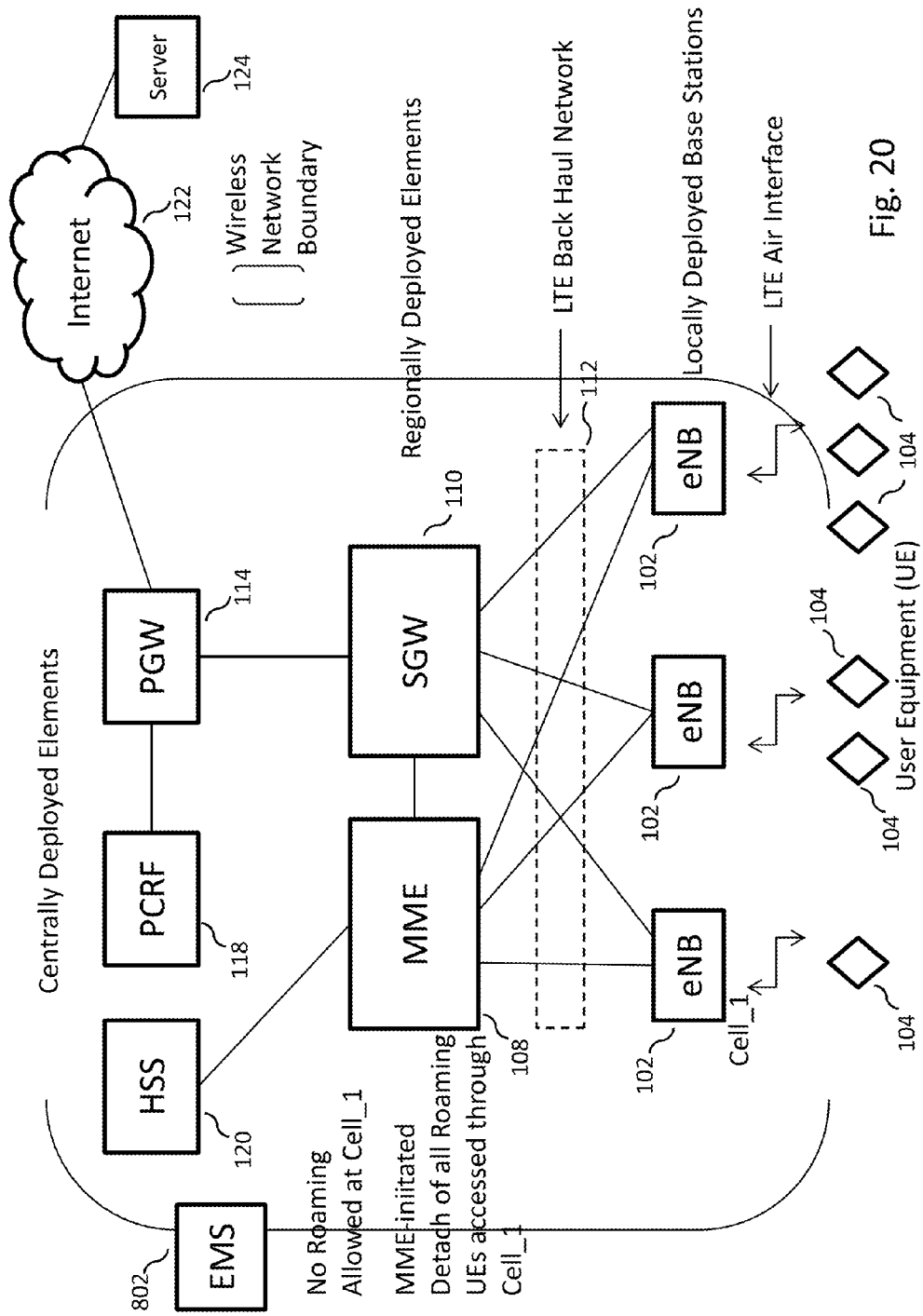
FIG. 20 depicts an example embodiment for detaching roaming UEs when a cell is restricted for government use.

FIG. 20 below is a modification of FIG. 1 of this disclosure, and includes an EMS 802 that manages the network elements in the LTE network. FIG. 20 shows that when a Cell is restricted, the MME(s) 108 that handle the Cell may be provisioned to remove or restrict the list of Allowed Roaming Networks, and the MME 108 may detach all UEs 104 that are not members of the Home Network, or of an Equivalent Network, or of an allowed Roaming Network, in the Dual Use network. The MME 108 keeps the UE 104 IMSI as part of the context information kept for each UE 104 handled by the MME 108. See Section 5.3.8.3 of TS 23.401 v9.4.0 for the MME-initiated Detach procedure.

While using the Roaming concepts serves to detach non-government users 104 from the restricted Cells, and denies their access to restricted Cells, these UEs 104 may still attempt to access the restricted parts of the Dual Use network. During disasters or other emergencies, such access attempts may prevent or delay the access of High Priority government users, of Police Department users, or of Fire Department users, or of Emergency Responder users. Rapid access must be provided to these users during such emergencies. The Cell Barring concept of 3GPP may be used and extended as described in this disclosure to achieve another aspect of implementing a Dual Use LTE wireless network.

Architecture Components that Implement Cell Barring and User Identity Validation Cell Barring is a standardized mechanism that may be used to limit the set of UEs 104 that are allowed to access a Cell. When Cell Barring is enabled at a particular Cell, the broadcast information from the Cell includes the CellBarred parameter, the ac-BarringFactor parameter, the ac-BarringTime parameter, the ac-BarringForEmergency parameter, and the list of allowed/notAllowed high priority access classes contained in the ac-BarringForSpecialAC parameter. The System Information Block 1 (SIB 1) CellBarred parameter indicates whether or not any access restrictions are enabled at the Cell. The SIB 2 ac-BarringFactor parameter and the ac-BarringTime parameter determine how frequently a UE 104 with Access Class Priority between 0 and 9 may attempt access to the Cell. The SIB 2 ac-BarringForEmergency parameter indicates whether E911 calls are also barred on the Cell. The ac-BarringForSpecialAC is a Boolean list detailing the access rights for each high priority access class. The UE 104 Access Class (AC) priority that is stored in the SIM card at the UE 104 allows the UE 104 to determine what to do when it detects that a Cell is Barred for access. Regular users have their UEs 104 assigned an AC value between 0 and 9 (the values are randomly assigned to regular users). TS 22.011 specifies that AC 10 is to be used for E911 calls; AC 11 is for PLMN users; AC 15 is for PLMN Staff; AC 12 is for Security Services; AC 13 is for Public Utilities (e.g., gas and water suppliers); and AC 14 is for Emergency Services users. The 3GPP standards indicate that there is no priority associated with AC 11 through AC 15. No other Access Class values are defined in the 3GPP standards, so a Dual Use network has to be able to operate using just these values configured into the UE 104 SIM card.

According to 3GPP standards, when CellBarred is set to "Barred," UEs 104 with Access Class priority values that exceed 10 are always allowed to access the barred Cell. This may, or may not be what is desired by the government administrator when a Cell is barred for Government use. A finer grain barring based on UE 104 Access Class priority may be needed (e.g., access may need to be barred for AC less than 12, or access may need to be allowed for some users with AC 12, but access may need to be barred for other users with AC 12, or more Access Class values than those in the 3GPP standards may be required to differentiate the government users). This patent disclosure provides design information for achieving a finer grain Cell access barring capability. Also, in a Dual Use network, it may be necessary to restrict the access of even High Priority users as noted above (e.g., FBI users with Access Class Priority 12 may need to access the barred Cell, but other users with Access Class Priority 12 may need to be restricted from accessing the barred Cell). The design information presented in the present disclosure uses the UE 104 IMSI to further restrict access to a barred Cell by a high priority user. Lastly, in certain circumstances, it may be the case that UE 104 SIM cards have been illegally set with a high priority Access Class by criminals or terrorists, or have programmed IMSIs that are assigned to high priority users. It may therefore be a requirement in a Dual Use network to be able to perform a biometric test of any High Priority user that becomes connected through a Cell that is barred for government use. Biometric testing may include voice matching, fingerprint matching, or any other type of test involving unique user characteristics or knowledge (e.g., a password). This biometric testing need is also accounted for in the information presented in this disclosure for a Dual Use network.

It may be the case that Cell barring strictly in accordance with the 3GPP standards needs to be set up at one or more LTE Cells. Meanwhile, the above paragraph shows that additional access constraints need to be enabled when Cells are barred for Government use. This patent disclosure design description therefore defines a special Cell Barring type, called Cell Barring for Government Use (CB-for-GU), which is distinct from the Cell barring capability defined in 3GPP standards documents. The design information contained in the present disclosure, and understandable by those skilled in the art, shows how to add the CB-for-GU Cell Barring capability to be used in addition to the Cell Barring specified in the 3GPP standards.

The design of the system disclosed herein is just one of several designs that may be used to implement the capabilities required in a Dual Use network. It should be noted that modifications to the design information presented herein are possible while achieving the same result. A specific set of design information is presented herein to illustrate to those skilled in the art how a Dual Use network may be implemented.

Figure 21:
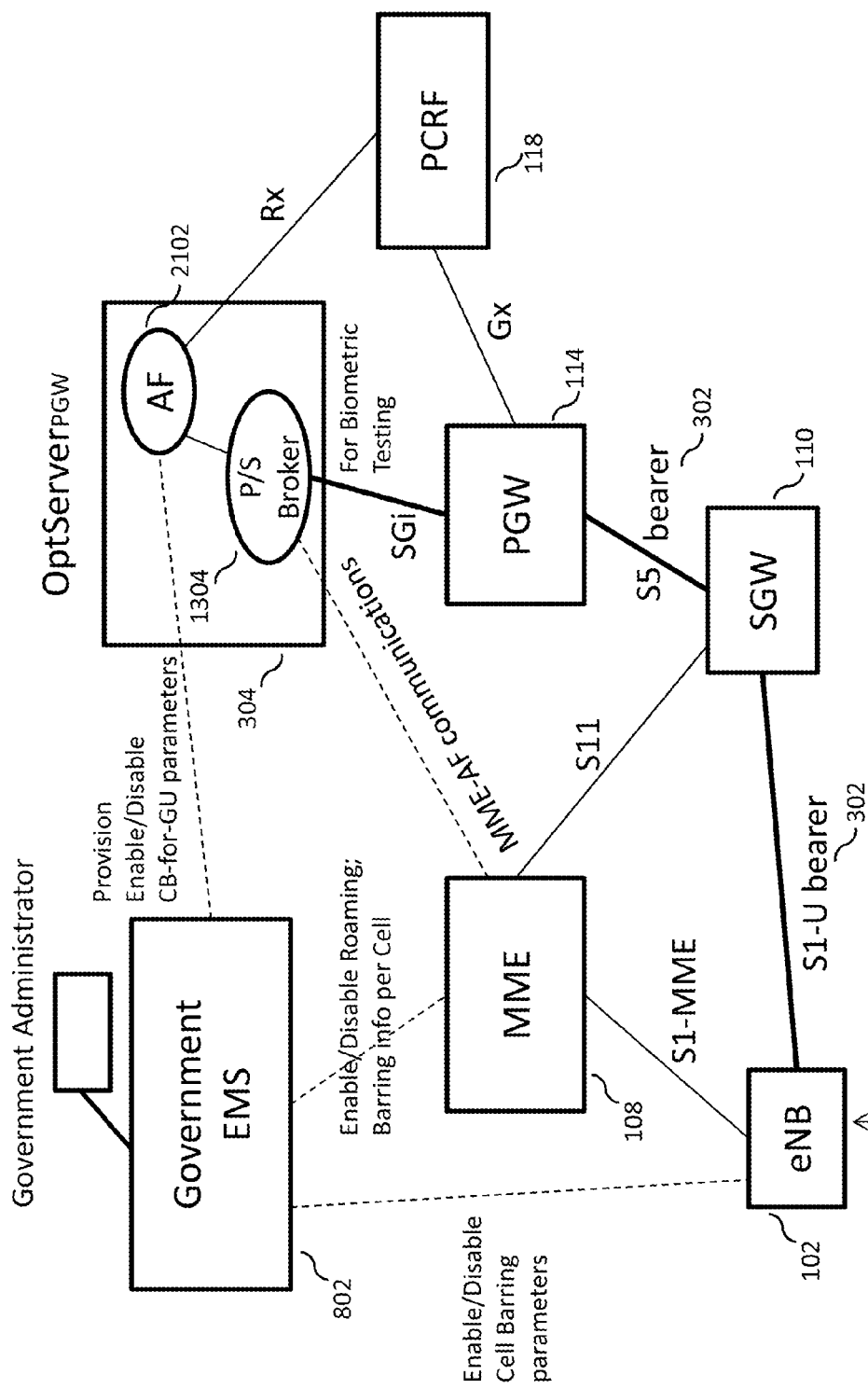
FIG. 21 depicts elements and interfaces to implement dual use capabilities in an LTE network.

FIG. 21 shows the LTE network components that may be required to implement the CB-for-GU capabilities described above. Note that FIG. 21 includes the Optimization Server concept and the P/S Broker concept described herein. Inclusion of these components into the design information makes the system disclosed here efficient, perhaps more efficient than with other types of element interfacing. The solid lines in FIG. 21 show standardized interfaces for an LTE network, and include the mnemonic used in the 3GPP standards for each interface. The dashed lines indicate additional interfaces that may be required to provide the Dual Use capability. The dashed lines connecting to the Government-run Element Management System (EMS 802) are OAM interfaces (Operations, Administration, and Maintenance interfaces) of the kind present in any LTE network, albeit in this case, they may provision information that may be pertinent to the Dual Use network capabilities. The interface between the LTE MME 108 and the P/S Broker 1304 running on the OptServerPGW 304 node may provide efficient interfacing between the plurality of MME 108 elements deployed in the LTE network and the Application Function (AF) 2102 that may play a central role in providing the Dual Use capabilities to the LTE network.

If Cell Barring is not in effect at any Cell in the LTE network, the EMS 802 does not provision any additional Cell Barring information into the AF 2102, and does not provision any additional Cell Barring information into the MME 108 elements. If the standardized Cell Barring is in effect at any Cell in the LTE network, the EMS 802 likewise does not provision any additional Cell Barring information into the AF 2102, and does not provision any additional Cell Barring information into the MME 108 elements. When Cell Barring for Government Use is enabled at one or more Cells in the LTE network, the EMS 802 provisions additional data related to the CB-for-GU into the AF 2102, into the MME 108 elements that serve the barred Cells, and into the eNB 102 elements that operate the barred Cells. (The information provisioned into the eNB 102 elements is the same as the information required for the standardized Cell Barring capability.) The following sections may describe a processing design that implements the Dual Use wireless network features.

Figure 22:
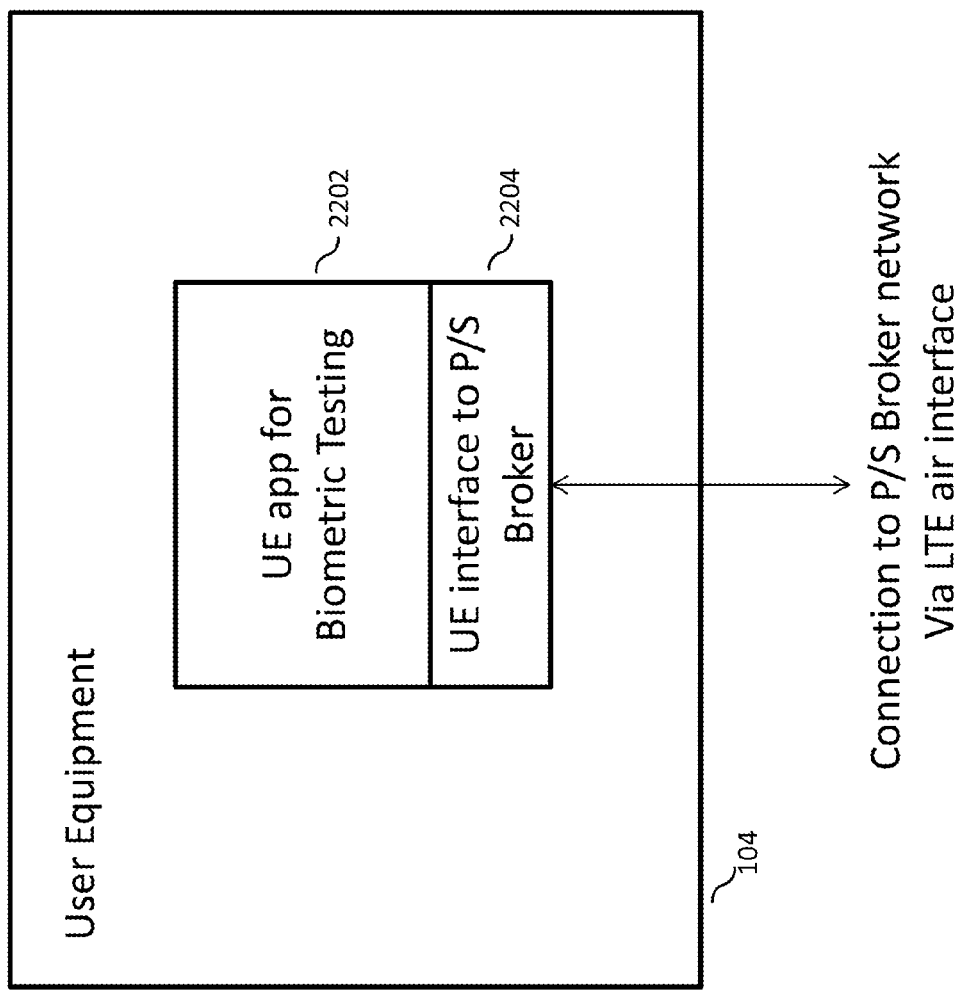
FIG. 22 depicts an embodiment UE application for biometric testing.

In addition to the network elements and interfaces shown in FIG. 21, a new application may be added to the UE 104 to enable biometric user validation in the Dual Use LTE network. The additional UE 104 capability is illustrated in FIG. 22. The UE 104 may also connect to the P/S Broker 1304 network for services other than Biometric Testing. The advantage of using the P/S Broker 1304 middleware is that a single connection of the UE 104 to the P/S Broker 1304 network may suffice to support any number of UE 104 applications. Each application uses application-specific Topics via the P/S Broker interface 2204. Hence, the UE 104 app for Biometric Testing 2202 may be invoked when the UE 104 is turned ON and first connects to the LTE network. The Biometric Testing app 2202 Subscribes to receive messages via a specific Topic, and may wait until the initial Biometric Testing message is received (it may never be sent, because the testing is not generally required). It may be understood by those skilled in the art that P/S Brokering is not essential to the Biometric Testing feature, because the UEs 104 may instead individually connect to a network-based program for such testing. The P/S Brokering 1304 middleware makes the solution more efficient.

Automatic Detachment of Restricted Users when Sole Government Usage is Enabled

The 3GPP standards define mechanisms to allow, or gate, or deny the access of a user to the network. To accomplish this, the standards define a Policy Charging and Rules Function (PCRF 118) and an Application Function (AF 2102) that may be involved in interactions with the PGW 114 when a user 104 first establishes access to the LTE network. These elements are shown in FIG. 21. To implement the capabilities required in the Dual Use network, special functionality may be added to the AF 2102. The AF 2102 may be provisioned with a list of Cell ID values for the Cells for which access is Barred for Government Use. For each Cell with CB-for-GU enabled, the provisioning data may include the minimum value of Access Class priority that is allowed to access the Cell, or a subset of allowed high priority access class values, a parameter to indicate whether E911 calls are permitted at the Barred Cell, a parameter to indicate whether, or not, biometric testing is enabled for accessing the Cell, and a parameter to indicate a minimum time interval between biometric tests for the same UE 104. In addition, the AF 2102 may be provisioned with, or have access to, a list of IMSI values, and for each one, its Access Class priority. Note that because these AC priority values are associated with IMSIs in a database that is used by the AF 2102, and is not contained in the UE 104 SIM card, the AC priority value may not be constrained to the standardized values 11 through 15, but may be assigned any value. Hence, for CB-for-GU, very fine access class restrictions may be imposed by the use of these AC priority values, as described in the present disclosure.

As shown in FIG. 21, the AF 2102 maintains an Rx Diameter interface to the set of PCRF 118 functions deployed in the LTE network, and also maintains an interface to a P/S Broker 1304, so the AF 2102 may participate in message exchanges with other entities that use the Publish/Subscribe Broker 1304 middleware for communications. The MME 108 entities in this Dual Use network design may also interface to the P/S Broker 1304 middleware for communicating with the AF 2102, as shown in FIG. 21. The UEs 104 may also interface to the P/S Broker 1304 middleware for communicating with the AF 2102, as shown in FIG. 22.

A first step that may be performed when CB-for-GU is being enabled at a particular Cell is for the EMS 802 to send provisioning information to the eNB 102 that provides the restricted Cell, so it can broadcast the changed set of allowed Roaming networks. A next step may be to provision each MME 108 that serves the Cell, so its provisioned information is changed to indicate that no Roaming is allowed at the Cell, or that only a subset of the Roaming networks remain configured for Roaming at the restricted Cell.

When the allowed Roaming networks are changed at the Cell, the UEs 104 attached through that Cell may select a different Cell once they determine that they are accessed through a Cell that does not allow Roaming from the UE 104 Home Network. Meanwhile, the MME(s) 108 may search through the UE 104 contexts for each UE 104 accessed through the Cell that has been provisioned for no Roaming, or for Restricted Roaming. For each UE 104 whose IMSI MCC, MNC value does not match the Home Network, or an Equivalent Network, or an allowed Roaming network, the MME 108 may initiate a Detach procedure, and these UEs 104 are removed from the Cell. The standardized MME-initiated Detach procedure is specified in Section 5.3.8.3 of TS 23.401 v9.4.0. See FIG. 23.

A next step may for the EMS 802 to provision the AF 2102 with the Cell-Barring-for-Government-Use parameters input by the Government administrator for this instance of access barring for Government Use. Per the first paragraph of this section, these parameters may include the Cell_ID, the minimum Access Class Priority allowed to access the Cell, or a list of high priority access class values allowed to access the Cell, whether E911 calls are allowed via the Cell, whether Biometric Testing is enabled for the Cell, and the time interval between biometric tests for a UE 104. Note that the list of AC priority values may contain values that exceed the set 11 through 15 specified in the 3GPP standards, as described in the preceding paragraphs. Following this, the Cell Barring for Government Use parameters may be provisioned into the set of MME 108 elements that serve the Barred Cell. Lastly, the eNB 102 that provides the Cell may be provisioned with the Cell Barring parameters for the restricted Cell. These parameters are the ones specified in the 3GPP standards, namely, the CellBarred parameter, the ac-BarringFactor parameter, the ac-BarringTime parameter, the acBarringForEmergency parameter, and the ac-BarringForSpecialAC parameter. To ensure that no low priority UEs 104 access the barred Cell, the ac-BarringFactor may be set to zero.

Once the eNB 104 Cell broadcasts the Cell Barring information, no low priority UEs 104 may access the Barred Cell. However, the low priority UEs 104 that are already accessed via the now-Barred Cell need to be detached. To accomplish this, the MME(s) 108 that serve the Barred Cell may search through their sets of UE 104 contexts for UEs 104 accessed through the Barred Cell. The UE 104 context contains the Establishment Cause parameter, which was sent by the UE 104 when it accessed the LTE network. If the Establishment Cause does not indicate High Priority, the MME 108 may initiate a Detach procedure for the UE 104. See FIG. 24.

Figure 24:
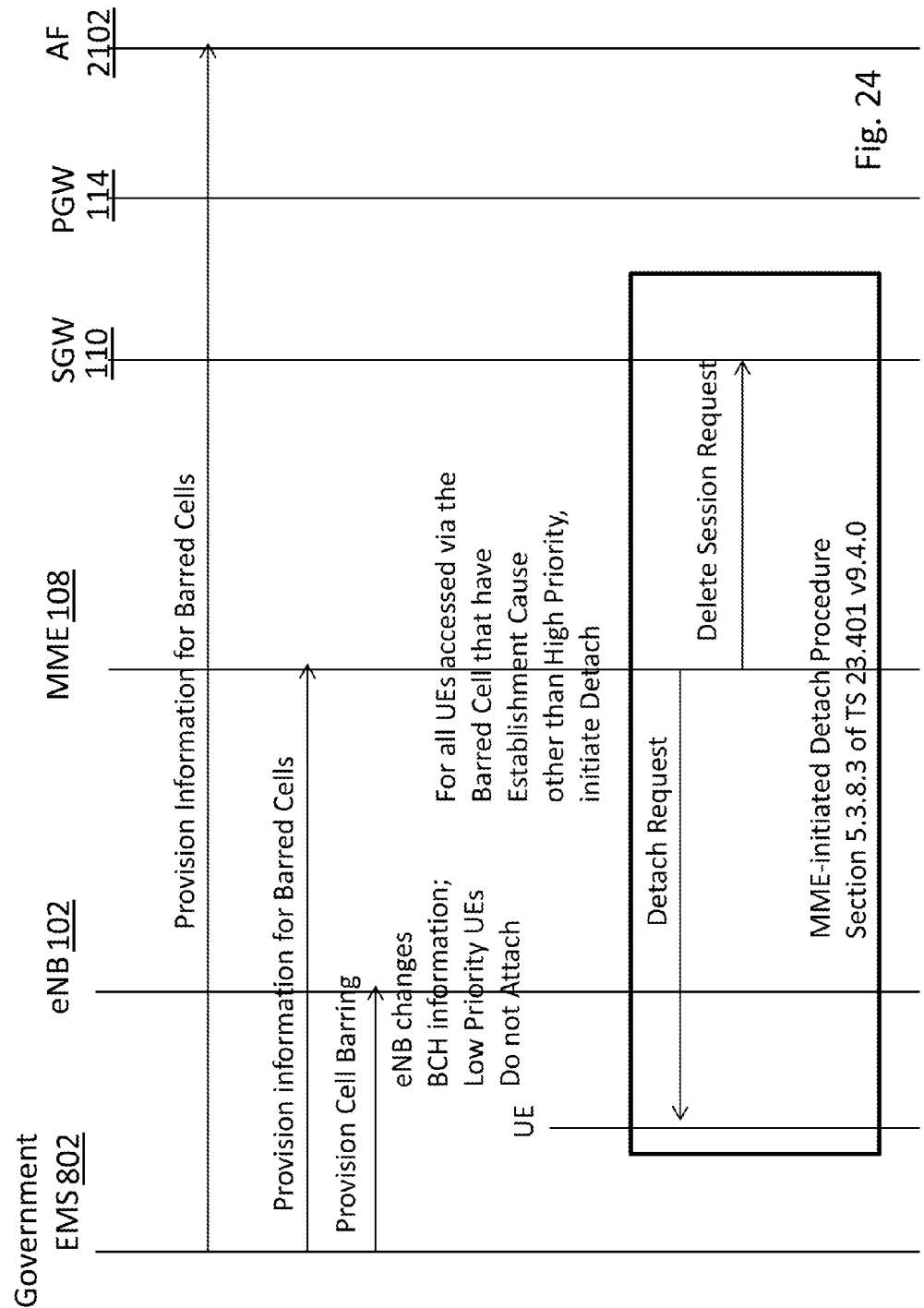
FIG. 24 depicts and example embodiment for automatically detaching low priority UEs from a barred cell.

If a High Priority UE 104 becomes detached via FIG. 24 because it initiated its LTE attachment without indicating a High Priority call, it may now re-attach to the Barred Cell, indicating a High Priority call. Low Priority UEs 104 may not access via the Barred Cell, especially if the ac-BarringFactor has been set to zero.

FIG. 24 shows that Low Priority UEs 104 may no longer attempt an access of the LTE network through the Cell that has CB-for-GU enabled, and that previously attached UEs 104 whose Establishment Cause is not High Priority are Detached from the Cell. The UEs 104 that remain attached via the Cell that has CB-for-GU enabled are therefore High Priority users, but as noted above, it is not certain that their priority is high enough to allow them to remain attached via the Barred Cell, and it is possible that a Biometric Test may need to be performed to allow them to remain attached via the Barred Cell. These aspects are not part of the standards-based Cell Barring capabilities of an LTE network, but are part of the capabilities of a Dual Use network when a Cell is Barred for Government Use. The following processing may detail the way in which these additional checks are made for the UEs that remain attached via the Barred Cell.

To implement these further checks, this design of a Dual Use network may require that the MME 108 elements that serve the Cell that has CB-for-GU enabled interact with the AF 2102 to check the UE 104 Access Priority, and to cause a biometric test to be performed, if necessary. As described herein, entities connected via the P/S Broker 1304 network communicate messages by tagging each Published message with a Topic, which may be a string. The message is delivered to all entities that have Subscribed to that Topic. Hence, when the AF 2102 initializes, it may Subscribe to the Topic "AF/biometric/*". The "*" character indicates that any text following the second slash sign is a match to this Subscription Topic. Meanwhile, each MME 108 may Subscribe to the Topic "AF/biometric/<GUMMEI>", where <GUMMEI> is the Globally Unique MME Identity assigned to the MME 108 instance. When Publishing any message, the sending entity is able to indicate that the message should not be routed back to itself, for in this case, the sender may have Subscribed to the same Topic to which it Publishes messages.

For each UE 104 that remains attached via the Cell that has CB-for-GU enabled, the MME 104 that serves the UE 104 may now Publish a UEaccessedCheck message to the Topic "AF/biometric/<GUMMEI>". Because of the wild card notation in the Topic Subscribed to by the AF 2102, this message is received by the AF 2102. The message may contain the Cell_ID of the Barred Cell, plus the UE 104 IMSI value. The AF 2102 may perform a further validation, via its provisioned data, that the Cell_ID referenced in the received UEaccessedCheck message is indeed a Cell that has CB-for-GU enabled. (If it is not, the AF 2102 may Publish a UEaccessedCheckResponse message to the Topic "AF/biometric/<GUMMEI>" to indicate that the UE 104 passes the access test, and also indicate the discrepancy between the MME 108 and the AF 2102 provisioning data. The message is received only by the MME 108 that sent the original UEaccessedCheck message, because of the inclusion of the unique GUMMEI value in the Topic string.) Assuming that the Cell_ID is that of a Cell with CB-for-GU enabled, the AF 2102 may obtain from its provisioning data the minimum value of Access Priority allowed to access the Barred Cell, or the list of high priority access class values allowed to access the Cell. The value(s) of AC priority value may exceed the values allowed in the 3GPP standards. The AF 2102 may then obtain either from its provisioned IMSI values, or from an accessible database of IMSI values, the priority of the UE 104 IMSI, the IMSI being that value received in the UEaccessedCheck message. The AC priority value assigned to the IMSI may exceed the values of AC priority allowed in the 3GPP standards. If the IMSI is not found in the provisioning data, or in the IMSI database, the AF 2102 may return the UEaccessedCheckResponse message to the MME 108 instance, indicating that the UE 104 should be Detached. The MME 108 may initiate a Detach procedure for the UE 104 in this case, because only High Priority users acknowledged by the Government are allowed access to the Cell with CB-for-GU enabled.

Alternatively, if the AF 2102 locates the UE 104 IMSI either in its provisioned data, or in an IMSI database, it may retrieve the UE 104 AC priority value, and compare it with the minimum AC priority value provisioned for the Barred Cell, or with the provisioned set of allowed high access class priority values. If the IMSI has too low a priority, or does not have a matching priority, the AF 2102 may return the UEaccessedCheckResponse message to the MME 108 instance, to cause the UE 104 to be detached. However, if the UE 104 AC priority is high enough, or matches one of the allowed High Priority access classes, the AF 2102 may check its provisioned data to determine if Biometric Testing is required for this Cell that has CB-for-GU enabled. If not, the AF 2102 may return the UEaccessedCheckResponse message to the MME 108 instance, indicating that the UE 104 may remain attached via the Barred Cell. If Biometric Testing is enabled for the Barred Cell, the following processing may be followed before a final resolution is determined regarding the UE 104 ability to remain attached via the Cell that has CB-for-GU enabled.

The text above indicates that when the UE connects to the LTE network, the UE Biometric Testing application 2202 may be started, and the UE 104 may connect automatically (i.e., without user intervention) to a P/S Broker 1304 instance on an Optimization Server 304 in the network. The UE 104 software may Subscribe to the Topic "AF/biometric/test/<IMSI>", where <IMSI> is the unique IMSI value assigned to the UE 104. The UE Biometric Test app 2202 is a special purpose application loaded onto all UEs 104 that may need to access the Dual Use network during emergencies. Meanwhile, when the AF 2102 initializes, it Subscribes to the Topic "AF/biometric/test/*". With these mechanics in place, and the checks through the previous paragraph being completed, the AF 2102 Publishes the StartBiometricTest message to the Topic "AF/biometric/test/<IMSI>", where the <IMSI> is the value received in the UEaccessedCheck message sent by the MME 108 that serves the UE 104. The message is therefore delivered by the P/S Broker 1304 network to the unique UE 104 that has the <IMSI> value, where it is consumed by the UE Biometric Test app 2202. The message may contain data such as the type of biometric test that should be performed, or any other data pertinent to the performance of the test. Other data may include obtaining the GPS location of the UE 104, generating periodic reports of the GPS location, continuing to make these reports even when the user attempts to put the UE 104 into the Evolved packet system Connection Management (ECM) ECM-IDLE state, or even when the user attempts to turn OFF the UE 104. (These latter capabilities may be required during military operations, or during other government operations.) The StartBiometricTest message may be delivered reliably by the P/S Broker 1304 network. A timer may be started by the AF 2102 for receipt of the Biometric Test data from the UE 104, in case the user chooses not to enter the data. In this case, if the timer expires, the AF 2102 may send the UEaccessedCheckResponse message to the MME 108 to indicate that the UE 104 should be detached.

When the biometric test is performed at the UE 104, the UE 104 Biometric Testing App 2202 Publishes the BiometricTestResults message to the Topic "AF/biometric/test/<IMSI>", and again, this message is received by the AF 2102. The AF 2102 cancels the timer previously established to receive this message, and starts the analysis of the returned data. Depending on the type of test being performed (e.g., matching a speech phrase, matching a fingerprint, or other biometric information, matching a password), the AF 2102 may analyze the data itself, or it may send the data to another service program to perform the analysis. The analysis reveals whether or not the UE 104 should remain attached via the Cell that has CB-for-GU enabled. The determination is returned to the serving MME 108 when the AF 2102 Publishes the UEaccessedCheckResponse message. Accordingly, the UE 2102 is either detached from the Cell, or is allowed to remain attached via the Barred Cell. In the latter case, the AF 2102 may set a BiometricTestPassed parameter for the IMSI, and may start a timer whose duration is set by the value of the TimeBetweenBiometricTests that is provisioned at the AF 2102 for the given Cell_ID.

When Biometric Testing is enabled at a Cell with CB-for-GU enabled, the testing may be performed whenever the UE goes through an Initial Access procedure at the Barred Cell, a Service Request procedure into the Barred Cell, or a Handover procedure into the Barred Cell. The purpose of the timer is to avoid testing the UE 104 too frequently. When the timer expires, the AF 2102 may reset the value of the BiometricTestPassed parameter associated with the IMSI, so another biometric test may be performed for that UE 104 IMSI. (The value of TimeBetweenBiometricTests may be set to INDEFINITE to ensure that just one test is performed per UE 104, if that is desired by the Government administrator.)

Figure 25:
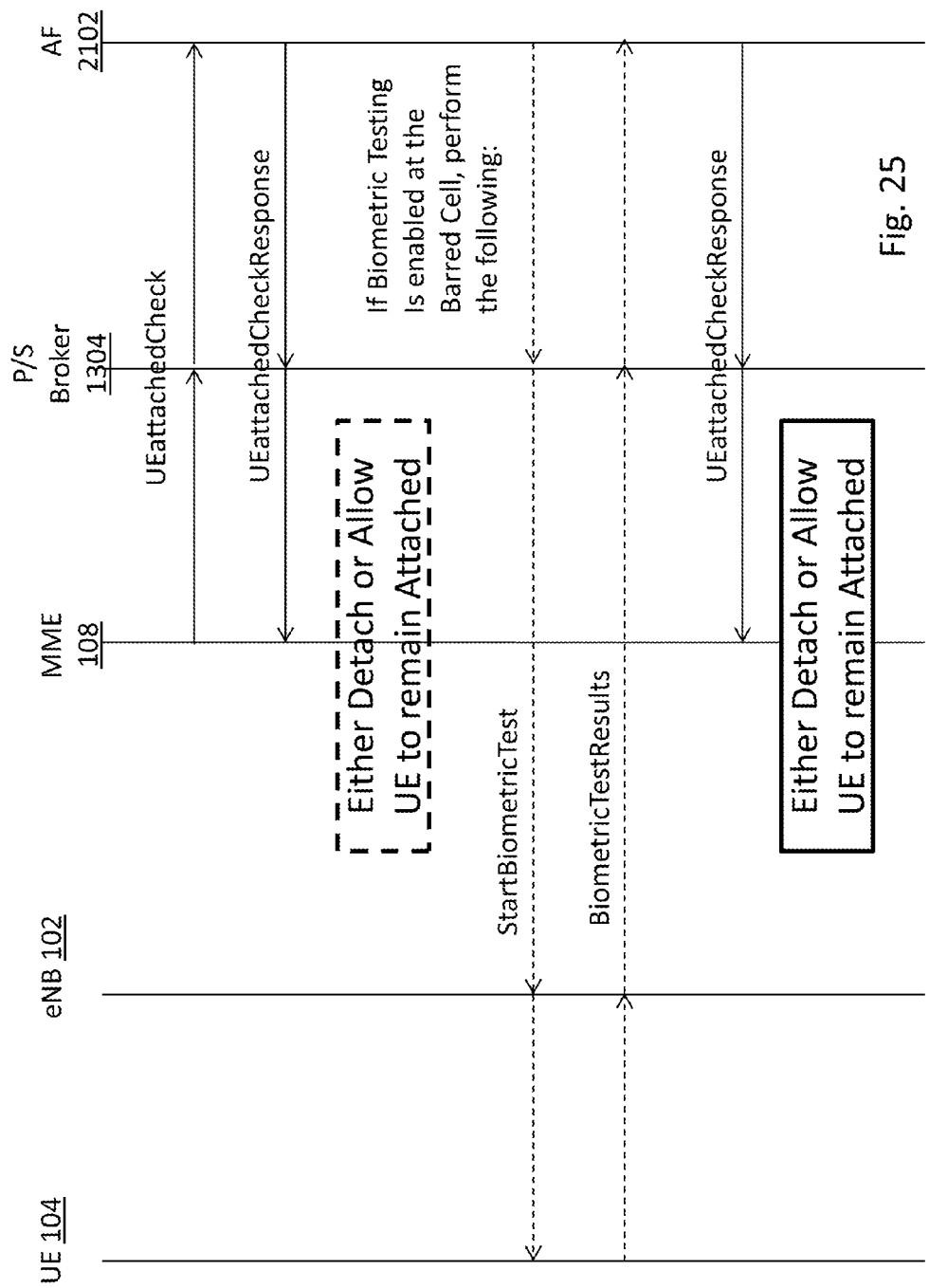
FIG. 25 depicts an example embodiment including biometric testing when cell barring is first enabled.

The processing described in the previous paragraphs for UEs that remain attached via the Cell with CB-for-GU enabled after the initial processing checks at the serving MME 108 is shown in FIG. 25.

The UEs 104 that remain attached via the Cell that has CB-for-GU enabled have had their Access Priority validated, and have possibly had the user identity validated via a biometric test. It may also be possible that UEs 104 not yet attached via the Barred Cell will attempt to access the Cell via an Initial Attach LTE procedure, or via a Service Request LTE procedure, or via a Handover LTE procedure. Such UEs 104 must also be checked before being allowed to remain accessed to a Cell that has CB-for-GU enabled. The following sections describe the processing that may be required to ensure that only appropriately validated UEs 104 remain accessed to a Cell that is Barred for Government Use.

Initial Access to Cells with CB-for-GU Enabled

As noted above, when a Cell is Barred for Government Use, a UE 104 that has an AC priority that is less than 10 does not generally attempt to access the Cell, except for E911 calling (if E911 calls are allowed at the Barred Cell). If the ac-BarringFactor is set to 0, UEs 104 with low AC priority may not attempt access through the Barred Cell. Hence, when an Initial Access Request is received at the eNB 102 via a Barred Cell, it is from a High Priority UE 104. The Attach Request is sent from the eNB 102 to one of the MMEs 108 that serves the Cell. See Section 5.3.2.1 of TS 23.401 v9.4.0 for the LTE Initial Attach procedure specification. If the Cell is Barred for some reason other than for Government Use, no additional processing is required, or indicated in this disclosure. However, if the Cell is Barred for Government Use, the additional processing described here may be required.

As noted previously, each MME 108 is provisioned with the CB-for-GU parameters whenever one of the Cells that it handles is Barred for Government Use. Hence, when an Attach Request is received from an eNB 102, the MME 108 that receives the Attach Request message may check its provisioned data to determine if the Cell through which the access is occurring is Barred for Government Use. If it is, a modification may be introduced into the MME 108 processing during the Initial Attach LTE procedure, as follows.

There are several points in the LTE Initial Attach Procedure where the MME 108 may initiate an interaction with the AF 2102 to determine whether the UE 104 should be allowed to continue with the procedure, or whether the MME 108 should Reject the Attach attempt. One point may be when the MME 108 first learns the IMSI of the UE (i.e., when it receives the Attach Request message from the eNB 102). Another point may be when the MME 108 receives the UE 108 Subscription data from the Home Subscriber Server (HSS 120) (i.e., when the MME 108 receives the Update Location Ack message from the HSS 120). The point at which the MME 108 interaction with the AF 2102 ensues does not materially affect the design illustrated in this disclosure. (In fact, another alternative may be for the HSS 120 to store the UE 104 AC priority with the rest of the IMSI Subscription data, and have the MME 108 make the determination of whether the UE 104 should proceed through the rest of the Initial Access procedure, rather than have the AF 2102 make the determination.) In what follows, the receipt of the Attach Request message by the MME 108 is used to initiate the AF 2102 interaction if the MME 108 determines that the Cell through which the UE 104 accesses the network is Barred for Government Use. See FIG. 26.

To more easily operate the Dual Use network, the default APN (the 3GPP Access Point Name, as opposed to the All Purpose Network used herein to distinguish the type of advanced wireless network that is the subject of this disclosure) for all UEs 104 in the Home Network and in all Equivalent Networks may be set to the APN that includes the Optimization Server 304 on which the AF 2102 program runs. When an Attach Request is received from a UE 104 that accesses the LTE network via a Cell that is Barred for Government Use, the MME 108 may be programmed to only allow an initial default bearer to be set up to this default APN (i.e., to a PGW 114 element that serves the default APN).

Figure 26:
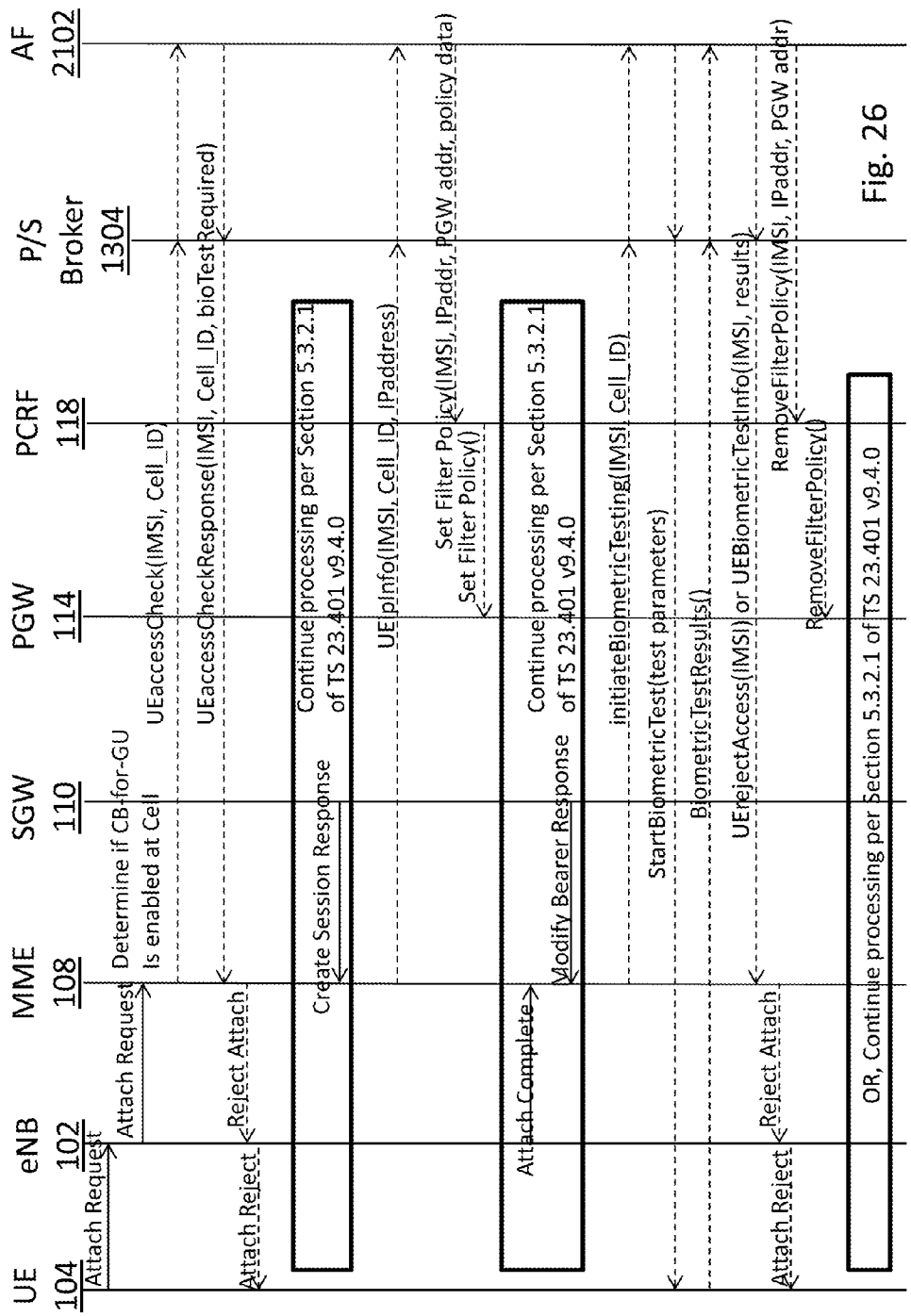
FIG. 26 depicts an example embodiment for initial attach processing when a UE accesses a cell that may have CB-for-GU enabled.

As the processing in FIG. 26 shows, when the MME 108 receives the Attach Request from the eNB 104, the MME 108 may determine if the Cell being accessed is Barred for Government Use. This determination is made from the provisioning information that may be sent to it by the Government EMS 802, as described previously. If the Cell is not Barred for Government Use, the Attach procedure proceeds per the LTE standards with no modification (Section 5.3.2.1 of TS 23.401 v9.4.0). However, if CB-for-GU is enabled at the Cell, the MME 108 may Publish a UEaccessCheck message to the Topic "AF/biometric/<GUMMEI>", where <GUMMEI> is the unique ID assigned to the MME 108. The message contains the UE 104 IMSI and the Cell_ID of the Cell being accessed. As noted previously, this message is received by the AF 2102. The AF 2102 may perform a further validation via its provisioned data that the Cell_ID referenced in the received UEaccessCheck message is indeed a Cell with CB-for-GU enabled. (If it is not, the AF 2102 may Publish a UEaccessCheckResponse message to the Topic "AF/biometric/<GUMMEI>" to indicate that the UE 104 passes the access test, that no biometric test is required, and also indicate the discrepancy between the MME 108 and the AF 2102 provisioning data. The message is received only by the MME 108 that sent the original UEaccessCheck message, because of the inclusion of the unique GUMMEI value in the Topic string.) Assuming that the Cell_ID is that of a Cell with CB-for-GU enabled, the AF 2102 may obtain from its provisioning data the minimum value of Access Priority allowed to access the Barred Cell, or the set of high priority access class values allowed for access to the Cell. Note that these AC priority values may include values that exceed the AC priority values specified in the 3GPP standards, to implement a finer grained priority access feature than may be provided with standardized Cell Barring. The AF 2102 may then obtain either from its provisioned IMSI values, or from an accessible database of IMSI values, the priority of the UE 104 IMSI, the IMSI being that value received in the UEaccessCheck message. If the IMSI is not found in the provisioning data, or in the IMSI database, the AF 2102 may return the UEaccessCheckResponse message to the MME 108 instance, indicating that the UE 104 access request should be Rejected. The MME 108 may initiate a Reject response to the UE 104 in this case.

Alternatively, if the AF 2102 locates the UE 104 IMSI either in its provisioned data, or in an IMSI database, it may retrieve the UE 104 AC priority value, and compare it with the minimum AC priority value provisioned for the Barred Cell, or compare it to the list of allowed high priority access class values. Note that the AC priority value stored with the UE 104 IMSI may exceed the AC priority values allowed in the 3GPP standards, to introduce a finer grained distinction of access priority classes than may be provided in the 3GPP standards. If the IMSI has too low a priority, or does not have a priority value that matches one of the allowed values, the AF 2102 may return the UEaccessCheckResponse message to the MME 108 instance, to cause the UE 104 Attach Request to be Rejected. However, if the UE 104 AC priority is high enough, or if the UE 104 AC priority matches one of the allowed values, the AF 2102 may check its provisioned data to determine if Biometric Testing is required for this Barred Cell. If not, the AF 2102 may return the UEaccessCheckResponse message to the MME 108 instance, indicating that the UE 104 Attach Request processing should proceed, and that no Biometric Testing is required. If Biometric Testing is enabled for the Barred Cell, the AF 2102 may return the UEaccessCheckResponse message to the MME 108 instance, indicating that the UE 104 Attach Request processing should proceed, and that Biometric Testing is required.

Per FIG. 26, if the Attach Request processing continues for access via a Cell that has CB-for-GU enabled, and if the AF 2102 response to the initial MME 108 interaction indicates that a further Biometric Test is required, the MME 108 may wait until it determines the IP address assigned to the UE 104. This may occur when the MME 108 receives the Create Session Response message from the SGW 110 during the LTE Initial Attach procedure. At this point, the MME 108 may Publish a UEipinfo message to the Topic "AF/biometric/<GUMMEI>", so the message is received by the AF 2102. The message may contain the Cell_ID, the IMSI, the IP address assigned to the UE 104, and the IP address of the PGW 114 that serves the UE 104. The AF 2102 may then use this information together with additional provisioned data to interact with the PCRF 118 function to request that a Filter Policy be set in the PGW 114 for this UE 104. The Filter Policy may be to restrict the packets that will be forwarded uplink by the PGW 114, or accepted for downlink transmission over the UE 104 bearer. The uplink packets allowed are only for the IP address and port number of each P/S Broker 1304 instance that runs on an available OptServerPGW 304 node (there may be more than one of these server nodes at the PGW 114 location, and there may be more than one P/S Broker instance on each of these servers). Allowed downlink packets can only come from one of these P/S Broker 1304 instances. The purpose of the Filter Policy is to isolate the communications capability of the UE 104 until the Biometric Test is completed. The UE 104 purpose-built software 2204 generally may attempt to connect and interface to a P/S Broker 1304 when the default bearer is first established. This communication is allowed by the Filter Policy.

Meanwhile, the standardized LTE Attach Procedure proceeds for the UE 104, eNB 102, MME 108, etc. When the eNB 102 sends the Attach Complete message to the MME 108, it indicates that the UE 104 has obtained its IP address, and it may begin to send uplink messages. (The UE 104 should attempt to connect to a P/S Broker 1304, which will be allowed by the Filter Policy at the PGW 114.) When the MME 108 receives the Modify Bearer Response message from the SGW 110, it indicates that the first downlink data can be sent to the UE 104. Hence, it is at this point that the MME 108 may Publish the initiateBiometricTesting message to the Topic "AF/biometric/<GUMMEI>". The message contains the Cell_ID and the IMSI of the concerned UE 104. The message is received by the AF 2102. The AF 2102 checks the BiometricTestingPassed variable kept for the IMSI, and if it is set, no Biometric Test is performed. Instead, the AF 2102 may Publish the UEBiometricTestInfo message to the Topic "AF/biometric/<GUMMEI>", so the message is received by the serving MME 108. The message indicates the UE 104 is allowed to access the Cell. On the other hand, if the BiometricTestPassed variable for the IMSI is not set, the Biometric Testing ensues as follows.

Similar to what is shown in FIG. 25, the AF 2102 Publishes the StartBiometricTest message to the Topic "AF/biometric/test/<IMSI>", where the <IMSI> is the value received in the initiateBiometricTesting message sent by the MME 108 that serves the UE 104. The message is therefore delivered by the P/S Broker 1304 network to the unique UE 104 that has the <IMSI> value, where it is consumed by the UE Biometric Test app 2202. The message may contain data such as the type of biometric test that should be performed, or any other data pertinent to the performance of the test. Other data may include obtaining the GPS location of the UE 104, generating periodic reports of the GPS location, continuing to make these reports even when the user attempts to put the UE 104 into the ECM-IDLE state, or even when the user attempts to turn OFF the UE 104. (These latter capabilities may be required during military operations, or during other government operations.) The StartBiometricTest message may be delivered reliably by the P/S Broker 1304 network. A timer may be started by the AF 2102 for receipt of the Biometric Test data from the UE Biometric Testing app 2202, in case the user chooses not to enter the data. In this case, if the timer expires, the AF 2102 may send the UErejectAccess message to the MME 108 to indicate that the UE 104 Attach Request should be Rejected. In this case, the MME 108 rejects the UE 104 access, and access via the Cell with CB-for-GU enabled is denied for the UE 104.

When the biometric test is performed at the UE 104, the UE Biometric Testing app 2202 Publishes the BiometricTestResults message to the Topic "AF/biometric/test/<IMSI>", and again, this message is received by the AF 2102. The AF 2102 cancels the timer previously established to receive this message, and starts the analysis of the returned data. Depending on the type of test being performed (e.g., matching a speech phrase, matching a fingerprint, or other biometric information, matching a password), the AF 2102 may analyze the data itself, or it may send the data to another service program to perform the analysis. The analysis reveals whether or not the UE 104 should remain attached via the Cell that has CB-for-GU enabled. The determination is returned to the serving MME 108 when the AF 2102 Publishes the UEBiometricTestInfo message. Accordingly, the UE 104 is either Rejected for access to the Cell, or is allowed to remain accessed via the Barred Cell. In the latter case, the AF 2102 may set a BiometricTestPassed parameter for the IMSI, and may start a timer whose duration is set by the value of the TimeBetweenBiometricTests that is provisioned at the AF 2102 for the given Cell_ID. The purpose of the timer is to avoid testing the UE 104 too frequently. When the timer expires, the AF 2102 may reset the value of the BiometricTestPassed parameter associated with the IMSI, so another biometric test may be performed for that UE 104 IMSI. (The value of TimeBetweenBiometricTests may be set to INDEFINITE to ensure that just one test is performed per UE 104, if that is desired by the Government administrator.)

If the UE 104 passes the biometric test, the AF 2102 may then interact with the PCRF 118 via its Rx Diameter interface to cause the removal of the Filter Policy previously installed at the PGW 114.

Avoiding Unnecessary Paging at Cells with CB-for-GU Enabled

Figure 27:
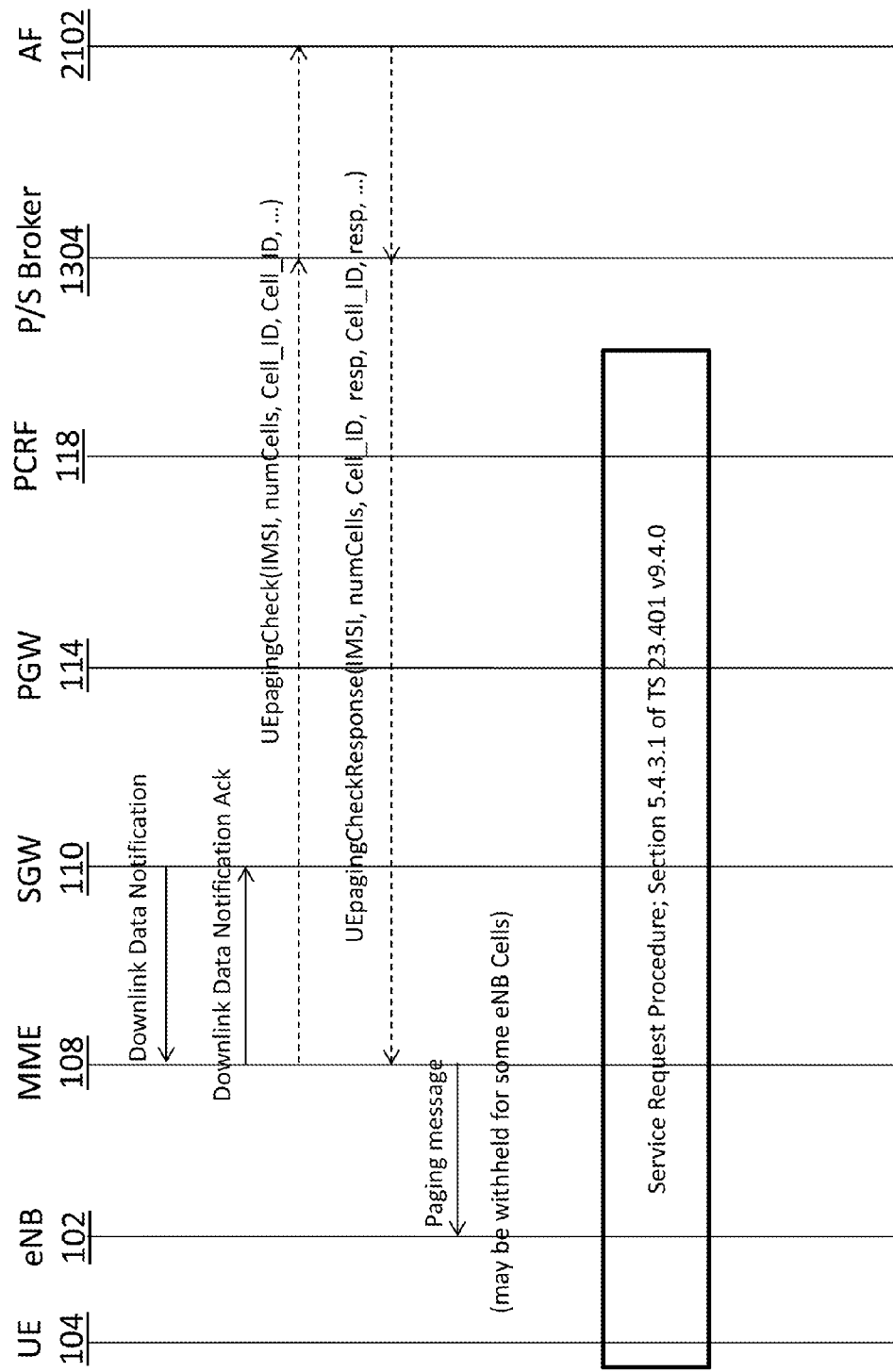
FIG. 27 illustrates an embodiment for modification of a network triggered service request in a dual use network.

Section 5.3.4.3 of TS 23.401 v9.4.0 specifies the LTE Network Triggered Service Request Procedure. When the UE 104 transitions from the ECM-ACTIVE state to the ECM-IDLE state, there is no connection between the UE 104 and an eNB 102, and hence, no communications between the LTE network elements and the UE 104. Because the UE 104 was previously in the ECM-ACTIVE state, a context is kept in the MME 108 instance that last served the UE 104. If, while in this state, a downlink packet arrives for the UE 104 at the SGW 110, the SGW 110 sends a Downlink Data Notification message to the MME 108. The MME 108 tries to locate the UE 104 by sending Paging messages to one or more eNB 102 elements that the MME 108 determines are most likely to cover the area in which the UE 104 resides. In a Dual Use network, it may be advantageous not to send Paging messages to an eNB 102 for transmission using a Cell that has CB-for-GU enabled, unless it is first determined that the UE 104 is allowed to access such a Cell. FIG. 27 shows the modification to the Network Triggered Service Request procedure that may be used effectively in a Dual Use LTE network. Note that if the UE 104 AC priority (which may have been obtained from the HSS 120 UE Subscription data) is maintained in the UE 104 context at the MME 108, the determination of initial access viability may be performed by logic in the MME 108, without the need to interact with the AF 2102 for that purpose. FIG. 27 shows a procedure that may be used when the UE 104 AC priority is not kept in the HSS 120 UE Subscription data.

In FIG. 27, when the MME 108 receives a Downlink Data Notification for a UE 104, it determines the set of Cells over which Paging messages should be sent to attempt to reach the UE 104. Using the data provisioned into the MME 108 by the Government EMS, the MME 108 may determine the subset of these Cells that have CB-for-GU enabled. Using this subset of Cells, the MME 108 may Publish the UEpagingCheck message to the Topic "AF/biometric/<GUMMEI>", where the <GUMMEI> is the unique ID assigned to the MME 108. As described previously, this message is received at the AF 2102.

For each Cell_ID in the received message, the AF 2102 may obtain from its provisioning data the minimum value of Access Priority allowed to access the Barred Cell, or the list of allowed high priority access class values. Note that the AC priority values assigned to the Cells with CB-for-GU enabled may exceed the set of values allowed in the 3GPP standards. The AF 2102 may then obtain either from its provisioned IMSI values, or from an accessible database of IMSI values, the AC priority of the UE 104 IMSI, the IMSI being that value received in the UEpagingCheck message. Note that the AC priority value assigned to the IMSI may exceed the values allowed in the 3GPP standards. If the IMSI is not found in the provisioning data, or in the IMSI database, the AF 2102 may return the UEpagingCheckResponse message to the MME 108 instance, indicating that the paging message for the UE 104 not be sent to any of the Cells received in the request message. The MME 108 may initiate paging to other Cells, but not to those with CB-for-GU enabled.

Alternatively, if the AF 2102 locates the UE 104 IMSI either in its provisioned data, or in an IMSI database, it may retrieve the UE 104 AC priority value, and compare it in turn with the minimum AC priority value provisioned for each Barred Cell, or compare it with the list of allowed high priority access class values for each Cell in the check list. If the IMSI has too low a priority for a given Cell_ID, or if the IMSI access priority does not match one of the allowed values for the Cell, the AF 2102 may compose the UEpagingCheckResponse message to indicate no-paging-allowed to the given Cell_ID. However, if the UE 104 AC priority is high enough for the given Cell_ID, or matches one of the allowed values for the Cell, the AF 2102 may check its provisioned data to determine if Biometric Testing is required for this Barred Cell. If not, the AF 2102 may compose the UEpagingCheckResponse message to indicate that paging is allowed to this Cell_ID, and that no Biometric Testing is required. If Biometric Testing is enabled for the given Barred Cell, the AF 2102 may compose the UEpagingCheckResponse message to indicate that paging is allowed to the given Barred Cell_ID, and that Biometric Testing is required. When all the Cell_ID values in the request message have been processed in this way, the AF 2102 may Publish the UEpagingCheckResponse message to the Topic "AF/biometric/<GUMMEI>", so it is received by the MME 108 instance that sent the request message.

When the MME 108 receives the UEpagingCheckResponse message, it uses the results for each Barred Cell to determine whether, or not, a paging message can be sent to the eNB 102 that handles that Cell. In this way, paging messages are not sent to Cells for which UE 104 access is prohibited by CB-for-GU. For those Cells with CB-for-GU enabled to which a paging message is sent, the MME 108 may save the status that paging is in progress to the Cell, and may save the status of whether, or not, a biometric test is required if the UE 104 accesses the network through that Cell. The processing modifications to the Service Request procedure to support the Dual Use network are described next.

Automatic Treatment of Restricted Users During Service Request

Section 5.4.3.1 of TS 23.401 v9.4.0 specifies the processing in the LTE network for the UE Initiated Service Request procedure. As noted in the previous section of this document, this procedure is also invoked when the UE 104 responds to a paging message.

Figure 28:
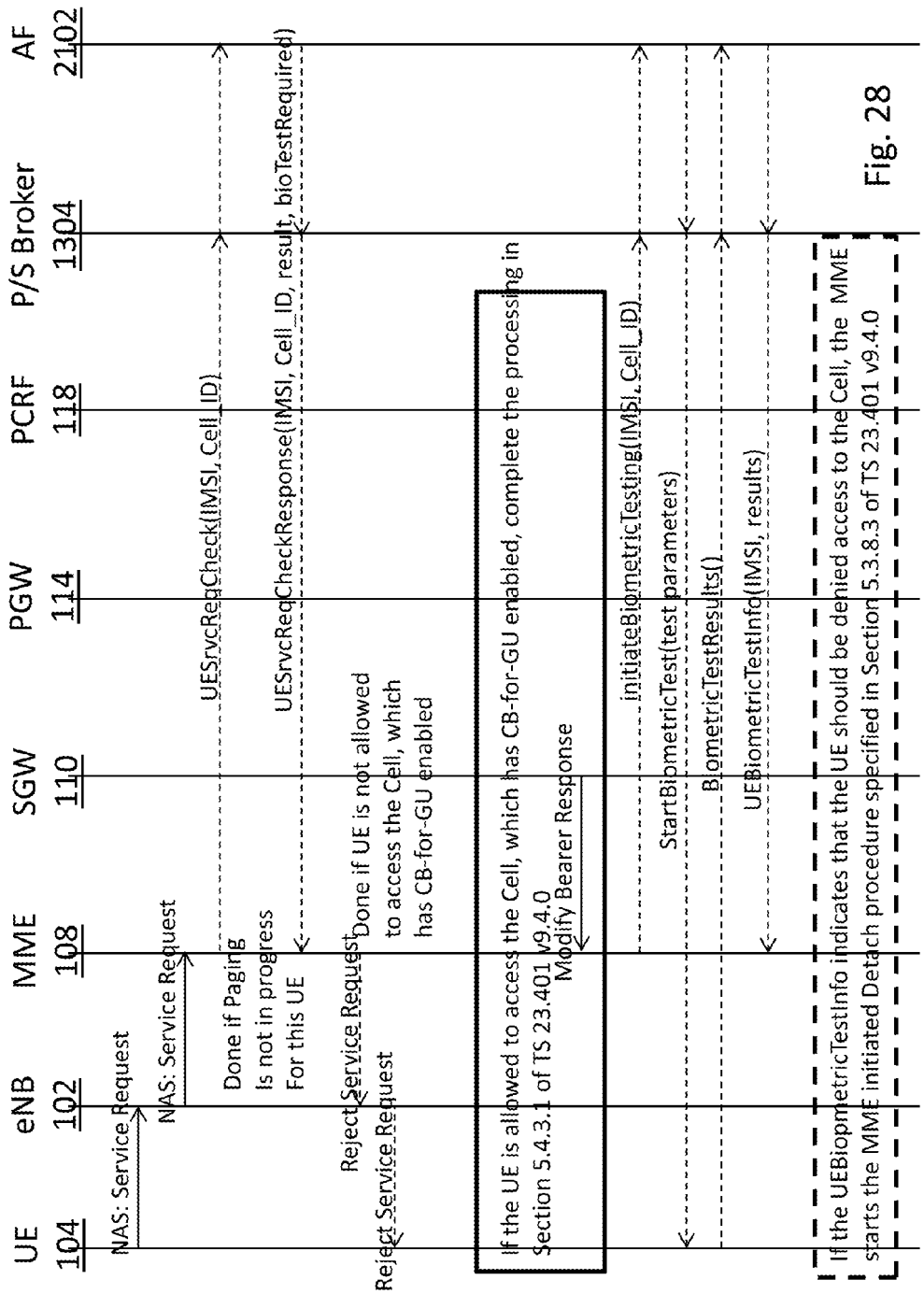
FIG. 28 depicts an example embodiment for a processing addition to the LTE service request procedure in a dual use network.

As the processing in FIG. 28 shows, when the MME 108 receives the Service Request from the eNB 102, the MME 108 may determine if the Cell being accessed is Barred for Government Use. This determination is made from the provisioning information that may be sent to it by the Government EMS 802, as described previously. If the Cell is not Barred for Government Use, or if the Service Request is the result of a paging message (see the previous section of this disclosure), the Service Request procedure proceeds per the LTE standards (Section 5.4.1.3 of TS 23.401 v9.4.0), with no modification. However, if the CB-for-GU is enabled for the Cell, and the Service Request is UE Initiated, the MME 108 may Publish a UESrvcReqCheck message to the Topic "AF/biometric/<GUMMEI>", where <GUMMEI> is the unique ID assigned to the MME 108. The message contains the UE 104 IMSI and the Cell_ID of the Cell being accessed. As noted previously, this message is received by the AF 2102. The AF 2102 may perform a further validation via its provisioned data that the Cell_ID referenced in the received UESrvcReqCheck message is indeed a Cell with CB-for-GU enabled. (If it is not, the AF 2102 may Publish a UESrvcReqCheckResponse message to the Topic "AF/biometric/<GUMMEI>" to indicate that the UE 104 passes the access test, that no biometric test is required, and also indicate the discrepancy between the MME 108 and the AF 2102 provisioning data. The message is received only by the MME 108 instance that sent the original UESrvcReqCheck message, because of the inclusion of the unique GUMMEI value in the Topic string.) Assuming that the Cell_ID is that of a Cell with CB-for-GU enabled, the AF 2102 may obtain from its provisioning data the minimum value of Access Priority allowed to access the Barred Cell, or obtain the list of high priority access class values allowed to access the Barred Cell. Note that the AC priority value(s) in this case may exceed the values used in the 3GPP standards, so that a finer grained differentiation of priority users may be made in this case than with the 3GPP standards. The AF 2102 may then obtain either from its provisioned IMSI values, or from an accessible database of IMSI values, the Access Class priority of the UE 104 IMSI, the IMSI being that value received in the UESrvcReqCheck message. Note that the value of AC priority assigned to the UE 104 IMSI may be greater than the set of values specified in the 3GPP standards. If the IMSI is not found in the provisioning data, or in the IMSI database, the AF 2102 may return the UESrvcReqCheckResponse message to the serving MME 108 instance, indicating that the UE 104 Service Request should be Rejected. The MME 108 may initiate a Reject response to the UE 104 in this case.

Alternatively, if the AF 2102 locates the UE 104 IMSI either in its provisioned data, or in an IMSI database, it may retrieve the UE 104 AC priority value, and compare it with the minimum AC priority value provisioned for the Barred Cell, or compare it with the list of allowed high priority access classes allowed for the Cell. If the IMSI has too low a priority, or if the IMSI AC priority does not match one of the allowed access class values, the AF 2102 may return the UESrvcReqCheckResponse message to the MME 108 instance, to cause the UE 104 Service Request to be Rejected. However, if the UE 104 AC priority is high enough, or matches one of the allowed values for the Cell, the AF 2102 may check its provisioned data to determine if Biometric Testing is required for this Barred Cell. If not, the AF 2102 may return the UESrvcReqCheckResponse message to the MME 108 instance, indicating that the UE 104 Service Request processing should proceed, and that no Biometric Testing is required. If Biometric Testing is enabled for the Barred Cell, the AF 2102 may return the UESrvcReqCheckResponse message to the MME 108 instance, indicating that the UE 104 Service Request processing should proceed, and that Biometric Testing is required.

If the Service Request is to proceed, the remainder of the procedure specified in Section 5.4.3.1 of TS 23.401 v9.4.0 is completed. When the MME 108 receives the Modify Bearer Response message from the SGW 110, the standardized Service Request procedure is finished, but the MME 108 has the following additional processing to perform in a Dual Use network when the accessed Cell has CB-for-GU enabled. See FIG. 28.

When the MME 108 receives the Modify Bearer Response message from the SGW 110 to end the Service Request procedure, the MME 108 may check the information stored for the UE 104 IMSI. If the information indicates that a Biometric test should be performed, the MME 108 may Publish the initiateBiometricTesting message to the Topic "AF/biometric/<GUMMEI>". The message contains the Cell_ID and the IMSI of the concerned UE 104. The message is received by the AF 2102, and the Biometric Testing ensues as follows.

Similar to what is shown in FIG. 25, The AF 2102 checks the BiometricTestPassed variable kept for the IMSI, and if it is set, no Biometric Test is performed. Instead, the AF 2102 may Publish the UEBiometricTestInfo message to the Topic "AF/biometric/<GUMMEI>, so the message is received by the serving MME 108. The message indicates the UE 104 is allowed to access the Cell. On the other hand, if the BiometricTestPassed variable for the IMSI is not set, the Biometric Testing ensues as follows. The AF 2102 Publishes the StartBiometricTest message to the Topic "AF/biometric/test/<IMSI>", where the <IMSI> is the value received in the initiateBiometricTesting message sent by the MME 108 that serves the UE 104. The message is therefore delivered by the P/S Broker 1304 network to the unique UE 104 that has the <IMSI> value, where it is consumed by the UE Biometric Test app 2202. The message may contain data such as the type of biometric test that should be performed, or any other data pertinent to the performance of the test. Other data may include obtaining the GPS location of the UE 104, generating periodic reports of the GPS location, continuing to make these reports even when the user attempts to put the UE 104 into the ECM-IDLE state, or even when the user attempts to turn OFF the UE 104. (These latter capabilities may be required during military operations, or during other government operations.) The message may be delivered reliably by the P/S Broker 1304 network. A timer may be started by the AF 2102 for receipt of the Biometric Test data from the UE Biometric Testing App 2202, in case the user chooses not to enter the data. In this case, if the timer expires, the AF 2102 may send the UErejectAccess message to the MME 108 to indicate that the UE 104 should be Detached from the network. In this case, the MME 108 starts the MME Initiated Detach procedure, and the UE 104 is detached from the Cell with CB-for-GU enabled.

When the biometric test is performed at the UE 104, the UE Biometric Testing App 2202 Publishes the BiometricTestResults message to the Topic "AF/biometric/test/<IMSI>", and again, this message is received by the AF 2102. The AF 2102 cancels the timer previously established to receive this message, and starts the analysis of the returned data. Depending on the type of test being performed (e.g., matching a speech phrase, matching a fingerprint, or other biometric information, matching a password), the AF 2102 may analyze the data itself, or it may send the data to another service program to perform the analysis. The analysis reveals whether or not the UE 104 should remain attached via the Barred Cell. The determination is returned to the serving MME 108 when the AF 2102 Publishes the UEBiometricTestInfo message. Accordingly, the UE 104 is either Detached from the Cell, or is allowed to remain accessed via the Barred Cell. In the latter case, the AF 2102 may set a BiometricTestPassed parameter for the IMSI, and may start a timer whose duration is set by the value of the TimeBetweenBiometricTests that is provisioned at the AF 2102 for the given Cell_ID. The purpose of the timer is to avoid testing the UE 104 too frequently. When the timer expires, the AF 2102 may reset the value of the BiometricTestPassed parameter associated with the IMSI, so another biometric test may be performed for that UE 104 IMSI. (The value of TimeBetweenBiometricTests may be set to INDEFINITE to ensure that just one test is performed per UE 104, if that is desired by the Government administrator.)

Automatic Detachment of Restricted Users During Handover

The LTE standards specify two different types of Handover procedures. In the first type, called X2 Handover, there is a direct communications path between the source eNB 102 (i.e., the eNB 102 that manages the current Cell through which the UE 104 is accessed) and the target eNB 102 (i.e., the eNB 102 that manages the Cell to which the UE 104 is being handed over). When no direct path exists between the source eNB 102 and the target eNB 102, the MME 108 becomes involved in the Handover processing at an earlier stage of the Handover, and uses its S1 links to arrange for communications between the source eNB 102 and the target eNB 102. This type of Handover is therefore called an S1 Handover. In an X2 Handover, the MME does not change, but the SGW 110 element may change if the UE 104 is moving to a Cell that is not handled by the current (source) SGW 110. In an S1 Handover, there may be a change (i.e., a Relocation) to a new (target) MME 108, as well as a possible change (Relocation) to a new (target) SGW 110 element.

Figure 5:
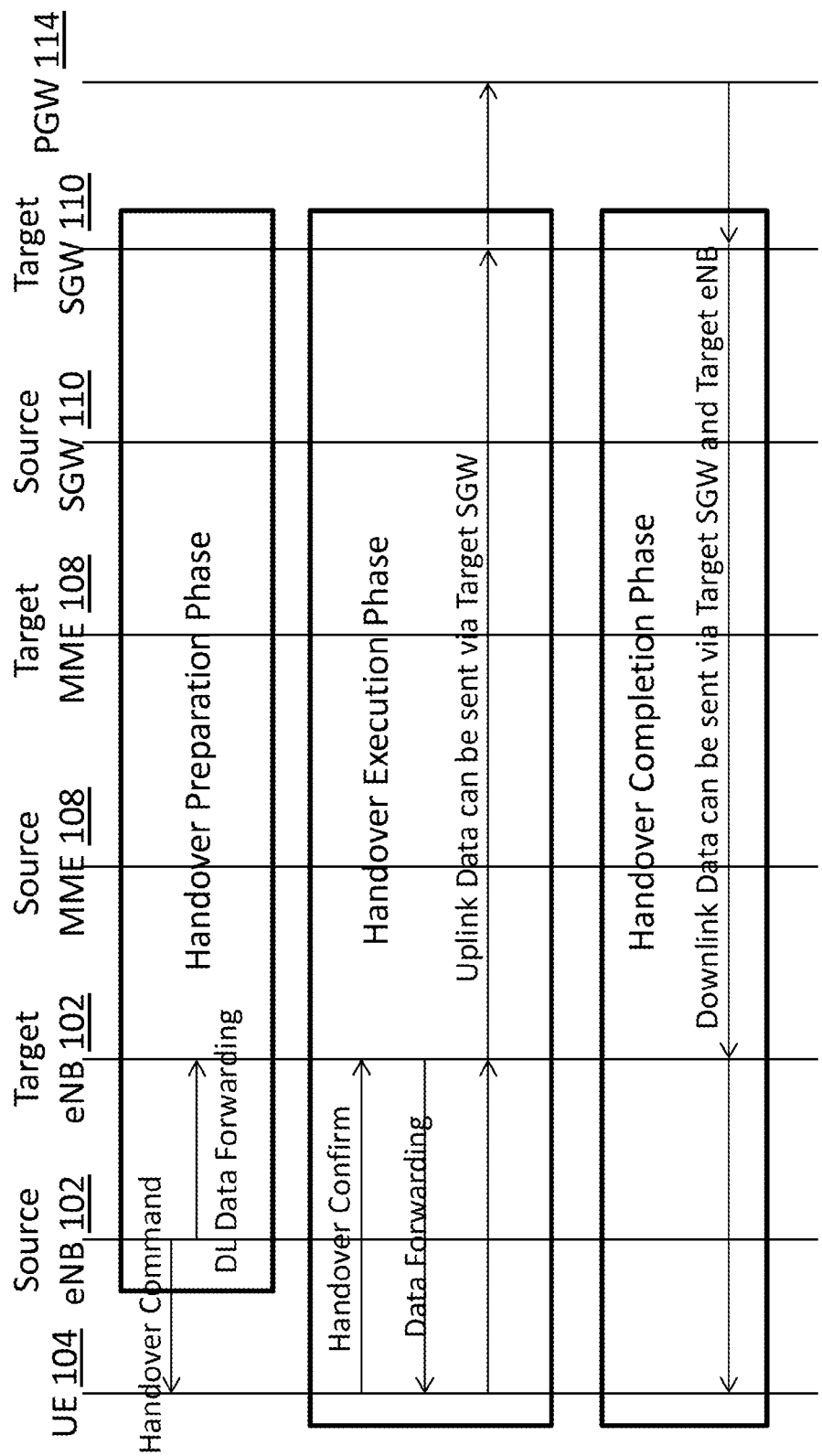
FIG. 5 depicts a high-level view of LTE handover processing.

A high level view of the LTE Handover processing is shown in FIG. 5. There are three distinct phases to the Handover procedure, namely, the Handover preparation phase, the Handover execution phase, and the Handover completion phase. During the Handover preparation phase, the UE 104 context in the source eNB 102 is transferred to the target eNB 102. In the Handover execution phase, the UE 104 leaves the Cell at the source eNB 102, and synchronizes and accesses the Cell at the target eNB 102. Uplink and downlink data can be exchanged with the UE 104 once the Handover Execution phase is completed. In the Handover completion phase, the UE 104 GTP tunnels at the SGW 110 are modified, so data is sent from the SGW 110 to the target eNB 102 (until this is done, the data is sent to the source eNB 102, and is forwarded to the target eNB 102 via the X2 communications path, where the data is queued until it can be sent to the UE 102 without data loss).

The X2 Handover procedure is specified in Section 5.5.1.1.2 of TS 23.401 v9.4.0 for the case where there is no SGW 110 Relocation. Section 5.5.1.1.3 provides the specification for the X2 Handover case where there is an SGW 110 Relocation. In an X2 Handover, the MME 108 serves both the source eNB 102 and the target eNB 102, so there is no change in the MME 108, i.e., there is no MME 108 Relocation in an X2 Handover. Section 5.5.1.2.2 of TS 23.401 v9.4.0 provides the specification of the S1 Handover case, and includes the possibilities of MME 108 Relocation as well as SGW 110 Relocation.

This portion of the disclosure may identify the changes to the MME 108 processing to implement a Dual Use network capability when the UE 104 is in Handover to a Cell that has CB-for-GU enabled. It may be recognized by those skilled in the art that the points in the standardized procedures chosen here to initiate MME-AF interactions is an example, as other processing points may be chosen without altering the results, and without materially altering the description provided here. Also, it may be pointed out that if the UE 104 AC priority is kept with the Subscriber data stored at the HSS 120, it may be obtained by the MME 108 when the UE 104 first accesses the LTE network, and the checks of the UE 104 AC priority versus the priority allowed at a Cell with CB-for-GU enabled may be performed by the MME 108 without the need to interface with the AF 2102 for this purpose.

X2 Handover in a Dual Use Network

Figure 29:
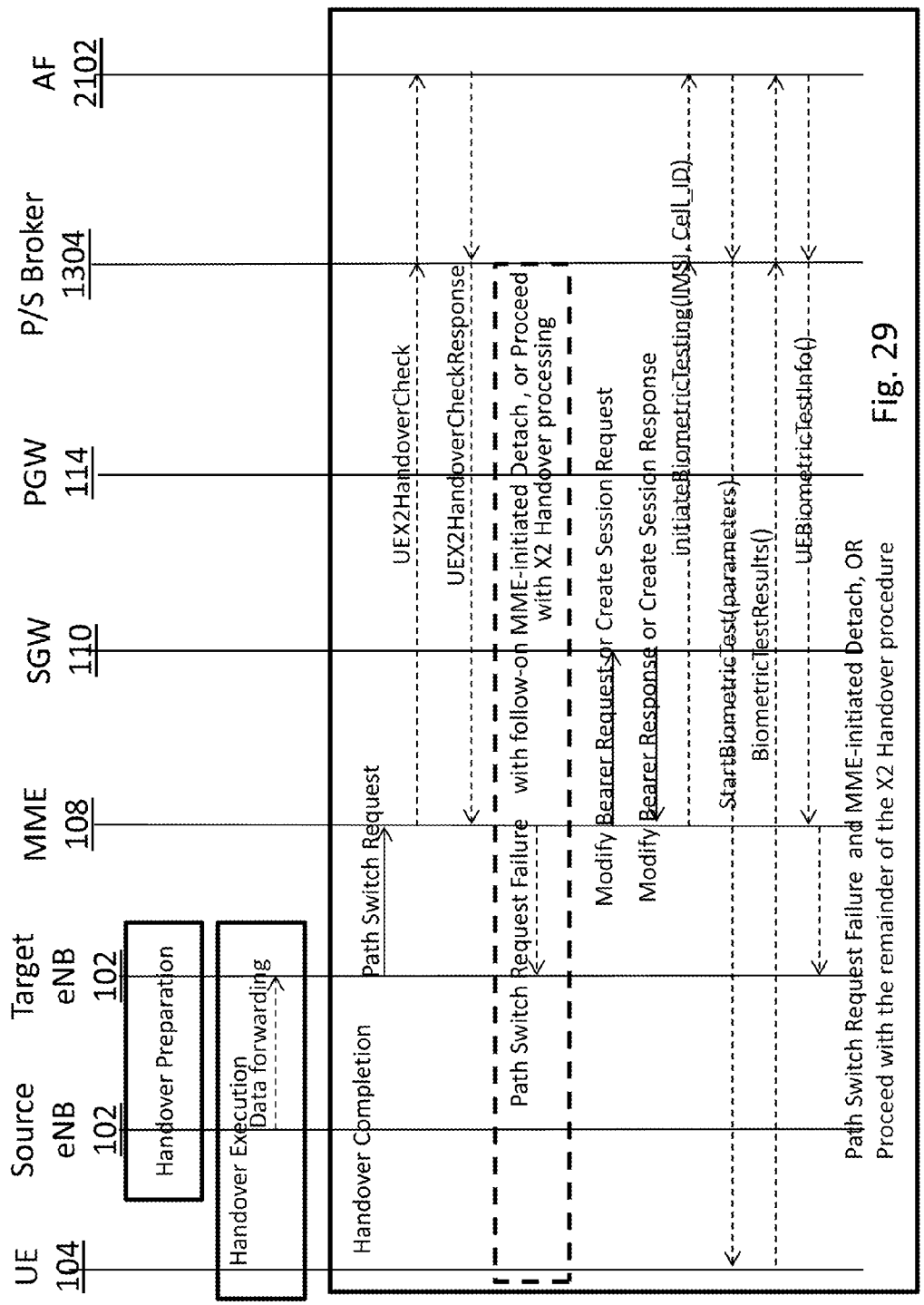
FIG. 29 depicts an example embodiment addition to the X2 handover procedure in a dual use network.

In an X2 Handover, the MME 108 first learns of the Handover when the Handover Completion phase starts. The target eNB 102 sends the LTE Path Switch message to the MME 108, and identifies the UE 104 and the target Cell ID. FIG. 29 shows the introduction of additional MME 108 processing to implement a Dual Use network. When the Path Switch message is received, the MME 108 determines from its provisioned data if the target Cell has CB-for-GU enabled. If it does not, there is no change to the X2 Handover processing. However, if the target Cell has CB-for-GU enabled, the MME 108 may check the UE 104 context data that it keeps, and determine if the UE 104 is making a High Priority call, or is making an Emergency Call (i.e., check the Establishment Cause value for the UE 104). If the UE 104 is making a normal call, or if the UE 104 is making an Emergency Call, but E911 calling is not allowed at the target Cell, the MME 104 may return the Path Switch Request Failure message to the target eNB 102, and may start the MME-initiated Detach procedure for the UE 104.

If the UE 104 is making a High Priority call, the MME 108 needs to determine whether the UE 104 AC priority is high enough to be allowed to gain access to the target Cell. Hence, the MME 104 may Publish the UEX2HandoverCheck message to the Topic "AC/biometric/<GUMMEI>", where <GUMMEI> is the unique ID assigned to this MME 108 instance. As noted herein, this message is received by the AF 2102. The message contains the UE 104 IMSI and the Cell_ID of the Cell being accessed. The AF 2102 may perform a further validation via its provisioned data that the Cell_ID referenced in the received UEX2HandoverCheck message is indeed a Cell with CB-for-GU enabled. (If it is not, the AF 2102 may Publish a UEX2HandoverCheckResponse message to the Topic "AF/biometric/<GUMMEI>" to indicate that the UE 104 passes the access test, that no biometric test is required, and also indicate the discrepancy between the MME 108 and the AF 2102 provisioning data. The message is received only by the MME 108 instance that sent the original UEX2HandoverCheck message, because of the inclusion of the unique GUMMEI value in the Topic string.) Assuming that the Cell_ID is that of a Cell with CB-for-GU enabled, the AF 2102 may obtain from its provisioning data the minimum value of Access Priority allowed to access the Barred Cell, or the list of high priority access class values allowed to access the Cell. Note that the value(s) received in this case may exceed the set of values allowed by the 3GPP standards. The AF 2102 may then obtain either from its provisioned IMSI values, or from an accessible database of IMSI values, the priority of the UE 104 IMSI, the IMSI being that value received in the UEX2HandoverCheck message. Note that the value of AC priority assigned to the UE 104 IMSI in this case may exceed the set of values allowed by the 3GPP standards, so that a finer grained discrimination of UE 104 AC priority classes may be implemented for the CB-for-GU feature than may be implemented for the standardized Cell Barring feature. If the IMSI is not found in the provisioning data, or in the IMSI database, the AF 2102 may return the UEX2HandoverCheckResponse message to the serving MME 108 instance, indicating that the UE 104 Handover should be Failed. In this case, the MME 108 may send the Path Switch Request Failure message to the target eNB 102, and may then start the MME-initiated Detach procedure for the UE 104.

Alternatively, if the AF 2102 locates the UE 104 IMSI either in its provisioned data, or in an IMSI database, it may retrieve the UE 104 AC priority value, and compare it with the minimum AC priority value provisioned for the Barred Cell, or with the list of allowed high priority access class values. If the IMSI has too low a priority, or does not match one of the allowed high priority values, the AF 2102 may return the UEX2HandoverCheckResponse message to the MME 108 instance, to cause the UE 104 Handover to be Failed, and the UE 104 to be Detached. However, if the UE 104 AC priority is high enough, or if it matches one of the allowed high priority values, the AF 2102 may check its provisioned data to determine if Biometric Testing is required for this Barred Cell. If not, the AF 2102 may return the UEX2HandoverCheckResponse message to the MME 108 instance, indicating that the UE 104 Handover processing should proceed, and that no Biometric Testing is required. If Biometric Testing is enabled for the Barred Cell, the AF 2102 may return the UEX2HandoverCheckResponse message to the MME 108 instance, indicating that the UE 104 Handover processing should proceed, and that Biometric Testing is required.

If the X2 Hanodver procedure is to proceed, the parts of the procedure are followed as specified in Section 5.5.1.1.2 of TS 23.401 v9.4.0 until the Modify Bearer Response is received by the MME 108 for the case of no SGW 110 Relocation. For the case of SGW 110 Relocation, the parts of the procedure are followed as specified in Section 5.5.1.1.3 of TS 23.401 v9.4.0 until the Create Session Response is received by the MME 108. When the MME 108 receives the Modify Bearer Response/Create Session Response message from the SGW 110, the MME 108 checks whether Biometric Testing is required for the UE 104, and if so, initiates an interaction with the AF 2102 to perform the Biometric Test. See FIG. 29.

As shown in FIG. 29, the MME 108 may Publish the initiateBiometricTesting message to the Topic "AF/biometric/<GUMMEI>". The message contains the Cell_ID and the IMSI of the concerned UE 104. The message is received by the AF 2102, and the Biometric Testing ensues as follows.

Similar to what is shown in FIG. 25, The AF 2102 checks the BiometricTestPassed variable kept for the IMSI, and if it is set, no Biometric Test is performed. Instead, the AF 2102 may Publish the UEBiometricTestInfo message to the Topic "AF/biometric/<GUMMEI>, so the message is received by the serving MME 108. The message indicates that the UE 104 is allowed to access the Cell. On the other hand, if the BiometricTestPassed variable for the IMSI is not set, the Biometric Testing ensues as follows. The AF 2102 may Publish the StartBiometricTest message to the Topic "AF/biometric/test/<IMSI>", where the <IMSI> is the value received in the initiateBiometricTesting message sent by the MME 108 that serves the UE 104. The message is therefore delivered by the P/S Broker 1304 network to the unique UE 104 that has the <IMSI> value, where it is consumed by the UE Biometric Test app 2202. The message may contain data such as the type of biometric test that should be performed, or any other data pertinent to the performance of the test. Other data may include obtaining the GPS location of the UE 104, generating periodic reports of the GPS location, continuing to make these reports even when the user attempts to put the UE 104 into the ECM-IDLE state, or even when the user attempts to turn OFF the UE 104. (These latter capabilities may be required during military operations, or during other government operations.) The message may be delivered reliably by the P/S Broker 1304 network. A timer may be started by the AF 2102 for receipt of the Biometric Test data from the UE Biometric Testing App 2202, in case the user chooses not to enter the data. In this case, if the timer expires, the AF 2102 may send the UErejectAccess message to the MME 108 to indicate that the UE 104 should be Detached from the network. In this case, the MME 108 starts the MME-Initiated Detach procedure, and the UE 104 is detached from the Cell with CB-for-GU enabled.

When the biometric test is performed at the UE 104, the UE Biometric Testing App 2202 Publishes the BiometricTestResults message to the Topic "AF/biometric/test/<IMSI>", and again, this message is received by the AF 2102. The AF 2102 cancels the timer previously established to receive this message, and starts the analysis of the returned data. Depending on the type of test being performed (e.g., matching a speech phrase, matching a fingerprint, or other biometric information, matching a password), the AF 2102 may analyze the data itself, or it may send the data to another service program to perform the analysis. The analysis reveals whether or not the UE 104 should remain attached via the Barred Cell. The determination is returned to the serving MME 108 when the AF 2102 Publishes the UEBiometricTestInfo message. Accordingly, the UE 104 is either Detached from the Cell, or is allowed to remain accessed via the Barred Cell. In the latter case, the MME 108 may continue the X2 Handover processing by sending the Path Switch Request Ack message to the target eNB 102, and perform the remaining processing indicated in TS 23.401 v9.4.0. Meanwhile, the AF 2102 may set a BiometricTestPassed parameter for the IMSI, and may start a timer whose duration is set by the value of the TimeBetweenBiometricTests that is provisioned at the AF 2102 for the given Cell_ID. The purpose of the timer is to avoid testing the UE 104 too frequently. When the timer expires, the AF 2102 may reset the value of the BiometricTestPassed parameter associated with the IMSI, so another biometric test may be performed for that UE 104 IMSI. (The value of TimeBetweenBiometricTests may be set to INDEFINITE to ensure that just one test is performed per UE 104, if that is desired by the Government administrator.)

S1 Handover in a Dual Use Network

Figure 30:
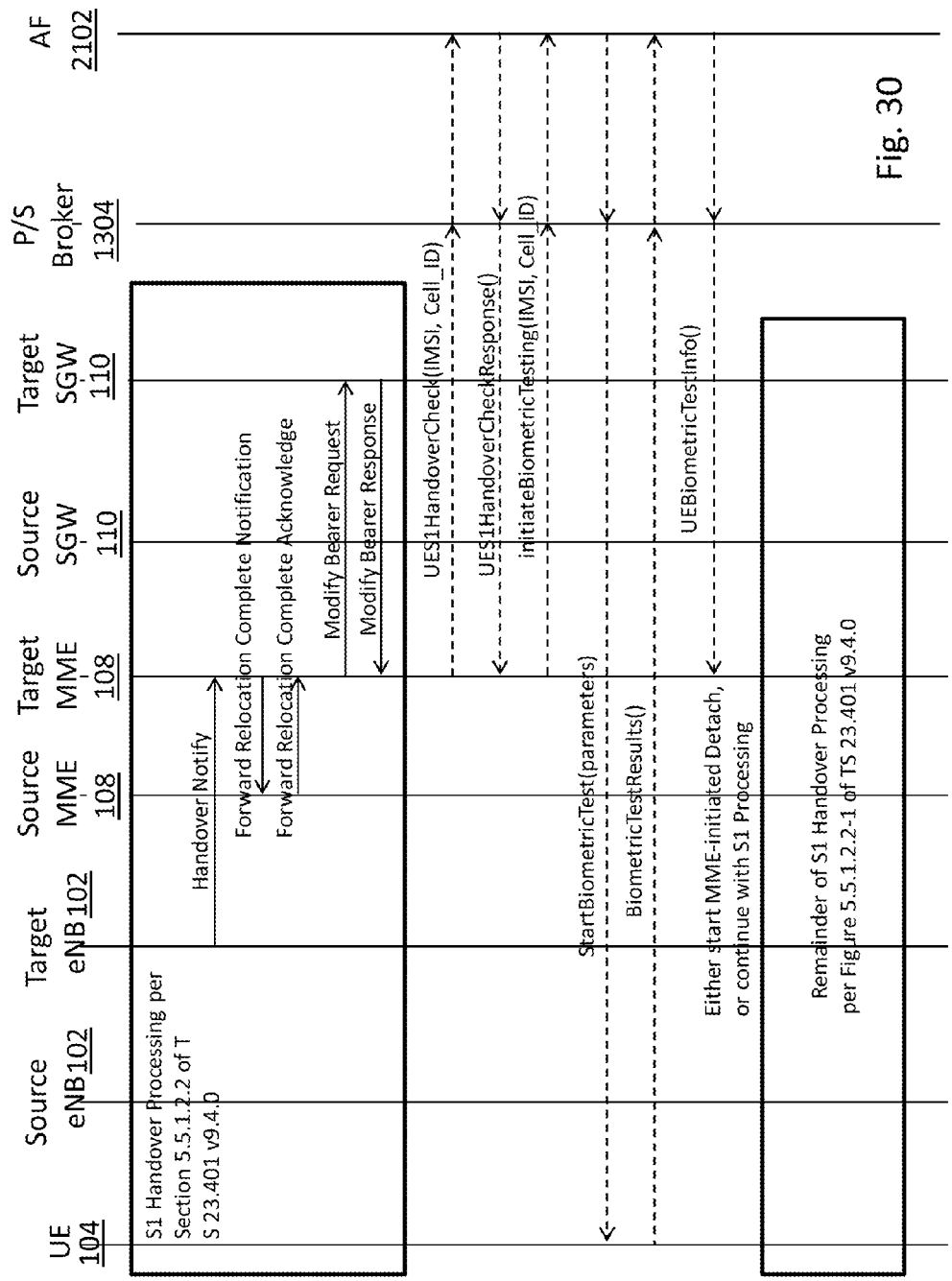
FIG. 30 depicts an example embodiment addition to the S1 handover procedure in a dual use network.

The S1 Handover procedure is specified in Section 5.5.1.2.2 of TS 23.401 v9.4.0, and covers the case of MME 108 Relocation and of SGW 110 Relocation. The standards specifications show that the MME 108 is involved in all three phases of an S1 Handover procedure. It is noted here again that there may be multiple possible points in the S1 Handover processing where it may be appropriate to insert the additional behaviors required in a Dual Use network. Regardless of the points selected in the S1 Handover procedure, the results of these interactions must be the same, namely, that the UE 104 AC priority must be checked to determine whether or not the UE 104 can remain attached through a target Cell that has CB-for-GU enabled, and that a Biometric Test is performed if the target Cell with CB-for-GU enabled is configured for such testing. FIG. 30 shows the point in the S1 Handover procedure that is selected here to show how additional processing may be used to implement a Dual Use Network.

In an S1 Handover, the MME 108 (the target MME 108, if MME Relocation is involved) first learns the identity of the target Cell when it receives the Handover Notify message from the target eNB 102. This message is sent during the Handover Completion phase, so the UE 104 has already synchronized on the target Cell, and uplink and downlink data may be exchanged with the UE 104. As FIG. 30 shows, the receipt of the Modify Bearer Response message from the (target) SGW 110 is used to trigger the additional actions required in a Dual Use network. Choosing this processing point ensures that the (target) MME 108 starts a timer for the deletion of the Indirect Data Forwarding paths, in case the checks performed for the Dual Use network result in Detaching the UE 104.

When the (target) MME 108 receives the Modify Bearer Response message, it may check its provisioned data to determine whether the target Cell has CB-for-GU enabled. If not, the S1 Handover processing proceeds without any modification. However, if the target Cell has CB-for-GU enabled, the MME 108 may check the UE 104 context data that it keeps, and determine if the UE 104 is making a High Priority call, or is making an Emergency Call (i.e., check the Establishment Cause value for the UE 104). If the UE 104 is making a normal call, or if the UE 104 is making an Emergency Call, but E911 calling is not allowed at the target Cell, the MME 108 may start the MME-initiated Detach procedure for the UE 104.

If the UE 104 is making a High Priority call, the MME 108 needs to determine whether the UE 104 AC priority is high enough, or matches one of the allowed High Priority AC values, to be allowed to remain accessed to the target Cell. Hence, the MME 108 may Publish the UES1HandoverCheck message to the Topic "AC/biometric/<GUMMEI>", where <GUMMEI> is the unique ID assigned to this MME 108 instance. As noted herein, this message is received by the AF 2102. The message contains the UE 104 IMSI and the Cell_ID of the Cell being accessed. The AF 2102 may perform a further validation via its provisioned data that the Cell_ID referenced in the received UES1HandoverCheck message is indeed a Cell with CB-for-GU enabled. (If it is not, the AF 2102 may Publish a UES1HandoverCheckResponse message to the Topic "AF/biometric/<GUMMEI>" to indicate that the UE 104 passes the access test, that no biometric test is required, and also indicate the discrepancy between the MME 108 and the AF 2102 provisioning data. The message is received only by the MME 108 instance that sent the original UES1HandoverCheck message, because of the inclusion of the unique GUMMEI value in the Topic string.) Assuming that the Cell_ID is that of a Cell with CB-for-GU enabled, the AF 2102 may obtain from its provisioning data the minimum value of Access Priority allowed to access the Barred Cell, or the list of high access class priority values allowed for access to the Cell. Note that the AC priority value(s) may in this case exceed the values allowed by the 3GPP standards. The AF 2102 may then obtain either from its provisioned IMSI values, or from an accessible database of IMSI values, the Access Class priority of the UE 104 IMSI, the IMSI being that value received in the UES1HandoverCheck message. Note that in this case, the value of AC priority assigned to the UE 104 IMSI may exceed the set of AC priority values allowed in the 3GPP standards, so that a finer grained discrimination of UE 104 access priority classes may be obtained than is possible in the standardized 3GPP Cell Barring feature. If the IMSI is not found in the provisioning data, or in the IMSI database, the AF 2102 may return the UES1HandoverCheckResponse message to the serving MME 108 instance, indicating that the UE 104 Handover should be Failed. In this case, the MME 108 may start the MME-initiated Detach procedure for the UE 104.

Alternatively, if the AF 2102 locates the UE 104 IMSI either in its provisioned data, or in an IMSI database, it may retrieve the UE 104 AC priority value, and compare it with the minimum AC priority value provisioned for the Barred Cell, or compare it with the list of allowed high access class priority values. If the IMSI has too low a priority, or does not match one of the allowed values, the AF 2102 may return the UES1HandoverCheckResponse message to the MME 108 instance, to cause the UE 104 to be Detached. However, if the UE 104 AC priority is high enough, or matches one of the allowed high priority access class priority values, the AF 2102 may check its provisioned data to determine if Biometric Testing is required for this Barred Cell. If not, the AF 2102 may return the UES1HandoverCheckResponse message to the MME 108 instance, indicating that the UE 104 Handover processing should proceed, and that no Biometric Testing is required. If Biometric Testing is enabled for the Barred Cell, the AF 2102 may return the UES1HandoverCheckResponse message to the MME 108 instance, indicating that the UE 104 Handover processing should proceed, and that Biometric Testing is required.

If the receipt of the UES1HandoverCheckResponse message indicates that the UE 104 is allowed access, but Biometric testing is not required, the MME 108 may continue with the S1 Handover procedure with no further modifications. However, if the message indicates that Biometric testing is required, the MME 108 may initiate an interaction with the AF 2102 to perform the Biometric Test. See FIG. 30.

As shown in FIG. 30, the MME 108 may Publish the initiateBiometricTesting message to the Topic "AF/biometric/<GUMMEI>". The message contains the Cell_ID and the IMSI of the concerned UE 104. The message is received by the AF 2102, and the Biometric Testing ensues as follows.

Similar to what is shown in FIG. 25, The AF 2102 checks the BiometricTestPassed variable kept for the IMSI, and if it is set, no Biometric Test is performed. Instead, the AF 2102 may Publish the UEBiometricTestInfo message to the Topic "AF/biometric/<GUMMEI>, so the message is received by the serving MME 108 instance. The message indicates that the UE 104 is allowed to access the Cell. On the other hand, if the BiometricTestPassed variable for the IMSI is not set, the Biometric Testing ensues as follows. The AF 2102 may Publish the StartBiometricTest message to the Topic "AF/biometric/test/<IMSI>", where the <IMSI> is the value received in the initiateBiometricTesting message sent by the MME 108 that serves the UE. The message is therefore delivered by the P/S Broker 1304 network to the unique UE 104 that has the <IMSI> value, where it is consumed by the UE Biometric Test app 2202. The message may contain data such as the type of biometric test that should be performed, or any other data pertinent to the performance of the test. Other data may include obtaining the GPS location of the UE 104, generating periodic reports of the GPS location, continuing to make these reports even when the user attempts to put the UE 104 into the ECM-IDLE state, or even when the user attempts to turn OFF the UE 104. (These latter capabilities may be required during military operations, or during other government operations.) The message may be delivered reliably by the P/S Broker 1304 network. A timer may be started by the AF 2102 for receipt of the Biometric Test data from the UE Biometric Testing App 2202, in case the user chooses not to enter the data. In this case, if the timer expires, the AF 2102 may send the UErejectAccess message to the MME 108 to indicate that the UE 104 should be Detached from the network. In this case, the MME 108 starts the MME Initiated Detach procedure, and the UE 104 is detached from the Cell with CB-for-GU enabled.

When the biometric test is performed at the UE 104, the UE Biometric Testing App 2202 Publishes the BiometricTestResults message to the Topic "AF/biometric/test/<IMSI>", and again, this message is received by the AF 2102. The AF 2102 cancels the timer previously established to receive this message, and starts the analysis of the returned data. Depending on the type of test being performed (e.g., matching a speech phrase, matching a fingerprint, or other biometric information, matching a password), the AF 2102 may analyze the data itself, or it may send the data to another service program to perform the analysis. The analysis reveals whether or not the UE 104 should remain attached via the Barred Cell. The determination is returned to the serving MME 108 when the AF 2102 Publishes the UEBiometricTestInfo message. Accordingly, the UE 104 is either Detached from the Cell, or is allowed to remain accessed via the Barred Cell. In the latter case, the MME 108 may continue the S1 Handover processing indicated in Figure 5.5.1.2.2-1 of TS 23.401 v9.4.0. Meanwhile, the AF 2102 may set a BiometricTestPassed parameter for the IMSI, and may start a timer whose duration is set by the value of the TimeBetweenBiometricTests that is provisioned at the AF 2102 for the given Cell_ID. The purpose of the timer is to avoid testing the UE 104 too frequently. When the timer expires, the AF 2102 may reset the value of the BiometricTestPassed parameter associated with the IMSI, so another biometric test may be performed for that UE 104 IMSI. (The value of TimeBetweenBiometricTests may be set to INDEFINITE to ensure that just one test is performed per UE 104, if that is desired by the Government administrator.)

Using Access Barring and Roaming Restrictions to Secure a Government Base

In some circumstances, it may be desirable to allow only a restricted set of users to access Cells that provide coverage to a government-controlled area, or base. One method that may be used is to assign all the Cells that provide RF coverage of the base to a Closed Subscriber Group (CSG). The CSG is then broadcast in one of the System Information Blocks periodically sent by each Cell. Only UEs 104 that have their SIMs configured with the specific CSG value bound to each of the Cells is allowed to access those Cells. This approach may have the following loopholes, or issues. Invalid users may gain access to the CSG value of the Cells (simply by monitoring the System Information transmitted by the Cells), and may be able to place the CSG value into their SIM card. These invalid UEs 104 are then able to access the Cells. Secondly, it may be necessary to allow access to personnel not normally present at the base, and therefore not equipped with UEs 104 that have the specific CSG configured. Because of these issues, it is desirable to use alternative methods to restrict the access to the Cells that cover a government base. The Cell Barring and Roaming restrictions described in this disclosure may provide a good alternative to providing the restricted access.

Roaming concepts may be used as a first line of defense against unauthorized access to the Cells that cover the government base. Each of the Cells may be provisioned with a set of allowed Roaming networks that cover the government users that are authorized to access these Cells. The Roaming list may also be a null list, so only UEs from the Home Network ascribed to the Cells, and from a set of Equivalent Networks ascribed to the Cells, are allowed to access these Cells. In this case, it may be that all the government users have UEs 104 with IMSIs in one PLMN (MCC, MNC), where members of different government agencies may be differentiated by using different IMSI ranges for the members of the different agencies. Alternatively, as described previously, members of different government agencies may be assigned IMSI values in different Equivalent Networks.

The Cells that provide the RF coverage of the government base may also be placed into one or more Tracking Areas (TAs), where the TA(s) only contain Cells that cover the government base. Via provisioning data, the MMEs 108 in the LTE network that handle the neighbor Cells to the Cells that cover the government base may be sent Handover Restriction lists that contain the TA(s) that contain the Cells that cover the government base. This Handover Restriction list may then be delivered to all UEs 104 that are ineligible for accessing the Cells that cover the government base. The list may also be delivered to all UEs 104 on the neighbor Cells that are not allowed to access the Cells that cover the government base for other reasons. Handover of these UEs 104 is then prohibited, if the target Cell is one that covers the government base.

Access to the Cells that cover the government base may also be further restricted by introducing Cell Barring for Government Use to these Cells. In this case, UEs 104 that are able to access these Cells must be High Priority UEs 104. The capabilities described previously in this disclosure for CB-for-GU may then be applied. Hence, verification checks of the UE 104 IMSI and of the UE 104 AC priority value versus the Access Priority allowed at the restricted Cells may be performed by an entity separate from the UE 104 (i.e., by the MME 108, or by an AF 2102 that runs on an Optimization Server 304 deployed in the LTE network). Furthermore, the user identity may be verified via the Biometric Testing described previously in this disclosure. These checks and the Biometric Testing are performed as described herein.

APN LTE Network to Serve as a Platform for Sensor Data Collection, Processing, Storage, and Distribution Government and commercial applications are more and more using sensors of all types to gather information. Sensors can include image capturing devices, video capturing devices, audio capturing devices, scanning devices, chemical detectors, smoke detectors, etc. Sensors may be carried on airborne drones or on manned aircraft, or may be deployed on the ground in moving vehicles or robots, or may be deployed at stationary points such as lamp posts, in or on buildings, in supermarkets and at other shopping areas, in mobile phones that are carried by a multiplicity of users, etc. It may be seen that the amount of data being collected by sensors in different applications is growing at a rapid rate. Sensor data needs to be collected and transmitted to points where the data can be stored and processed. Depending on the application, data from a multiplicity of sensors of the same or of different types may need to be analyzed together to generate results, or to generate tertiary data, and then may need to be distributed to one, or to a multiplicity of end points for further processing or for decision making. Wireless technology may offer beneficial ways to acquire and transport the data collected by sensors. However, the amount of data that needs to be collected in certain sensor-based applications may exceed the capacities of current wireless networks. Furthermore, a wireless network that has the ability to acquire, process, store, and distribute the sensor data efficiently and quickly is not available. Such capabilities are referred to herein as characteristics of a sensor platform.

The system described herein utilizes aspects of the APN LTE Wireless Network presented in prior sections of this disclosure, plus additional concepts, to create the sensor platform outlined in the previous paragraph. These aspects may include the higher data capacity that may be available using the APN network beam forming technique, the ability to co-locate Optimization Servers 308 with the eNB 102 elements, close to the wireless access points of a large set of sensors, the ability to use the Publish/Subscribe 1304 communications in the APN LTE Wireless network to collect and distribute the sensor data among a large set of end points in an efficient manner, and the ability to use the Optimization Servers 304 and 308 as storage and analysis processing points for the sensor data. A large set of sensor-based applications may be built using these capabilities, as revealed in the example scenario below that illustrates the present disclosure. It may be understood by those skilled in the art that the example shown herein is an illustration of the power and applicability of the APN LTE Wireless Network in providing a sensor platform, and that many other sensor-based applications may be built using the capabilities described herein.

Using Optimization Servers and Publish/Subscribe Messaging to Handle Data from a Multiplicity of Sensors FIG. 13 shows how a Publish/Subscribe (P/S) Broker 1304 middleware messaging system may be used to provide a means of interconnecting a set of diverse end points, which in this case may be a diverse set of sensors, computer programs for processing and storing sensor data, and user terminals and devices that may receive the results of the sensor data processing and data distribution. Per the teachings disclosed in the earlier sections of this disclosure, the Publishing end points 1308 and the Subscribing end points 1310 do not interact directly with one another, and are therefore decoupled. This decoupling provides a benefit in that entities (e.g., sensors, processors, user terminals) may be added to or deleted from the network without impacting the behavior of any Publisher 1308 or of any Subscribers 1310 to the data being sent or received. All communicating entities may have one connection into the P/S Broker 1304 network, and through it, are able to send to, or receive from, a multiplicity of other end points. Publishers 1308 may send one packet, and any replication of the packet required to reach a multiplicity of Subscribers 1310 is taken care of by the P/S Broker 1304 middleware. Hence, the system is efficient, and may operate in a simpler manner than with other communications architectures.

FIG. 14 shows an example deployment of P/S Broker 1304 instances on the set of Optimization Servers 304 and 308 that may be deployed in the APN LTE Wireless Network. Note that at least one OptServereNB 308 is associated with each eNB 102 network element. In addition, the OptServerPGW 304 may be associated with the PGW 114 that serves the users that gain access via the eNB 102 elements. The teachings in this disclosure also describe how a UE bearer 302 may be redirected at the eNB 102, so it connects to the OptServereNB 308 that is associated with the eNB 102. This procedure may give the UE 104 a short path to reach the services that may be provided by the OptServereNB 308, and especially, to allow the UE 104 to connect to a P/S Broker 1304 instance that may run on that server 308. Furthermore, the use of the redirected bearer 312 may result in reducing, or eliminating, the use of back haul 112 resources when sending data to the UE 104, or when receiving data from the UE 104. It may also result in the lowest delay possible in sending or receiving data from a server program to/from a UE 104, when the server runs on the OptServereNB 308 that is associated with the eNB 102 that serves the UE 104. In this instance, the UE 104 may be a sensor, or it may be a user terminal that displays the sensor data or controls the sensors that may connect via this type of LTE Wireless Network. The number of sensors that may connect to the network may be large, especially when the Beam Forming system referenced in this disclosure is used at the eNB 102 elements to increase the system capacity. Many sensors may be able to connect to the LTE network at each eNB 102 element.

Over the past dozen years, several universities around the world have participated in specifying and building service architectures that can accommodate collaborative audio and video conference meetings. These types of services may be precisely what are needed to support sensors deployed to serve troops in the field, or to support Emergency workers at a disaster scene, or to support many types of commercial services involving sensors. Collaborative audio communications may be needed by the people involved in an emergency or military operation. Video streams are likely to be generated by sensors, and may need to be distributed to sets of people who need the information to improve their decision making ability, and to inform them before making a next move. Likewise, large collections of images taken by sensors may need to be stored, so they can be sent later to users who need to make decisions based on the image contents. The ability to interconnect the sensors and the users in a conference arrangement using the P/S Broker 1304 middleware of the APN LTE Wireless Network may facilitate the storage, processing, and distribution communications needs of applications involving sensors. These services may extend naturally into the commercial domain as well, although person-to-person, or sensor-to-person communications may be used more frequently than conference services. However, conference services may have their place in the commercial domain, and the P/S Broker 1304 communications may facilitate the operation of the conferencing service. Meanwhile, person-to-person and sensor-to-person communications may likewise be handled efficiently by using the P/S Broker 1304 middleware, as illustrated in the present disclosure.

Figure 31:
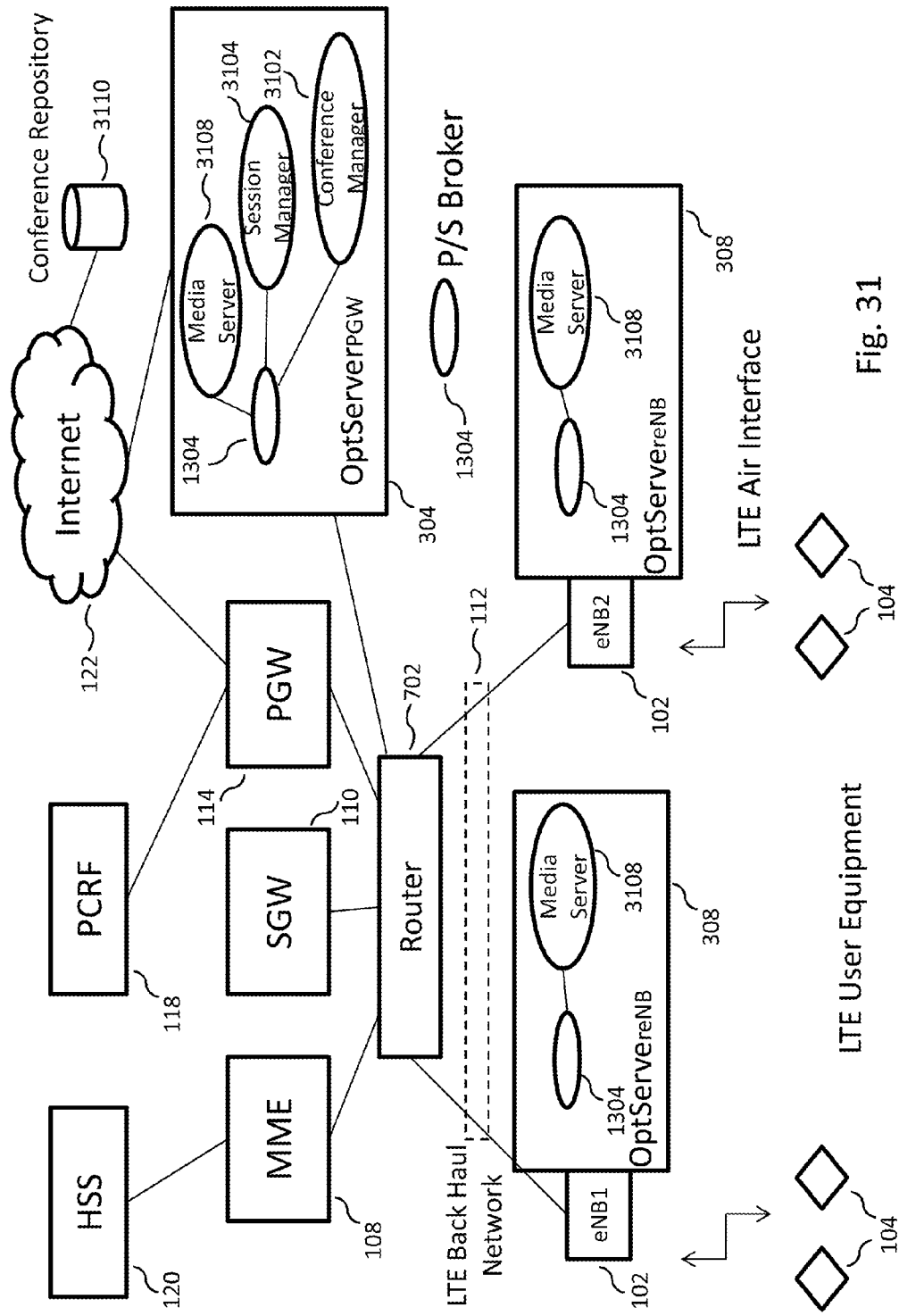
FIG. 31 depicts an example deployment of conferencing functions on the optimization servers in the APN LTE wireless network.

FIG. 31 shows the minimum set of functions that may be required to set up and manage multimedia conference services using the P/S Broker 1304 middleware for communications. FIG. 31 shows how these functions may be distributed across the set of Optimization Servers 304 and 308 that may be deployed in the APN LTE Wireless Network. The Conference Repository 3110 may contain a list of scheduled conferences, together with the set of user 104 IMSI values that are allowed access to the conference, the role of each user 104 in the conference (e.g., sensor of a particular type, general participant, chairperson, speaker, listener), and the conference start and end times. The Conference Manager 3102 may start and terminate the conference, interact with the Session Manager 3104 to add or delete specific types of sessions (e.g., audio, video, alarms), and manage the orderly use of the Conference resources by the participants. The Session Manager 3104 may interact with the Media Server 3108 to start and delete media types from the Conference. The Media Server 3108 may provide services specific to different types of media. The Session Manager 3104 is the interface point for sensors, devices, and users 104 who wish to join a particular session associated with the Conference that the end point (sensor, device, or user 104) has joined.

The generic ideas presented in FIG. 31 are that the Optimization Servers 304 and 308 and the associated P/S Broker 1304 communications middleware may be used as a platform to receive, process, store, and redistribute the sensor data in an LTE Wireless network. A conference capability may be required to facilitate the implementation of the distribution and collection functions, depending on the application, and may serve to organize the sensor, processing, and end user resources into one application. Other functions required by the specific sensor application may be deployed on the set of Optimization Servers 304 and 308, and may be connected to the P/S Broker 1304 system. There is no restriction on the type of functionality that may be added. The following subsections of this disclosure describe a set of additional functions, such as an Image Server 3302 and an Alarm Server 3304, that receive, process, store, and redistribute sensor data as part of a specific application. The inclusion of these functions may serve to illustrate how the APN LTE Wireless Network may serve as a platform for building sensor applications.

Deployment of these sensor services may be on the Optimization Server 304 associated with the PGW 114, or may be on the Optimization Server 308 associated with the eNB 102. The choice may depend on the location of the sensors and of the human and machine participants in the sensor application. As the following subsections show, choosing the appropriate server 304 and/or 308 to execute the function may result in large savings in bandwidth utilization on the network communications links 112 and 704 and/or in greatly reduced delay in getting information from or to an end point.

An Emergency Application Example Involving Sensors

This example application of sensors may serve to illustrate how the capabilities built into the APN LTE Wireless Network may be used as a platform to build sensor-based applications. A set of diverse sensor capabilities are used in this example to emphasize and illustrate how the sensor platform may be used.

When disasters occur, it frequently happens that the wireless infrastructure required to support the communications needs of Emergency responders is destroyed along with other infrastructure. The enhanced data capacity of the APN Beam Forming technology and the use of the Optimization Server 304 and 308 technology in an APN network may be used to restore LTE wireless capabilities over the area in which the Emergency responders must operate. In addition, deployment of the Publish/Subscribe Broker 1304 message delivery middleware and an associated set of conferencing software may be used to support the sensor data collection, analysis, and distribution that is vital to the safety of the responders and to the success of the Emergency operation. The details provided in this disclosure may illustrate how these aspects are addressed. Multimedia conference capabilities are also important to the response team and to the staff situated remote from the area of operation in a Command Post. The ability to co-locate service applications with the eNB 102 elements offers back haul 112 utilization savings and minimizes delays in providing information to the response team. The following example scenario may illustrate how the APN network may be used to support these important requirements of an Emergency Action application.

Figure 32:
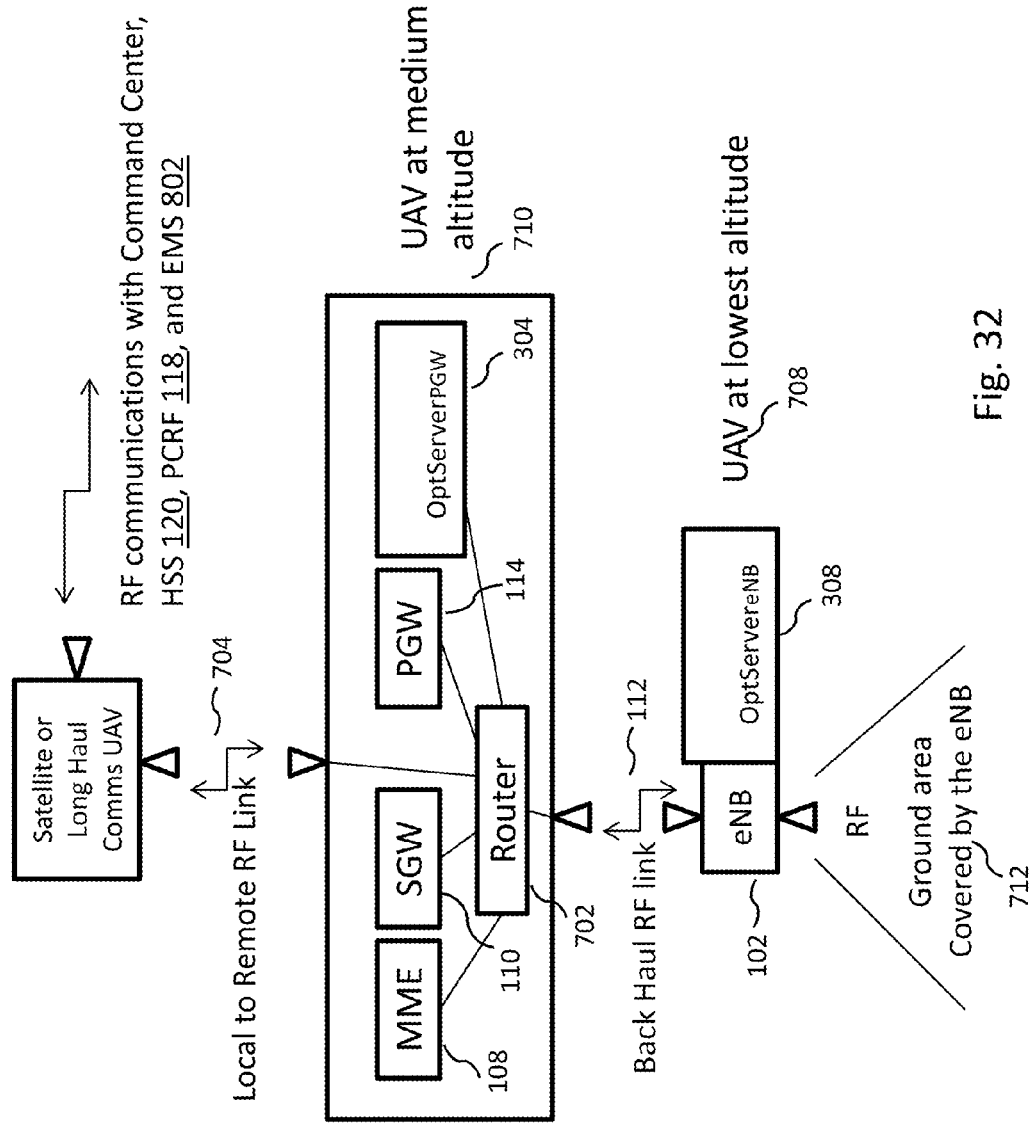
FIG. 32 depicts an embodiment for an ad-hoc network deployment for an emergency action scenario.

The example scenario that illustrates the use of the APN LTE Wireless Network as a sensor platform is one in which wireless infrastructure has been destroyed in the disaster area. Hence, an Unmanned Aerial Vehicle (UAV) 708 is used to deploy an eNB 102 element and an OptServereNB 308 element above the disaster area. The UAV-based APN network deployment shown in FIG. 32 may be used in this example scenario. A single eNB 102 carried in a UAV 708 is assumed to be sufficient to cover the emergency area of operation. While FIG. 32 shows the use of a second UAV 710 to carry the Enhanced Packet Core (EPC) components (MME 108, SGW 110, and PGW 114), it is understood by those skilled in the art that communications from the eNB 102 to a ground-based EPC is another possible deployment option.

Figure 33:
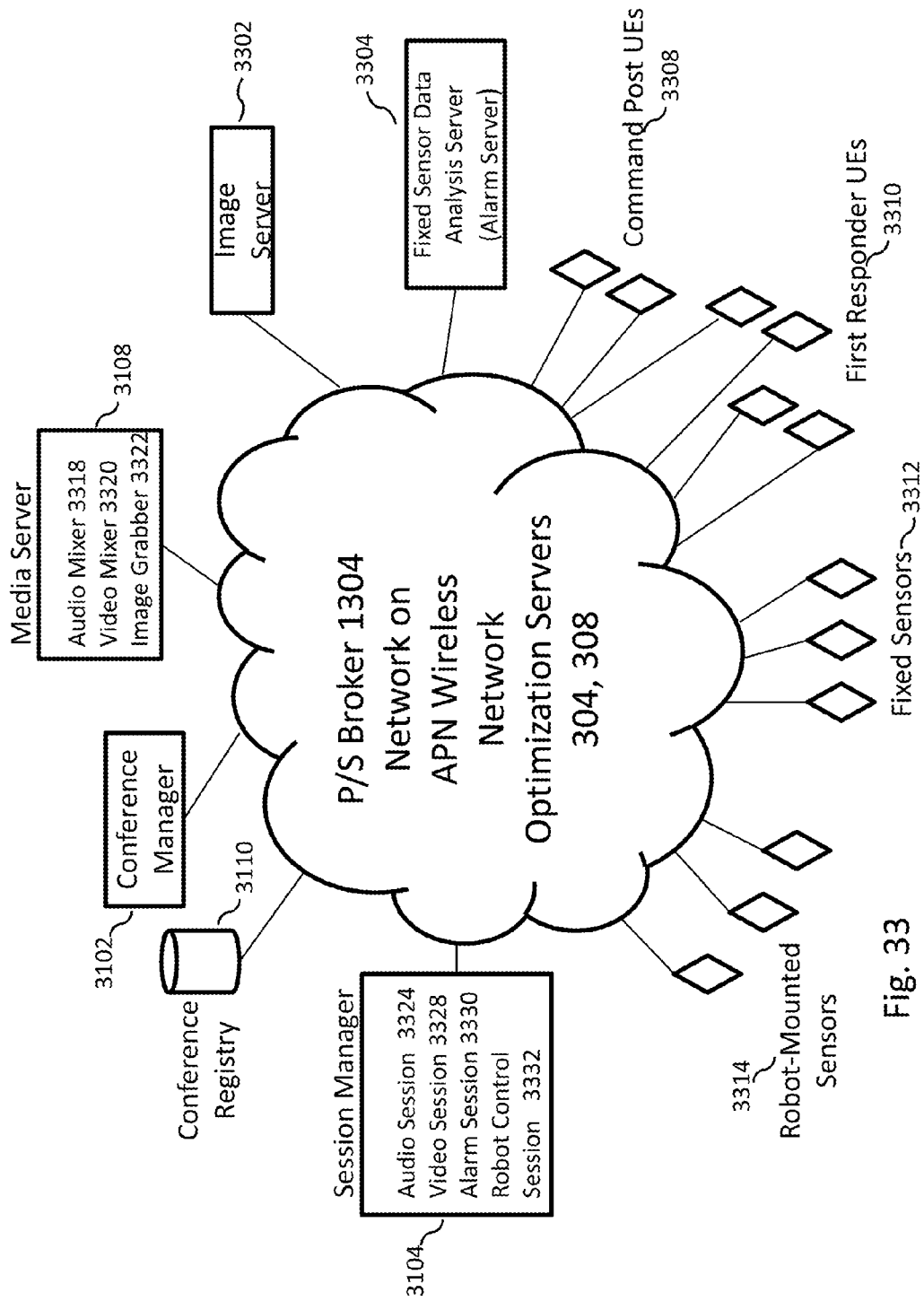
FIG. 33 depicts a functional view of an embodiment emergency action service architecture involving sensor processing.

Table 7 shows the main players and functions involved in the communications and processing aspects of the Emergency Action operation example scenario, and indicates where each function may be deployed in the architecture. A functional architecture for this scenario is shown in FIG. 33.

Figure 34:
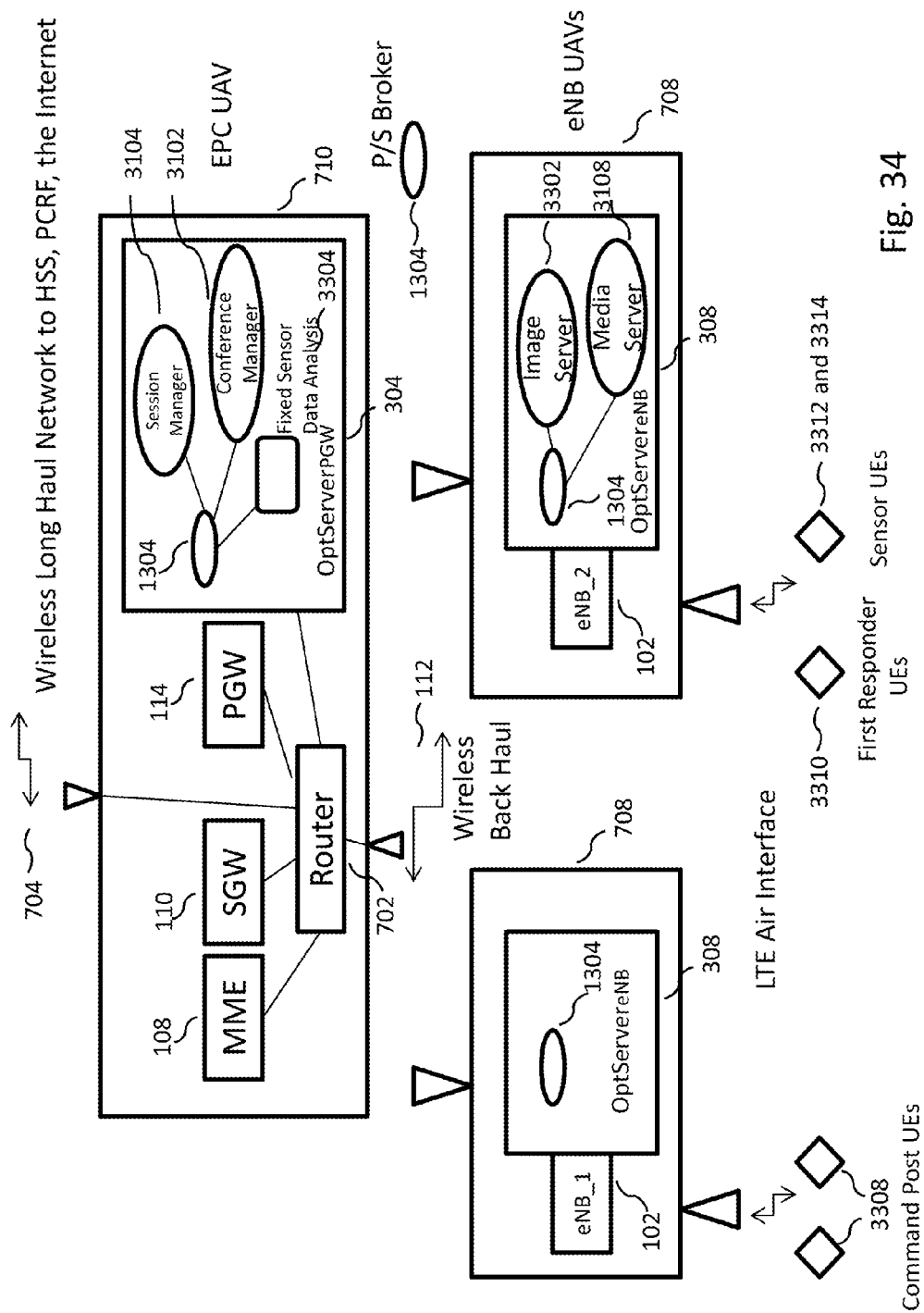
FIG. 34 depicts an embodiment deployment view of an emergency action service architecture involving sensor processing.

A deployment architecture for this scenario is shown in FIG. 34 (it should be understood by those skilled in the art that not all the service functions listed in Table 7 are shown in FIG. 34 because of the lack of space in the figure).

TABLE 7

Actors, Deployment, and Descriptions for an Example Emergency Action Scenario Involving Sensors

| Function | Description | Where Deployed | Notes |
| --- | --- | --- | --- |
| Emergency responder team members and their UE devices 3310 | Humans engaged in first responder activities in the emergency area of operation. | Deployed across the area of operation. | All are in an audio conference call, so their actions can be coordinated and modified based on conditions in the field. |
| Conference Chairperson UE device 3310 or 3308 | The entity recognized by the Conference software as being able to make decisions about the conference. | Generally, one of the emergency responders 3310, or someone at the command post 3308. | Decides whether to give the "floor" of the conference to someone else; decides whether someone not on the initial attendance list can join the conference. |
| Command Post personnel and their UE devices (computers, mobile phones) 3308 | Personnel who can coordinate the actions of human responders 3310 and sensors 3312 and 3314. | Deployed at a fixed location distant from the area of operation. | Is in audio conference with all human responders 3310 and command post personnel 3308, and has control of the robotic sensors 3314 deployed into the emergency operational area. |
| Conference Manager 3102 | A software service function that manages the Conference. | Deployed on the OptServer$_{PGW}$ 304 node. | Starts the conference, terminates the conference, interacts with the Session Manager 3104 to start and terminate media sessions. Keeps a database of conference attendees and session templates. Keeps the set of roles participants play in the conference, including the identity of the Conference Chairperson. |
| Session Manager 3104 | A software service function that manages the media sessions that are part of the conference (e.g., audio session 3324, video session 3328, Alarm session 3330, robot control session 3332). Admits participants to the sessions they select, and sends information that enables communications within the session. | Deployed on the OptServer$_{PGW}$ 304 node. | Based, generally, on control commands from the Conference Manager software; creates the sessions for a Conference, and manages the data streams that are used by participants to use in each of the sessions. |
| Media Processing Server 3108 | Audio mixer 3318 to handle multiple audio streams that arrive simultaneously. Publish mixed audio stream to each participant. Video mixer 3320 to handle multiple concurrent video streams in the video session. Image Grabber 3322 to "grab" a single image from each video stream, so a representation of that user or sensor video can be displayed on each participant 3308 or 3310 device. Other functions may include vocoder translations. | Deployed on the OptServer$_{eNB}$ 308 associated with the eNB 102 element that serves the Emergency Action operational area. | When a participant audio stream is added to the conference, the participant's stream is added to the audio stream-mixing function 3318, and a stream containing the audio of all participants 3308 and 3310 except that one is Published to a unique topic Subscribed-to by the added participant 3308 or 3310. |
| Fixed Sensors (a special purpose UE as far as the LTE network is concerned) 3312 | In this scenario, the fixed sensors are carried to a spot by a robot, and dropped into place at the command of a human operator 3308 or 3310. These sensors detect such things as fire, smoke, specific chemicals, movements, sounds. No video. | Deposited throughout the Emergency area of operation, based on directions from the Command Post 3308 or from first responders 3310 to the mobile robots that carry them. | The fixed sensors 3312 are not involved in the conference. Instead, they send their data to the Fixed Sensor Data Analysis Server 3304. |

TABLE 7-continued

Actors, Deployment, and Descriptions for an Example Emergency Action Scenario Involving Sensors

| Function | Description | Where Deployed | Notes |
|---|---|---|---|
| Mobile Sensors (robot-mounted; a special purpose UE as far as the LTE network is concerned) 3314 | In this scenario, these sensors are mounted on moving robots, whose motions in the emergency area of operation are controlled by the Command Post personnel 3308, or by a First Responder 3310. The video streams they generate are part of the Conference. Their control data stream is also used to control the movement of the robot that carries the sensor. | These robot-mounted sensors are distributed throughout the emergency area of operation. | When a robot-mounted sensor is set up near the operational area, someone at the command post 3308, or a first responder 3310, positions the robot to a point where the fixed sensor(s) 3312 that it carries can be deposited. Further control commands direct the robot to other points in the operational area, where video of the area is distributed to the conference participants. |
| Fixed Sensor Data Analysis Server 3304 | This function receives the data from each of the fixed sensors 3312 deployed in the emergency area of operation. If an alarm condition is determined to exist, an Alarm is Published to all conference participants 3308 and 3310 who are set up to receive the Alarm. | Deployed on the $OptServer_{PGW}$ 304. | Each conference participant 3308 or 3310 can obtain details about the Alarm, including type of Alarm (e.g., movement or sound from a disaster victim is detected), location of the sensor, etc. The command post 3308 (or any participant 3310 gaining control of the conference) can direct a robot-mounted sensor 3314 to the location of the Alarm to send video information. |
| Image Server 3302 | Stores images sent from cameras integrated into the Response Team members' UEs 3310. Delivers images to participants 3308 and 3310 for display. | Deployed on the $OptServer_{eNB}$ 308 associated with the eNB 102 element that serves the Emergency Action operational area. | During the Emergency operations, many detailed photos may be taken of different areas to get closer, different, better looks at the scene. Images can be used for historical comparison, or for near real-time information gathering and analysis. |
| P/S Broker 1304 | Provides the attachment point for each entity (sensor 3312 and 3314, UE 3308 and 3310) involved in accessing the APN LTE network and obtaining the services offered on the APN Optimization Servers 304 and 308. Allows connected entities to Publish and Subscribe to "Topics." Routes a message Published to a Topic to all entities that have Subscribed to that Topic. | Deployed on the $OptServer_{PGW}$ 304 and on the $OptServer_{eNB}$ 308. | Decouples senders of data from receivers of the data. Allows an arbitrary number of Publishers and Subscribers to be involved in a Service, and allows entities to be added to, or deleted from, the service dynamically. |

Because of the deployment of the Media Server 3108 on the OptServereNB 304 that is located over the Emergency Action operational area, all audio and video data streams may be mixed and delivered to each first responder 3310 team member with little use of the back haul 112 interface. The audio data stream from each first responder 3310 may be routed via its re-directed dedicated LTE bearer 312 to the OptServereNB 308 associated with eNB_2 102, which covers the area of operation. The audio streams are mixed in the Media Server 3108, so concurrent packets from different user audio streams may appear in the single audio data stream that each participant 3308 and 3310 receives from the Media Server 3108 (the packets sent by a specific user 3308 or 3310 are not mixed in the audio stream returned to that user). The back haul 112 is not used in these interactions because of the re-directed bearer 312 used to carry the data to/from the UE 3310 and the OptServereNB 308, where the Media Server 3108 executes (see FIG. 3 for the meaning of a redirected bearer 312).

If a UE 3308 located at the Command Post joins the Audio session 3324 of the conference, the audio packets from that UE 3308 may be routed via the P/S Broker 1304 associated with eNB_1 102 via the wireless back haul 112 to the P/S Broker 1304 associated with the PGW 114 to the P/S Broker 1304 associated at eNB_2 102, and then to the Media Server 3108. The mixed audio stream generated at the Media Server 3108 for that UE 3308 may be routed via the reverse path. Hence, lower packet delays may be achieved for the first responder team members 3310, and lower back haul 112 utilization may be achieved overall than with a traditional architecture.

The Image Server 3302 may be deployed on the OptServereNB 308 that is associated with eNB_2 102. Hence, no back haul 112 may be utilized to store images collected by the first responder 3310 team members. Because each image is a large file, the back haul 112 savings are significant with this architecture. When images are uploaded, the application on the UE 3310 for image handling may tag the image with a date, time, GPS coordinates, and user comments. By interacting with the Image Server 3302, any UE 3308 or 3310 in the operation may obtain a list of images, filtered by criteria set by the user. Any user may thus view any of the large set of detailed images that may be recorded during the team operation. In this case, because of the APN Optimization Server 304 and 308 architecture, the image download to the UE 3310 or 3308 comes from the OptServereNB 308 with little delay, and no back haul 112 may be used to transmit the images to the first responder team members 3310. See FIG. 34.

With the UAVs 708 and 710 deployed over the operational area, the first responder team 3310 may approach the disaster area, load the mobile robots 3314 with their fixed sensor 3312 payloads, and turn on the mobile robots 3314. The responder team members 3310, the Command Post personnel 3308, and the robots 3314 with their video sensors may all join the multimedia conference. In this scenario, the robots 3314 may only send a video stream. They do not receive video, but they do have a control channel 3332 to receive commands for movement and for control of the fixed sensors 3312 that they carry. The mobile robot sensor video streams 3314 may appear on the displays of the command Post 3308 personnel, who use the communications control channels 3332 to direct the robots further into the disaster area. Based on the video stream from a particular robot-mounted sensor 3314, its fixed sensor 3312 payload may be deposited on the ground, and turned on. The software/firmware in these fixed sensors 3312 may connect to the LTE network, and then to the P/S Broker 1304 network, locate the Fixed Sensor Data Analysis service 3304, and announce themselves and their capabilities (e.g., fire detection, sound detection, chemical detection, motion detection) and their GPS location coordinates. The data sent from each fixed sensor 3312 may be collected and analyzed by the Fixed Sensor Data Analysis service program 3304 that runs (in this example) on the OptServerPGW 304, and an Alarm may be generated based on the data received from the fixed sensor 3312. All participant UEs 3310 and 3308 Subscribe to receive the Alarm data stream 3330.

Meanwhile, all participants 3308 and 3310 may be able to communicate via the voice conferencing setup, and may be able to select the video feed from any of the robot-mounted sensors 3314, or from videos played by any first responder 3310. Based on the needs of the first responders 3310, robots 3314 may be commanded to move in particular directions. The commands may come either from the Command Post personnel 3308, or from a first responder team member 3310. As an example, a robot 3314 near the area of a fixed sensor 3312 can be sent to "investigate" an Alarm that is generated by the data from that fixed sensor 3312. Also, video streams that may be generated by the UEs 3310 of the first responders are made available to all the conference participants 3308 and 3310 via the Conference video session capabilities. The conference participants 3308 and 3310 may have the ability to select a video data stream for display from a list of all the entities in the conference that generate video data, via the still images available from the Image Grabber 3322. Likewise, the images captured by the response team mobile devices 3310 may be selected for display on any participant's UE 3308 or 3310.

The following sub-sections of this disclosure provide details, understandable to those skilled in the art, for how the Multimedia Conference may be set up to allow audio and video communications among all the conference participants, how the video streams from the mobile robot-mounted sensors 3314 may be made available to all the conference participants 3308 and 3310, how the Alarm notification messages may be made available to the conference participants 3308 and 3310, and how control channels may be set up to allow users at the Command Post 3308 to control the motions of the mobile robots 3314, and to control the locations at which the fixed sensors 3312 are deposited by the mobile robots 3314. The interactions among participant UE 3308 and 3310 devices and the Image Server 3302 is outside the scope of the multimedia conference, as are the interactions between the fixed sensors 3312 and the Fixed Sensor Data Analysis server 3304. The Image Server 3302 interactions and the Fixed Sensor Data Analysis Server 3304 interactions with the fixed sensors 3312 are also described in the succeeding sub-sections in this disclosure.

Setting Up the Multimedia Conference

The Conference Manager 3102 application may have associated with it a Registry 3110 of Conferences. The data for each Conference stored in the Registry 3110 may have the following information: Conference Name, Conference ID (defined by the Conference Manager 3102 when the Conference is activated), Start time, end Time, attendee list, chairperson ID, list of Roles and Capabilities, and a Template for each Session that can be selected for this Conference. A field in each Session Template may indicate whether the Session should be activated by the Conference Manager 3102 when the Conference is started. Attendees may not join a session until the session is activated, and sessions may be activated dynamically by any participant 3308, 3310, or 3314 once the Conference starts. In this scenario, all the sessions are started by the Conference Manager 3102, based on the information in the Registry 3110 for the "Emergency Action" Conference. The Conference Manager 3102 may also create a set of Topics for use in the Publish/Subscribe communications schema for all the activities required in the Conference. Additional Topics may be created and distributed by the Conference Manager 3102 as each participant 3308, 3310, or 3314 joins a session, so the participant may be able to receive a unique and appropriate view of the conference data.

The Registry 3110 information may be created by any authorized UE 104 to set up a future Conference, but can also be set up by an Element Management System 802. In this scenario, assume that the Registry 3110 entry for the "Emergency Action" conference has already been set up when the Emergency Operation needs to begin.

UEs 3308, 3310, and 3314 may join and leave the Conference at any time. UEs 3308, 3310, and 3314 may join or leave any, all, or a subset of the Sessions 3324, 3328, 3330, and 3332 that are activated for the Conference, and for which they are allowed to join. Hence, in this Emergency Action scenario, the number of participants 3308, 3310, and 3314 may change dynamically. For instance, one or more robots 3314 may be disabled, and new ones may replace them, or additional ones may be added to the operation as needed.

Table 8 may show some of the information the Registry 3110 may contain for the "Emergency Action" Conference before and after the Conference is Activated (some entries may be made after the Conference Starts, such as ConferenceID and the list of Activated Sessions and their Topics). The entries may be made by the Conference Manager 3102 once the Conference is started, but may be made by any entity (e.g., EMS 802 or a user) before the Conference is started.

TABLE 8

Emergency Action Conference Parameters

| Conference Parameter | Value(s) | When Entry Is Made |
|---|---|---|
| Conference Name | Emergency Action | Prior to Conference Start |
| ConferenceID | <a number, or a text string> | When the Conference is Started |
| Start Time | <time>, but IMMEDIATE in this scenario | Prior to Conference Start |
| End Time | <time>, but in this case UNTIL-TERMINATED | Prior to Conference Start |
| Attendee List | May be names of users, or IMSIs of user UEs, or names such as "Alarm Generator," or generic IDs such as "any first responder," "any robot," or "any Commander" | Prior to Conference Start, although additional entries may be made via the EMS 802, or by approval of the Chairperson |
| Chairperson ID | <a unique ID in the Conference>: may be an IMSI or a participant name | Prior to Conference Start, but the Chairperson may be changed dynamically via RequestChair/Give Chair interactions between participants and the Conference Manager 3102 |
| Roles and Capabilities | "FirstResponder," (all sessions); "CommandPost," (all sessions); "AlarmGenerator," (send alarms and alarm information, receive alarm queries); "MobileRobot," (send video, receive commands); "FixedSensor," (send data); | Prior to Conference Start |
| Conference Topics | ServiceControl/ConfSvc/ EmergencyAction/<confID> (the Conf Mgr Subscribes to this Topic); append/ <IMSI> to direct Conf Mgr responses to a particular UE | When the Conference is Started |
| Session Topics: | See next items | When Session is Activated; in this scenario, when the Conference is Started |
| Audio Session control | ServiceControl/ConfSvc/ EmergencyAction/<confID>/ audio | When the audio session 3324 is activated; in this case, when the Conference starts. |
| Video Session control | ServiceControl/ConfSvc/ EmergencyAction/<confID>/ video | When the video session 3328 is activated; in this case, when the Conference starts. |
| Alarm Session | ServiceControl/ConfSvc/ EmergencyAction/<confID>/ alarm | When the Alarm session 3330 is activated; in this case, when the Conference starts. |
| Robot Control Session | ServiceControl/ConfSvc/ EmergencyAction/<confID>/ robotControl | When the Robot Control session 3332 is activated; in this case, when the Conference starts. |
| Session Control | ServiceControl/ConfSvc/ EmergencyAction/<confID>/ sessionUpdate | When the first session is activated; in this case, when the Conference starts. Sessions may be activated or terminated by participants Publishing messages to this Topic. The Conference Manager 3102 and the Session Manager 3104 may use a separate pair of Topics to communicate initially, before the Session Manager 3104 can learn the <confID> assigned by the Conference Manager 3102. |
| Session Notification | ServiceControl/ConfSvc/ EmergencyAction/<confID>/ <sessionName-Notify> | This generic Topic may be used by the Conference Manager to notify all UEs that participate in a particular session of changes in the session participant list. All UEs in a particular session Subscribe to this Topic to receive these updates. |

See FIG. 35, FIG. 36, FIG. 37, and FIG. 38 for the following description of how the Conference may be started and operated. The use of the P/S Broker 1304 networking is omitted in these figures for the sake of simplifying the figures, but it should be apparent to those skilled in the art that the messaging interactions occur through the actions of the P/S Broker 1304 middleware system.

Figure 35:
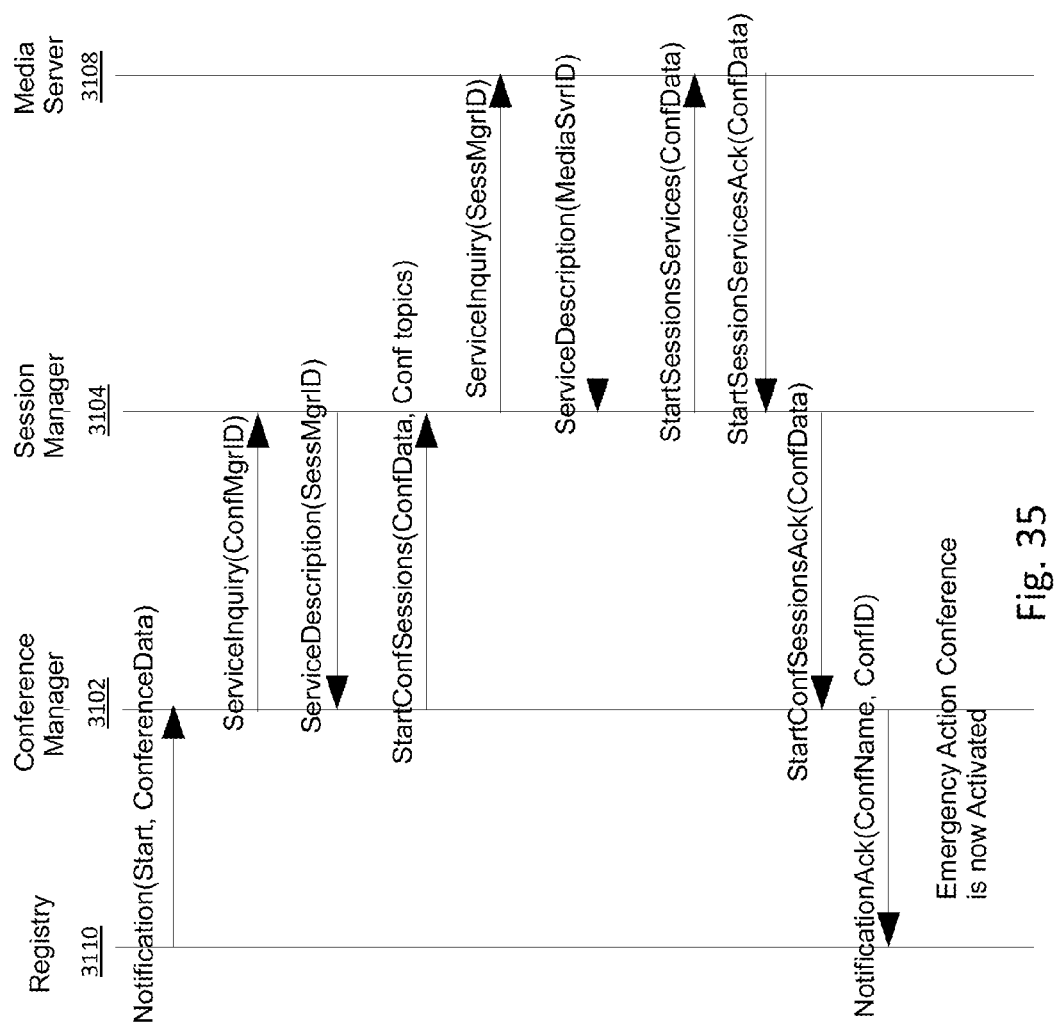
FIG. 35 depicts an embodiment for starting an emergency action multimedia conference.

FIG. 35 shows how the Conference may be started. Because the Registry 3110 contains an entry for the Emergency Action Conference indicating that it start IMMEDIATELY, once the Registry 3110 entry is made, the Conference Manager 3102 may be notified. The Conference Manager 3102 may start the Conference, assign a ConfID to the Conference, and Subscribe to the Topic: ServiceControl/ConfSvc/EmergencyAction/<confID>. The <confiD> may embed the uniqueID assigned to this Conference Manager 3102, as opposed to any other instance, so messages pertaining to its conferences are routed by the P/S Broker 1304 network only to this Conference Manager 3102 instance.

The Conference Manager 3102 may determine from the Registry 3110 information the Sessions that need to be started, and may Publish a Service Inquiry to the topic ServiceInquiry/ConfSessionkConfMgrID> to locate a Session Manager 3104 instance, where <ConfMgrID> may be a unique ID assigned to this Conference Manager 3102 instance. All Session Manager 3104 instances may Subscribe to the Topic ServiceInquiry/ConfSession/* to receive these Inquiries. In this case, there is just one Session Manager 3104 instance, so the Conference Manager 3102 may receive one Service Description reply that carries a SessMgrID that is unique among all the Session Manager 3104 instances. The Session Manager 3104 may Subscribe to its unique control channel that is outside the scope of any particular Conference (ServiceControl/ConfSession/<SessMgrID>). With each communicating entity in possession of the unique ID assigned to the other, the Conference Manager 3102 and the Session Manager 3104 may now exchange messages via the P/S Broker 1304 network.

The Conference Manager 3102 may Publish a message to the Session Manager 3104 to indicate the start of the Emergency Action Conference, and may provide a list of sessions that need to be started. The Topics for each Session may also be included in the information passed to the Session Manager 3104. In this case, an audio session 3324, a video session 3328, an Alarm session 3330, and a Robot Control session 3332 may be activated. Because an audio conferencing session 3324 is activated, and because a video conferencing session 3328 is activated, the Session Manager 3104 must locate a Media Server 3108 to reserve and start the audio mixer 3318, video mixer 3320, and Image Grabber 3322 capabilities for the Conference participants, so they are available when each participant joins the corresponding session.

The location of the Media Server 3108 may involve a Service Inquiry being Published by the Session Manager 3104 to the generic topic Subscribed-to by all Media Server 3108 instances (in this example, there is just one instance), and a Service Description response being returned to a Topic made unique by adding the uniqueID of the Session Manager 3104 instance. The reply contains the uniqueID assigned to the Media Server 3108 instance, and from that point onwards, the two instances may communicate via the P/S Broker 1304 network to set up the media processing for the audio and video sessions. The availability of audio mixer 3318, video mixer 3320, and image grabber 3322 resources may be included in the Service Description response generated by the Media Server 3108, so the Session Manager 3104 is able to select from among several Media Servers 3108 when there is more than one instance available in the network. Hence, the Topic Subscribed-to by the Session Manager 3104 for the audio session in this Conference may be ServiceControl/ConfSvc/EmergencyActionkconfID>/audio/<SessMgrID>. The Topic Subscribed-to by the Media Server 3108 for the audio session in this Conference may be ServiceControl/ConfSvc/EmergencyActionkconfID>/audio/<MediaServerID>. The audio mixing resources 3318, video mixing resources 3320, and the image grabbing resources 3320 may be reserved at the Media Server 3108 instance for the Emergency Action Conference. The Emergency Action Conference is now in the Activated state. The Conference Manager 3102 may return an Acknowledgement to the Registry 3110 to indicate the start of the Conference, and may provide the Registry 3110 with the ConfID that has been assigned to the Conference. This value must be passed to each participant to allow the participant to Join the Conference.

FIG. 35 shows the interactions discussed above for starting the Emergency Action Conference. As noted, the use of the P/S Brokers 1304 to route these messages is not shown in FIG. 35 as a simplification. The inclusion of the P/S Broker 1304 routing is therefore to be understood by the reader as underpinning each of the interactions shown in FIG. 35. It should be remembered that the only point-to-point connections are those between an entity (e.g., Session Manager 3104, Media Server 3108, sensor 3314) and a P/S Broker 1304. There are no explicit connections between the communicating service entities, sensors, or participant UEs. Also, every message sent is actually Published to a Topic, and every message received implies a Subscription to the Published Topic. The Topics that may be used in this scenario may be found in Table 8.

Participants Join the Conference and Join Sessions

Figure 36:
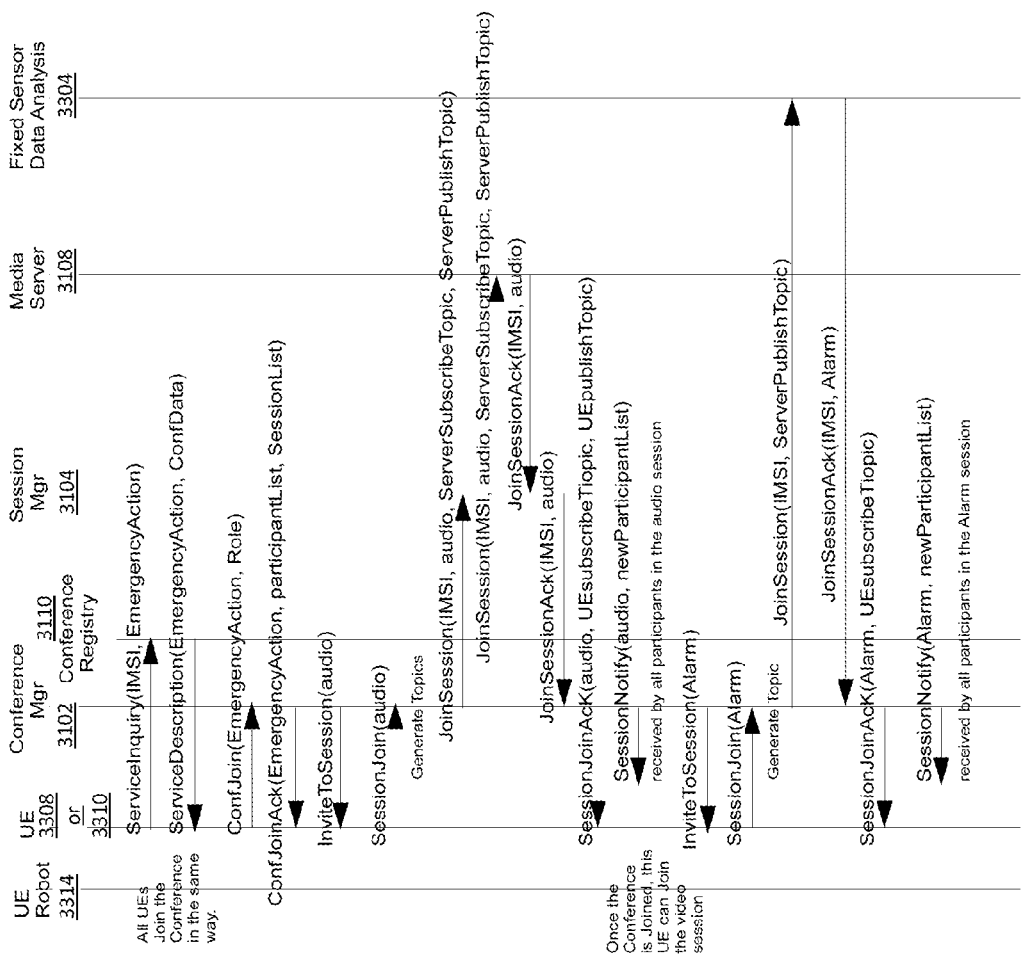
FIG. 36 depicts an embodiment for participants joining a conference and joining their sessions.
Figure 37:
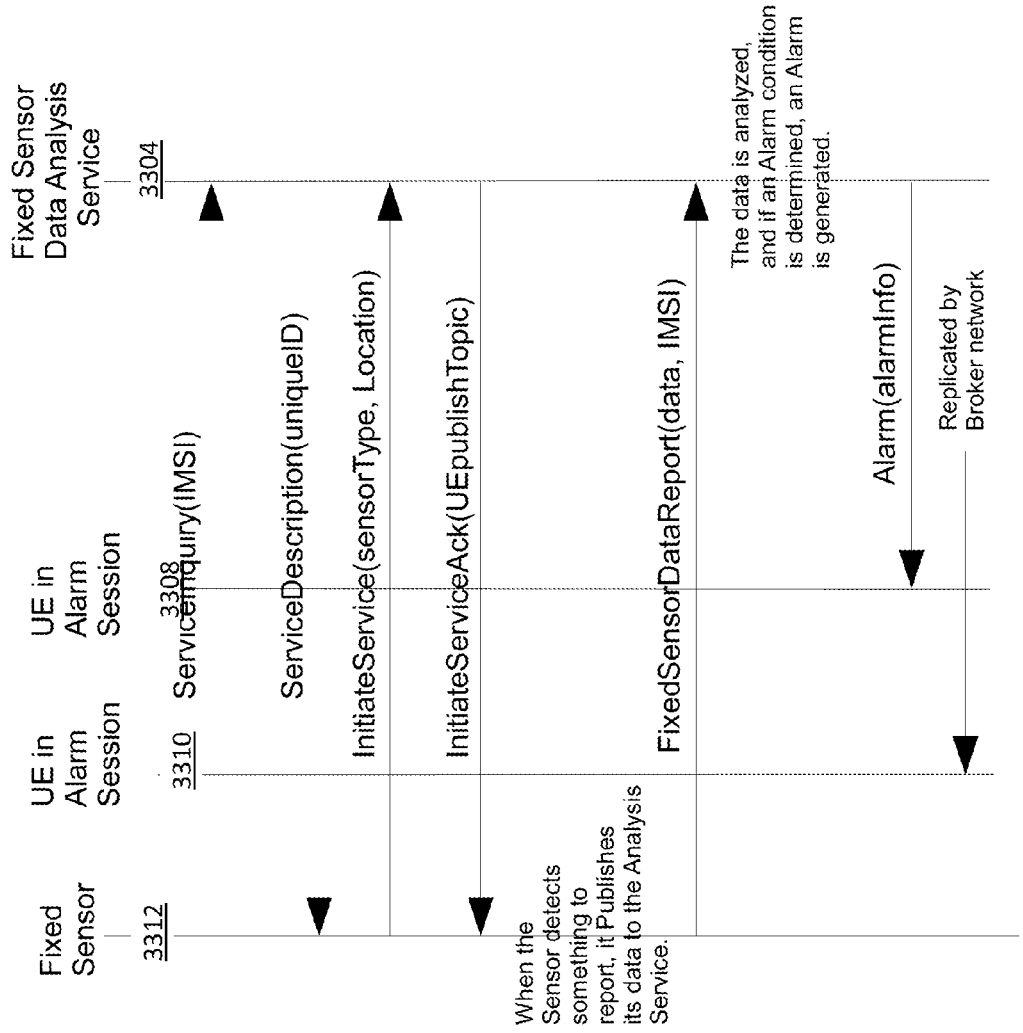
FIG. 37 depicts a fixed sensor data collection, analysis, and alarm generation and distribution.

See FIG. 36 for this description of how entities may join the Conference and the Sessions allowed to them. Each conference participant UE 3308, 3310, and each sensor 3314, needs to communicate with the Conference Manager 3102 to join the Conference. For this and other Conference control pur-poses, the Conference Manager may Subscribe to the Topic: ServiceControl/ConfSvc/EmergencyAction/<confID>.

Hence, the participant device must obtain both the Conference Name and the <confID> before it is able to Publish a request to join the Conference. While the Conference Name may be provisioned into the participant device, the <confID> may not, because it is assigned by the Conference Manager 3102 when the Conference is started. This behavior adds a degree of security to the Conference Join procedure.

When the user 3308, 3310, or 3314 selects to Join a Conference, the UE 3308, 3310, or 3314 may Publish a Service Inquiry to the Topic ServiceInquiry/ConfSvc/Registry/<IMSI>, where <IMSI> is the unique value assigned to the UE. Because all Registry 3110 instances may have Subscribed to the Topic ServiceInquiry/ConfSvc/Registry/*, the UE 3308, 3310, or 3314 message may be routed by the P/S Broker 1304 network to all Registry 3110 instances. The Service Description response message Published by a Registry 3110 instance may include the unique UE 3308, 3310, or 3314 IMSI in the Topic, to allow routing the response to this particular UE 3308, 3310, or 3314. The ServiceInquiry message may contain the Conference Name (Emergency Action), so the Registry 3110 may respond if it has information for that Conference. In this example, there is only one Registry 3110, so just one Service Description response message may be returned to the UE 3308, 3310, or 3314. It contains the unique ID of the Conference Manager 3102, and the information about the Emergency Action Conference, including the <confiD>. (In this case, the Conference Name may be provisioned into the sensors 3314 and other UEs 3308 and 3310 that need to join the conference.)

The UE 3308, 3310, or 3314 may now Publish a Join message to the Conference Manager 3102 for the Emergency Action Conference. The list of Attendees available to the Conference Manager 3102 may allow it to admit the UE 3308, 3310, or 3314 to the Conference. The Join may have information related to the Role of the UE 3308, 3310, or 3314, and hence, the Conference Manager 3102 may determine the set of sessions the UE 3308, 3310, or 3314 may be able to join, and may send the Session list to the UE 3308, 3310, or 3314 in an Acknowledgment to the Join request. Thus, the UE 3308, 3310, or 3314 is able to display all the Sessions that the UE 3308, 3310, or 3314 is able to Join. The Conference Manager 3102, as the initiator of the Sessions, sends an Invite( ) message to the UE 3308, 3310, or 3314 for each session that the UE 3308, 3310, or 3314 is able to Join. The UE 3308, 3310, or 3314 may not Join a Session without first receiving an Invite( ) from the Session initiator, which may be the Conference Manager 3102 in this scenario.

In other Conference situations, the user may select the Sessions to be Joined. In this case, the UE 3308, 3310, or 3314 may be programmed to automatically Join those sessions pertinent to its Role. Hence, the UEs 3308 of Command Post personnel and those UEs 3310 of First Responders may accept a Join Invite( ) to the audio 3324, video 3328, Alarm 3330, and Robot Control 3332 sessions. The robot-mounted video sensors 3314 may accept a Join Invite( ) only of the video session 3328 with an ability only to send/Publish video, but not to receive it. The Fixed Sensors 3312 are not participants in the Conference in this example scenario. They may only Publish their data to the Topic indicated in the next subsection, where the Topic is Subscribed-to by the Fixed Sensor Data Analysis Service 3304.

When the UE 3308, 3310, or 3314 Publishes a request to Join a Session (e.g., for a video session 3328: ServiceControl/ConfSvc/EmergencyActionkconfID>/video), the Conference Manager 3102 may receive the request, determine from the Role of the UE 3308, 3310, or 3314 whether the request can be granted, and if it can, may generate one or more Topics to assign to the UE 3308, 3310, or 3314 for the session. For instance, a Join of an audio session 3324 may generate two Topics. One is for the UE 3308 or 3310 to use in Publishing its audio stream. The other is for the UE 3308 or 3310 to Subscribe-to, so it may receive the mixed audio stream being sent to it by the audio mixer 3318 in the Media Server 3108. The mixed audio stream has the concurrent audio packets generated by all UE participants, except for the UE receiving the stream. Robot-mounted sensor UEs 3314 do not participate in the audio session 3324 in this scenario.

For a video session 3328, two Topics may be generated for the First Responder 3310 and for the Command Post 3308 UEs. Only one Topic may be generated for a robot-mounted sensor 3314 UE. The first Topic may be used by the UE 3308, 3310, or 3314 in Publishing its video stream. The second, if generated, may be for the UE 3308 or 3310 to Subscribe-to to receive the mixed video stream being generated by the video mixer 3320 at the Media Server 3108. Here, too, the mixed video contains the video streams generated by all video-generating-sensors and by all participant UEs 3308, 3310, or 3314, except for the receiving UE. (Actually, a sequence of grabbed images, one from each participant 3308 and 3310 and sensor stream 3314, may be sent. When the user selects a particular video stream, only the video stream from the selected participant 3308 or 3310, or sensor 3314, may be sent to the requesting UE 3308 or 3310.)

For an Alarm session 3330, one Topic may be generated, and is Subscribed-to by the UE 3308 or 3310 to receive the Alarms. Only First Responder 3310 and Command Post 3308 UEs may Join the Alarm session, and most likely, the same Alarm Topic may be assigned to all UEs 3308 and 3310 that Join the Alarm session, so the Alarm is Published once by the Fixed Sensor Data Analysis 3304 Alarm generator function, and all Subscribing UEs 3308 and 3310 may be able to receive it.

For the Robot-control session 3332, two Topics may be generated. The first may be for the UE 3308 or 3310 to use to Publish Robot control commands. The second may be for the UE 3308 or 3310 to use to Subscribe for reception of Robot responses to those commands.

As the participant list changes for each Session, the Conference Manager 3102 may Publish an updated session participant list, so it is received by each UE 3308 and 3310 participating in that Conference session. Per Table 8, all UEs 3308 and 3310 participating in a session whose name is "sessionName" Subscribe to the Topic: ServiceControl/ConfSvc/EmergencyActionkconfID>/<sessionName-Notify> to receive the Session participant change notices for that particular session (e.g., for the video session 3328, the last part of the Topic string may be "video-Notify").

The Topics generated by the Conference Manager 3102 may not be strings, but may be 8-byte numbers. Transmission of audio 3324 and video 3328 streams requires low delay, so the use of String Topics may be avoided to reduce the time spent by the P/S Broker 1304 network to determine routing of these packets. Because the Topic generation is handled by the Conference Manager 3102, their uniqueness may be guaranteed. When a UE 3308, 3310, or 3314 joins a Session, the Conference Manager 3102 has to generate the Topic(s), and may send the Topics to the UE 3308, 3310, or 3314 and also to the Session Manager 3104, which takes care of Publishing them to the Media Server 3108, where the audio and video streams from UEs are collected, and where the mixed streams 3324 and 3328 are Published. In the case of the Alarm session 3330, the Conference Manager 3102 may send the Topic to the Fixed Sensor Data Analysis service 3304, as well as to the UEs 3308 and 3310 that Join the Alarm session 3330. For the Robot-control session 3332, the Topics may be sent to the Robot participants 3314 that Join the Robot-control session 3332 (they all do in this scenario), as well as to the UEs 3308 and 3310 that Join the Robot-control session.

Meanwhile, the First Responder UEs 3310 and the Command Post personnel UEs 3308 may display all the available sessions to the user, as well as those sessions that the user may have Joined.

FIG. 36 shows the message interactions that may occur when a UE 3308, 3310, or 3314 Joins the Conference, and then subsequently Joins one or more Sessions. Again, the P/S Broker 1304 routing and interactions are omitted in FIG. 36 for the sake of simplifying the messaging diagram. To keep the interactions to a limited number in FIG. 36, all the Session Joins for the UE 3308, 3310, or 3314 are not shown. Readers who are skilled in the art may recognize that all sessions required by a particular UE-type may be joined in the manner indicated in FIG. 36.

Once the UE 3308, 3310, or 3314 has Joined all of its sessions, it may participate in all the services allowed to it during the Conference. A UE 3308 or 3310 that has joined the audio session 3324 may now Publish its audio packets to the Topic received in the Join(audio) interactions. It also may receive the mixed audio stream 3324 via the audio Topic to which it now Subscribes for that purpose. The user 3308 or 3310 is thus in audio conference with every other user 3308 and 3310 in the audio session 3324. Likewise, the UE 3308 or 3310 may display the grabbed image of each video stream in the video session 3328 of the Conference, including those of the Robot-mounted sensors 3314 and those of the First Response team members 3310. When a user 3308 or 3310 selects one of the grabbed images on the display, the UE 3308 or 3310 may send a control message to the Conference Manager 3102 to select a particular video stream. The Conference Manager 3102 may send the instruction to the Session Manager 3104, which informs the Media Server 3108 to stop sending the mixed video stream to the Topic it Publishes on for that UE 3308 or 3310. The Conference Manager 3102 may return to the UE 3308 or 3310 the Topic number used by another UE 3308, 3310, or 3314 to Publish the selected video stream. The requesting UE 3308 or 3310 may Subscribe to that Topic, and may begin to receive the selected video stream. Thus a first responder 3310 or a command person 3308 may receive the video stream being sent by any sensor 3314, or by any video publisher 3310 in the conference. Note that the P/S Broker 1304 middleware being used in this disclosure does not change the way in which the generator of (in this case) a video stream transmits its video packets. If another end point (i.e., user 3308 or 3310) needs to receive that video stream, the P/S Broker 1304 network arranges for the delivery of the stream, as long as the new viewer Subscribes to the Topic being used to Publish the video stream packets.

Likewise, once the UE 3308, 3310, or 3314 Joins any other session, and the corresponding Topics are distributed appropriately, the UE 3308, 3310, or 3314 may be able to participate in that Session. First Responder 3310 and Command Post 3308 UEs may receive the Alarms generated by the Fixed Sensor Data Analysis service 3304. First Responder 3310 and Command Post 3308 UEs may send movement commands to the mobile Robot UEs 3314 (the Conference Manager 3102 distributes a Subscribe Topic to each mobile Robot UE 3314 when it Joins the Robot-control session 3332, and distributes that Topic as a Publish Topic to each First Responder 3310 and Command Post 3308 UE that joins the Robot-control Session 3332).

Fixed Sensor Data Collection and Alarm Distribution

As noted in the above descriptions in this disclosure, the Fixed Sensors 3312 in this scenario do not directly participate in the Multimedia Conference. Depending on their capabilities, they may monitor for movement, or may detect smoke or chemicals, or may detect heat, or sound, etc. When they sense something to report, these sensors 3312 may send their information to the Fixed Sensor Data Analysis service 3304, which may analyze the data, and generate an Alarm, if appropriate. Thus, when a Fixed Sensor 3312 is turned on, it may connect to the LTE network, it may connect to a P/S Broker 1304, and it may send a Service Inquiry to locate one or more instances of the Fixed Sensor Data Analysis service 3304 (there is just one in this scenario example). Suppose the Fixed Sensor Data Analysis service 3304 subscribes to the Topic ServiceInquiry/FixedSensor/* to receive the Service Inquiry messages. Each Fixed Sensor 3312 may Publish its Service Inquiry message to the Topic ServiceInquiry/FixedSensor/<myIMSI>. By including its unique IMSI value, the Fixed Sensor Data Analysis 3304 service software may Publish a Service Description reply that is routed by the P/S Broker 1304 network only to the Fixed Sensor 3312 that generated the Service Inquiry. The Service Description may include an identity value that is unique across all the Fixed Sensor Data Analysis 3304 service instances in the network. Once the Fixed Sensor 3312 and the Fixed Sensor Data Analysis 3304 program are in possession of the unique ID of the other party, the Fixed Sensor 3312 and the Analysis 3304 service program may thereafter exchange messages with one another via the P/S Broker 1304 network.

The Fixed Sensor 3312 may send an InitiateService( ) message to the Fixed Sensor Data Analysis 3304 service instance, providing information such as its GPS location coordinates and its detection capabilities. The Fixed Sensor Data Analysis 3304 service software may Publish an InitiateServiceAck( ) message in which it assigns a Topic that the Fixed Sensor 3312 is to use to Publish data for whatever it detects.

Meanwhile, as indicated above in FIG. 36, each UE 3308 and 3310 that Joins the Alarm session may receive a Topic to which it Subscribes to receive Alarms, and that Topic may also be maintained at the Fixed Sensor Data Analysis 3304 service program as a Publish Topic for Alarms. If all UEs 3308 and 3310 in the Session are to receive all Alarms, then the same Topic may be assigned to each UE 3308 and 3310 participant in the Alarm session. If different UEs 3308 and 3310 are to be made responsive to different sets of Alarms, then the Alarm session Topics assigned to different UEs 3308 and 3310 by the Conference Manager may be different. At any rate, when a Fixed Sensor 3312 Publishes data to its assigned Topic, it is received by the Fixed Sensor Data Analysis 3304 service software, analyzed, and if an Alarm is generated, it is Published to the Topic, or Topics, associated with that Alarm type. The Alarm may then be received by all UEs 3308 and 3310 in the Alarm session that have Subscribed to the Published Topic. These interactions are shown below in FIG. 37. The P/S Broker 1304 network is again omitted in FIG. 37 for the sake of simplifying the interaction diagram.

Image Collection, Storage, and Distribution

As noted in the above descriptions of the Emergency Action scenario, the UEs 3310 of the First Responder team members may be capable of taking pictures as the members go through the area of operation. These images may need to be loaded onto a server, and made available to the other members of the First Responder team 3310, as well as to the personnel 3308 located at the Command Post. The Image Server 3302 shown in FIG. 34 may run on the OptServereNB 308 associated with the eNB 102 that covers the area of operation, and may provide the means to upload and store these images, and to make them available for download to any participant 3308 or 3310 in the Emergency Action operation. By executing the Image Server 3302 software on the OptServereNB 308, no back haul 112 is used to carry the images from the First Responder team member UEs 3310 to the storage site, and no back haul 112 is used to download the images to members of the First Responder team 3310. Transmission delays over the back haul 112 are thus avoided in this architecture, and back haul 112 utilization is minimized, so it is available for other services. When images are downloaded to participants 3308 at the Command Post, the back haul 112 is used, because in this example scenario, their UEs 3308 access the network via a different eNB 102 element from the one associated with the OptServereNB 308 that runs the Image Server 3302. See FIG. 34.

When the user invokes the image handling program on the UE 3308 or 3310, the program must first locate an Image Server 3302 in the APN network. To do so, it may Publish a Service Inquiry message to the Topic ServiceInquiry/ImageService/<IMSI>, where <IMSI> is the unique ID assigned to the UE 3308 or 3310. Meanwhile, all Image Server 3302 instances Subscribe to the generic Topic ServiceInquiry/ImageService/*, and therefore receive the Service Inquiry messages that are Published by the UEs 3308 or 3310. The Image Server 3302 may Publish a ServiceDescription reply message to the Topic ServiceInquiry/ImageService/<IMSI>, so the P/S Broker 1304 network may route the reply only to the UE 3308 or 3310 that sent the Service Inquiry. In this example scenario, there is only one Image Server 3302 in the network, so one Service Description is returned to the UE 3308 or 3310 for its Inquiry. The Service Description message may contain the unique ID assigned to the Image Server 3302 program. Hence, from this point onwards, the UE 3308 or 3310 and the Image Server 3302 instance may exchange messages via the P/S Broker 1304 network. The UE 3308 or 3310 image handling program may register itself with the Image Server 3302 instance, and may receive a Topic to use when Publishing images to the Server (only UEs 3310 do this in this example scenario), a second Topic to use when Publishing service requests (e.g., for image downloads and for image information) to the Image Server 3302, a third Topic to use to Subscribe to receive service response information from the Image Server 3302, plus a fourth Topic to use to receive downloads of images from the Image Server 3302.

When an image is recorded at the UE 3310, the image handling program on the UE 3310 may tag the image with the current GPS coordinates of the UE 3310, may add the date and time, and may allow the user to enter comments. This information may be kept together with the image in the UE 3310 memory. When the user selects to upload this image to the Image Server 3302, the UE 3310 image handling program may use the Publish Topic given to it during its initial interaction with the Image Server 3302 to upload the image and the associated tag information to the Image Server 3302. The image and its tag data may be saved to permanent storage by the Image Server 3302.

Figure 38:
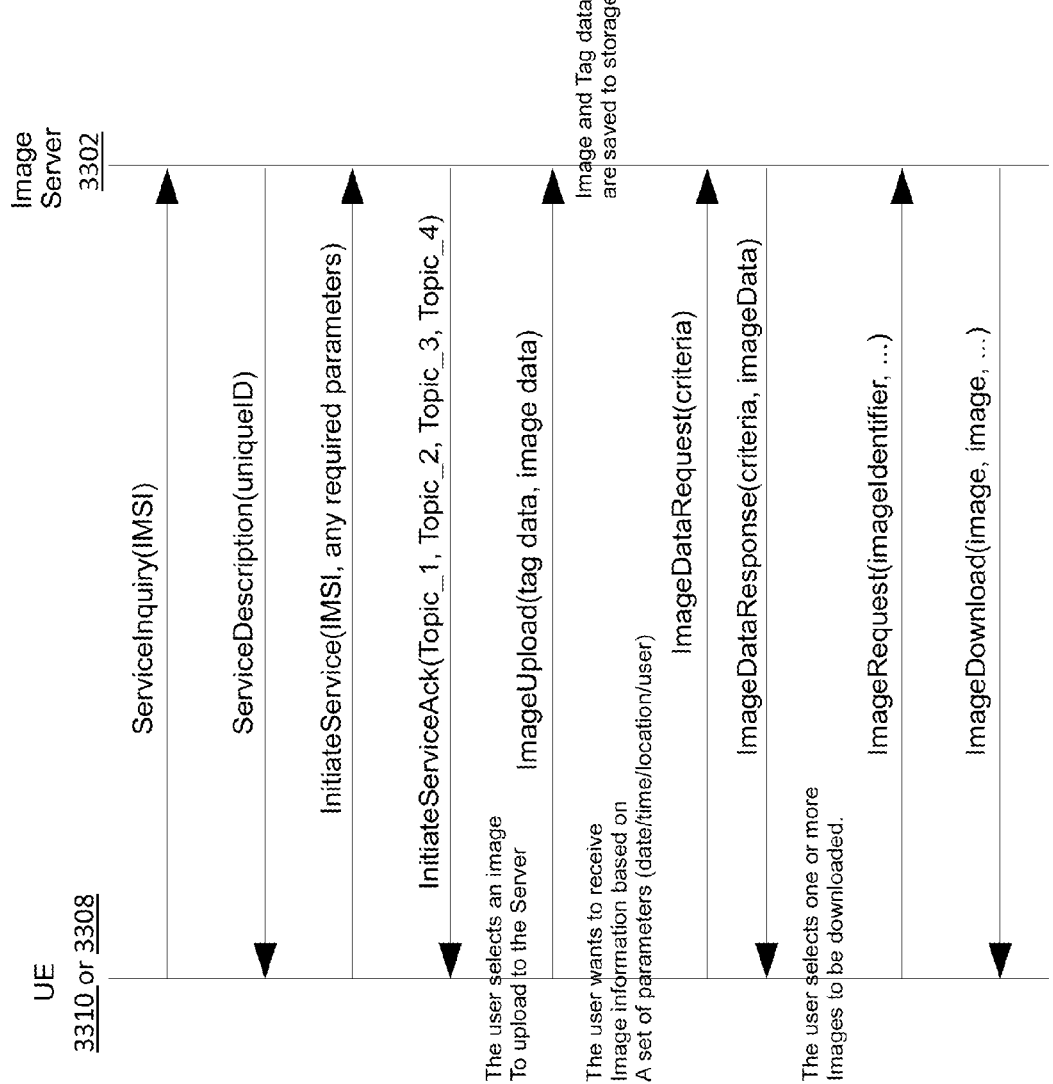
FIG. 38 depicts an embodiment for finding an image server instance, initiating and using the image service in the emergency action scenario.

When a user (3308 or 3310) elects to see one or more images kept at the Image Server 3302, the UE 3308 or 3310 may Publish a request message via its assigned service request Topic. The request may ask for a list of images stored from a particular user 3310, or from a set of dates/times, or from a set of locations, etc. The list may be returned to the user UE 3308 or 3310 via the Topic assigned to it to receive responses to the service requests. Another service request Published by the user UE 3308 or 3310 may request the download of one or more specific images from the list. These images may be downloaded to the user UE 3308 or 3310 via the Topic assigned to the UE 3308 or 3310 to receive image downloads. These interactions are shown in FIG. 38. Here, too, the P/S Broker 1304 interactions in the messaging scheme are omitted for the sake of simplicity.

The disclosure presented herein utilizing the Emergency Action scenario shows how the APN LTE Wireless Network and its associated Optimization Server 304 and 308 architecture, plus the redirected bearer 312 capability, and the P/S Broker 1304 Middleware components may be used to handle a variety of sensor requirements. It should be clear to those skilled in the art that any sensor data collection and processing not covered in this scenario example is capable of being deployed in an efficient manner using the APN LTE Wireless Network Optimization Servers 304 and 308, the bearer redirection 312 capability, and the associated P/S Broker 1304 middleware, thereby demonstrating the ability of the systems disclosed in this document to be used as a platform for sensor data collection, storage, analysis, and distribution.

APN LTE Network to Give Data Rate Priority to LTE Users

In an LTE network, and especially in a Dual Use LTE network, users may be given Access Priorities, and may be assigned bearer priorities, but they are not assigned a priority for being allocated air interface resources to send or receive data. It may be desirable to assign priorities to users for receiving high data rates when there are many users accessed through a particular Cell. This situation may occur when there is no emergency condition, and therefore Cell Barring for Government Use (CB-for-GU) is not enabled at the Cell. Alternatively, there may be an emergency or disaster condition, and the Cell may be barred for Government Use, but there are still so many users accessing the LTE network through the restricted Cell that the highest priority users are not able to receive the high data rates that they may need.

In an LTE system, user equipment (UE 104) is granted a set of Physical Resource Blocks (each PRB is a set of 12 contiguous sub-carriers used in the system) and a time for sending uplink data. Likewise, the LTE system schedules a time and a set of PRBs to carry downlink data to a particular UE 104. The software component within the LTE system that performs this function is the Scheduler within the eNB 102 element. The Scheduler may generally be designed to give fair treatment to all the UEs 104 that access the LTE network through the Cells of the eNB 102. However, there may be situations in which UEs 104 designated as High Priority UEs 104 require preferential treatment in the assignment of PRBs for over-the-air transmissions. The number of PRBs assigned to the UE 104, plus the encoding applied to the data, determines the data rate that is provided to the UE 104.

Assigning Data Rate Priorities to UEs and Configuring the eNB Scheduler to Use the Values This disclosure describes methods and systems for configuring the eNB 102 Scheduler with a Data Rate Priority value for each UE 104 that accesses a Cell contained within the eNB 102. The Scheduler may use the Data Rate Priority value associated with a given user to guide its assignment of Physical Resource Blocks (PRBs) to the user for sending and receiving data over the LTE air interface, and/or to give time-based priority to the UE 104 for access to the LTE air interface. Previous sections of this disclosure are pertinent to the present disclosure, namely, the use of a Publish/Subscribe (P/S) Broker 1304 middleware to implement efficient communications among elements in the APN LTE network, the use of a set of Optimization Server 304 and 308 nodes that are associated with the LTE network elements and integrated into the LTE procedure processing in the network, the use of a Wireless Control Process (WCP) 3902 and its interface to the eNB 102 elements to effect the delivery of UE 102 Data Rate Priority values to the eNB 102, and thence, to the Scheduler, the use of an Application Function (AF 2102) that contains provisioning data for high priority UEs 104 (IMSI values), or is able to access a database of IMSI values that may contain provisioning information pertaining to the Data Rate Priority capability. See the previous sections of this disclosure.

The following set of list items describes the mechanics that may be put into place to implement the Data Rate Priority capability referred to above. It may be recognized by those skilled in the art that deviations from the descriptions given below may be made, while achieving the same result. The teachings presented specifically below are thus illustrative of how a Data Rate Priority feature may be implemented in an LTE Wireless Network.

1. All users 104 may be assigned by the eNB 102 Scheduler a Data Rate Priority value of 1 by default when they first gain access to a Cell. The default value of UE 104 Data Rate Priority may be inserted by the Scheduler into a data record kept for the UE 104 by the Scheduler.
2. The AF 2102 program that may run on the OptServer-PGW 304 node may be provisioned on a per-Cell basis with DataRatePriority OFF, or ON. The default value may be OFF. When the value of the DataRatePriority variable is changed for a Cell, the AF 2102 may interact with an application program referred to herein as the Wireless Control Process 3902 to cause the Data Rate Priority value of each currently Registered UE 102 that is served by the Cell to be updated appropriately (i.e., to the value 1 if the DataRatePriority becomes OFF at the Cell, or to the UE 104 Data Rate Priority value assigned to the UE 104 if the DataRatePriority becomes ON at the Cell).
3. The eNB 102 interface with the Wireless Control Process 3902 that runs on the OptServerPGW 304 may be used to send a Data Rate Priority value to the eNB 102 for a given UE 104 (the C-RNTI kept at the Wireless Control Process 3902 as part of the data saved per UE 104 is used to identify the UE 104 at the eNB 102).
4. Hence, for all UEs 104 that do not interface with the Wireless Control Process 3902, their Data Rate Priority remains set at the default value 1. Such UEs 104 may be those of non-government agency users that may be Roaming on the Dual Use APN Wireless Network. All government agency users, and likewise, many, or all, other users of the Dual Use APN Wireless Network may have software that interfaces with the Wireless Control Process 3902 via the P/S Broker 1304 middleware. For UEs 104 that interface with the Wireless Control Process 3902, such interfacing may occur whenever the UE 104 accesses a Cell in the APN Wireless Network, i.e., whenever the UE 104 sends the Register message (i.e., after the LTE Initial Access procedure), or sends the RegisterUpdate message (i.e., after the LTE Service Request procedure), or sends a Handover message (i.e., after the LTE Handover procedure), to the Wireless Control Process 3902. See FIG. 4 and FIG. 6. During the processing of any of these messages, the Wireless Control Process 3902 may interface with the AF 2102 via the P/S Brokering 1304 middleware to obtain the Data Rate Priority value associated with the UE 104 IMSI. If the provisioning at the AF 2102 for the Cell ID in the Wireless Control Process 3902 request message indicates DataRatePriority OFF, the AF 2102 may return the value 1 for the UE 104 Data Rate Priority. Otherwise, the AF 2102 may check the Data Rate Priority provisioned into it for the UE 104 IMSI, or check the value provisioned into an accessible IMSI database. If the AF 2102 does not retrieve information provisioned for the UE 104 IMSI, the default value of 1 may be returned. Otherwise, the AF 2102 may obtain the Data Rate Priority value provisioned for the UE 104 IMSI, and return that value to the Wireless Control Process 3902. The Wireless Control Process 3902 may therefore send the UE 104 Data Rate Priority value to the eNB 102 when it processes the UE 102 Register message, or RegisterUpdate message, or Handover message, whether or not a UE 102 bearer 302 is subsequently redirected at the eNB 102 by the Wireless Control Process 3902. The values used for the UE 104 Data Rate Priority may be any value 1, or greater, with the higher number value implying a higher Data Rate Priority for the UE 104.

5. The eNB 104 Scheduler may be changed from current implementations to take the Data Rate Priority value into account when scheduling the UE 104 to receive or send data. For example, if the eNB 102 Scheduler is about to schedule downlink data to be sent to a set of UEs 104, the set of available PRBs may be assigned based on the RF conditions reported previously by the UEs 104, and also based on the Data Rate Priority associated with the UEs 104. The UE 104 with the highest Data Rate Priority value may receive the maximum number of PRBs consistent with sending the data queued for that UE 104, or, may be handled by the Scheduler before the Scheduler handles a UE 104 with a lower Data Rate Priority value. Meanwhile, all UEs 104 with Data Rate Priority 1 may receive a number of PRBs smaller than the maximum number that might otherwise be assigned, because some number of PRBs have been assigned to UEs 104 with higher Data Rate Priority values. All UEs 104 with the same Data Rate Priority value may receive equal treatment by the Scheduler in terms of being assigned a number of PRBs, or in terms of being handled first by the Scheduler.

Figure 39:
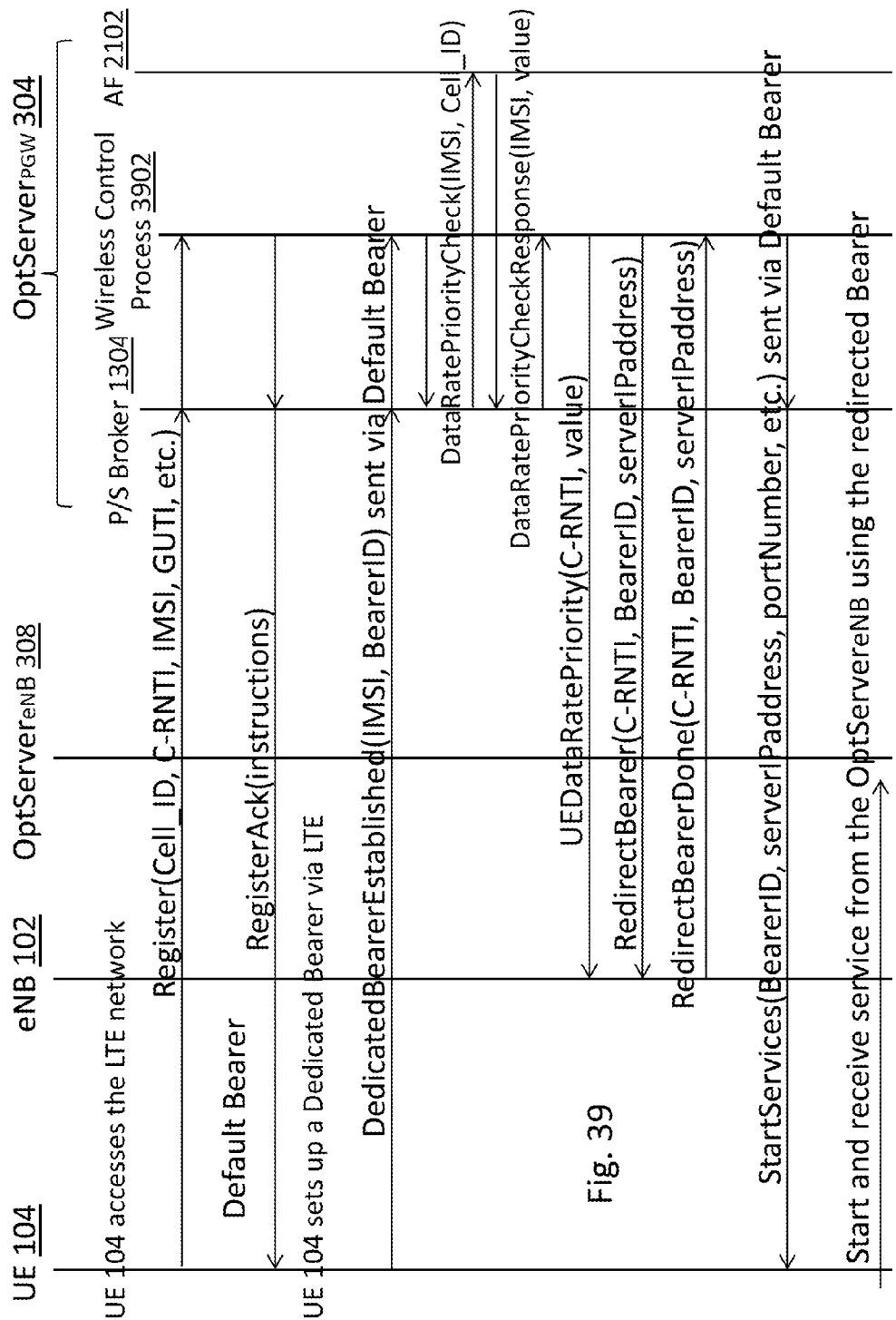
FIG. 39 depicts an embodiment for obtaining the UE data rate priority value and updating the eNB with the value for the initial access case.
Figure 40:
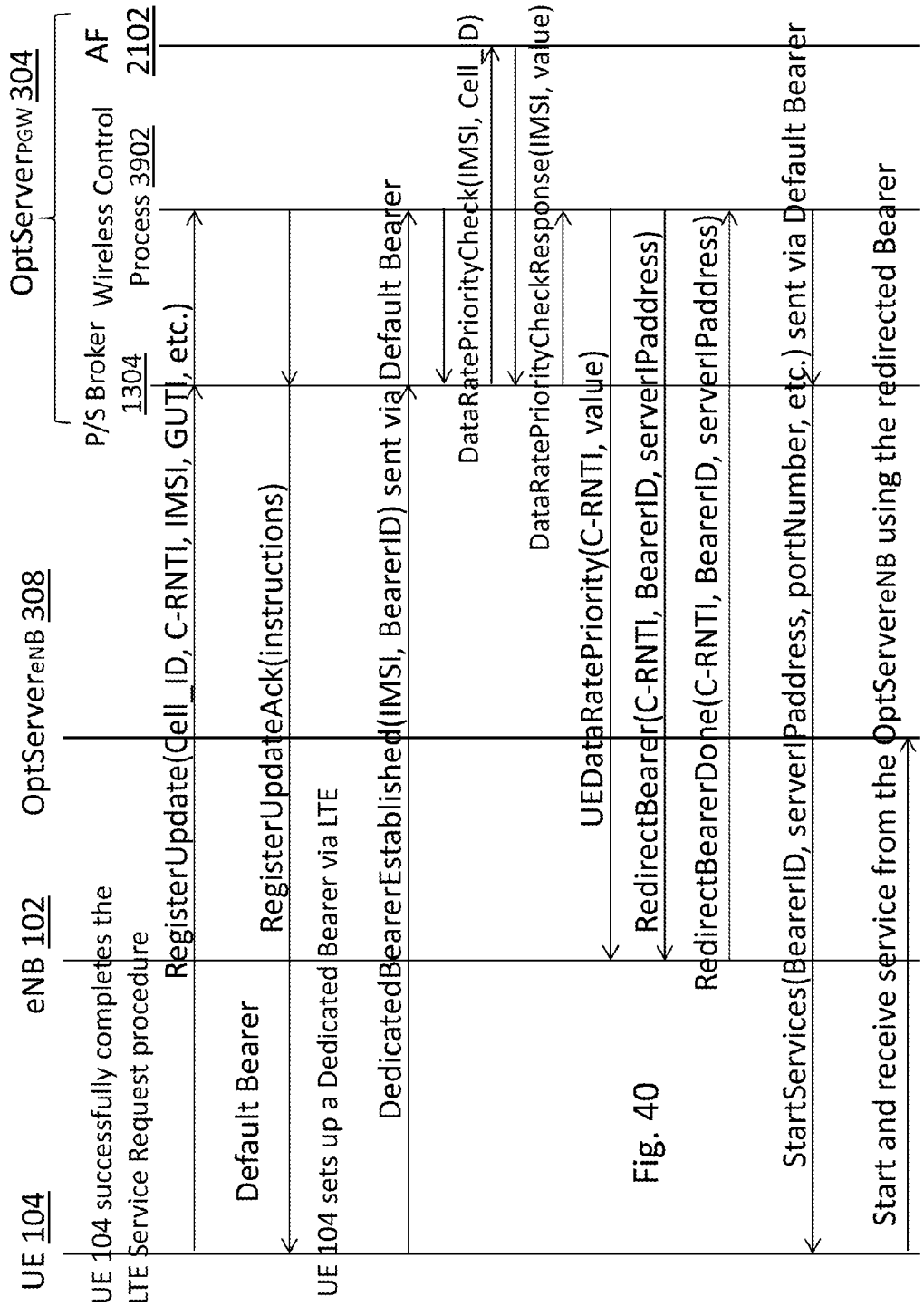
FIG. 40 depicts an embodiment for obtaining the UE data rate priority value and updating the eNB with the value for the service request case.
Figure 41:
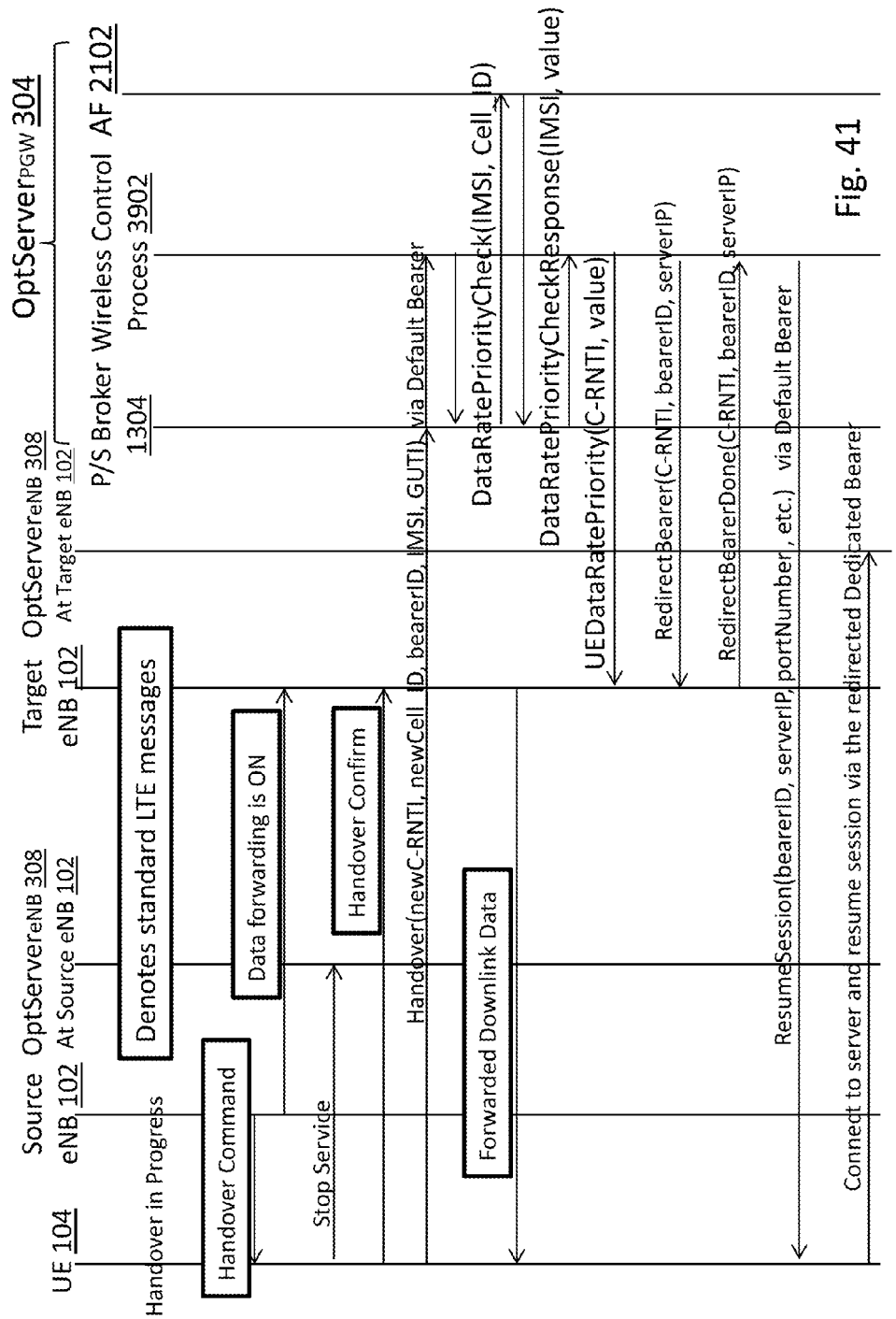
FIG. 41 depicts an embodiment for obtaining the UE data rate priority value and updating the target eNB with the value for the handover case.
Figure 42:
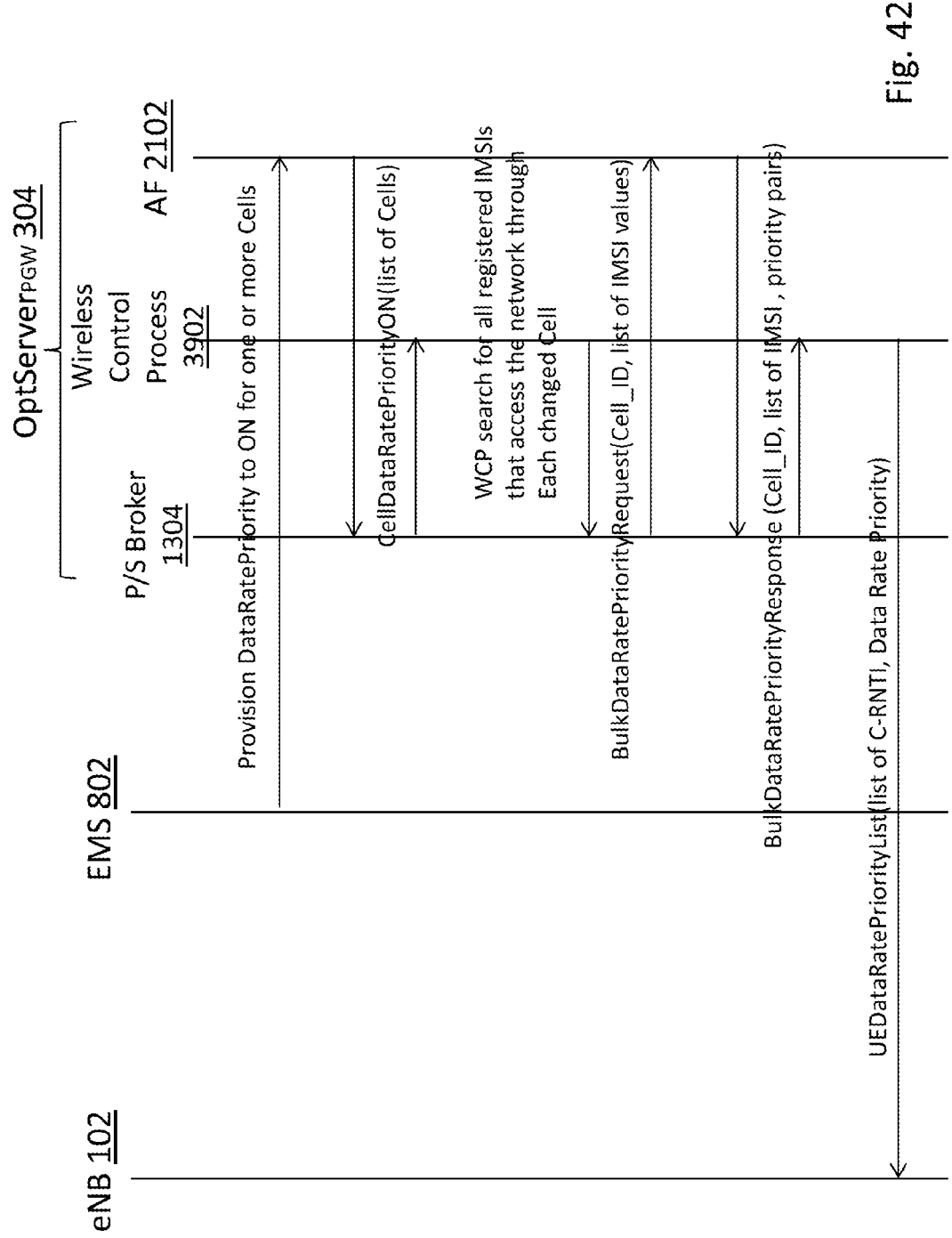
FIG. 42 depicts an embodiment for updating the UE data rate priority values when data rate priority service is enabled at the serving cell.
Figure 43:
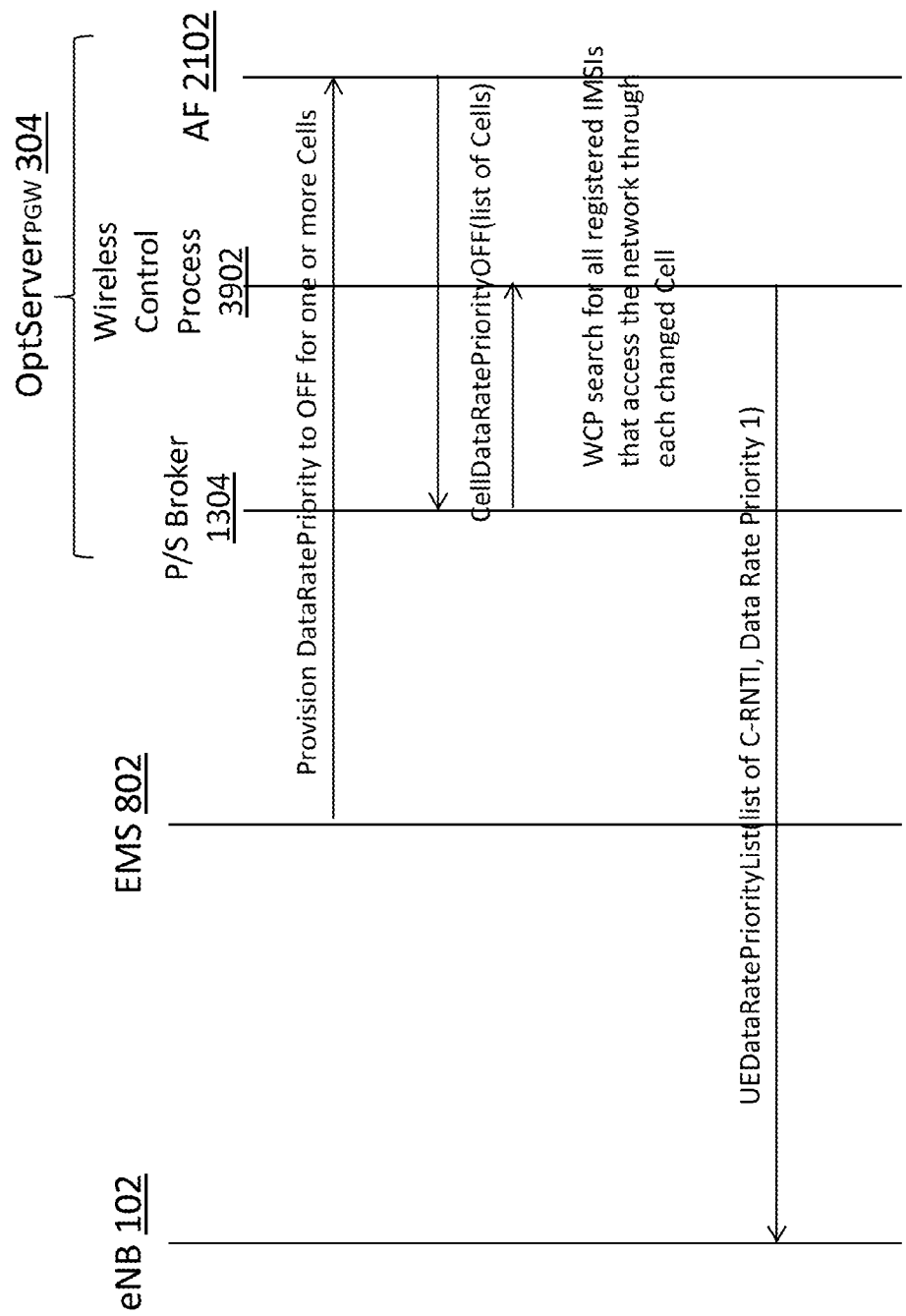
FIG. 43 depicts an embodiment for updating the UE data rate priority values when data rate priority service is disabled at the servicing call.

The disclosure in the above paragraphs may be seen in FIG. 39, FIG. 40, FIG. 41, FIG. 42, and FIG. 43. The first three of these figures add the Data Rate Priority interactions to the interactions shown in FIG. 4 and FIG. 6, where the Wireless Control Process 3902 and the P/S Broker 1304 messaging infrastructure are shown explicitly (FIG. 4 and FIG. 6 do not show these components explicitly). FIG. 39 may apply to the situation in which the UE 104 has not yet registered with the Wireless Control Process 3902 (i.e., during the Initial Access Procedure). FIG. 40 may apply to the situation in which the UE 104 has previously registered with the Wireless Control Process 3902, but must provide an update because, for example, the UE 104 is in transition from the ECM-IDLE state to the ECM-CONNECTED state. FIG. 41 may apply to the situation where the UE 104 is in Handover to a new eNB 102. Each of these three situations may result in the UE 104 accessing a different Cell than previously, and hence, the newly accessed eNB 102 must be informed of the Data Rate Priority for the UE 104. FIG. 42 may apply to the situation where the AF 2102 is provisioned to turn DataRatePriority ON for one or more Cells in the LTE network. FIG. 43 may apply to the situation where the AF 2102 is provisioned to turn DataRatePriority OFF for one or more Cells in the LTE network.

FIG. 39 shows an elaboration and modification of the procedure shown in FIG. 4 and described earlier in this disclosure. The elaboration shows how the UE 104 may use the P/S Broker 1304 middleware to communicate with the Wireless Control Process 3902 that runs on the OptServerPGW 304 node. The portNumber in the StartServices message is the port number of the P/S Broker to which the UE 104 connects. Meanwhile, the AF 2102 software that plays a role in the disclosure provided herein for implementing a Dual Use Network may also be provisioned with IMSI data, or have access to an IMSI database, that includes the Data Rate Priority value assigned to the UE 104 IMSI. In a modification to the procedure described in FIG. 4, the Wireless Control Process 3902 and the AF 2102 may communicate via the services of the P/S Broker 1304 middleware, as shown in FIG. 39, FIG. 40, FIG. 41, FIG. 42, and FIG. 43, to provide the Data Rate Priority value for a given IMSI, and to update the serving eNB 102 with this value.

To receive messages from a multiplicity of UEs 104, the Wireless Control Process 3902 may Subscribe to the Topic "WirelessControl/*". To communicate with the Wireless Control Process 3902, a UE 104 may Publish its message to the Topic "WirelessControl/<myIMSI>", where <myIMSI> is the unique IMSI value assigned to the UE 104. When the Wireless Control Process 3902 responds to a particular UE 104, it may Publish the message to the Topic "WirelessControl/<IMSI>", where <IMSI> is the value assigned to the targeted UE 104. The UE 104 must have previously Subscribed to this Topic to receive messages on this Topic.

To effect the exchange of messages between the Wireless Control Process 3902 and the AF 2102, the AF 2102 may Subscribe to the Topic "AF/data/*". The Wireless Control Process 3902 may then Publish the DataRatePriorityCheck( ) message to the Topic "AF/data/<WCPid>", where <WCPid> is a unique ID assigned to the Wireless Control Process 3902, and where the Wireless Control Process 3902 Subscribes to receive messages on the Topic "AF/data/<WCPid>". The AF 2102 may then reply to the Wireless Control Process 3902 by Publishing the DataRatePriorityCheckResponse( ) message to the Topic "AF/data/<WCPid>".

When the UE 104 first accesses the LTE network, it proceeds as described in the earlier sections in this disclosure (see FIG. 4), until the DedicatedBearerEstablished message is Published by the UE 104 to Wireless Control Process 3902 (see FIG. 39). At this point in the Registration Procedure, it may be appropriate for the Wireless Control Process 3902 to Publish the DataRatePriorityCheck message to the AF 2102. The AF 2102 may use the Cell_ID in the message and the IMSI to obtain a Data Rate Priority value for the IMSI, and may then Publish the DataRatePriorityCheckResponse message to the Wireless Control Process 3902. The Wireless Control Process 3902 may then use its direct interface with the eNB 102 that serves the UE 104 to deliver the Data Rate Priority value associated with the UE 104, and the value may be passed by the eNB 102 software to the eNB 102 Scheduler. The remainder of the Registration procedure proceeds as shown in FIG. 4 (and FIG. 39).

FIG. 40 shows the processing that may be used when the UE 104 transitions from the ECM-IDLE state to the ECM-CONNECTED state, and successfully completes the LTE Service Request Procedure. The interactions that ensue to register the UE 104 with the Wireless Control Process 3902 for the new Cell ID and new C-RNTI value are the same as shown in FIG. 39, except that the RegisterUpdate and RegisterUpdateAck messages are exchanged, instead of the Register and RegisterAck messages of FIG. 39. The same parameters may be contained in the messages in both cases.

FIG. 41 shows an elaboration and a modification of the procedure shown in FIG. 6 and described earlier in this disclosure. The elaboration shows how the UE 104 may use the P/S Broker 1304 middleware to communicate with the Wireless Control Process 3902 that runs on the OptServer$_{PGW}$ 304 node. The portNumber received by the UE 104 in the ResumeSession message is the port number of the P/S Broker 1304 to which the UE 104 connects. FIG. 6 shows the interactions during a Handover procedure for integrating the Optimization Server 304 and 308 into the LTE network behaviors, and for redirecting a UE bearer 312 at the target eNB 102 for the purpose of allowing the UE 104 to communicate directly with an OptServereNB 308 node associated with the target eNB 102. Per the present disclosure, FIG. 41 shows how the procedure of FIG. 6 may be modified to also include making an update at the target eNB 102 Scheduler for the UE 104 Data Rate Priority value.

When the Handover is completed, and the UE 104 Publishes the Handover message to the Wireless Control Process 3902, the new C-RNTI and the new Cell_ID values are made available to the Wireless Control Process 3902, along with the UE 104 IMSI value. The Wireless Control Process 3902 may therefore interact with the AF 2102 to obtain the Data Rate Priority assigned to the UE 104 (or, the value 1, if the new Cell_ID has DataRatePriority OFF). The Wireless Control Process 3902 may then deliver the UE 104 Data Rate Priority to the target eNB 102 via a direct communication interaction, so it may be passed to the eNB 102 Scheduler. The Wireless Control Process thereafter may continue with the processing of the Handover procedure by exchanging the RedirectBearer and RedirectBearerResponse messages with the target eNB 102, and with causing the UE 104 to resume its service session via the OptServereNB 308 that is associated with the target eNB 102. See FIG. 6 and FIG. 41.

Data Rate Priority is Turned ON for One or More Cells

See FIG. 42 for the following message interaction descriptions. As noted in the preceding paragraphs, the AF 2102 may be provisioned with the DataRatePriority value assigned to each Cell in the LTE network. When the DataRatePriority variable is changed from OFF to ON for a Cell, all the UEs 104 that are Registered with the Wireless Control Process 3902 and that access the LTE network via the Cell need to have their Data Rate Priority values updated at the Scheduler of the serving eNB 102 that contains the Cell. The current Data Rate Priority of the UE 104 may have the value 1 at the Scheduler, because the DataRatePriority value previously associated with the Cell is OFF. FIG. 42 shows the processing that may be required to update the eNB 102 Scheduler with the Data Rate Priority values of each Registered UE 104 that accesses the network via that Cell.

The Wireless Control Process 3902 may Subscribe to the generic Topic "WirelessControl/*" to receive messages from a multiplicity of end points. When the AF 2102 is provisioned with a value of ON for the DataRatePriority for a given Cell, or Cells, the AF 2102 may Publish a CellDataRatePriorityON message to the Topic "WirelessControl/dataRatePriority/<AFid>", so the message may be received by all instances of the Wireless Control Process 3902. The message contains a list of Cell ID values. This message is received by the Wireless Control Process 3902. For each Cell_ID in the message, the Wireless Control Process 3902 may search its data structures for all UEs 104 that have registered with it, and have indicated their serving Cell ID as the value selected from the message sent by the AF 2102. The list of UE 104 IMSI values thus collected by the Wireless Control Process 3902 may be placed into a BulkDataRatePriorityRequest message that is Published to the Topic "AF/<WCPid>", so it is received by the AF 2102. A message is sent for each Cell_ID in the message received by the WCP 3902. When the BulkDataRatePriorityRequest message is received by the AF 2102, the AF 2102 may search its provisioned data, or an accessible IMSI database, on a per-IMSI basis, for the Data Rate Priority value of each IMSI. The results may be placed into a BulkDataRatePriorityResponse message that may be Published to the Topic "AF/<WCPid>", so it is received by the requesting Wireless Control Process 3902 instance. The Wireless Control Process 3902 may then retrieve from its provisioned data the C-RNTI value corresponding to each IMSI, and also retrieve from its provisioned data the IP address of the eNB 102 that serves each Cell in the received message, and send the Data Rate Priority value for each UE (C-RNTI) that accesses the network through each corresponding Cell. These interactions are followed for each Cell_ID value in the CellDataRatePriorityON message.

Data Rate Priority is Turned OFF for One or More Cells

See FIG. 43 for the following message interaction descriptions. When the DataRatePriority variable is changed from ON to OFF for a Cell, all the UEs 104 that are registered with the Wireless Control Process 3902 and that access the LTE network via the Cell need to have their Data Rate Priority values updated at the Scheduler of the eNB 102 that contains the Cell. At the Scheduler, the current Data Rate Priority of the UE 104 may have the value provisioned for the UE 104 IMSI, because the DataRatePriority value previously assigned to the Cell is ON. These values now need to be changed to the value 1, so all UEs 104 that access the network through that Cell can obtain equal priority treatment from the eNB 102 Scheduler. FIG. 43 shows the processing that may be required to update the eNB 102 Scheduler with the Data Rate Priority value of 1 for each Registered UE 104 that accesses the network via that Cell.

When the AF 2102 provisioning is changed, so the DataRatePriority value of one or more Cells is changed from ON to OFF, the AF 2102 may Publish the CellDataRatePriorityOFF message to the Topic "WirelessControl/dataRatePriority/<AFid>", so the message may be received by all instances of the Wireless Control Process 3902. The message contains a list of Cell ID values. For each Cell ID in the received message, the Wireless Control Process 3902 may search its data structures for all UEs 104 that have registered with it, and have indicated their serving Cell ID as the value selected from the message sent by the AF 2102. The data kept at the Wireless Control Process 3902 for each such UE 104 includes the C-RNTI value, which is the identifier by which the UE 104 is known at the serving eNB 102. The list of UE 104 C-RNTI values may be collected by the Wireless Control Process 3902, and placed into a UEDataRatePriorityList message that is sent to the eNB 102 that handles the selected Cell whose DataRatePriority value has changed to OFF. For each C-RNTI value, the message may indicate that the Data Rate Priority value of 1 is to be associated with the C-RNTI that identifies a UE 104 to the eNB 102 Scheduler. When this message is received by the eNB 102, the UE 104 values are updated accordingly by the Scheduler.

Collecting and Reporting Billing Data at Optimization Servers in an APN LTE Network When a UE bearer is redirected at its serving eNB 102, so the bearer is connected to a local Optimization Server 308, rather than to an SGW 110 element and then to a PGW 114 element, the PGW 114 is unable to create billing information for the usage of the air interface by the data that traverses the redirected bearer. This condition may not be important for some applications (e.g., for a military application, or for an Emergency application), but may be important for commercial applications. In this latter case, programs on the OptServer$_{eNB}$ 308 may keep track of the bytes, packets, connection time, etc. required to generate the equivalent of a Call Detail Record (CDR) for the transport of data that traverses a redirected bearer 312, and must be able to convey this information to the PGW 114, or to some other billing data processor, at the appropriate time(s). (Different charging may be applied to this usage, because the back haul 112 may not be used to transport the data between the OptServer$_{eNB}$ 308 and the UE 104.) Furthermore, the resources provided by the Optimization Servers 304 and 308 may include permanent data storage, temporary data storage, program execution time, etc., and the operator of the APN network may desire to charge for the use of these system resources. Hence, billing data must also be collected for the Optimization Server 304 and 308 resource usage.

The Broadband Forum IPDR (IP session Detail Record) is specified in TR 232 (http://www.broadband-forum.org/technical/download/TR-232.pdf), and provides an outline for data reporting that may be used to organize and report the collection of the billing data at the OptServer$_{eNB}$ 308 and at the OptServer$_{PGW}$ 304, and the sending of the detail record to the PGW 114, or to another processing point for such data. Passing the billing detail requires a specification of the precise data to be collected, and either an interface into the PGW 114 that allows an Optimization Server 304 or 308 to effect the transfer of the information, or the specification of another processing entity that is charged with handling this information.

Furthermore, collection of IP detail records for particular redirected bearers 312 associated with particular UEs 104 needs to be worked out, because at the OptServer$_{eNB}$ 308 with a redirected bearer 312, no bearer-to-IMSI mapping is immediately available. The extension of the redirected bearer 312 that remains at the PGW 114 is no longer applicable to this situation, because packets that traverse a redirected bearer 312 do not pass through the PGW 114, and hence, cannot be accounted for by the PGW 114 in its usual manner of collecting billing data. The bearer-to-IMSI mapping for the redirected bearer 312 may need to be conveyed to a billing data collection program on the OptServer$_{eNB}$ 308, and a design may need to be made to generate the data, and to transport the billing data to the billing data collection service. This disclosure may provide such a design. Also, when the UE 104 moves from one eNB 102 to another, the redirected bearer 312 moves from one OptServer$_{eNB}$ 308 to another, and the billing data collection point may need to be migrated for the data that traverses the redirected bearer 312. This disclosure may also provide details for how this movement of the billing data collection point may be arranged.

As noted above, in addition to the transport of user data packets via the redirected bearer 312 entities, use of the resources at the OptServer$_{PGW}$ 304 and OptServer$_{eNB}$ 308 entities may need to be reported. For this purpose, operating system statistics may be collected and used, e.g., process text size and .bss (random access memory) size, permanent memory file size and storage time, etc. This disclosure may provide details of how this data collection and reporting may be arranged on the OptServerp$_{PGW}$ 304 and OptServer$_e$ 308 nodes in the APN network architecture.

An Architecture that May be Used to Collect and Report Billing Data at Optimization Servers Readers skilled in the art may recognize that many alternative means may be devised to organize the collection and reporting of data that may be used for billing purposes in an APN LTE Network with its set of integrated Optimization Servers 304 and 308. However, any architecture that succeeds in this task may be seen to provide a means of identifying a set of usage data, including, perhaps, duration of usage, with a particular user or other billing entity, and of transferring the collected data in a timely manner to an appropriate designated billing center. The teachings provided in this disclosure provide one such architecture. The architecture takes advantage of capabilities made inherent in the APN Network via the disclosures reported previously in this document, and thus provides what may be a most efficient means of collecting and reporting the needed billing data.

Figure 17:
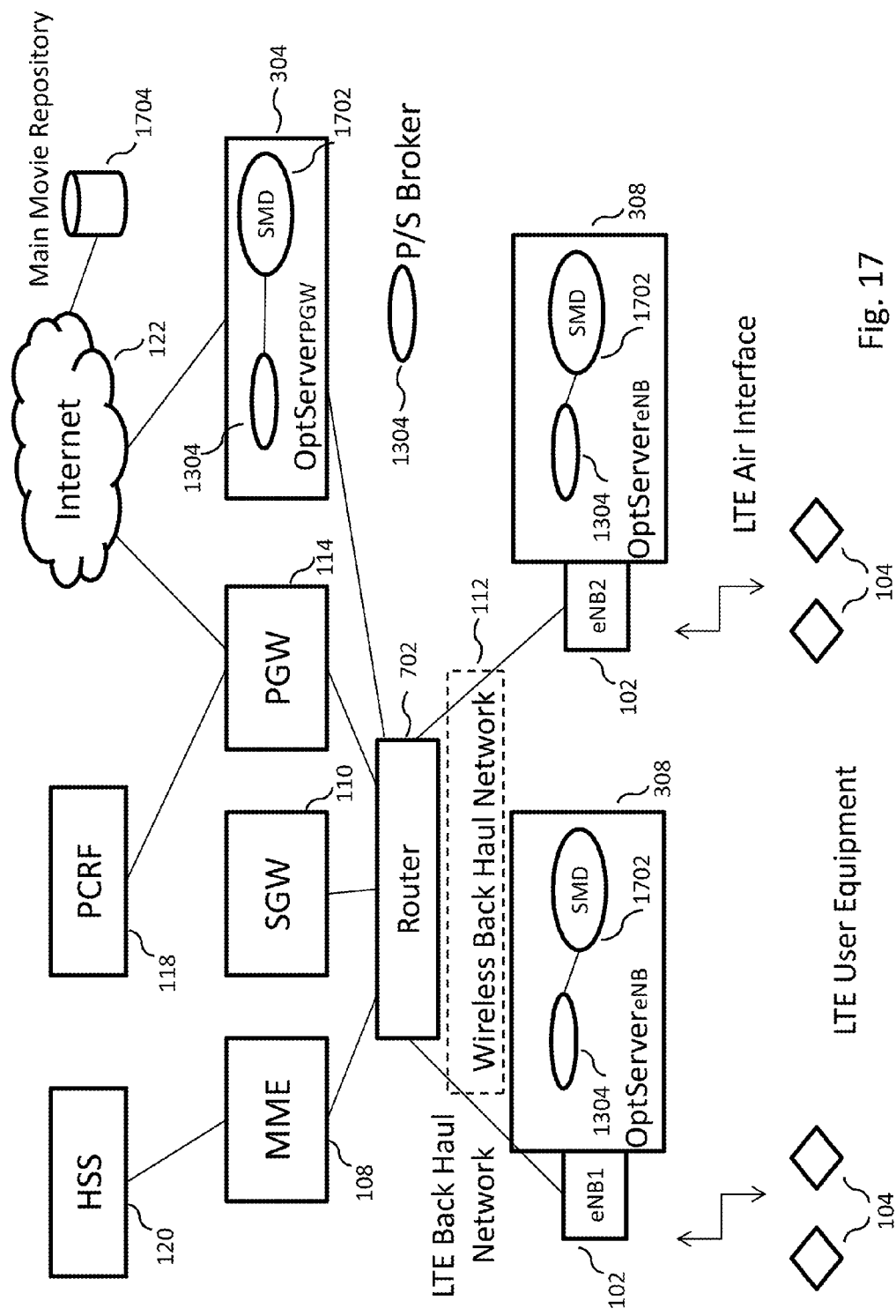
FIG. 17 depicts an embodiment deployment of a streaming movie delivery service on the APN optimization servers.
Figure 18:
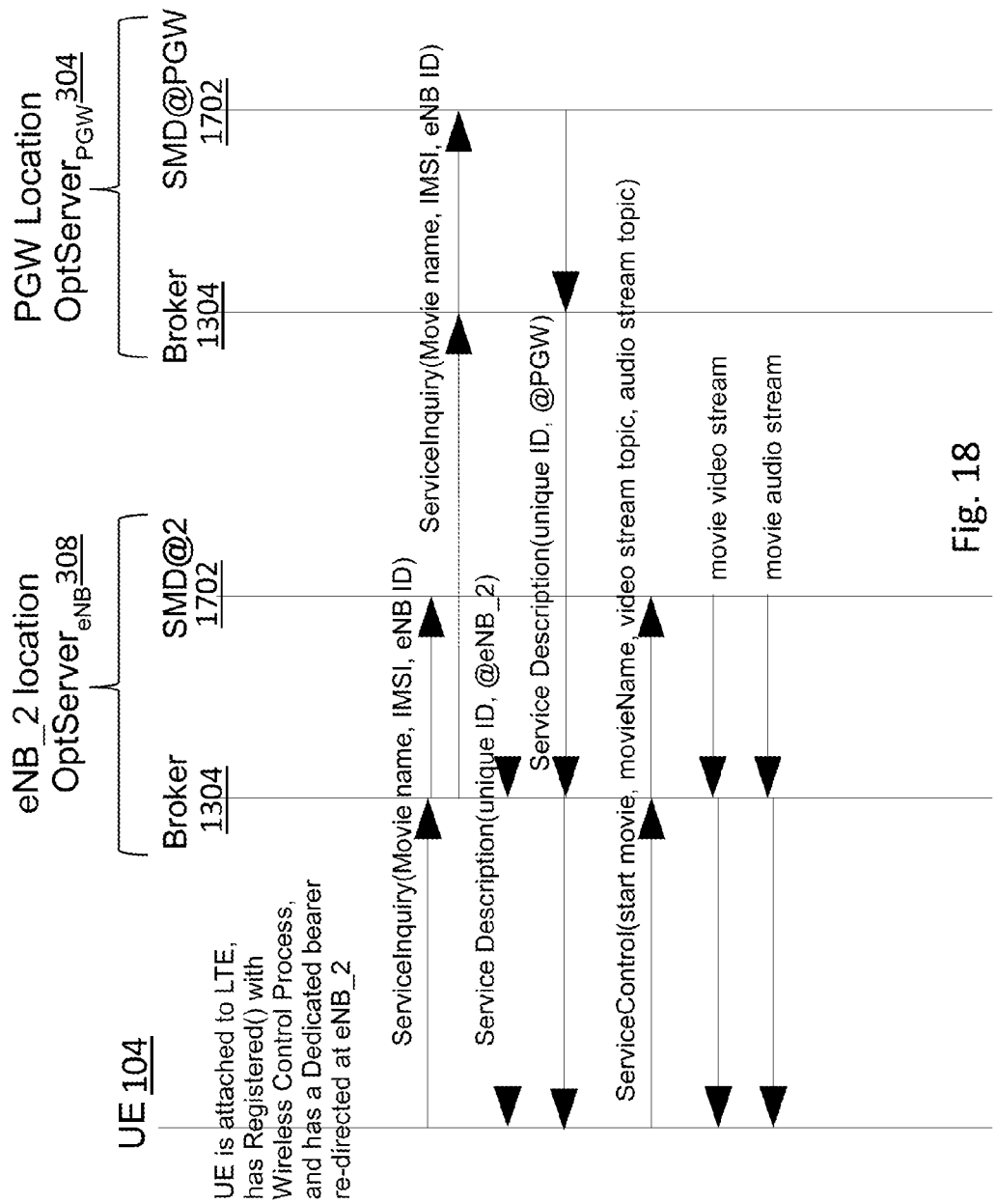
FIG. 18 depicts an example embodiment for finding the closest SMD service instance and delivery movie streams to UE.
Figure 44:
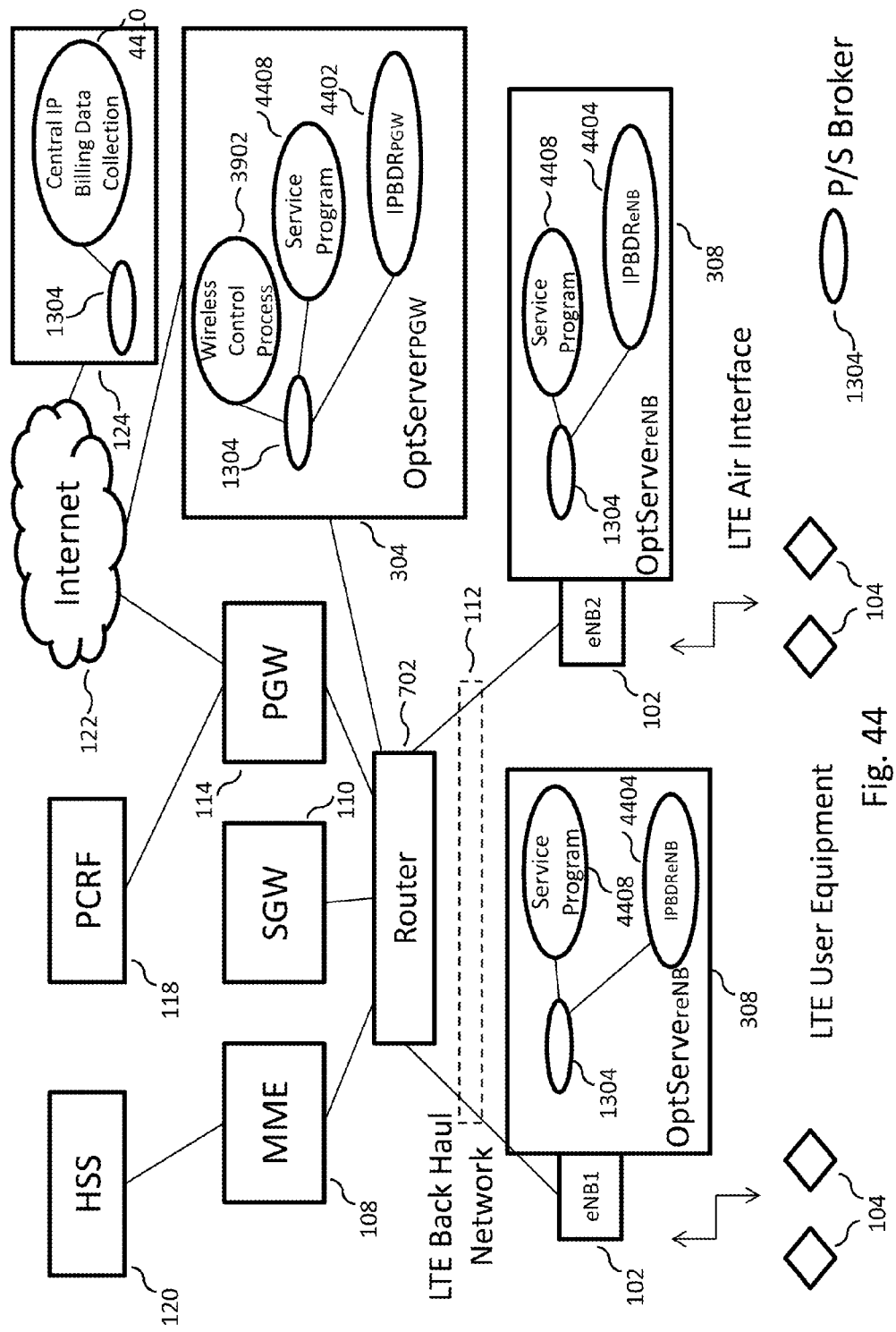
FIG. 44 depicts an embodiment of an architecture for collecting, transporting, and further processing the billing data that may be collected on the APN Optimization Servers.

FIG. 44 shows that on each OptServer$_e$ 308 node, a program called the IP Billing Data Record (IPBDR$_{eNB}$ 4404) program instance may run for the purpose of collecting billing data pertinent to using the resources of the OptServer$_{eNB}$ 308 and also pertinent to collecting billing information related to the transport of user data using the redirected bearers 312 that terminate on the OptServer$_{eNB}$ 308 node. Further, a similar program instance, the IPBDRp$_{PGW}$ 4402, is seen to run on the OptServerp$_{PGW}$ 304 node that is associated with the PGW 114 element in the APN LTE Network. Whereas the IPBDR$_{eNB}$ 4404 program may be concerned with collecting billing data for resource usage on its local server and also for the transport of data over UE 104 redirected bearers 312, the IPBDRp$_{PGW}$ program may only be concerned with collecting billing data for resource usage on its local server. The reason for this difference is that any user data transported by LTE bearers to the OptServerp$_{PGW}$ passes through the PGW 114 element, and therefore, billing data for this transport is collected and reported by the PGW 114 element in the usual fashion well known to those skilled in the art. FIG. 44 also shows a set of Service Programs 4408 that run on the Optimization Servers 304 and 308. These may be the same service program, such as depicted in FIG. 17, or they may be different service programs. Also shown in FIG. 44 is a Central IP Billing Data Collection and processing program 4410. This program 4410 is shown to run on a server 124 that is external to the APN LTE Network, but the server location may alternatively be within the APN LTE Network, on the OptServer-p$_{PGW}$ 304 node, for example. The function of this program in the architecture shown in this disclosure is to aggregate the data being collected and reported by the IPBDRp$_{PGW}$ 4402 program and by the multiplicity of IPBDR$_{eNB}$ 4404 programs, to store the aggregated results in a database for easier access by the operator of the APN LTE Network, and to distribute the aggregated billing data to the formal billing system programs used by the LTE Network operator for Wireless Network billing purposes. Note that in FIG. 44, all the program components mentioned above connect to a P/S Broker 1304 instance, and hence, are able to participate in the Publish/Subscribe messaging described throughout this disclosure.

A unique ID may be assigned to each OptServer$_e$ 308 node and to the OptServerp$_{PGW}$ 304 node. This assignment may be desirable to facilitate the creation of a unique ID for each P/S Broker 1304 instance that is deployed in the APN LTE Network. In the present disclosure, when the IPBDRp$_{PGW}$ 4402 or when an IPBDR$_{eNB}$ 4404 initializes, it may be provided with the ID assigned to the Optimization Server 304 or 308, respectively, on which it runs. The processor type (i.e., OptServerp$_{PGW}$ 304 or OptServer$_{eNB}$ 308) may also be provided to the initializing program, so it may determine whether to register with the Wireless Control Process 3902 for the purpose of collecting data related to the transport of user packets via a redirected bearer 312. The IPBDR$_{eNB}$ 4404 programs may register with the Wireless Control Process 3902, as shown in FIG. 45.

Meanwhile, the Wireless Control Process 3902 may have provisioning data that associates each P/S Broker 1304 instance on each OptServer$_{eNB}$ 308 and on the OptServer$p_{PGW}$ 304 with an associated eNB 102 element, or a PGW 114 element, respectively, for the purpose of assigning a P/S Broker 1304 to a UE 104 for communications using a dedicated bearer. The StartServices message and the ResumeSession message in FIG. 4, FIG. 6, FIG. 39, FIG. 40, and FIG. 41 show this assignment of the P/S Broker 1304 IP address and port number to the UE 104. The provisioning data at the Wireless Control Process 3902 for each P/S Broker 1304 instance may now also include the server ID. Doing so may enable the Wireless Control Process 3902 to associate a registered IPBDR$_{eNB}$ 4404 program with a UE 104 IMSI and the P/S Broker ID or IP address and port number information.

Figure 45:
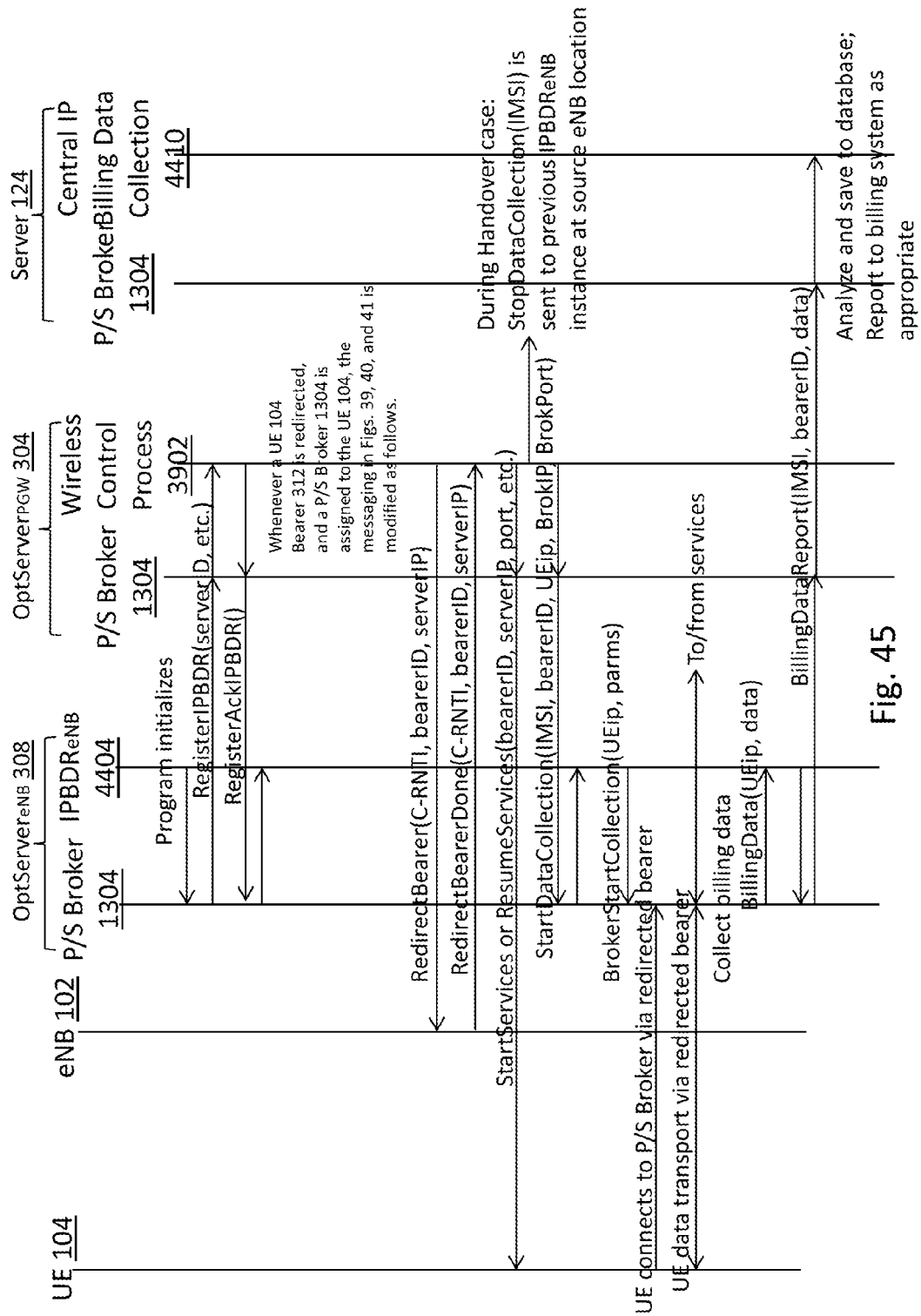
FIG. 45 depicts an embodiment of a message exchange that enables programs to collect and report billing data for usage via a redirected bearer.

Once these associations are made, FIG. 45 shows that whenever a UE 104 bearer 312 is redirected to the OptServer$_{eNB}$ 308 that hosts the IPBDR$_{eNB}$ 4404 instance, the IPBDR$_{eNB}$ 4404 instance receives from the Wireless Control Process 3902 the UE 104 IMSI, plus the IP address and Port number of the P/S Broker 1304 to which the UE 104 connects via the redirected bearer, plus the IP address assigned to the UE 104 (the UE 104 IP address may be included in the Register and RegisterUpdate messages that the UE 104 sends to the Wireless Control Process 3902; see the Register and RegisterUpdate messages in FIG. 39 and FIG. 40). See FIG. 39, FIG. 40, and FIG. 41 for the LTE processing situations in which a dedicated bearer 312 may be redirected for a UE 104.

Once the IPBDR$_{eNB}$ 4404 instance obtains the UE IP address and the IP address and port number of the P/S Broker 1304 to which the UE 104 connects, FIG. 45 shows that the IPBDR$_{eNB}$ 4404 may communicate with the P/S Broker 1304 instance to inform it to collect billing data for the UE (via the BrokerStartCollection( ) message), and to cause it to transfer the billing data to the IPBDR$_{eNB}$ 4404 program either continuously, or at periodic intervals, or upon command by the IPBDR$_{eNB}$ 4404 program. Because the P/S Broker 1304 instance is in the direct path of conveyance of packets to and from the UE 104 redirected bearer 312, all such data can be counted, and the results conveyed by the P/S Broker 1304 instance to the IPBDR$_{eNB}$ 4404 instance. The data that may be collected includes the start time and the end time of the billing data collection, the bearer ID of the redirected bearer 312, the number of bytes and packets sent to, and received from, the UE 104 via the redirected bearer 312, and also a breakout of these numbers into bytes and packets sent and received per Topic. The association of the values with a Topic may help to determine whether the data traverses the back haul 112 network, or whether the data is being exchanged with a real time service, such as an interactive game, that requires very low delay. Different billing policies may then be applied to the usage data when the data is differentiated by the Topic used to convey the data via the P/S Broker 1304 communications.

The analysis of the Topic-based usage data to determine whether the back haul 112 is used, or to determine whether a different billing policy should apply because low delay is provided to the data transport by the proximity of the OptServer$_{eNB}$ 308 to the user 104 access point, may be most conveniently provided by the Central IP Billing Data Collection 4410 program. The program 4410 may be provisioned with information that relates the Topics used in the APN LTE Network to other information that may be used to determine billing policies that may apply to the collected data. Subsequently, the billing data may be reported by the Central IP Billing Data Collection 4410 program to the billing system used by the APN LTE Network Operator.

FIG. 45 shows, in addition, that when a Handover occurs, the ResumeSession( ) message is sent to the UE 102. In this case, the OptServer$_{eNB}$ 308 element is changed from one at the source eNB 102 location to one at the target eNB 102 location. The explicit message interaction to start billing data collection at the target location is shown via the StartDataCollection( ) message. It is also the case that billing data collection for the redirected bearer at the source location must be ended, and any unreported data may now be reported to the Central IP Billing Data Collection 4410 program. FIG. 45 shows that the Wireless Control Process 3902 may send the StopDataCollection( ) message to the IPBDR$_{eNB}$ 4404 instance at the source location to cause a final reporting from that program to the Central IP Billing Data Collection 4410 program, to cause the P/S Broker 1304 at that location to cease data collection for the UE 102, and to remove context data for the UE 102 at the IPBDR$_{eNB}$ 4404 instance at the source location. These latter interactions are not shown in FIG. 45, but may be understood by those skilled in the art to take place as described herein.

The StopDataCollection( ) message is shown in FIG. 45 to indicate how billing data collection for a UE 102 redirected bearer 312 is stopped during a Handover, when the UE 102 moves away from the source location where the redirected bearer 312 was formerly terminated. Data collection also needs to be stopped when the UE 102 transitions from the ECM-CONNECTED state to the ECM-IDLE state, and also when the UE is detached from the LTE network. The interactions that may be used to implement this behavior are shown in FIG. 46 for the case of transition to ECM-IDLE, and in FIG. 47 for the case when the UE 102 is detached from the LTE network.

The transition of a UE 104 from the ECM-ACTIVE state to the ECM-IDLE state is shown in Section 5.3.5 of TS 23.401 v9.4.0. The LTE procedure is called the S1 Release procedure. The 3GPP specification shows that the UE 104 may, or may not, be involved in the S1 Release message interactions, but that the MME 108 entity is always involved. FIGS. 25, 26, 27, 28, 29, and 30 show that the MME 108 entity may be connected to the P/S Broker 1304 middleware in an APN LTE Network, and thus may be used to facilitate the notification of the IPBDR$_{eNB}$ 4404 instance when a UE 104 transitions to the ECM-IDLE state. FIG. 46 shows how the LTE S1 Release procedure may be extended for the MME 108 element to enable the IPBDR$_{eNB}$ 4404 instance that currently collects the redirected bearer 312 data usage for the UE 104 to be informed by the MME 108 when the UE 104 transitions to the ECM-IDLE state. Each IPBDR$_{eNB}$ 4404 instance may Subscribe to the Topic "IPBDR/<IMSI>" when it first starts collecting usage data for a particular UE 104 IMSI, i.e., when it receives the StartDataCollection( ) message from the Wireless Control Process 3902 (see FIG. 45). As shown in FIG. 46, when the MME 108 receives the UE S1 Context Release Complete message from the eNB 102 that previously served the UE 104, the UE 104 is no longer connected to the LTE network via any eNB 102 element. The MME 108 may then Publish the StopDataCollection(IMSI) message to the Topic "IPBDR/<IMSI>," so it is received only by the IPBDR$_{eNB}$ 4404 instance that serves that IMSI. The IPBDR$_{eNB}$ 4404 instance may then send any remaining usage data for the UE 104 to the Central IP Billing Data Collection 4410 program, interact with the local P/S Broker 1304 instance to have it stop collecting usage data for the UE 104, remove the UE 104 context data from the IPBDR$_{eNB}$ 4404 memory, and UnSubscribe from the Topic "IPBDR/<IMSI>."

The LTE procedures used to Detach a UE 104 from the LTE network are specified in Section 5.4.8 of TS 23.401 v9.4.0. Three situations may pertain to the current disclosure, namely, the UE-Initiated Detach Procedure specified in Section 5.3.8.2 of TS 23.401 v9.4.0, the MME-Initiated Detach Procedure specified in Section 5.3.8.3 of TS 23.401 v9.4.0, and the HSS-Initiated Detach Procedure specified in Section 5.3.8.4 of TS 23.401 v9.4.0. Several points in the procedures may be used by the MME 108 to Publish the StopDataCollection(IMSI) message to the IPBDReNB 4404 instance in the first two situations. One is when the MME 108 receives the LTE Delete Session Response message from the SGW 110; the other is when the S1 Release Procedure completes with the reception by the MME 108 of the S1 UE Context Release Complete message (see Figures 5.3.8.2-1 and 5.8.3.3-1 in TS 23.401 v9.4.0). If the S1 Release Procedure occurs in these interactions, the preferred point for the MME 108 to Publish the StopDataCollection( ) message may be at the end of that part of the Detach procedure. Otherwise, the MME 108 may Publish the StopDataCollection( ) message when it receives the LTE Delete Session Response message from the SGW 110. When the Detach is an HSS-initiated Detach Procedure, the MME 108 may Publish the StopDataCollection( ) message preferably after the S1 Release portion of the Detach procedure completes, but alternatively, when the MME 108 sends the LTE Cancel Location Ack message to the HSS 120. See FIG. 47.

Figure 46:
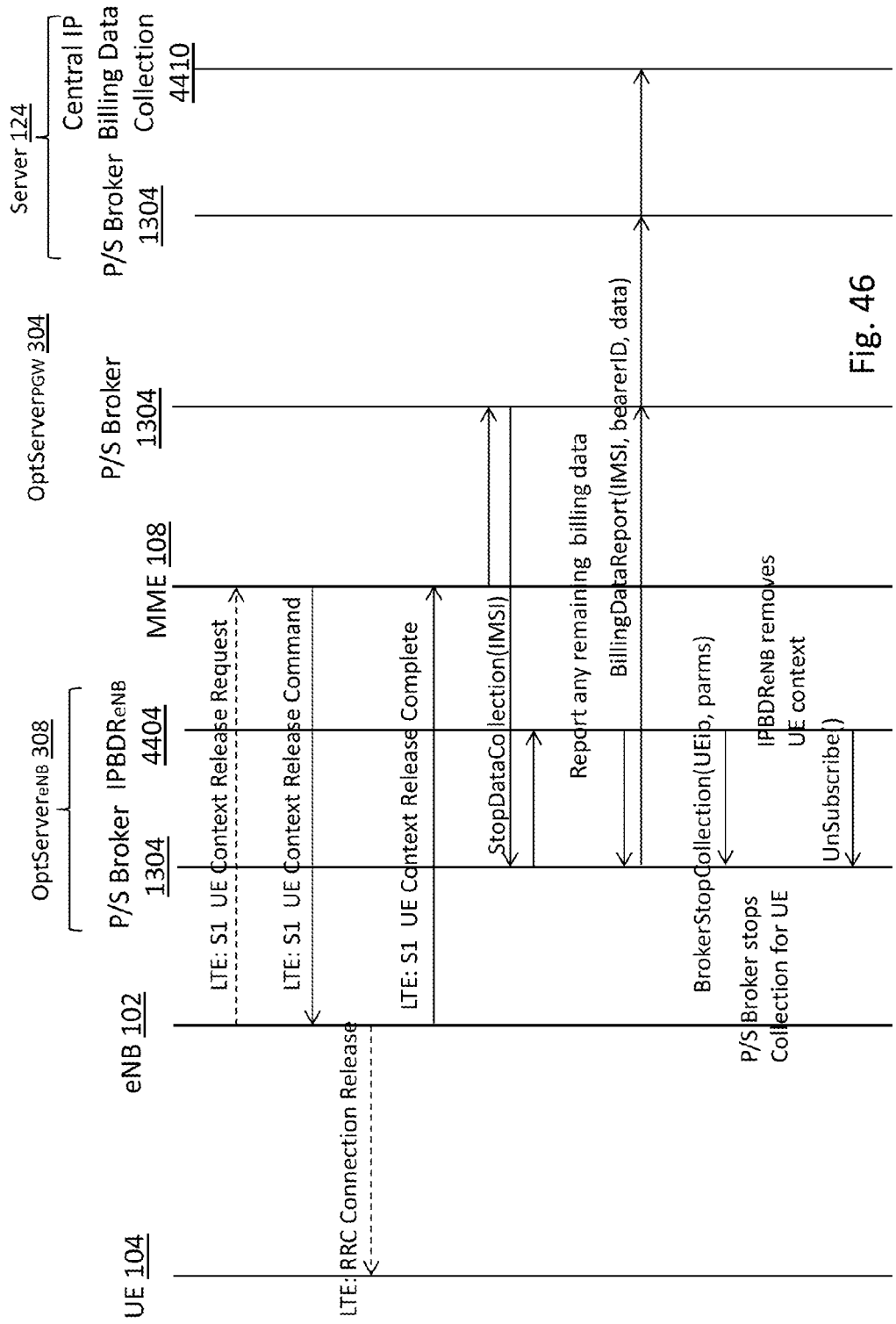
FIG. 46 depicts an embodiment of a message exchange that enables billing data collection programs to learn when to stop their collecting actions when a UE goes to the ECM-IDLE state.
Figure 47:
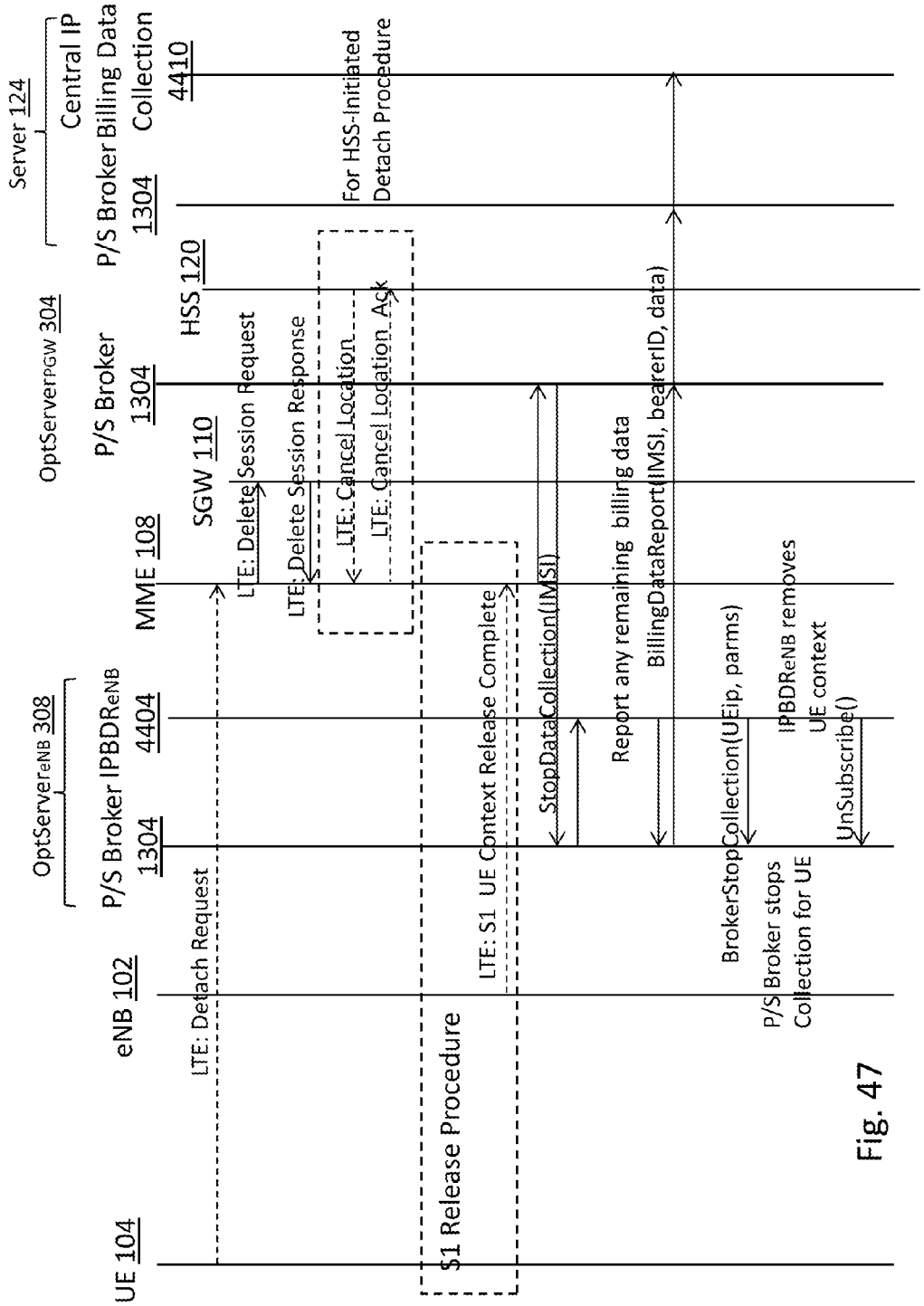
FIG. 47 depicts an embodiment of a message exchange that enables billing data collection programs to learn when to stop their collecting actions when a UE becomes detached from the LTE Network.

Note that although FIG. 45, FIG. 46, and FIG. 47 show the message interactions using the facilities of the P/S Broker 1304 middleware, the descriptions provided herein do not include a complete set of Topics that may be used for these exchanges. The previous paragraphs and the preceding sections of this disclosure has included teachings as to how the Topics may be constructed to provide effective communications among all the participating entities, and those skilled in the art may be able to apply these teachings to the message exchanges in the current disclosure.

In addition to collecting and reporting the usage data that traverses a redirected bearer 312 associated with a particular UE 104, the IPBDR$_{eNB}$ 4404 programs, and likewise, the IPBDR$_{PGW}$4402 program, may also report billing data for the resource usage that occurs on their processing node. In one embodiment of this capability, these program instances may periodically obtain data collected by the operating system for their computing node. Typically, these programs may collect the size of program text and .bss (i.e., RAM memory) used by each Service Program 4408 shown in FIG. 44. The usage data thus collected may be Published to the Central IP Billing Data Collection program 4410 for aggregation, deposition into a database, and for sending to the LTE Network billing system.

To obtain the number of bytes of permanent storage used by Service Program 4408 instances, and the amount of time used for permanent storage of Service Program 4408 data, the IPBDR$_{PGW}$4402 and the IPBDR$_{eNB}$ 4404 instances may use an interface to the local disk system that is constructed to provide this information to these billing data collection programs. For example, the disk or permanent memory system may be segmented, so Service Program 4408 data is stored in one or more particular segments. The IPBDR$_{PGW}$ 4402 instance and the IPBDR$_{eNB}$ 4404 instances may register on their respective Optimization Server 304 and 308 processors to receive notifications whenever these segments are changed. An agreement with the Service Program 4408 providers may be necessary to allow tagging of the stored data with an ID that identifies the provider of the Service Program 4408 for which data is being stored. With this type of arrangement, it may be seen that the IPBDR$_{PGW}$4402 and IPBDR$_{eNB}$ 4404 instances may collect permanent storage usage data for particular billable entities. This usage data may include the number of bytes stored, the start time, end time, or duration of the storage, the node on which the data is stored, number of accesses to a specified stored item per hour of each day, and the total number of access to a specified stored item per day, the average length of time spent by users in accessing this content item, the total volume of data involved in delivering a specific stored content item using the Back Haul 112, the total volume of data involved in delivering a specific content item not using the Back Haul 112, the number of control messages used in delivering a specified content item per hour of each day. The permanent storage usage data may then be formatted and Published to the Central IP Billing Data Collection program 4410 for aggregation, deposition into a database, and for sending to the LTE Network billing system.

Efficient Reduction of Inter-Cell Interference Using Agile Beams

Figure 48:
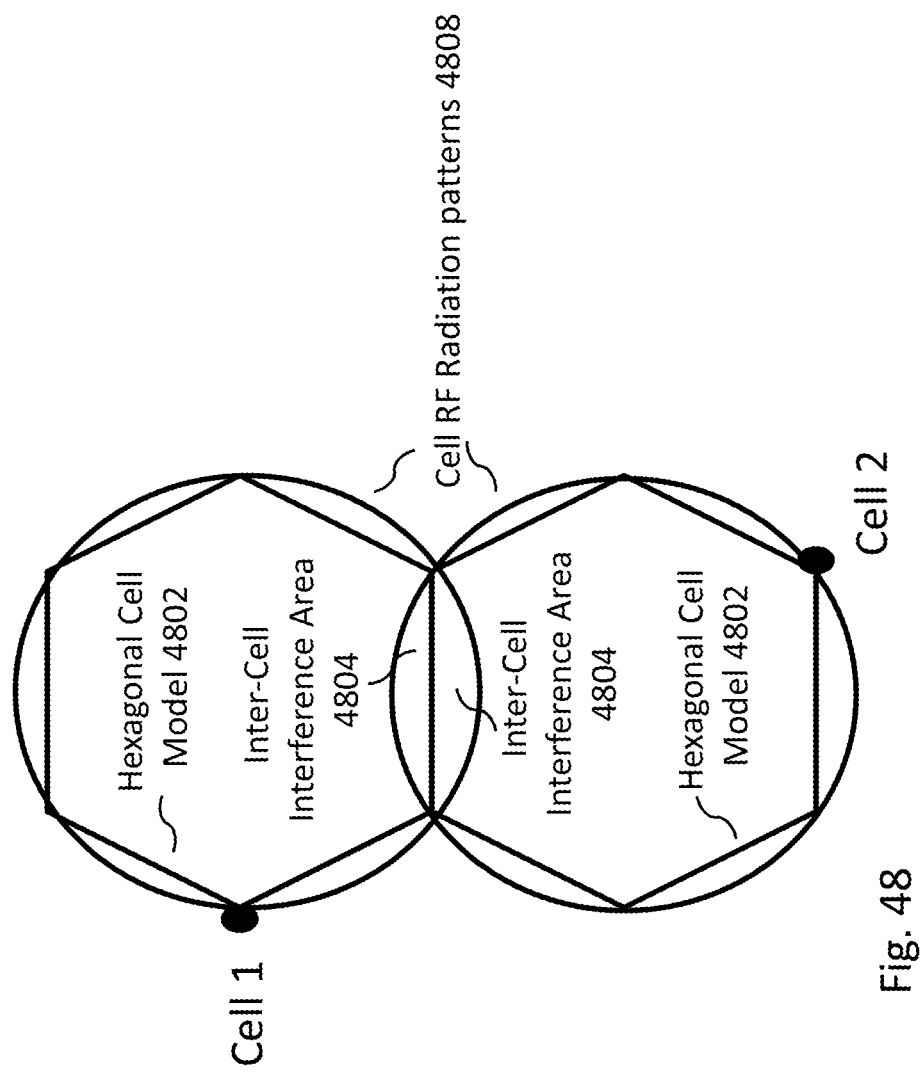
FIG. 48 depicts two adjacent Cells, and shows the overlap of the RF transmissions of each Cell into the coverage area of the other Cell, thereby illustrating the concept of Inter-Cell Interference.

A problem of note in all wireless networks is the interference presented to users in one Cell coverage area by the signals transmitted by an adjacent Cell. This interference is called Inter-Cell Interference, and is especially encountered by users who are near the boundary between two adjacent Cells. See FIG. 48, which shows two adjacent Cells modeled as hexagonal areas 4802, where the solid dot represents the antenna that generates the RF signal 4808 for the Cell. The RF signal 4808 from each Cell necessarily overlaps the coverage area of the adjacent Cell, for otherwise, RF coverage holes result. The areas 4804 where the RF signals overlap are the areas in which Inter-Cell Interference occurs. Because of the interference, the data rates offered to users located in the Cell boundary area 4804 may be reduced, and hence the Cell capacity and throughput, as well as the user experience, may be impacted in a negative way. In an LTE Wireless Network, users are assigned sub-carriers on which to transmit or receive their data. The sub-carriers are designed in the standards to be orthogonal, so that users assigned to one set of sub-carriers observe no interference from the transmissions for other users who are assigned a different set of sub-carriers. However, near the Cell boundary, each of two adjacent Cells may assign the same set of sub-carriers to users in its respective Cell boundary area 4804, which is part of its Cell coverage area 712. In this case, each of these users may be interfered with by the transmissions in the adjacent Cell that use the same sub-carriers as are assigned to the given user.

Techniques for reducing or eliminating this Inter-Cell Interference have long been sought. Current techniques for LTE may include dividing the band of sub-carriers into subsets, such that one subset of sub-carriers is assigned only to users near a boundary of the serving Cell, while the second subset is assigned to users located in the interior of the serving Cell. The subsets may be arranged in each of a set of adjacent Cells such that different subsets of sub-carriers are used at the boundary of these Cells. While this technique mitigates the Inter-Cell Interference problem, the technique leads to a reduction in overall Cell throughput and to a reduced individual user data rate, because only a subset of all the available sub-carriers is made available for assignment to any user.

Another technique currently being explored may be to have adjacent Cells communicate with one another in real time to announce the set of sub-carriers that it will assign to a user located in the boundary 4804 of its Cell coverage area 712. This technique may allow the use of the entire set of sub-carriers by any user, but may result in extra communications between base stations to coordinate their use of the available set of sub-carriers. This technique results in not being able to assign sub-carriers to users at the Cell boundary of one Cell, if the sub-carriers are being assigned to users at the Cell boundary of an adjacent Cell. Hence, Cell throughput and individual user data rates may be impacted negatively. This technique is referred to as Inter-Cell Interference Coordination.

The present disclosure uses neither of the above techniques. Rather, it may exploit the use of Agile Beam Forming discussed earlier in this disclosure. In a given one millisecond interval, a Cell with Agile Beam Forming generates a set of RF beams 902 (e.g., four beams) that covers a subset of the total Cell coverage area 712. A different set of (four) RF beams 902 is generated in each of four one millisecond intervals in an LTE FDD system, such that the sixteen RF beams 902 so generated span the entire Cell coverage area 712. In the fifth millisecond, the first set of RF beams 902 is generated again, followed by the second set of RF beams 902 in the sixth millisecond, etc., and the rotation of the Agile Beams may continue to sweep over the Cell coverage area with a periodicity of four milliseconds. An example of a set of sixteen Agile Beams 902 covering the area 712 of an FDD LTE Cell is shown in FIG. 9.

Figure 49:
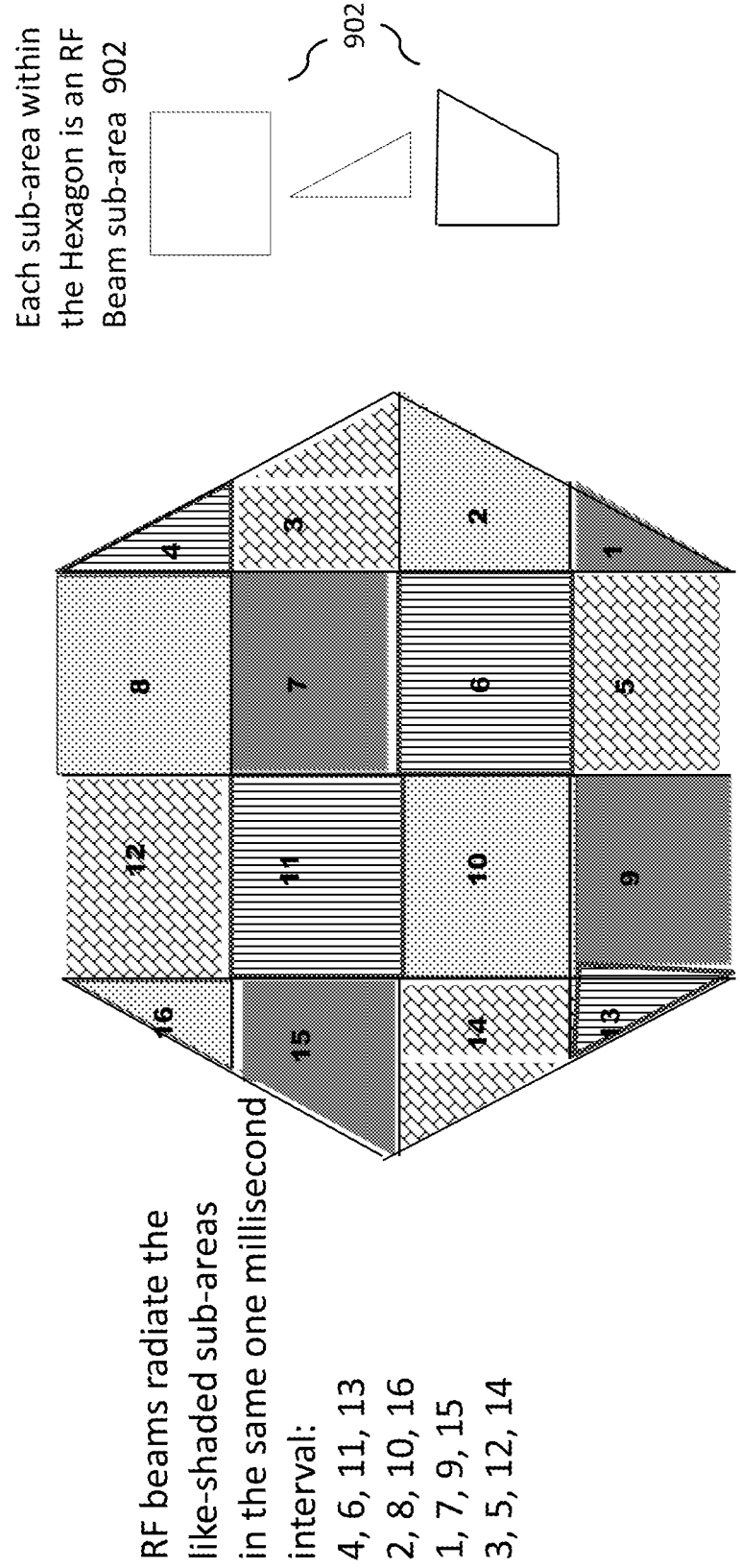
FIG. 49 depicts a hexagonal representation of a Cell, wherein the Cell coverage area is divided into four sets of four sub-areas (i.e., sixteen sub-areas overall), and where each sub-area is covered by an RF beam that is generated by the Cell antenna system using Agile Beam forming techniques.

Using the hexagonal model for a Cell coverage area 712, FIG. 49 shows an example arrangement of sixteen RF beam areas 902 that collectively span the Cell coverage area 712. FIG. 49 shows the set of sixteen RF beam 902 areas grouped into four sets of four RF beam areas 902 that are used to span the Cell coverage area 712, where the sub-areas belonging to the same set are shaded in the same way. All sub-areas with the same shading are covered by RF beams generated in the same one millisecond interval. It may be noted in FIG. 49 that the RF beams 902 cannot be contained to the sub-areas shown, but spill over to some degree into adjacent sub-areas, and likewise spill over at the Cell boundary to the sub-areas of adjacent Cells. By using a large set of antennas to generate the Agile Beams, the spill-over into adjacent sub-areas may be minimized, because the RF beams 902 may be better focused, and the RF signal level of a particular beam 902 may be attenuated rapidly outside the sub-area of its intended coverage. Note in FIG. 49 that the sub-areas 902 that are generated in any single one millisecond interval are, in general, separated by one or more sub-areas 902 in the same Cell. Hence, in any one millisecond interval, the use of Agile Beam forming allows the same sub-carriers to be assigned to users in the same Cell (to up to four users), but who are located in different sub-areas 902. The Cell capacity and throughput, as well as the maximum data rate that may be assigned to any user, may be greatly increased compared with a Cell that does not use Agile Beam forming.

It may therefore be noted that if the RF beam 902 rotations in adjacent Cells can be arranged such that the RF beams 902 covering adjacent sub-areas in adjacent Cells are not generated in the same one millisecond interval, the Inter-Cell Interference problem may be solved without resorting to additional communications, and without resorting to limiting the set of sub-carriers that may be assigned to users.

Establishing Non-Adjacent RF Beam Patterns in the Cells of the Same LTE Base Station This disclosure presents the case where the same sets of four RF beam sub-areas 902 are generated in each Cell, although not necessarily at the same time in each Cell. It should be noted that if the sixteen RF beams 902 are arranged in a pattern in which only one, two, or three RF beams 902 cover any boundary 4804 of the Cell, then it may be possible to arrange the beam rotations in adjacent Cells such that no two adjacent RF beam 902 sub-areas are generated in the same one millisecond interval. However, if the pattern of the RF beam sub-areas results in their being four or more RF beam 902 sub-areas at any Cell boundary 4804, it may not be possible to choose a beam rotation in each Cell without causing two or more adjacent sub-areas to be generated in the same one millisecond interval.

Figure 50:
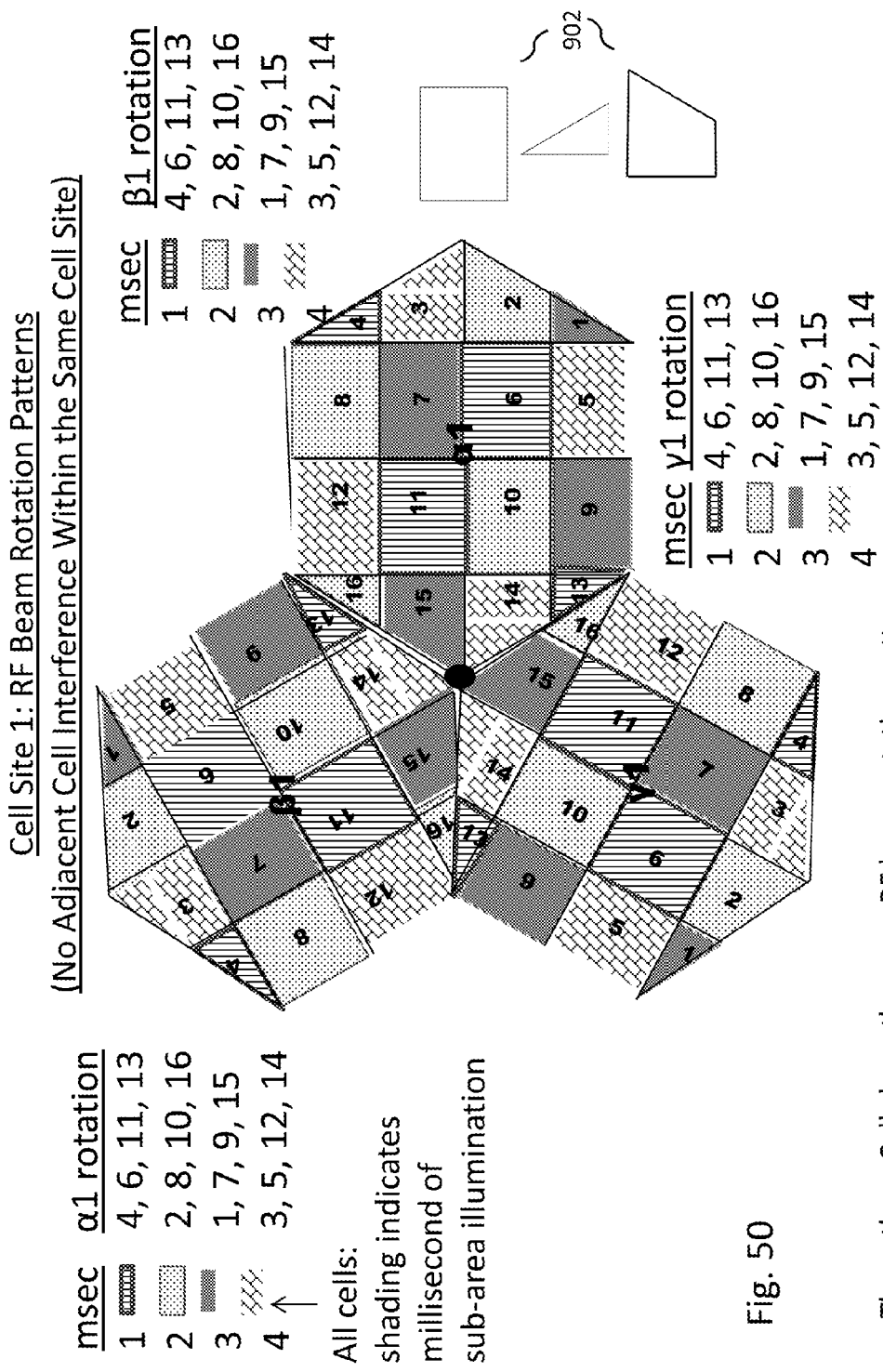
FIG. 50 depicts the three Cells of an example base station system that employs Agile Beam forming, and shows how the RF beam rotation pattern in each Cell may be constructed to avoid Inter-Cell Interference at the boundaries of any Cell.

FIG. 50 shows the case for a base station that supports three Cells. The antennas of the base station system are located at the solid black dot in FIG. 50, and the three Cells are labeled α1, β1, and γ1. The RF beam area 902 sub-areas are labeled 1 through 16. The same sets of four RF beam areas 902 are used in each Cell, and for the RF beam 902 geometry shown in FIG. 50, the same RF beam 902 rotation pattern may be used in each Cell. Hence, in the first one millisecond interval, each of the three Cells generates RF beams 902 that cover sub-areas 4, 6, 11, 13 in its respective Cell coverage area 712. These sub-areas are all shaded with vertical lines in FIG. 50. Note that at the boundary between any two Cells, the adjacent sub-area in the adjacent Cell is not being generated in this time interval, and hence, there is no Inter-Cell interference in this first millisecond of operation.

In the second millisecond of operation, FIG. 50 shows that each Cell generates RF beam areas 902 that cover sub-areas 2, 8, 10, and 16 in its respective Cell coverage area 712, which are shaded with a dotted pattern. Again, it may be seen that at the boundary between any two Cells, the adjacent sub-areas in the adjacent Cell are not being generated in this time interval. Hence, there is no Inter-Cell Interference in the second millisecond of operation.

In the third millisecond of operation, FIG. 50 shows that each Cell generates RF beam areas 902 that cover sub-areas 1, 7, 9, 15 in its respective Cell coverage area 712, which are shaded with a fine hashed pattern. Again, it may be seen that at the boundary between any two Cells, the adjacent sub-areas in the adjacent Cell are not being generated in this time interval. Hence, there is no Inter-Cell Interference in the third millisecond of operation.

In the fourth millisecond of operation, FIG. 50 shows that each Cell generates RF beam areas 902 that cover sub-areas 3, 5, 12, 14 in its respective Cell coverage area 712, which are shaded with a slanted brick pattern. Again, it may be seen that at the boundary between any two Cells, the adjacent sub-areas in the adjacent Cell are not being generated. Hence, there is no Inter-Cell Interference in the fourth millisecond of operation.

The first set of RF beam 902 areas, 4, 6, 11, 13, are generated again in the fifth millisecond of operation, so the pattern of RF beam 902 generation repeats again. Thus, it may be seen that the RF beam rotation pattern selected for each Cell in FIG. 50 results in no Inter-Cell Interference. No inter-Cell communications or coordination is required, and no restrictions are placed on the LTE sub-carriers that may be assigned to users in any of the RF beam 902 areas in any given millisecond of operation. The selection of RF beam 902 sub-areas grouped into sets of four is not unique, and the rotation pattern shown in FIG. 50 is not unique. It may be apparent to those skilled in the art that other selections of the RF beam 902 sub-areas, and other choices for the RF beam rotation pattern may be selected with the same result of no Inter-Cell Interference.

Figure 51:
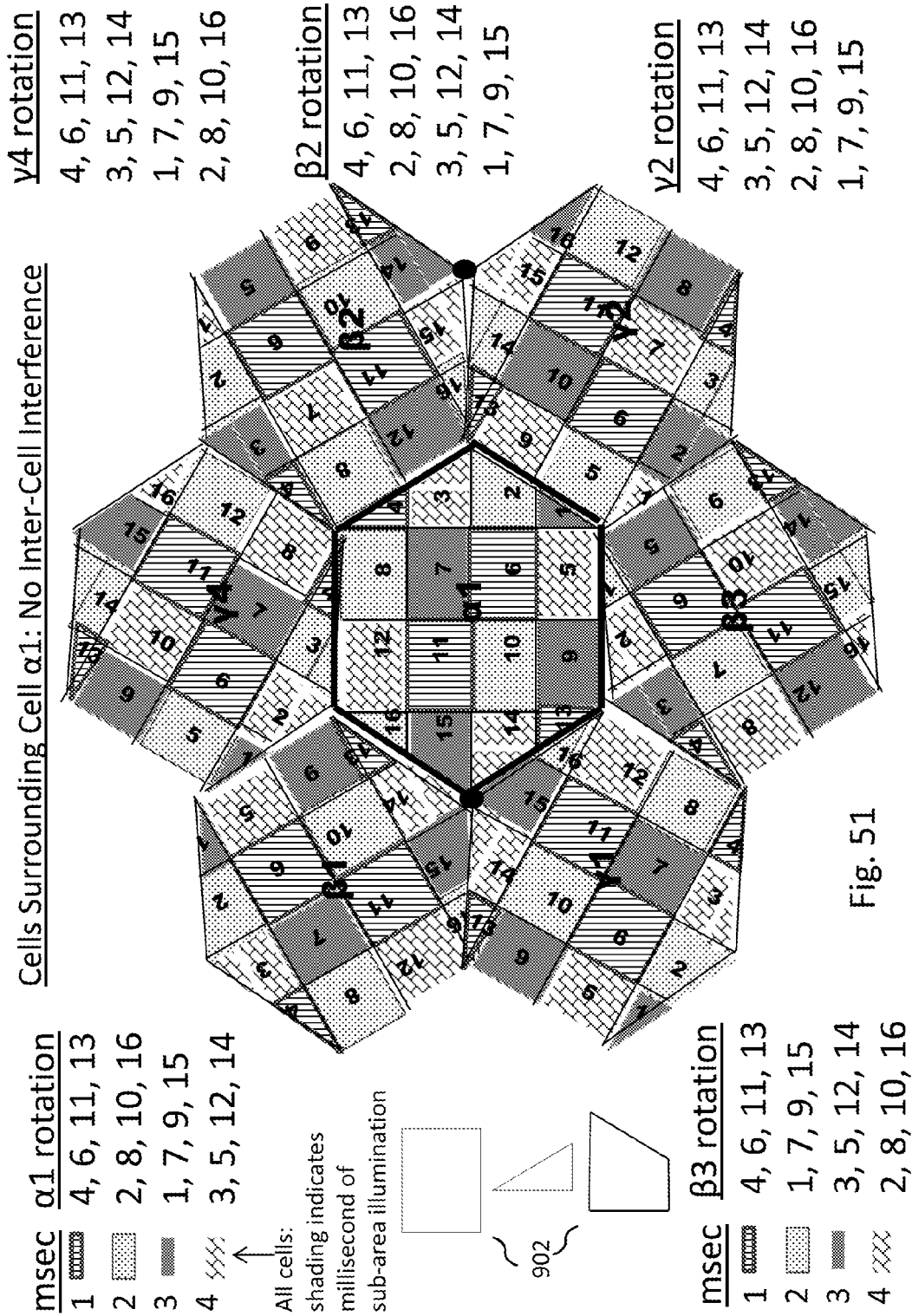
FIG. 51 depicts all the Cells that may be adjacent to a given Cell, and shows how the RF beam rotation pattern in each Cell may be constructed to avoid Inter-Cell Interference at the boundary of any Cell.

Establishing Non-Adjacent RF Beam Patterns in the Adjacent Cells of Different LTE Base Stations FIG. 51 expands the result shown in FIG. 50 by adding the adjacent Cells of neighbor LTE base stations 2, 3, and 4. For the sake of easier understanding of the results, FIG. 51 shows only the adjacencies to the Cell a1. In this hexagonal representation of a Cell, each Cell has six sides and hence, each Cell has six adjacent Cells. Two of the adjacent Cells, β1 and γ1, are in the same base station system as is α1, and the results of their RF beam rotation patterns is already shown in FIG. 50. The other Cells that are adjacent to Cell α1 are β2 and γ2 in base station system 2, Cell β3 in base station system 3, and Cell γ4 in base station system 4, as shown in FIG. 51. The boundaries of Cell a1 are shown in highlight to make it easier to see that there are no adjacent sub-areas being generated at the same time in any two adjacent Cells, i.e., at any boundary 4804 of Cell α1, whenever an RF sub-area is being generated in that Cell, the adjacent sub-area in the adjacent Cell is not being generated (has a different shading).

FIG. 51 lists the RF beam rotation pattern followed in each of the Cells β2 and γ2, and β3 and γ4 that are adjacent to Cell α1, but not in the same base station system. Table 9 shows the beam rotation patterns chosen for these Cells adjacent to Cell α1, and located in a different base station system from Cell α1. It should also be noted in FIG. 51 that the adjacent sub-areas at the boundary between Cells γ2 and β2 and at the boundary between Cells γ2 and β3 likewise have different shading patterns, thereby indicating that no Inter-Cell Interference occurs between these Cells. The same conclusion is reached for the boundary between Cells β2 and γ4 and for the boundary between Cells β3 and γ1. See FIG. 51.

TABLE 9

Example of Beam Rotation Patterns for Cells Adjacent to a Given Cell, but in a Different Base Station System

| Base Station System | Cell | Rotation Pattern |
| --- | --- | --- |
| 1 | α1 | msec 1: 4, 6, 11, 13 |
|   |    | msec 2: 2, 8, 10, 16 |
|   |    | msec 3: 1, 7, 9, 15 |
|   |    | msec 4: 3, 5, 12, 14 |
| 2 | β2 | msec 1: 4, 6, 11, 13 |
|   |    | msec 2: 2, 8, 10, 16 |
|   |    | msec 3: 3, 5, 12, 14 |
|   |    | msec 4: 1, 7, 9, 15 |
|   | γ2 | msec 1: 4, 6, 11, 13 |
|   |    | msec 2: 3, 5, 12, 14 |
|   |    | msec 3: 2, 8, 10, 16 |
|   |    | msec 4: 1, 7, 9, 15 |
| 3 | β3 | msec 1: 4, 6, 11, 13 |
|   |    | msec 2: 1, 7, 9, 15 |
|   |    | msec 3: 3, 5, 12, 14 |
|   |    | msec 4: 2, 8, 10, 16 |
| 4 | γ4 | msec 1: 4, 6, 11, 13 |
|   |    | msec 2: 3, 5, 12, 14 |
|   |    | msec 3: 1, 7, 9, 15 |
|   |    | msec 4: 2, 8, 10, 16 |

Figure 52:
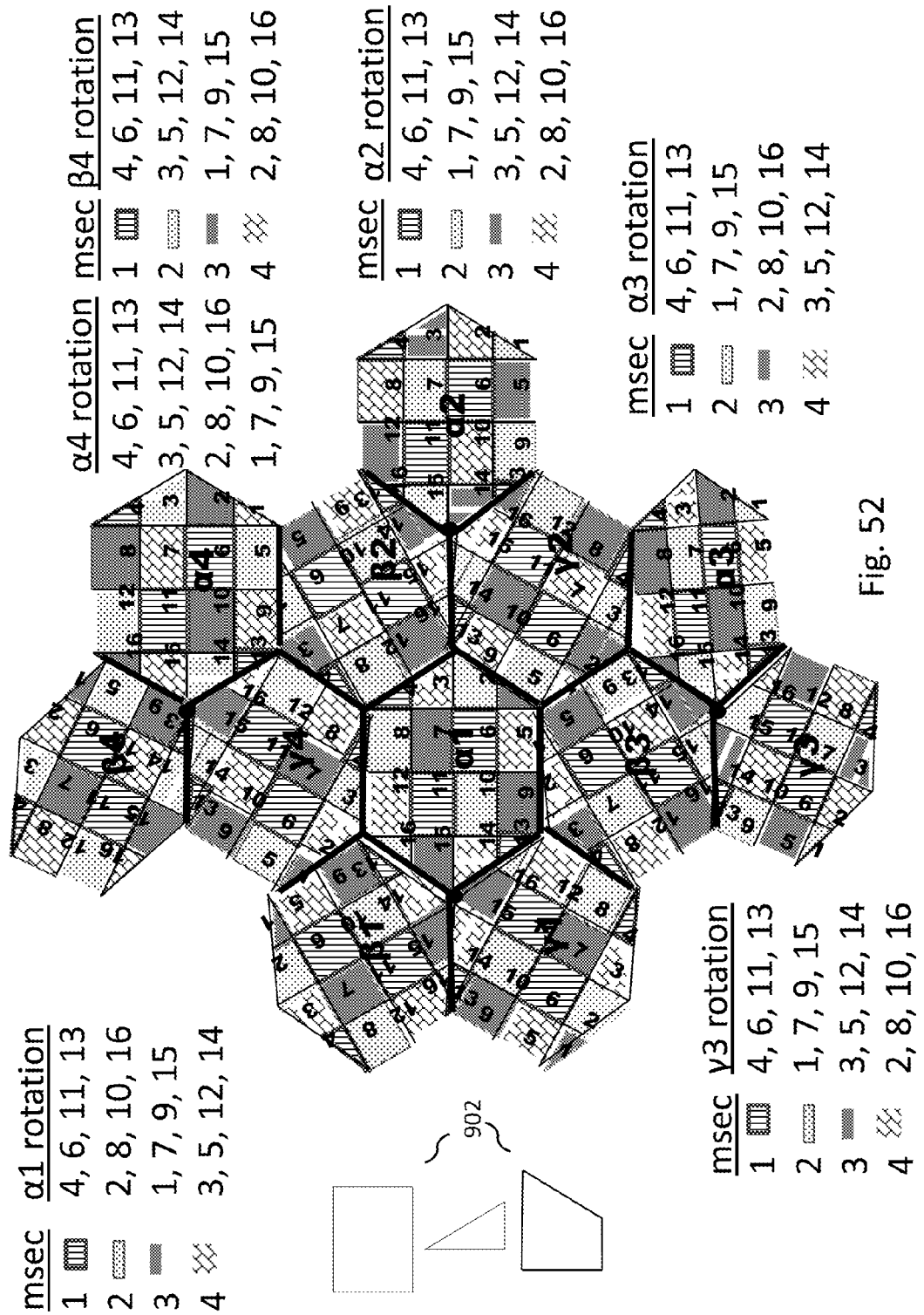
FIG. 52 depicts all the Cells in four base station systems that use Agile Beam forming, and shows how the RF beam rotation pattern in each Cell may be constructed to avoid Inter-Cell Interference at the boundary of any Cell, thereby demonstrating that Inter-Cell Interference avoidance may be extended to all the Cells in the wireless network.

The example of FIG. 51 may be continued to show that when the remaining Cells of base station systems 2, 3, and 4 are added, RF beam 902 rotation patterns may be selected, so there is again no Inter-Cell Interference generated at any boundary of any Cell. This process of selecting the RF beam 902 rotation pattern may be extended to every base station system, and to every Cell, in the LTE Wireless Network. FIG. 52 shows the result when Cell α2 is added for base station system 2, when Cells α3 and γ3 are added for base station system 3, and when Cells α4 and β4 are added for base station system 4. The RF beam 902 rotation pattern is shown for each of these Cells in FIG. 52, and the boundary between each pair of adjacent Cells is highlighted to make it easier to see that no like-shaded sub-areas are adjacent to each other across any inter-Cell boundary. Thus, Inter-Cell Interference may be avoided when Agile Beams are used in the LTE wireless system, as disclosed herein.

Arranging for Time Synchronization in Each Cell for RF Beam Generation

FIG. 50, FIG. 51, and FIG. 52 show how Inter-Cell Interference may be avoided in wireless systems employing Agile Beam Forming for systems of three Cells in one base station system and in a multiplicity of base station systems. In each case, the base station systems must maintain the same notion of a start time, so each Cell is able to determine which sub-set of RF beam areas 902 must be generated in any given millisecond interval. The time synchronization across all the Cells must therefore be precise to a tolerance much less than one millisecond. The RF beam 902 patterns repeat in each Cell every four milliseconds, and hence a given set of four RF beams 902 occurs in the same sub-frame of an LTE frame every twenty milliseconds (i.e., in every other LTE frame). If each Cell is able to determine when the first millisecond of an odd-numbered (or even-numbered) LTE frame occurs, all the Cells may generate the correct subset of RF beam 902 patterns in every one millisecond interval.

There may be at least two approaches to generate the desired result, where no new invention is required for this purpose. The first approach may be if all the base station systems in the wireless network operate using GPS for timing. In this case, each base station system may have the same notion of the current time to a precision better than 20 nanoseconds. Each Cell may therefore be synchronized, for example, to start an odd-numbered LTE frame coincident with a 1-second mark of the GPS timing system. (Each LTE frame is 10 milliseconds in duration.) If GPS is not available to any, or to all, the base station systems in the LTE network, then the Precision Time Protocol (PTP) specified in the IEEE 1588 standard may be used. A master clock that is part of an IEEE 1588 timing system may be synchronized to GPS time, for example, and precise timing information may be distributed to each base station system in the LTE network, synchronized to the master clock. Here, as in the use of GPS timing, each Cell may then, for example, synchronize its odd-numbered LTE frame with a 1-second mark of the IEEE 1588 system. The precision obtained may be much better than one millisecond, and hence, may be used for the purpose of synchronizing the LTE Cells in their generation of the RF beam 902 patterns.

Baseband Data Transmission and Reception in an LTE Wireless Base Station Employing Periodically Scanning RF Beam Forming Beam forming techniques have been used for many years in the areas of audio signal processing, sonar signal processing, and radio frequency signal processing to improve the operation of the system. In many cases, these systems locate a transmitting or receiving point, and then focus the system antennas to create a beam for that point. The systems disclosed herein operate in a different manner, and take advantage of the fact that in LTE Wireless Systems, user devices are scheduled either to receive a down link transmission, or to generate an uplink transmission. The disclosed systems do not focus an antenna beam on a particular user, but rather generate m sets of N RF beam patterns 902, where a given set of N RF beams 902 covers a fixed set of N sub-areas of the total Cell coverage area. The systems perform best when the sub-areas are non-adjacent. The maximum number of sets of N RF beam patterns 902 may be restricted in an LTE FDD system to be 4, as disclosed herein, while the maximum number of sets of N RF beam patterns 902 may be restricted in an LTE TDD system to be either 1, 2, or 3, depending on the U/D configuration 1002 of the TDD system, as disclosed herein. The total number, m times N, of RF beams 902 may be designed to overlap the total Cell coverage area 712. In an LTE FDD system, each of the m sets of RF beam patterns 902 may be generated in a one-millisecond sub-frame of an LTE frame, where the m sets may fill every four consecutive sub-frames in an LTE FDD system in the same sequence, and thus have a periodicity of 4 sub-frames, as disclosed herein. In an LTE TDD system, each of the m sets of RF beam patterns may be generated in a one-millisecond sub-frame of an LTE frame, wherein the m sets may be distributed across the 10 sub-frames of each LTE frame in a restricted manner that depends on the TDD U/D configuration 1002, as disclosed herein. In either the LTE FDD system, or in the LTE TDD system, the RF beams may be seen to rotate over the Cell coverage area 712 in a periodic manner. These types of beam forming systems are referred to as Periodically Scanning RF Beam Forming Systems, or Periodic Beam Forming Systems, or Periodic Agile Beam Forming Systems.

The present disclosure teaches information related to the systems and methods that may be used by the wireless base station digital baseband subsystem 5302 to construct and process the data that passes via an interface between the RF and antenna subsystem 5304 and the baseband processing subsystem 5302 of an LTE wireless RF base station that employs Periodically Scanning RF Beam Forming. Hence, the present disclosure does not deal with the system and methods used in the RF and antenna subsystem 5304 to generate the RF beam signals that are transmitted or received by the wireless RF base station. The present disclosure teaches that enabling the RF and antenna subsystem 5304 to form N concurrent focused RF beams 902 requires the RF and antenna subsystem 5304 to work with N+1 separate data streams 5308 in the transmit direction and N+1 separate data streams 5310 in the receive direction. For each transmit or receive direction of transmission, each one of N of the data streams corresponds to a different one of the N focused RF beams 902, and one additional data stream corresponds to an additional RF signal whose energy covers the entire area of the Cell, the Cell-Wide transmit data stream, or the Cell-Wide receive data stream. The teachings disclosed herein pertain to the placement of different types of information into each of these data streams for transmission and pertains to the extraction of different types of information from the received data streams. Hence, these teachings describe the operation of the baseband subsystem 5302 of the wireless RF base station that employs Periodically Scanning RF Beam Forming.

Figure 53:
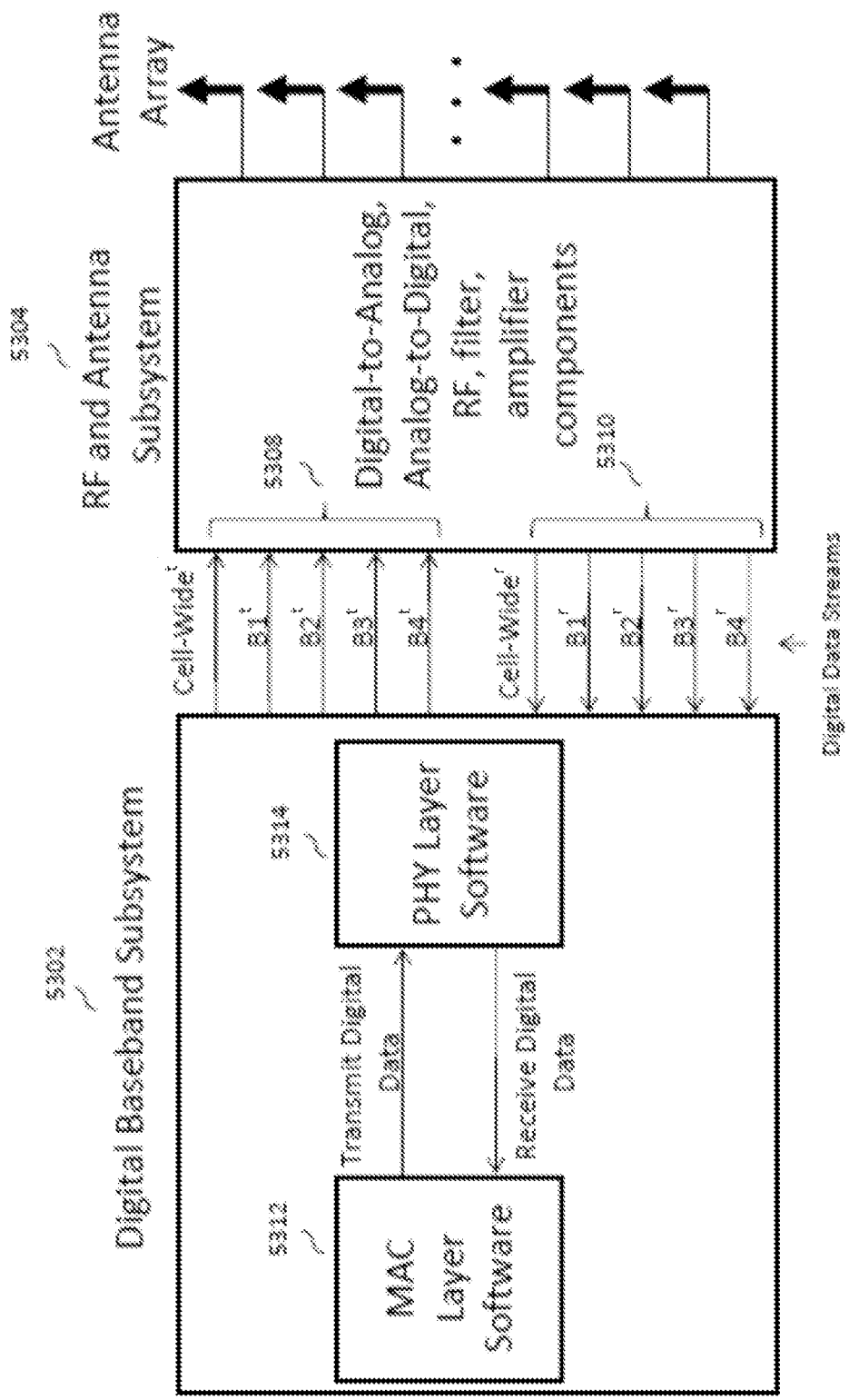
FIG. 53 depicts the baseband subsystem and the RF and antenna subsystem of an LTE wireless base station that generates Periodically Scanning RF Beams, emphasizing the interface between the two subsystems and the MAC layer software and the PHY layer software that perform baseband signal processing.

FIG. 53 shows a depiction of interfacing the RF and antenna subsystem 5304 to the wireless RF base station digital baseband processing subsystem 5302 for the case where N=4. FIG. 53 therefore shows five digital transmit data streams 5308 between the two subsystems, denoted by Cell-Wide$^t$, B1$^t$, B2$^t$, B3$^5$, B4$^t$. These streams may be carried on separate physical interfaces, or may be multiplexed onto a single physical interface between the two subsystems. FIG. 53 also shows five digital receive data streams 5310 between the two subsystems, denoted by Cell-Wide$^r$, B1$^r$, B2$^r$, B3$^r$, B4$^r$. These streams may be carried on separate physical interfaces, or may be multiplexed onto a single physical interface between the two subsystems.

In every 1 millisecond LTE sub-frame interval in an FDD system, or in each D sub-frame interval in a TDD system, the MAC (Medium Access Control) layer software 5312 must generate information for five transmit data streams 5308. One information set corresponds to "Cell-Wide$^t$," where this is the stream whose data is intended to be transmitted across the entire Cell coverage area during the upcoming 1 millisecond sub-frame interval. Each of the four other information sets corresponds to one of the four transmit beam data streams labeled "B1$^t$," "B2$^t$," "B3$^t$," and "B4$^t$." Each transmit beam data stream is intended to be transmitted via a separate RF beam that "illuminates" a specific fixed Cell sub-area in the upcoming 1 millisecond interval. The PHY (Physical) layer software 5314 processing may be applied to convert each transmit information set received from the MAC layer software 5312 into a digital representation of the modulated sub-carriers of the composite signal that needs to be transmitted over the LTE air interface. Hence, the LTE Physical Resource Block (PRB) assignment to the information in each data stream 5308 may be applied by the PHY layer software 5314.

The digital samples for each generated transmit data stream 5308 are conveyed to the RF and antenna subsystem 5304, which contains the array of antenna elements used to generate the RF beam signals 902 as well as the Cell-Wide RF signal. Each of the five digital data streams 5308 is further processed to generate the Cell-Wide RF transmit signal, plus the four RF transmit beam signals 902, which are transmitted over the air interface.

The receive process is analogous to the transmit process for beam forming. In each 1 millisecond interval in an FDD system, or in each U sub-frame in a TDD system, the array of antenna elements in the RF and antenna subsystem 5304, plus additional processing components, generates five digital receive signals 5310, one corresponding to each RF receive beam generated in the interval, plus one corresponding to a Cell-Wide RF receive signal. These signals are denoted in FIG. 53 by Cell-Wide$^r$, B1$^r$, B2$^r$, B3$^r$, B4$^r$, and are sent over the interface to the wireless base station digital baseband subsystem 5302.

LTE is an OFDMA (Orthogonal Frequency Division Multiple Access) system. Orthogonal Frequency Division Multiple Access is the scheme of multiplexing multiple users onto an OFDM (Orthogonal Frequency Division Multiplexing) air interface. A number of sub-carrier frequencies comprise the entire LTE bandwidth for a particular system, where the carrier spacing is chosen so the sub-carriers are orthogonal to one another in the sense specified in TS 36.211 a40. The spacing between sub-carriers is typically 15 kHz. The multiple access of users is achieved by allocating a subset of the total set of sub-carriers to different users at different times. Thus, the sub-carrier resources are assigned to users in a time-shared fashion and in a frequency-shared fashion. LTE signals are allocated to users in units of 12 adjacent sub-carriers (180 kHz), called a Physical Resource Block (PRB). The allocation is for a time interval of 0.5 milliseconds, and usually contains 7 symbols whose modulation can be either QPSK, 16QAM, or 64QAM in the current versions of the standards. The OFDMA symbol period is 66.7 microseconds.

The PRBs and the time domain are viewed as a set of resources, with PRBs being available for assignment to UEs in a given slot of time. The time domain is broken into a series of Frames, each 10 milliseconds long. Each frame consists of 10 sub-frames of 1 millisecond each, and each sub-frame consists of two slots of 0.5 milliseconds each. In every 0.5 millisecond slot, 7 (typically) symbol time intervals occur. In each symbol time interval (66.7 µs), the symbol can modulate an assigned sub-carrier. The combination of symbol time and sub-carrier is referred to as a Resource Element. There are 84 (12 times 7) Resource Elements per PRB in each slot, and 168 Resource Elements per PRB in each sub-frame. The view of the Resource Elements (sub-carrier frequency and symbol time axes) is referred to as a Resource Grid.

Some of the Resource Elements are assigned to Reference Signals, which are transmitted with a predetermined amplitude and phase. These signals are sent by the wireless base station PHY layer software and by the UE PHY layer software, and allow the receiving end to perform coherent demodulation of the radio channel, or to determine the radio channel conditions. Other Resource Elements are assigned to a set of channels used to convey control and other information. The remaining (majority of) Resource Elements are available for assignment to UEs for downlink user data transmissions and for uplink user data transmissions.

Table 10 lists the set of Reference Signals used in down link transmissions, and describes the function of each signal. Table 11 lists the set of physical layer data channels used in down link transmissions, and describes the function of each data channel. Table 12 lists the set of Reference Signals used in uplink transmissions and also describes their functions. Table 13 lists the set of uplink physical layer data channels and describes their functions. These tables may be used to determine the placement of each Reference Signal and each data channel into the data streams used in the Periodically Scanning RF Beam Forming System.

TABLE 10

Summary of Down Link Reference Signals

| Down Link Reference Signal | Reference Signal Sub-Type | Function |
| --- | --- | --- |
| PSS—Primary Synchronization Signal | | Used in Cell search and initial synchronization; conveys part of the Cell ID and synchronization to the system 5 millisecond timing |
| SSS—Secondary Synchronization Signal | | Identifies frame (10 millisecond) timing, and conveys the rest of the Cell ID |
| RS—Reference Signal (Pilot) | Cell-Specific RS UE-Specific RS Channel State Information (CSI) RS MBSFN RS Positioning RS | Used for down link channel estimation and coherent demodulation of down link data |

TABLE 11

Summary of Down Link Physical Layer Data Channels

| Down Link Channel | Function |
| --- | --- |
| Physical Downlink Broadcast Channel (PBCH) | Conveys cell-specific information (e.g., number of transmit antennas, system bandwidth) |
| Physical Control Format Indicator Channel (PCFICH) | Conveys number of OFDM symbols used for PDCCH in a sub-frame |
| Physical Hybrid ARQ Indicator Channel (PHICH) | Conveys H-ARQ feedback to the UE for UE transmissions |
| Physical Downlink Control Channel (PDCCH) | Conveys UL and DL scheduling information and other information |
| Physical Downlink Shared Channel (PDSCH) | Conveys user data, Paging Messages, and some system block information (SBI) of the Broadcast Channel |

TABLE 12

Summary of Uplink Reference Signals

| Uplink Reference Signal | Function |
| --- | --- |
| Demodulation Reference Signal for the Shared Channel (PUSCH-DMRS) | Used for uplink shared channel coherent demodulation (per-UE) |
| Demodulation Reference Signal for the Control Channel (PUCCH-DMRS) | Used for uplink conrtrol channel coherent demodulation (per-UE) |
| Sounding Reference Signal (SRS) | used for uplink channel estimation when no PUSCH or PUCCH is scheduled |

TABLE 13

Summary of Uplink Physical Layer Data Channels

| Uplink Channel | Function |
| --- | --- |
| Physical Random Access Channel (PRACH) | Used to request signaling establishment with the wireless RF base station |
| Physical Uplink Control Channel (PUCCH) | Carries ACK/NAK for downlink packets, CQI information, and scheduling requests |
| Physical Uplink Shared Channel (PUSCH) | Carries User data |

Based on the functions of each Reference Signal and on each data channel, a decision may be made as to which digital data stream to use on the interface between the baseband subsystem and the RF and antenna subsystem when sending or receiving each Reference Signal, and when sending or receiving information for each data channel. The decision may be to use the digital data stream corresponding to the Cell-Wide RF signal or to use the digital data stream corresponding to the specific RF beam signal that covers the current user location. The resulting determinations may be reflected in Table 14 for down link Reference Signals, in Table 15 for down link physical layer data channels, in Table 16 for uplink Reference Signals, and in Table 17 for uplink physical layer data channels.

TABLE 14

Mapping Down Link Reference Signals to Transmit Data Streams

| Reference Signal | Cell-Wide Transmit Data Stream | Per-Beam Transmit Data Stream |
| --- | --- | --- |
| Primary Synchronization Signal | Must be seen by all UEs at all times and at all locations. | |
| Secondary Synchronization Signal | Must be seen by all UEs at all times and at all locations. | |
| UE-specific Reference Signal | When the UE location is unknown, this signal may be sent with the downlink PDSCH transmission of the user data to allow coherent demodulation at the UE. | When the UE location is known, this signal may be sent with the downlink PDSCH transmission of user plane data to allow coherent demodulation at the UE. |
| Cell-specific Reference Signal | These signals must be seen by all UEs at all times and at all locations. | |
| MBSFN Reference Signal | If these signals are used, they must be seen by all UEs at all times and at all locations. | |
| Positioning Reference Signal | If these signals are used, they must be seen by all UEs at all times and at all locations. | |
| CSI Reference Signal | | This signal may be sent in the beam signal for which a UE measurement is desired. |

TABLE 15

Mapping Down Link Physical Layer Data Channels to Transmit Data Streams

| Down Link Physical Layer Data Channel | Cell-Wide Transmit Data Stream | Per-Beam Transmit Data Stream |
| --- | --- | --- |
| PBCH | The system timing information, Cell ID, and MIB information must be received by any UE in any location at any time. | |

TABLE 15-continued

Mapping Down Link Physical Layer Data Channels to Transmit Data Streams

| Down Link Physical Layer Data Channel | Cell-Wide Transmit Data Stream | Per-Beam Transmit Data Stream |
|---|---|---|
| PDCCH | The UE must receive this information before the UE accesses the Cell. PDCCH Control information is sent to UEs during the Random Access procedure, before the UE location is known. | |
| PHICH | H-ARQ ACK/NAK must be sent to any UE in any location at any time. | |
| PMCH | Multicast data must be received by any UE in any location at any time. | |
| PDSCH | Data for the logical Multicast Channel needs to be transmitted cell-wide, so it can be received by a UE in any location. | |
| PDSCH | User plane data is sent to the UE via the Cell-Wide data stream when the UE location is not known, e.g., when the RA Contention Resolution message is sent. | User plane data is scheduled for downlink transmission in the RF beam that covers the UE location, if the UE location is known. This data may include data sent from applications being used by the user, and data sent to the UE via the Logical Dedicated Control Channel. |
| PDSCH | The Logical Common Control Channel information from higher layer protocols in the wireless RF base station is sent via the PDSCH, and needs to be received by the UE before the UE location is known. | |
| PDSCH | The Broadcast Channel SIBs sent via the PDSCH must be received by UEs before they access the system, and before the UE location is known. | |
| PDSCH | Paging messages must be transmitted cell-wide to reach a UE in any location at any time. | |

TABLE 16

Mapping Uplink Reference Signals to Receive Data Streams

| Uplink Reference Signal | Cell-Wide Receive Data Stream | Per-Beam Receive Data Stream |
|---|---|---|
| PUSCH-DMRS | Received in Cell-Wide RF signal along with the corresponding UE PUSCH transmission, when the UE location is unknown. | Received in an RF beam along with the corresponding UE PUSCH transmission, when the UE location is known. |
| PUCCH-DMRS | Received in the Cell-Wide receive signal along with the UE PUCCH data. | |
| Sounding Reference Signal | | Received in an RF beam signal to allow determination of the uplink channel characteristics for the beam-based reception of user plane data by the wireless base station. |

TABLE 17

Mapping Uplink Physical Layer Data Channels to Receive Data Streams

| Uplink Physical Layer Data Channel | Cell-Wide Receive Data Stream | Per-Beam Receive Data Stream |
|---|---|---|
| PRACH | Data is sent on the PRACH before the UE location is known. | |
| PUCCH | Received in the Cell-Wide receive stream to allow requests and measurements to be reported at any time, and to avoid re-assigning this channel whenever the UE moves to a new RF beam location. | |
| PUSCH | User plane data is received via the Cell-Wide receive stream if the UE location is unknown. | User plane data is received via a receive beam signal, if the UE location is known. This data includes data sent on the Logical Dedicated Control Channel of the UE. |
| PUSCH | Logical Common Control Channel signaling is sent to the UE before the UE location is known, and hence, must be received in the Cell-Wide receive signal. | |

It may be seen from Table 14 and Table 15 that the Reference Signals and physical layer data channel information transmitted to the UE using the transmit RF beam data stream corresponding to the RF beam signal that covers the UE location may be limited to the UE-specific Reference Signal used to allow demodulation of user data sent via an RF beam signal, the CSI Reference Signals sent down link to allow the UE to report the down link channel conditions, and the UE data sent via the PDSCH when the UE location is known. All other down link Reference Signals and physical layer data channel information may be sent via the Cell-Wide transmit data stream. The UE data may be sent to the RF and antenna subsystem via the Cell-Wide transmit data stream when the UE location is unknown or when the data is also sent via a transmit RF beam data stream. In the latter case, Transmission Mode 2 (transmit diversity) may be used. When the UE data is sent only in a transmit RF data stream, Transmission Mode 7 may be used (i.e., logical antenna port 5, the beam forming port, is implied).

It may be seen from Table 16 and Table 17 that the Reference Signals and physical layer data channel information received from the UE using the RF beam that covers the UE location are limited to the PUSCH-DMRS that may be transmitted with the UE data and may be received via an RF beam signal when the UE location is known, the SRS signal transmitted by a UE when the wireless base station determines the uplink channel conditions and the UE location is known, and the UE data sent via the PUSCH when the UE location is known. All other uplink Reference Signals and physical layer data channel information may be received via the Cell-Wide receive data stream.

The teachings presented in this disclosure may therefore be used to constrain and guide the behavior of the MAC layer software 5312 and the PHY layer software 5314 in their operation in an LTE wireless base station employing a Periodically Scanning RF Beam Forming system. In each Transmission Time Interval (TTI, i.e., one millisecond interval of an LTE Frame) in an FDD system, or in each D sub-frame of a TDD system, the MAC layer software may interact with the PHY layer software to present a set of transport blocks for the data that is to be transmitted during the TTI, where for each transport block, the MAC layer software may also indicate the transmit beam data stream(s) that are to be used to transmit the data block. For each common channel, the PHY layer software may be pre-provisioned by the MAC layer software with the mapping to a transmit beam data stream. Also, the PHY layer software may be pre-provisioned, or instructed in each TTI by the MAC layer, to include the Reference Signals appropriate to the set of transport blocks in the transmit data streams presented to the PHY layer.

Likewise, in each TTI (i.e., one millisecond interval of an LTE Frame) in an FDD system, or in each U sub-frame in a TDD system, the MAC layer software may interact with the PHY layer software to indicate the set of Resource Elements or PRBs to use to detect data for a particular common or control channel, Reference Signal, or uplink shared channel, and may also indicate the receive beam data stream(s) to use to perform the detection processing. The MAC layer software may re-provision the PHY layer software for some of these items, e.g., for the PRACH channel. It may be important for the PHY layer software to indicate to the MAC layer software the receive data stream which was used to detect each item of detected data presented to the MAC layer by the PHY layer.

Other teachings in this disclosure address the issue of locating and tracking UEs within the sub-areas covered by the RF beams generated in a Periodically Scanning RF Beam Forming system. To better enable the wireless base station MAC layer software to determine which UEs are allowed to be scheduled for data transmission uplink and down link, the MAC layer may keep a list for each of the RF beams generated by the system, where each list contains the set of UEs known to be in the sub-area corresponding to the RF beam represented by the list.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, interne server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

All documents referenced herein are hereby incorporated by reference.

What is claimed is:

1. A system for baseband data transmission and reception in cellular mobile transceiver device communications, the system comprising:
   a cellular LTE base transceiver station adapted for RF time division duplexing (TDD) communication with a plurality of mobile transceiver devices within a cell coverage area of a cell of the cellular LTE base transceiver station, wherein the cell is a sector that operates a single carrier, the cellular LTE base transceiver station comprising a digital baseband processing facility, a digital interface, an RF facility, and an agile beam forming antenna subsystem;
   wherein the cellular LTE base transceiver station is in communication with the plurality of mobile transceiver devices through a cell-wide RF transmit signal, a cell-wide RF receive signal, plus a number m different sets of fixed-position patterns of a number N RF beams, each of the N RF beams transmitted in a given time interval covers a different sub-area of the cell coverage area and all of the N RF beams transmitted in a given time interval are either receive beams for uplink transmissions or transmit beams for downlink transmissions, wherein the cell coverage area is covered by the m different sets of N RF beams, wherein the agile beam forming antenna subsystem is adapted to generate each of the m sets of N RF beams in two or more one-millisecond sub-frames of each LTE frame, such that the m sets of N RF beams are generated in a manner to enable operation of Hybrid-ARQ functionality with a p millisecond interval between a data packet transmission from a respective one of the plurality of mobile transceiver devices to the cellular LTE base transceiver station and an ACK or NAK sent from the cellular LTE base transceiver station in response to receipt of the data packet transmission, and a q millisecond interval between the data packet transmission and a retransmission of the same data packet from the respective one of the plurality of mobile transceiver devices if a NAK is received, wherein p and q are fixed integers and depend on the TDD Up/Down configuration, wherein if the TDD Up/Down configuration is 5 or 6, m is equal to one, wherein if the TDD Up/Down configuration is 0, 1, 2, or 4, then m is equal to one or two, and wherein if the TDD Up/Down configuration is 3, then m is equal to one, two, or three;
   wherein the digital baseband processing facility provides N transmit beam digital data streams and a cell-wide transmit digital data stream to the RF facility through the digital interface for transmission through the agile beam forming antenna subsystem, and the RF facility provides N receive beam digital data streams and a cell-wide receive digital data stream from the agile beam forming antenna subsystem to the digital baseband processing facility through the digital interface; and
   wherein the digital baseband processing facility processes transmissions to the plurality of mobile transceiver devices through at least one of the N transmit beam digital data streams and the cell-wide transmit digital data stream for transmission in at least one of the m sets of N transmit RF beams and the cell-wide RF transmit signal, and processes receptions from the respective one of the plurality of mobile transceiver devices through at least one of the N receive beam digital data streams and the cell-wide receive digital data stream from at least one of the m sets of N RF receive beams and the cell-wide RF receive signal.

2. The system of claim 1, wherein N equals 4, where 4 transmit beam digital data streams, plus the cell-wide transmit digital data stream are generated in each Downlink (D) sub-frame of the LTE TDD system, and where 4 receive beam digital data streams, plus the cell-wide receive digital data stream are generated in each Uplink (U) sub-frame of the LTE TDD system.

3. The system of claim 1, wherein when a mobile transceiver device of the plurality of mobile transceiver devices first accesses the cell through one of a random access procedure, a handover procedure, and a service request procedure, then the cellular LTE base transceiver station schedules the mobile transceiver device to transmit at least one of an aperiodic CQI (channel quality indicator) measurement report and an aperiodic SRS (sounding reference signal) to the cellular base transceiver station in each of the sub-frames from among the sub-frames in an upcoming LTE frame in which a different set of N RF beams is generated by the agile beam antenna subsystem and in which a DCI (downlink command information) command may be sent.

4. The system of claim 3, wherein the cellular LTE base transceiver station receives the at least one of a CQI measurement report and an SRS sent by the mobile transceiver device k milliseconds after the mobile transceiver device is commanded to transmit the at least one of the CQI measurement report and the SRS, with a reception being recorded for each particular one of the N receive beam signals generated in the reception sub-frame, and wherein after receiving the at least one of a CQI measurement report and an SRS for each of the sub-frames in which the at least one of an aperiodic CQI measurement report and an aperiodic SRS are expected after the mobile transceiver device first accesses the cell, the base transceiver station selects the RF beam associated with the at least one of the highest level CQI measurement report and the highest level SRS thus received as being the RF beam that best covers the mobile transceiver device location.

5. The system of claim 1, wherein after a mobile transceiver device of the plurality of mobile transceiver devices first accesses a cell, and after the cellular LTE base transceiver station determines an RF beam that best covers the initial location of the mobile transceiver device within the cell coverage area, then the cellular LTE base transceiver station periodically schedules that mobile transceiver device to transmit at least one of an aperiodic CQI measurement report and an aperiodic SRS to the cellular LTE base transceiver station in each of the sub-frames from among the sub-frames in an up-coming LTE frame in which a different set of N RF beams is generated by the agile beam antenna subsystem and in which a DCI command may be sent.

6. The system of claim 5, wherein in each periodic interval in which the mobile transceiver device sends the at least one of an aperiodic CQI measurement report and an aperiodic SRS to the cellular LTE base transceiver station, the cellular LTE base transceiver station receives the at least one of the CQI measurement report and the SRS sent by the mobile transceiver device k milliseconds after the mobile transceiver device is commanded to transmit the at least one of the CQI measurement report and the SRS, with a reception being recorded for each particular one of the N receive beam signals generated in the reception sub-frame, and wherein after receiving the at least one of the CQI measurement report and the SRS for each of the sub-frames in which the at least one of the aperiodic CQI measurement report and the aperiodic SRS are expected in the current interval, the base transceiver station selects the RF beam associated with the at least one of the highest level CQI measurement report and the highest level SRS thus received as being the RF beam that best covers the mobile transceiver device location.

7. The system of claim 1, wherein once a location for a mobile transceiver device of the plurality of mobile transceiver devices within an RF beam sub-area is determined, and whenever data is available for transmission to the mobile transceiver device, the cellular LTE base transceiver station schedules transmissions to begin in one of the D sub-frames of a selected LTE frame in which the RF beam sub-area covers the location of the mobile transceiver device, and where any remaining data is transmitted to the mobile transceiver device in subsequent D sub-frames, the first of which is offset from the originally selected sub-frame by a number of sub-frames that depends on the TDD Up/Down configuration, and where the cellular LTE base transceiver station transmits in that D sub-frame an RF beam that covers the location of the mobile transceiver device, until all available data is transmitted to the mobile transceiver device.

8. The system of claim 7, wherein the D sub-frames in which transmissions to the mobile transceiver device can occur repeat every 10 sub-frames.

9. The system of claim 1, wherein transmission through at least one of the N transmit beam digital data streams includes user plane data only for those mobile transceiver devices of the plurality of mobile transceiver devices which are known to be located in a corresponding sub-area illuminated by at least one of the N RF transmit beams corresponding to the at least one of the N transmit beam digital data streams.

10. The system of claim 1, wherein transmissions to the plurality of mobile transceiver devices are provided in both the N transmit beam digital data streams and the cell-wide transmit digital data stream.

11. The system of claim 1, wherein the digital baseband processing facility determines at least one transmit data stream to use to transmit a specific set of transport blocks using a specific set of resource elements, wherein the transport blocks are for at least one of common channels and user data.

12. The system of claim 1, wherein reception through one of the N receive beam digital data streams includes user plane data only from those mobile transceiver devices of the plurality of mobile devices which are known to be located in a corresponding sub-area illuminated by the at least one of the N RF receive beams corresponding to the at least one of the N receive beam digital data streams.

13. The system of claim 1, wherein receptions from the mobile transceiver devices are provided in both the N receive beam digital data streams and the cell-wide receive digital data stream.

14. The system of claim 1, wherein the digital baseband processing facility selects information to be received through the N receive beam digital data streams and the cell-wide receive digital data stream.

15. The system of claim 1, wherein the cell-wide transmit digital data stream contains data for mobile transceiver devices whose location is not known.

16. The system of claim 1, wherein the cell-wide transmit digital data stream contains at least one of data for common channels, reference signals that are common or cell-specific, and paging messages.

17. The system of claim 1, wherein the cellular LTE base transceiver station processes S (Special) sub-frames so that Downlink Pilot Time Slot data is sent in the cell-wide transmit digital data stream, and the Uplink Pilot Time Slot data is received from the cell-wide receive digital data stream.

18. The system of claim 1, wherein if the cellular LTE base transceiver station receives a NAK from a mobile transceiver device for a transmission sent by the cellular LTE base transceiver station, a retransmission is scheduled in any sub-frame in which the current mobile transceiver device location is illuminated by an RF beam.

19. The system of claim 1, wherein the cellular LTE base transceiver station processing of each of N+1 receive digital data streams, comprising the N receive beam digital data streams and the cell-wide receive digital data stream, includes, for each received data item, an indication of which of the N+1 receive digital data streams was used to extract the data, allowing the same data to be detected concurrently in more than one of the N+1 receive digital data streams.

20. The system of claim 1, wherein the digital baseband processing facility maintains a list of mobile transceiver devices located within each RF beam sub-area to be used in scheduling communications in a next communications interval, and wherein a mobile transceiver device may appear in different lists for uplink and downlink transmissions.

21. The system of claim 20, wherein there are m times N lists for uplink transmission and m times N lists for downlink transmission, where N is the number of RF beams generated in each one-millisecond interval, and m is the number of different sets of N RF beams generated by the agile beam forming subsystem.

22. The system of claim 21, wherein up to 12 lists are kept for the uplink transmissions and up to 12 lists are kept for the downlink transmissions.

23. The system of claim 21, wherein the digital baseband processing facility reassigns a mobile transceiver device to a new list whenever the mobile transceiver device moves to a new RF beam sub-area.

24. The system of claim 1, further wherein the cellular LTE base transceiver station is adapted to generate at least one of a CQI (channel quality indicator) measurement command and an SRS (sounding reference signal) command to the respective one of the plurality of mobile transceiver devices and k milliseconds later, wherein k is a fixed integer depending on the TDD Up/Down configuration, the respective one of the plurality of mobile transceiver devices transmits at least one of a CQI measurement report and an SRS signal back to the cellular LTE base transceiver station.

25. The system of claim 4, wherein a different RF beam is selected based on the CQI measurement report than is selected based on the received SRS, the former selection being the best RF beam to use for downlink transmissions, and the latter selection being the best RF beam to use for uplink transmissions.

26. The system of claim 6, wherein a different RF beam is selected based on the CQI measurement report than is selected based on the received SRS, the former
selection being the best RF beam to use for downlink transmissions, and the latter
selection being the best RF beam to use for uplink transmissions.

27. A method, comprising:
providing a cellular LTE base transceiver station adapted for RF time division duplexing (TDD) communication with a plurality of mobile transceiver devices within a cell coverage area of a cell of the cellular LTE base transceiver station, wherein the cell is a sector that operates a single carrier, the cellular LTE base transceiver station comprising a digital baseband processing facility, a digital interface, an RF facility, and an agile beam forming antenna subsystem,
wherein the cellular LTE base transceiver station is in communication with the plurality of mobile transceiver devices through a cell-wide RF transmit signal, a cell-wide RF receive signal, plus a number m different sets of fixed-position patterns of a number N RF beams, wherein each of the N RF beams transmitted in a given time interval covers a different sub-area of the cell coverage area and all of the N RF beams transmitted in a given time interval are either receive beams for uplink transmissions or transmit beams for downlink transmissions, wherein the cell coverage area is covered by the m different sets of N RF beams, wherein the agile beam forming antenna subsystem is adapted to generate each of the m sets of N RF beams in two or more one-millisecond sub-frames of each LTE frame, such that the m sets of N RF beams are generated in a manner to enable operation of Hybrid-ARO functionality with a p millisecond interval between a data packet transmission from a respective one of the plurality of mobile transceiver devices to the cellular LTE base transceiver station and an ACK or NAK sent from the cellular LTE base transceiver station in response to receipt of the data packet transmission, and a q millisecond interval between the data packet transmission and a retransmission of the same data packet from the respective one of the plurality of mobile transceiver devices if a NAK is received, wherein p and q are fixed integers and depend on the TDD Up/Down configuration, and wherein if the TDD Up/Down configuration is 5 or 6, m is equal to one, wherein if the TDD Up/Down configuration is 0, 1, 2, or 4, then m is equal to one or two, wherein if the TDD Up/Down configuration is 3, then m is equal to one, two, or three;
wherein the digital baseband processing facility provides N transmit beam digital data streams and a cell-wide transmit digital data stream to the RF facility through the digital interface for transmission through the agile beam forming antenna subsystem, and the RF facility provides N receive beam digital data streams and a cell-wide receive digital data stream from the agile beam forming antenna subsystem to the digital baseband processing facility through the digital interface; and
wherein the digital baseband processing facility processes transmissions to the plurality of mobile transceiver devices through at least one of the N transmit beam digital data streams and the cell-wide transmit digital data stream for transmission in at least one of the m sets of N transmit RF beams and the cell-wide RF transmit signal, and processes receptions from the respective one of the plurality of mobile transceiver devices through at least one of the N receive beam digital data streams and the cell-wide receive digital data stream from at least one of the m sets of N RF receive beams and the cell-wide RF receive signal.

28. The method of claim 27, further comprising generating, by the cellular LTE base transceiver station, at least one of a CQI (channel quality indicator) measurement command and an SRS (sounding reference signal) command to the respective one of the plurality of mobile transceiver devices and k milliseconds later, wherein k is a fixed integer depending on the TDD Up/Down configuration, the respective one of the plurality of mobile transceiver devices transmits at least one of a CQI measurement report and an SRS signal back to the cellular LTE base transceiver station.

* * * * *

UNITED STATES PATENT AND TRADEMARK OFFICE
CERTIFICATE OF CORRECTION

PATENT NO.        : 9,219,541 B2
APPLICATION NO.   : 13/945273
DATED             : December 22, 2015
INVENTOR(S)       : Harvey Rubin et al.

It is certified that error appears in the above-identified patent and that said Letters Patent is hereby corrected as shown below:

On the page 2, in column 2, under "Other Publications", line 3, delete "Netowrks" and insert -- Networks --, therefor.

On sheet 8 of 53, in Figure 8, line 5, delete "Grtound" and insert -- Ground --, therefor.

Figure 15:
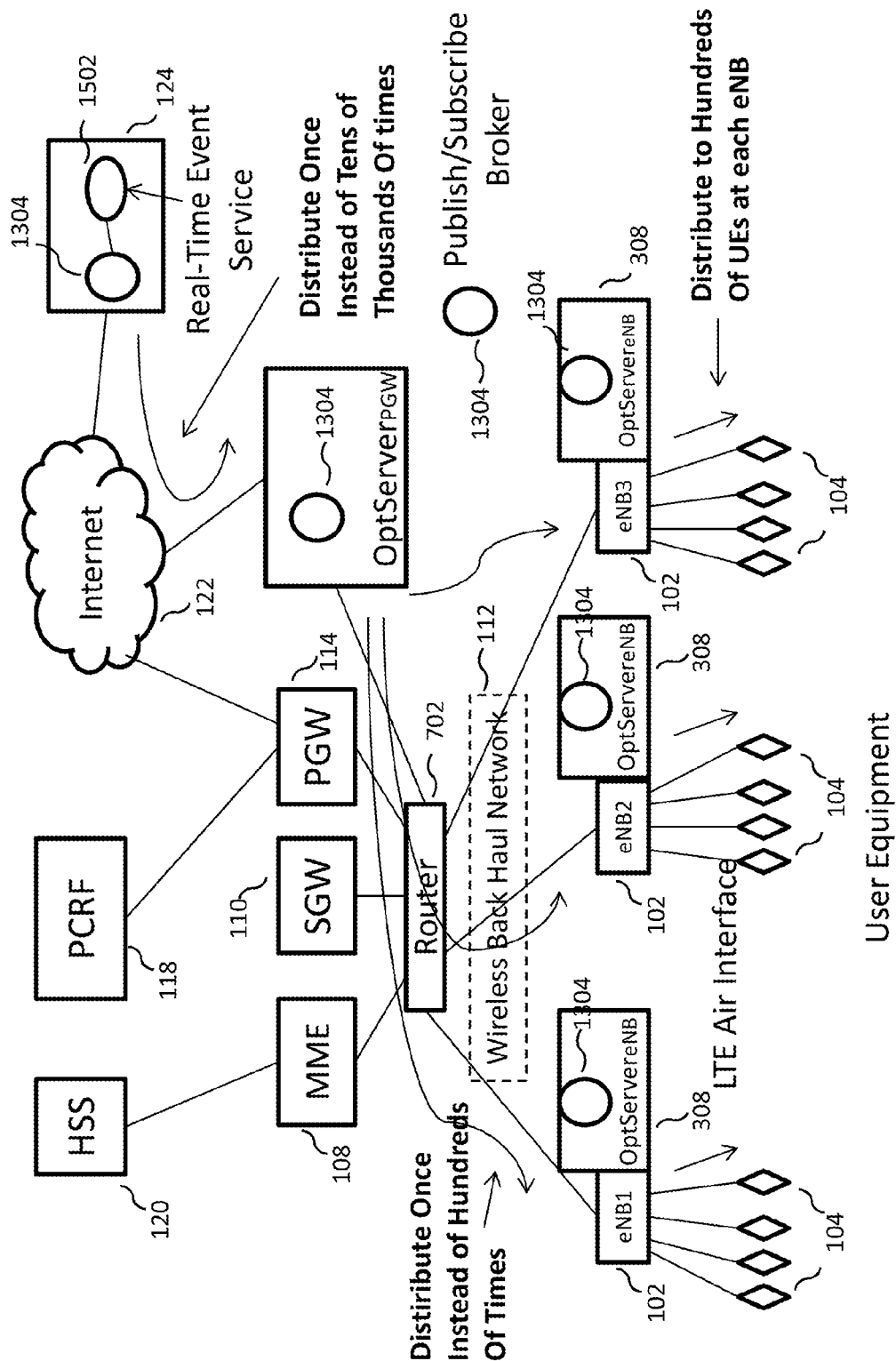
FIG. 15 depicts a real-time event service using the P/S broker architecture and APN bearer redirection.

On sheet 15 of 53, in Figure 15, line 9, delete "Distiribute" and insert -- Distribute --, therefor.

On sheet 20 of 53, in Figure 20, line 6, delete "iniitated" and insert -- initiated --, therefor.

Figure 23:
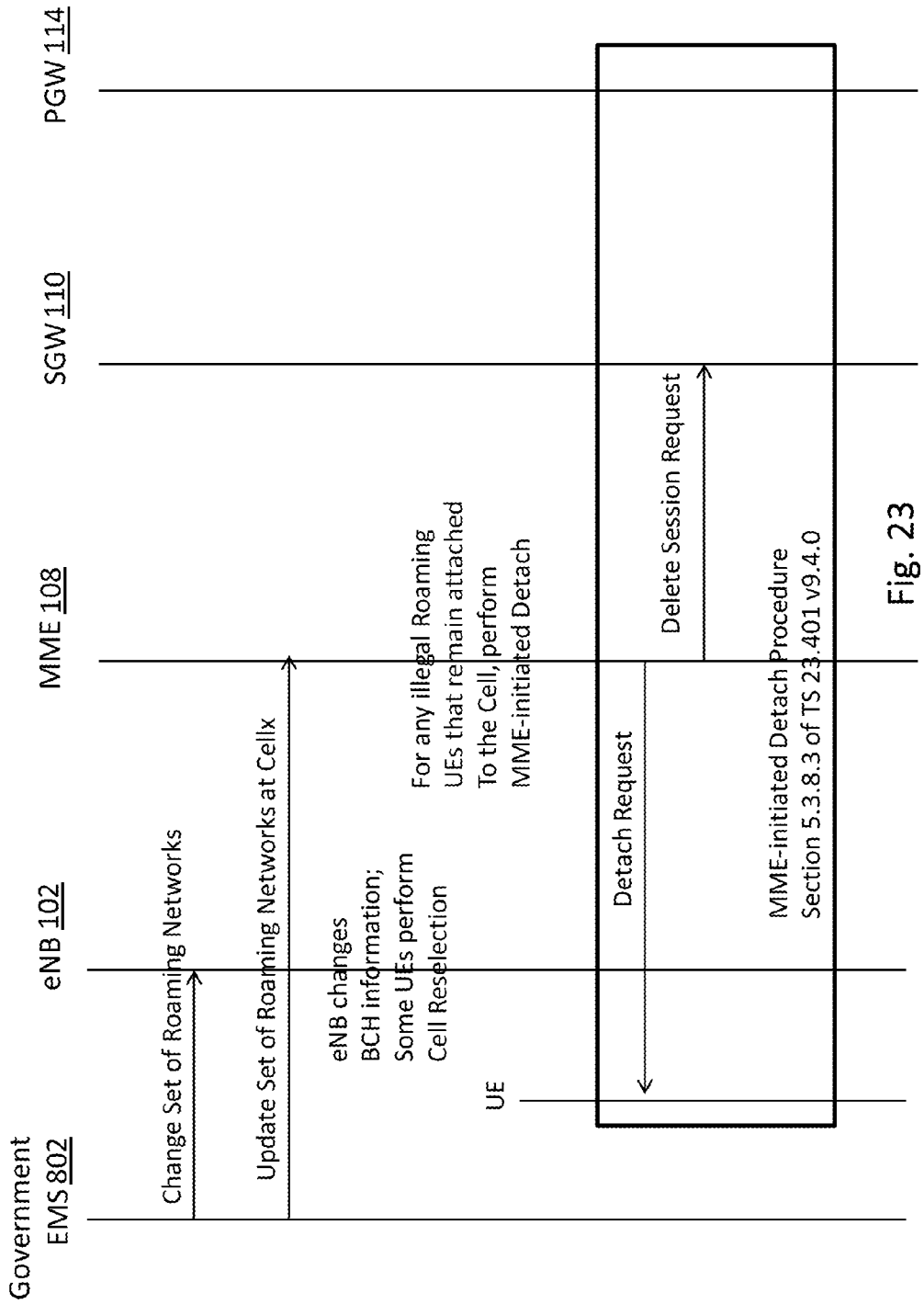
FIG. 23 depicts an initial phase of automated UE detachment from a cell with CB-for-GU enabled: detach roamers.

On sheet 23 of 53, in Figure 23, line 4, delete "Cellx" and insert -- Cells --, therefor.

On sheet 28 of 53, in Figure 28, line 20, delete "UEBiopmetric" and insert -- UEBiometric --, therefor.

On sheet 29 of 53, in Figure 29, line 10, delete "Detach ," and insert -- Detach, --, therefor.

On sheet 36 of 53, in Figure 36, line 20, delete "UEsubscribeTiopic," and insert -- UEsubscribeTopic, --, therefor.

On sheet 36 of 53, in Figure 36, line 30, delete "UEsubscribeTiopic)" and insert -- UEsubscribeTopic) --, therefor.

In column 8, line 46, delete "and" and insert -- an --, therefor.

In column 9, line 1, delete "and" and insert -- an --, therefor.

In column 16, line 2, delete "minimized" and insert -- minimized. --, therefor.

In column 17, line 66, delete "a the" and insert -- the --, therefor.

In column 18, line 39, delete "eNB 1" and insert -- eNB1 --, therefor.

In column 24, line 19, delete "QCI" and insert -- CQI --, therefor.

In column 28, line 11 (Table 5), delete "QCI" and insert -- CQI --, therefor.

In column 28, line 31 (Table 5), delete "QCI" and insert -- CQI --, therefor.

In column 28, line 48 (Table 5), delete "QCI" and insert -- CQI --, therefor.

In column 32, line 52, delete "QCI" and insert -- CQI --, therefor.

In column 39, line 8, delete "of" and insert -- of, --, therefor.

Signed and Sealed this
Thirty-first Day of May, 2016

Michelle K. Lee
*Director of the United States Patent and Trademark Office*

CERTIFICATE OF CORRECTION (continued)
U.S. Pat. No. 9,219,541 B2

In column 41, line 17, delete "kpbs," and insert -- kbps, --, therefor.

In column 44, line 14, delete "Controlkservice" and insert -- Control/<service --, therefor.

In column 44, line 56, delete "Controlkservice" and insert -- Control/<service --, therefor.

In column 44, line 58, delete "Controlkservice" and insert -- Control/<service --, therefor.

In column 44, line 65-66, delete "Controlkservice" and insert -- Control/<service --, therefor.

In column 45, line 9, delete "Controlkservice" and insert -- Control/<service --, therefor.

In column 45, line 17, delete "Controlkservice" and insert -- Control/<service --, therefor.

In column 45, line 27, delete "Controlkservice" and insert -- Control/<service --, therefor.

In column 45, line 34, delete "Controlkservice" and insert -- Control/<service --, therefor.

In column 45, line 62, delete "Controlkservice" and insert -- Control/<service --, therefor.

In column 48, line 41, delete "there.)." and insert -- there). --, therefor.

In column 56, line 9, delete "acBarring" and insert -- ac-Barring --, therefor.

In column 61, line 6, delete "UEipinfo" and insert -- UEipInfo --, therefor.

In column 65, line 31, delete "The" and insert -- the --, therefor.

In column 68, line 38, delete "Hanodver" and insert -- Handover --, therefor.

In column 84, line 44, delete "<confiD>" and insert -- <confID> --, therefor.

In column 84, line 52, delete "SessionkConf" and insert -- Session/<Conf --, therefor.

In column 85, line 33, delete "ActionkconfID" and insert -- Action/<confID --, therefor.

In column 85, line 36, delete "ActionkconfID" and insert -- Action/<confID --, therefor.

In column 86, line 4, delete "<confiD>" and insert -- <confID> --, therefor.

In column 86, line 6, delete "<confiD>" and insert -- <confID> --, therefor.

In column 86, line 28-29, delete "<confiD>" and insert -- <confID> --, therefor.

In column 86, line 66, delete "ActionkconfID" and insert -- Action/<confID --, therefor.

In column 87, line 49, delete "ActionkconfID" and insert -- Action/<confID --, therefor.

In column 97, line 57, delete "OptServerp$_{PGW}$" and insert -- OptServer$_{PGW}$ --, therefor.

In column 97, line 57, delete "OptServer$_e$" and insert -- OptServer$_{eNB}$ --, therefor.

In column 98, line 9, delete "OptServer$_e$" and insert -- OptServer$_{eNB}$ --, therefor.

In column 98, line 16, delete "IPBDRp$_{PGW}$" and insert -- IPBDR$_{PGW}$ --, therefor.

In column 98, line 17, delete "OptServerp$_{PGW}$" and insert -- OptServer$_{PGW}$ --, therefor.

In column 98, line 22, delete "IPBDRp$_{PGW}$" and insert -- IPBDR$_{PGW}$ --, therefor.

In column 98, line 25, delete "OptServerp$_{PGW}$" and insert -- OptServer$_{PGW}$ --, therefor.

In column 98, line 36-37, delete "OptServerp$_{PGW}$" and insert -- OptServer$_{PGW}$ --, therefor.

In column 98, line 39, delete "IPBDRp$_{PGW}$" and insert -- IPBDR$_{PGW}$ --, therefor.

In column 98, line 50, delete "OptServer$_e$" and insert -- OptServer$_{eNB}$ --, therefor.

In column 98, line 51, delete "OptServerp$_{PGW}$" and insert -- OptServer$_{PGW}$ --, therefor.

CERTIFICATE OF CORRECTION (continued)
U.S. Pat. No. 9,219,541 B2

In column 98, line 54, delete "IPBDRp$_{PGW}$" and insert -- IPBDR$_{PGW}$ --, therefor.

In column 98, line 57-58, delete "OptServerp$_{PGW}$" and insert -- OptServer$_{PGW}$ --, therefor.

In column 99, line 1, delete "OptServerp$_{PGW}$" and insert -- OptServer$_{PGW}$ --, therefor.

In column 104, line 4, delete "α1," and insert -- α1, --, therefor.

In column 104, line 59, delete "al." and insert -- α1. --, therefor.

In column 104, line 67, delete "al" and insert -- α1 --, therefor.

In column 107, line 42, delete "B3$^5$," and insert -- B3$^t$, --, therefor.

In column 107, line 59, delete "and"B4$^t$."" and insert -- and "B4$^t$." --, therefor.

In column 109, line 63, delete "conrtrol" and insert -- control --, therefor.

In column 114, line 40, delete "interne" and insert -- internet --, therefor.

In column 118, line 55, in claim 2, delete "4transmit" and insert -- 4 transmit --, therefor.

In column 118, line 57, in claim 2, delete "4receive" and insert -- 4 receive --, therefor.

In column 118, line 59, in claim 2, delete "(U)sub-frame" and insert -- (U) sub-frame --, therefor.

In column 122, line 9, in claim 27, delete "Hybrid-ARO" and insert -- Hybrid-ARQ --, therefor.